US008930253B1

(12) United States Patent
Ball

(10) Patent No.: US 8,930,253 B1
(45) Date of Patent: Jan. 6, 2015

(54) INTERACTIVE SYSTEMS AND METHODS FOR ESTATE PLANNING RELATED ACTIVITIES

(75) Inventor: Robert Ball, Atlanta, GA (US)

(73) Assignee: The Guardian Life Insurance Company of America, New York, NY (US)

(*) Notice: Subject to any disclaimer, the term of this patent is extended or adjusted under 35 U.S.C. 154(b) by 770 days.

(21) Appl. No.: 12/771,795

(22) Filed: Apr. 30, 2010

Related U.S. Application Data

(63) Continuation-in-part of application No. 12/380,564, filed on Feb. 27, 2009, which is a continuation-in-part of application No. 12/113,087, filed on Apr. 30, 2008, now Pat. No. 8,185,463, which is a continuation-in-part of application No. 11/891,616, filed on Aug. 10, 2007, which is a continuation-in-part of application No. 11/510,537, filed on Aug. 25, 2006, now Pat. No. 8,073,714.

(60) Provisional application No. 61/290,579, filed on Dec. 29, 2009, provisional application No. 60/763,200, filed on Jan. 27, 2006.

(51) Int. Cl.
*G06Q 40/00* (2012.01)

(52) U.S. Cl.
USPC ................................ 705/36 R; 705/4; 705/35

(58) Field of Classification Search
USPC ....................................................... 705/36 R
See application file for complete search history.

(56) References Cited

U.S. PATENT DOCUMENTS 3,406,467 A 10/1968 Lufkin et al. ................. 434/107
4,837,693 A 6/1989 Schotz ......................... 364/408

(Continued)

FOREIGN PATENT DOCUMENTS

WO WO 01/33476 5/2001
WO WO 01/33476 A2 5/2001
WO WO 02056143 A2 7/2002

OTHER PUBLICATIONS

"GBS Agency Expert" GBS, Inc.,http://www.gbsinc.com(Feb. 16, 2006), 122 pages.

(Continued)

*Primary Examiner* — Hai Tran
(74) *Attorney, Agent, or Firm* — McGuireWoods LLP

(57) ABSTRACT

Systems and methods for performing insurance related activities are provided. Software can be implemented to provide a (optionally networked) application that includes an interactive interface for use by insurance professionals in managing clients. Personal data can be received for computing a client's financial condition. Business data of the client can be received for computing a business financial condition of the business at the death of the client. An assumption of the business financial condition, including levels of business owned life insurance can be modified. A selection mechanism can also be provided, which when selected displays a representation of a death benefits to the client and to the business, based on the modified assumption. The personal financial and business financial condition can change in relation to a change in the personal death and business death benefit as the assumptions are interactively modified, thereby showing the benefit of business owned life insurance.

17 Claims, 129 Drawing Sheets

(56) References Cited

U.S. PATENT DOCUMENTS

| | | | | |
|---|---|---|---|---|
| 5,182,705 | A | 1/1993 | Barr et al. | 364/401 |
| 5,479,344 | A | 12/1995 | Keziah, Jr. | 364/40 B |
| 5,523,942 | A | 6/1996 | Tyler et al. | |
| 5,819,263 | A | 10/1998 | Bromley et al. | 707/3 |
| 5,884,283 | A | 3/1999 | Manos | 705/30 |
| 5,903,873 | A | 5/1999 | Peterson et al. | 705/4 |
| 5,956,691 | A * | 9/1999 | Powers | 705/4 |
| 5,991,744 | A | 11/1999 | DiCresce | 705/36 |
| 6,009,402 | A | 12/1999 | Whitworth | 705/4 |
| 6,012,043 | A * | 1/2000 | Albright et al. | 705/36 R |
| D424,541 | S | 5/2000 | Mugura | D14/486 |
| 6,064,986 | A | 5/2000 | Edelman | 705/36 |
| 6,076,072 | A | 6/2000 | Libman | 705/34 |
| D427,576 | S | 7/2000 | Coleman | D14/486 |
| 6,092,050 | A | 7/2000 | Lungren et al. | 705/10 |
| D437,601 | S | 2/2001 | Utsuki et al. | D14/486 |
| 6,430,542 | B1 | 8/2002 | Moran | 705/36 |
| 6,456,979 | B1 | 9/2002 | Flagg | 705/4 |
| 6,584,446 | B1 * | 6/2003 | Buchanan et al. | 705/4 |
| 6,611,807 | B1 * | 8/2003 | Bernheim et al. | 705/36 R |
| 6,684,190 | B1 | 1/2004 | Powers et al. | 705/4 |
| 6,996,782 | B2 | 2/2006 | Parker et al. | 715/764 |
| 7,062,458 | B2 * | 6/2006 | Maggioncalda et al. | 705/36 R |
| D526,323 | S | 8/2006 | McDougall et al. | D14/485 |
| D526,324 | S | 8/2006 | McDougall et al. | D14/485 |
| D526,653 | S | 8/2006 | McDougall et al. | D14/485 |
| D527,735 | S | 9/2006 | McDougall et al. | D14/485 |
| 7,328,183 | B1 * | 2/2008 | Leisle | 705/36 T |
| D586,821 | S | 2/2009 | Koh | D14/486 |
| D589,522 | S | 3/2009 | Jewitt et al. | D14/486 |
| D589,528 | S | 3/2009 | Koh | D14/486 |
| 8,010,433 | B1 | 8/2011 | Fisher, III | |
| 8,073,714 | B1 | 12/2011 | Ball | |
| 8,185,463 | B1 | 5/2012 | Ball | |
| 2001/0009004 | A1 | 7/2001 | Groat et al. | 705/36 |
| 2001/0023414 | A1 | 9/2001 | Kumar et al. | 705/35 |
| 2002/0007332 | A1 | 1/2002 | Johnson et al. | 705/36 |
| 2002/0019791 | A1 * | 2/2002 | Goss et al. | 705/36 |
| 2002/0095363 | A1 | 7/2002 | Sloan et al. | 705/36 |
| 2002/0103733 | A1 | 8/2002 | Barrington et al. | 705/36 |
| 2002/0123949 | A1 | 9/2002 | VanLeeuwen | 705/35 |
| 2002/0138389 | A1 | 9/2002 | Martone et al. | 705/36 |
| 2002/0143680 | A1 | 10/2002 | Walters et al. | 705/36 |
| 2002/0147618 | A1 | 10/2002 | Mezrah et al. | 705/4 |
| 2002/0198743 | A1 | 12/2002 | Ariathurai et al. | 705/4 |
| 2003/0167220 | A1 | 9/2003 | Schoen et al. | 705/36 |
| 2004/0039588 | A1 | 2/2004 | Libman | 705/1 |
| 2004/0128171 | A1 * | 7/2004 | Rees et al. | 705/4 |
| 2004/0243451 | A1 | 12/2004 | Winklevoss et al. | |
| 2004/0254881 | A1 * | 12/2004 | Kumar et al. | 705/40 |
| 2005/0010510 | A1 | 1/2005 | Brose et al. | 705/35 |
| 2005/0027632 | A1 | 2/2005 | Zeitoun et al. | 705/36 |
| 2005/0155590 | A1 * | 7/2005 | Carpenter et al. | 124/49 |
| 2006/0090141 | A1 | 4/2006 | Loui et al. | 715/764 |
| 2006/0155590 | A1 | 7/2006 | Graham | |
| 2007/0027736 | A1 | 2/2007 | Reynolds et al. | 705/8 |
| 2010/0004957 | A1 | 1/2010 | Ball | |

OTHER PUBLICATIONS

"Web Writer™," Insurance Systems, Inc., http://www.insurancesystems.ca/insurancesoftware.htm.

"ProSpector™," Sintech Software, Inc, http://www.sintechsoft.com(Feb. 14, 2006), 32 pages.

"IncomeMAX," Cygnus Software, Inc.,http://www.cygnussoftcom (Feb. 14, 2006), 46 pages.

"AccountantsWorld/Financial Calculators" AccountantsWorld, LLChttp://accountantsoffice.com (Aug. 18, 2006), 49 pages.

Article: Robert Regis Hyle, "Guardiin Offers Customers Daily Look at Net Worth" (Industry Intelligence, News, Insights, Innovations, Financial Tools), National Underwriter Publication, TechDecisions for Insurance, vol. 8, No. 4, Apr. 2006.

Article: Danna Voth, "Drowning in Data—Comprehensive Portfolio Management Software Throws a Lifeline to Investors Overwhelmed by the Task of Tracking Their Assets", Worth, May 2007.

Article: Bob Ball and Kathy Readinger, "Producers Eye Account Aggregation As Key to Service Philosophy", National Underwriter Life & Health, Jul. 2007.

"GBS System Capabilities and Features," GBS, Inc., http://www.gbsinc.com, 122 pages (Feb. 16, 2006).

"WebWriter™," Insurance Systems, Inc., http://www.insurancesystems.ca/insurance-software.htm, pp. 1-4 (Feb. 14, 2006).

"ProSpector," Sintech Software, Inc, http://www.sintechsoft.com, 32 pages (Feb. 14, 2006).

"IncomeMax," Cygnus Software, Inc., http://www.cygnussoft.com, 46 pages (Feb. 14, 2006).

"AccountantsWorld/Financial Calculators" AccountantsWorld, LLC, http://www.accountantsoffice.com, 49 pages (Aug. 18, 2006).

* cited by examiner

| | | 8401 Asset Value with Appreciation | | 8402 Asset Income | | 8403 Asset Income Accumulated with Interest | 8404 Additional Income Tax that Would Had to Have Been Paid if the Client Had A GRAT (Capital Gains On Sale of Asset Excluded) | | | | 8405 Estate Values Estate Tax and net After Tax Estate Values | | |
|---|---|---|---|---|---|---|---|---|---|---|---|---|---|
| 8406 Year | 8407 Age | 8408 Value of Property (BOY) | 8409 Value of Property (EOY) | 8410 Annual Asset Income (EOY) | 8411 Net Annual Asset Income (EOY) | 8412 Income Accumulated At Interest - Account Balance (EOY) | 8413 Total Income Tax Required for Current Strategy (EOY) | 8414 Total Income Tax Required for Alternate GRAT Strategy (EOY) | 8415 Tax Differential Between the Two Strategies (EOY) | 8416 Accumulated Opportunity Gain (Loss) on Tax Differential (EOY) | 8417 Total Value of Asset and Accumulated Income Plus/Minus Opportunity Gain (Loss) | 8418 Federal Estate Tax (EOY) | 8419 Value of Property After Estate Tax (EOY) |
| 1 | 60 | $5,000,000 | $5,500,000 | $100,000 | $60,000 | $60,000 | $40,000 | $40,000 | $0 | $0 | $5,560,000 | $2,502,000 | $3,058,000 |
| 2 | 61 | $5,500,000 | $6,050,000 | $110,000 | $66,000 | $128,160 | $45,440 | $41,049 | ($4,391) | ($4,392) | $6,173,768 | $2,778,196 | $3,395,572 |
| 3 | 62 | $6,050,000 | $6,655,000 | $121,000 | $72,600 | $205,374 | $51,476 | $42,223 | ($9,253) | ($13,802) | $6,846,572 | $3,080,957 | $3,765,615 |
| 4 | 63 | $6,655,000 | $7,320,500 | $133,100 | $79,860 | $292,627 | $58,169 | $43,538 | ($14,631) | ($28,930) | $7,584,197 | $3,412,889 | $4,171,308 |
| 5 | 64 | $7,320,500 | $8,052,550 | $146,410 | $87,846 | $391,008 | $65,587 | $45,012 | ($20,575) | ($50,547) | $8,393,011 | $3,776,855 | $4,616,156 |
| 6 | 65 | $8,052,550 | $8,857,805 | $161,051 | $96,631 | $501,715 | $73,804 | $46,662 | ($27,142) | ($79,509) | $9,280,011 | $4,176,005 | $5,104,006 |
| 7 | 66 | $8,857,805 | $9,743,586 | $177,156 | $106,294 | $626,071 | $82,904 | $48,510 | ($34,394) | ($116,765) | $10,252,892 | $4,613,801 | $5,639,091 |
| 8 | 67 | $9,743,586 | $10,717,945 | $194,872 | $116,923 | $765,532 | $92,975 | $50,580 | ($42,395) | ($163,364) | $11,320,113 | $5,094,051 | $6,226,062 |
| 9 | 68 | $10,717,945 | $11,789,740 | $214,359 | $128,615 | $921,706 | $104,117 | $52,898 | ($51,219) | ($220,464) | $12,490,982 | $5,620,942 | $6,870,040 |
| 10 | 69 | $11,789,740 | $12,968,714 | $235,795 | $141,477 | $1,096,364 | $116,439 | $55,494 | ($60,945) | ($289,346) | $13,775,732 | $6,199,079 | $7,576,653 |
| 11 | 70 | $12,968,714 | $14,265,585 | $259,374 | $155,624 | $1,291,457 | $130,063 | $58,402 | ($71,661) | ($371,424) | $15,185,618 | $6,833,528 | $8,352,090 |
| 12 | 71 | $14,265,585 | $15,692,144 | $285,312 | $171,187 | $1,509,136 | $145,120 | $67,746 | ($77,374) | ($462,169) | $16,739,111 | $7,532,600 | $9,206,511 |
| 13 | 72 | $15,692,144 | $17,261,358 | $313,843 | $188,306 | $1,751,771 | $161,756 | $78,235 | ($83,521) | ($562,329) | $18,450,801 | $8,302,860 | $10,147,941 |
| 14 | 73 | $17,261,358 | $18,987,494 | $345,227 | $207,136 | $2,021,971 | $180,133 | $88,996 | ($91,137) | ($672,709) | $20,336,756 | $9,151,540 | $11,185,216 |
| 15 | 74 | $18,987,494 | $20,886,243 | $379,750 | $227,850 | $2,322,612 | $200,427 | $103,169 | ($97,258) | ($794,185) | $22,414,670 | $10,086,602 | $12,328,068 |
| 16 | 75 | $20,886,243 | $22,974,867 | $417,725 | $250,635 | $2,656,861 | $222,833 | $117,910 | ($104,923) | ($927,699) | $24,704,029 | $11,116,813 | $13,587,216 |
| 17 | 76 | $22,974,867 | $25,272,354 | $459,497 | $275,698 | $3,028,206 | $247,564 | $134,391 | ($113,173) | ($1,074,269) | $27,226,291 | $12,251,831 | $14,974,460 |
| 18 | 77 | $25,272,354 | $27,799,589 | $505,447 | $303,268 | $3,440,489 | $274,856 | $152,800 | ($122,056) | ($1,234,999) | $30,005,079 | $13,502,286 | $16,502,793 |
| 19 | 78 | $27,799,589 | $30,579,548 | $555,992 | $333,595 | $3,897,941 | $304,969 | $173,349 | ($131,620) | ($1,411,078) | $33,066,410 | $14,879,885 | $18,186,525 |
| 20 | 79 | $30,579,548 | $33,637,503 | $611,591 | $366,955 | $4,405,222 | $338,186 | $196,269 | ($141,917) | ($1,603,795) | $36,438,930 | $16,397,519 | $20,041,411 |
| 21 | 80 | $33,637,503 | $37,001,253 | $672,750 | $403,650 | $4,967,460 | $374,825 | $221,816 | ($153,009) | ($1,814,541) | $40,154,172 | $18,069,377 | $22,084,795 |
| 22 | 81 | $37,001,253 | $40,701,378 | $740,025 | $444,025 | $5,590,314 | $415,229 | $250,273 | ($164,956) | ($2,044,830) | $44,246,862 | $19,911,088 | $24,335,774 |
| 23 | 82 | $40,701,378 | $44,771,516 | $814,028 | $488,417 | $6,279,972 | $459,778 | $281,952 | ($177,827) | ($2,296,260) | $48,755,228 | $21,939,853 | $26,815,375 |
| 24 | 83 | $44,771,516 | $49,248,668 | $895,430 | $537,258 | $7,043,309 | $508,891 | $317,198 | ($191,693) | ($2,570,619) | $53,721,358 | $24,174,611 | $29,546,747 |
| 25 | 84 | $49,248,668 | $54,173,535 | $984,973 | $590,984 | $7,887,852 | $563,029 | $356,392 | ($206,637) | ($2,869,799) | $59,191,589 | $26,636,215 | $32,555,374 |
| 26 | 85 | $54,173,535 | $59,590,889 | $1,083,471 | $650,083 | $8,821,898 | $622,696 | $399,954 | ($222,742) | ($3,195,853) | $65,216,934 | $29,347,620 | $35,869,314 |
| 27 | 86 | $59,590,889 | $65,549,978 | $1,191,818 | $715,091 | $9,854,577 | $688,453 | $448,347 | ($240,106) | ($3,551,010) | $71,853,545 | $32,334,095 | $39,519,450 |
| 28 | 87 | $65,549,978 | $72,104,976 | $1,311,000 | $786,600 | $10,995,942 | $760,910 | $502,083 | ($258,827) | ($3,937,674) | $79,163,244 | $35,623,460 | $43,539,784 |
| 29 | 88 | $72,104,976 | $79,315,474 | $1,442,100 | $865,260 | $12,257,056 | $840,743 | $561,727 | ($279,016) | ($4,358,446) | $87,214,084 | $39,246,338 | $47,967,746 |

FIG. 84

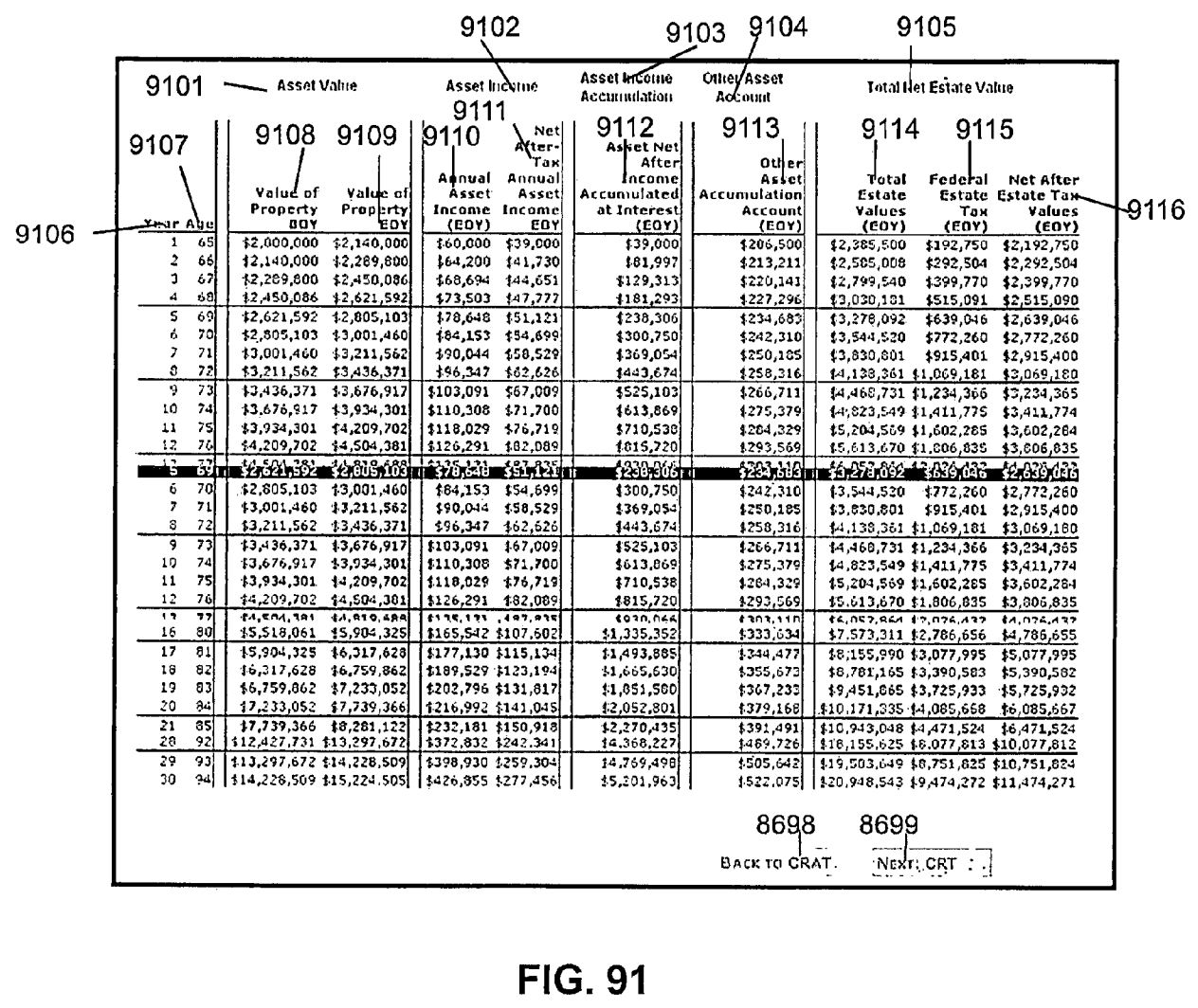

9101 Asset Value | 9102 Asset Income | 9103 Asset Income Accumulation | 9104 Other Asset Account | 9105 Total Net Estate Value

| Year (9106) | Age (9107) | Value of Property BOY (9108) | Value of Property EOY (9109) | Annual Asset Income (EOY) (9110) | Net After-Tax Annual Asset Income EOY (9111) | Asset Net After Income Accumulated at Interest (EOY) (9112) | Other Asset Accumulation Account (EOY) (9113) | Total Estate Values (EOY) (9114) | Federal Estate Tax (EOY) (9115) | Net After Estate Tax Values (EOY) (9116) |
|---|---|---|---|---|---|---|---|---|---|---|
| 1 | 65 | $2,000,000 | $2,140,000 | $60,000 | $39,000 | $39,000 | $206,500 | $2,385,500 | $192,750 | $2,192,750 |
| 2 | 66 | $2,140,000 | $2,289,800 | $64,200 | $41,730 | $81,997 | $213,211 | $2,505,008 | $292,504 | $2,292,504 |
| 3 | 67 | $2,289,800 | $2,450,086 | $68,694 | $44,651 | $129,313 | $220,141 | $2,799,540 | $399,770 | $2,399,770 |
| 4 | 68 | $2,450,086 | $2,621,592 | $73,503 | $47,777 | $181,293 | $227,296 | $3,030,181 | $515,091 | $2,515,090 |
| 5 | 69 | $2,621,592 | $2,805,103 | $78,648 | $51,121 | $238,306 | $234,683 | $3,278,092 | $639,046 | $2,639,046 |
| 6 | 70 | $2,805,103 | $3,001,460 | $84,153 | $54,699 | $300,750 | $242,310 | $3,544,520 | $772,260 | $2,772,260 |
| 7 | 71 | $3,001,460 | $3,211,562 | $90,044 | $58,529 | $369,054 | $250,185 | $3,830,801 | $915,401 | $2,915,400 |
| 8 | 72 | $3,211,562 | $3,436,371 | $96,347 | $62,626 | $443,674 | $258,316 | $4,138,361 | $1,069,181 | $3,069,180 |
| 9 | 73 | $3,436,371 | $3,676,917 | $103,091 | $67,009 | $525,103 | $266,711 | $4,468,731 | $1,234,366 | $3,234,365 |
| 10 | 74 | $3,676,917 | $3,934,301 | $110,308 | $71,700 | $613,869 | $275,379 | $4,823,549 | $1,411,775 | $3,411,774 |
| 11 | 75 | $3,934,301 | $4,209,702 | $118,029 | $76,719 | $710,538 | $284,329 | $5,204,569 | $1,602,285 | $3,602,284 |
| 12 | 76 | $4,209,702 | $4,504,381 | $126,291 | $82,089 | $815,720 | $293,569 | $5,613,670 | $1,806,835 | $3,806,835 |
| 13 | 77 | $4,504,381 | $4,819,488 | $135,131 | $87,835 | $930,066 | $303,110 | $6,057,864 | $2,026,432 | $4,026,432 |
| 5 | 69 | $2,621,592 | $2,805,103 | $78,648 | $51,121 | $238,306 | $234,683 | $3,278,092 | $639,046 | $2,639,046 |
| 6 | 70 | $2,805,103 | $3,001,460 | $84,153 | $54,699 | $300,750 | $242,310 | $3,544,520 | $772,260 | $2,772,260 |
| 7 | 71 | $3,001,460 | $3,211,562 | $90,044 | $58,529 | $369,054 | $250,185 | $3,830,801 | $915,401 | $2,915,400 |
| 8 | 72 | $3,211,562 | $3,436,371 | $96,347 | $62,626 | $443,674 | $258,316 | $4,138,361 | $1,069,181 | $3,069,180 |
| 9 | 73 | $3,436,371 | $3,676,917 | $103,091 | $67,009 | $525,103 | $266,711 | $4,468,731 | $1,234,366 | $3,234,365 |
| 10 | 74 | $3,676,917 | $3,934,301 | $110,308 | $71,700 | $613,869 | $275,379 | $4,823,549 | $1,411,775 | $3,411,774 |
| 11 | 75 | $3,934,301 | $4,209,702 | $118,029 | $76,719 | $710,538 | $284,329 | $5,204,569 | $1,602,285 | $3,602,284 |
| 12 | 76 | $4,209,702 | $4,504,381 | $126,291 | $82,089 | $815,720 | $293,569 | $5,613,670 | $1,806,835 | $3,806,835 |
| 13 | 77 | $4,504,381 | $4,819,488 | $135,131 | $87,835 | $930,066 | $303,110 | $6,057,864 | $2,026,432 | $4,026,432 |
| 16 | 80 | $5,518,061 | $5,904,325 | $165,542 | $107,602 | $1,335,352 | $333,634 | $7,573,311 | $2,786,656 | $4,786,655 |
| 17 | 81 | $5,904,325 | $6,317,628 | $177,130 | $115,134 | $1,493,885 | $344,477 | $8,155,990 | $3,077,995 | $5,077,995 |
| 18 | 82 | $6,317,628 | $6,759,862 | $189,529 | $123,194 | $1,665,630 | $355,673 | $8,781,165 | $3,390,583 | $5,390,582 |
| 19 | 83 | $6,759,862 | $7,233,052 | $202,796 | $131,817 | $1,851,580 | $367,233 | $9,451,865 | $3,725,933 | $5,725,932 |
| 20 | 84 | $7,233,052 | $7,739,366 | $216,992 | $141,045 | $2,052,801 | $379,168 | $10,171,335 | $4,085,668 | $6,085,667 |
| 21 | 85 | $7,739,366 | $8,281,122 | $232,181 | $150,918 | $2,270,435 | $391,491 | $10,943,048 | $4,471,524 | $6,471,524 |
| 28 | 92 | $12,427,731 | $13,297,672 | $372,832 | $242,341 | $4,368,227 | $489,726 | $18,155,625 | $8,077,813 | $10,077,812 |
| 29 | 93 | $13,297,672 | $14,228,509 | $398,930 | $259,304 | $4,769,498 | $505,642 | $19,503,649 | $8,751,825 | $10,751,824 |
| 30 | 94 | $14,228,509 | $15,224,505 | $426,855 | $277,456 | $5,201,963 | $522,075 | $20,948,543 | $9,474,272 | $11,474,271 |

BACK TO CRAT. (8698) NEXT: CRT (8699)

FIG. 91

INTERACTIVE SYSTEMS AND METHODS FOR ESTATE PLANNING RELATED ACTIVITIES

RELATED PATENT APPLICATION

This application claims the benefit of U.S. Provisional Patent Application No. 61/290,579 filed Dec. 29, 2009, and is a continuation-in-part of U.S. patent application Ser. No. 12/380,564 filed Feb. 27, 2009, which is a continuation-in-part of U.S. patent application Ser. No. 12/113,087 filed Apr. 30, 2008 now U.S. Pat. No. 8,185,463, which is a continuation-in-part of U.S. patent application Ser. No. 11/891,616 filed Aug. 10, 2007, which is a continuation-in-part of U.S. patent application Ser. No. 11/510,537 filed Aug. 25, 2006 now U.S. Pat. No. 8,073,714, which claims the benefit of U.S. Provisional Patent Application No. 60/763,200 filed Jan. 27, 2006, which are all hereby incorporated herein by reference in their entireties.

COPYRIGHT NOTICE

The present application includes material that is subject to copyright protection. The copyright owner does not object to the facsimile reproduction of the application by any person as the application appears in the records of the U.S. Patent and Trademark Office, but otherwise reserves all rights in the copyright.

BACKGROUND OF THE INVENTION

The present invention relates to interactive tools for assisting in estate planning, such as assisting in estate planning professionals in performing activities such as marketing estate planning services to new or existing clients, managing client relationships, and prospecting for new clients. The clients or prospective clients can for example be the affluent or the super-affluent, and generally have an estate worth at least $10,000,000 in today's dollars.

Current tax law provides that for a legacy today of more than $2,000,000 to anyone other than your spouse, even to your children, the marginal federal estate tax rate can range from 43% to 48%. The legacy or estate is the total of a home, a retirement plan and life insurance, and as such an estate's value can easily exceed that number. In addition, many states now have separate taxation due upon death. The primary purpose of estate planning is to ensure an orderly transfer of property to the heirs. Without a strategy to accomplish this, heirs might encounter problems, such as, an inappropriate distribution of the estate, the care for minor children can be left in the hands of a court, settlement costs and administrative fees that deplete the value of one's estate etc. A common error people make is to assume that estate planning only refers to dying. In fact, an important part of estate planning is to take the appropriate steps to ensure management of one's financial affairs if one becomes disabled or terminally ill. Current tax laws also provide for giving gifts, either to loved ones or to a charity. Currently a gift of $13,000 per year can be provided per beneficiary without tax consequences. The giving of gifts can be an important strategy for maximizing the estate. Charitable giving techniques can potentially eliminate capital gains taxes and/or lower income and estate taxes.

Known software applications for estate planning professionals do not provide adequate support for a broad range of activities or services that are needed by estate planning professionals. For example, such known software applications are inadequate in meeting the needs of professionals in areas such as interactive estate planning reports, various trust vehicles, interactive estate calculators, client data gathering tools, automatic configuration based on client data, among others. In addition, the information, processes, vehicles or analysis of estate planning can be highly complex and difficult to analyze, when seen in the context of real life information. As such, a need exists for improved software and system solutions in the estate planning field.

SUMMARY OF THE INVENTION

In accordance with the principles of the present invention, methods, apparatuses, media, and systems for providing interactive estate planning related tools and applications are provided.

In one embodiment, a computer-implemented method for interactively analyzing and illustrating a grantor's estate transfer to heirs is described. The method comprises storing grantor information including a life expectancy state and a current financial state with a computer; calculating with the computer a projected financial state, wherein the projected financial state is calculated by a wealth shifting tool utilizing the life expectancy state and a financial change in the current financial state that occurs when an estate disbursement is triggered; presenting an interactive interface of that displays the current financial state and the projected financial state over a period of years; and data gathering, with the interactive interface, estate related parameters to redisplay the projected financial state based on the estate related parameters on the computer is described.

In one embodiment, the period of years is greater than ten years.

In one embodiment, the wealth shifting tools comprise two or more of an Irrevocable Life Insurance Trust (ILIT), a Grantor Retained Annuity Trust (GRAT), an Intentionally Defective Grantor Trust (IDGT), a Charitable Remainder Trust (CRT), a Charitable Lead Trust (CLT), a Qualified Personal residence Trust (QPRT) and a Family Limited Partnership (FLP).

In one embodiment, the presenting includes a graph.

In one embodiment, the graph includes graphs for the current estate state over the years and the projected estate state over the years pursuant to using the wealth shifting tool.

In one embodiment, the presenting includes data tables for the current estate state over the years and the projected estate state over the years pursuant to using the wealth shifting tool.

In one embodiment, the presenting includes comparing the projected financial state generated by a wealth shifting tool against a different wealth shifting tool.

In one embodiment, the wealth shifting tool includes a trust set to transfer at the estate distribution event.

In one embodiment, the data gathering limits the financial parameters to permissible estate parameters.

In one embodiment, the modified financial state includes life insurance.

In one embodiment, the life insurance includes whole life insurance that pays dividends without further cash from the insured.

In one embodiment, the interactive interface displays the current financial state in numerical values.

In one embodiment, the interactive interface comprises side-by-side tabular information for the current financial state and the modified version of the current financial state.

In one embodiment, the interactive interface provides the user with an opportunity to select to payoff liabilities incurred by the estate due to the estate disbursement trigger and calculating the modified financial state.

In one embodiment, the interactive interface provides the user with an opportunity to select key assets owned by the estate and calculating the modified financial state based upon the transfer of the key assets to a trust.

In one embodiment, the interactive interface is presented in a browser.

In one embodiment, the method further comprises publishing the current financial state and the modified financial state to a customized client web-site.

According to various embodiments, a method of providing an interactive estate planning tool on a platform is described. The method comprises receiving personal data of a client for computing an estate financial condition for the client; modifying an assumption of the estate financial condition; and providing a selection mechanism, which when selected displays a representation of a death benefit to the estate, based on the modified assumption, wherein the estate financial condition changes in relation to a change in the death benefit.

In some embodiments, modifying the assumption of the estate financial condition comprises: selecting an out of estate death benefit payable to the estate, selecting an in estate death benefit payable to the estate, selecting a death benefit triggered by the death of the client, selecting a death benefit triggered by the death of the client's spouse, selecting a death benefit triggered by the death of the survivor between the client and the client's spouse, or a combination thereof.

In some embodiments, the method further comprises: after the death of a client, maintaining a cash flow within a threshold of a desired percentage of the cash flow prior to the death of the client, based on the modified assumption, wherein the modified assumption comprises an addition of a death benefit payable to the estate.

In some embodiments, the method further comprises: displaying an impact on the liability of the estate based on the death benefit, wherein the liability includes funding an estate tax.

In some embodiments, the method further comprises: displaying an impact on an asset of the estate as a debt in an amount of a value of the asset less at least a portion of the death benefit.

In some embodiments, the method further comprises: computing a cash flow of the personal financial condition based on at least two of a savings rate of the family, a spending rate of the family, an income of the family, and an income replacement comprising disability insurance payments, retirement income, or savings; and computing a net worth of the estate based on an asset of the family, a liability of the family, and the change in the personal death benefit.

In some embodiments, the method further comprises: selecting to sell an ownership of a key asset at the death of the client; computing a client's equity of the business financial condition based on a mortgage or loan liability of the business, a contractual requirement to purchase the ownership by the business for a value of the business, and the change in the business death benefit; computing a business cash flow of the business financial condition based on the mortgage or loan liability of the business and the change in the business death benefit; computing a liability of the personal financial condition based on a debt owed by the business for at least a portion of a value of the business that is unfunded by the change in the business death benefit; and computing a cash flow of the personal financial condition based on any assets paid by the business for the ownership.

In some embodiments, the method further comprises: selecting to keep an ownership of the business by the family at the death of the client; computing the client's equity of the business financial condition based on a mortgage or loan liability of the business and the change in the business death benefit; and computing a business cash flow of the business financial condition based on the mortgage or loan liability of the business and the change in the business death benefit.

In some embodiments, the method further comprises: varying a display of the financial condition for the estate based on a combination of at least two of a scenario for keeping an ownership of the business with the family, a scenario for selling the ownership, a scenario for changing an in estate owned life insurance policy, and a scenario for changing a out of estate life insurance policy.

In one embodiment, a user interface for providing an interactive estate planning tool comprising computer displayed components is describer. In one embodiment, the user interface comprises: a personal interactive snapshot summary configured to provide personal information about a plurality of personal financial domains of the client, wherein a plurality of layers of the personal summary displays each of the different plurality of personal financial domains; a selection mechanism configured to modify an assumption about the personal financial domains, wherein a modification of the assumption changes a display of the personal information, and wherein a change in the personal information is a function of whether the assumption comprises sufficient levels of an additional insurance protection to fund a liability of a client's estate; and a navigation mechanism configured to modify the information displayed in a estate liquidly summary based on a sequence of displays of information within the personal financial domains.

In one embodiment, the user interface further comprises: a personal data entry interface configured to receive information about at least a portion of the plurality of personal financial domains.

In one embodiment, the user interface further comprises: a personal cash flow interface configured to determine a cash flow of the family at the death of the client.

In one embodiment, the user interface further comprises: a reporting interface configured to generate an observation reports about the personal financial domains and the estate liquidity.

For example, a method or system for providing one or more interactive estate planning or insurance tools on a platform is provided. The method or system can include receiving client personal data for computing a personal financial condition for the client's estate. The method or system can include receiving asset and liability information for computing an estate planning condition of the client. The method or system can include modifying an assumption of the estate planning condition. The method or system can include providing a selection mechanism, which when selected, based on a modified assumption displays: a representation of a personal death benefit to the client, a representation of a business death benefit to a surviving spouse, a representation of an estate tax burden or a representation of an heir's inheritance. The estate planning condition can change in relation to a change in a death benefit, e.g., as the assumption is changed interactively. Modifying the assumption of the estate planning condition can include selecting a life insurance policy for a client, a spouse, and an out of state trust.

The system or method can include a cash flow to the estate at the death of the client within a threshold of a desired percentage of a cash flow of the estate while the surviving spouse is alive, based on the modified assumption. The modified assumption can include an addition of out of estate life insurance.

The system or method can include displaying an impact on the estate tax liability of the estate based on the death benefit.

The liability can include funding a purchase of an ownership in a business, paying a mortgage or loan, or replacing lost profits due to the death of a person in the estate.

The system or method can include displaying an impact on an asset of the family as a debt in an amount of a value of the estate less at least a portion of the death benefit.

The system or method can include computing a personal cash flow of the personal financial condition based on at least two of a savings rate of the family, a spending rate of the family, an income of the family, an income replacement and computing a net worth of the estate based on an asset of the estate, a liability of the estate, and the change in the death benefit. The income replacement can comprise social security, disability insurance payments, retirement income, or savings.

The system or method can include determining if an option is selected to sell an ownership of a business by the family upon the death of the surviving spouse. If so, the method or system can perform computing an owner's equity of the estate planning condition based on a mortgage or loan liability of the estate, a contractual requirement to sell the ownership of a business that is part of the estate, and a change in the death benefit. In some embodiments, the system or method includes computing a cash flow of a surviving spouse based on any assets paid to the estate by the acquisition of a death benefit for the first to die member of the estate.

The system or method can include determining if an option is selected to keep an ownership of the business in the estate. If so, the method or system can perform computing an owner's equity of the estate planning condition based on a mortgage, loan or estate tax liability of the estate and the change in the death benefit.

The system or method can include varying a display of the personal financial condition for a client's family and a display of the financial condition of the estate based on a combination of at least two of a scenario for keeping an ownership of a business with the family, a scenario for selling the ownership, a scenario for changing an in estate owned life insurance policy, and a scenario for changing an out of estate life insurance policy.

In another example, an apparatus for providing an interactive estate planning tool can be provided. The apparatus can include a first computing component configured to generate a personal financial condition for a client's family when an estate must be distributed, based on personal data of the client. The apparatus can include a second computing component configured to generate a business financial condition of the business when an estate must be distributed, based on business data of the client's business. At least a portion of the personal financial condition or business financial condition can be configured to be modified in a layer in a user interface. The apparatus can include a third computing component configured to receive an assumption about the business financial condition and the personal financial condition. The assumption can include a personal life insurance policy for the client, a trust owned life insurance policy for the heirs, or a life insurance policy that was owed by the client and then transferred to a trust. The apparatus can include a fourth computing component configured to change the personal financial condition and the business financial condition based on a change in a level of insurance protection provided by the received assumption.

The fourth computing component can be further configured to display, based on the change in the level of insurance protection, a cash flow within the displayed layer. The cash flow can be a cash flow of the client or the client's spouse. The fourth computing component can be further configured to maintain a cash flow for the second to die in an estate within a threshold of a desired percentage of another cash flow prior to the death of the first to die.

The apparatus can include a fifth component for displaying an impact on a liability of the estate based on the survivor trigger death benefit. The liability can include funding an estate tax, funding a purchase of an interest in the business, paying a mortgage or loan of the business, or replacing lost profits due to the estate being in estate.

In another example, a system for providing an interactive estate planning tool over a network can be provided. The system can include a consumer interface for providing over a computer network, personal data about a client and a spouse. The system can include a web host configured for calculating personal financial condition based on the personal data and to generate estate planning condition based on the personal data.

The system can include an insurance carrier for marketing to the client over the network, an in-estate life insurance policy, an out of estate life insurance policy, or a partially in-estate and a partially out of estate life insurance policy.

The system can include an agent that is configured to perform actions. The actions can include providing a selection mechanism configured to receive a selection of a life insurance policy for the client; and providing another selection mechanism, which when selected displays an aggregation of a representation of a death benefit to the estate and a representation of a death benefit to the estate based on a combination of the life insurance policies. The estate planning condition can change in relation to changes in the death benefit. The agent's actions can further include displaying an interactive comparison of estate assets and liabilities for displaying when the estate is to be distributed.

The agent's actions can further include displaying an interactive tool for varying an application or parameter of the life insurances; and sending a message over the network to the web host to recalculate the estate planning condition based on the varied application or parameter. The estate planning condition can include estate taxes due comprising a business liability and a portion of the death benefit that is due to a change in the life insurance associated with the estate.

The agent's actions can further include providing an interactive cash flow planning tool for predicting a cash flow of the estate for assets and liabilities of the estate. In another example, a user interface for providing an interactive estate planning tool comprising computer displayed components can be provided. The user interface can include a personal interactive snapshot summary configured to provide personal information about a plurality of personal financial domains of the client. A plurality of layers of the personal summary can display each of the different plurality of personal financial domains. The user interface can include an estate planning interactive snapshot summary configured to provide estate information about a plurality of financial domains of the estate. A plurality of layers of the estate summary can display each of the different plurality of estate financial domains.

The user interface can include a selection mechanism configured to modify an assumption about the estate financial domains and the business financial domains. A modification of the assumption changes a display of the personal information and the business information. A change in the personal information can be a function of a change in the business information and whether the assumption can include sufficient levels of an additional insurance protection to fund a liability of the estate. The user interface can include a navigation mechanism configured to modify the information displayed in the financial information based on a sequence of displays of information within the personal financial domains and the business financial domains.

The user interface can further include a personal data entry interface configured to receive information about at least a portion of the plurality of financial domains. The user interface can further include a cash flow interface configured to determine a cash flow of the family at the death. The user interface can further include an estate protection interface configured to determine a degree of protection for at least a portion of the estate's financial domains. The user interface can further include a reporting interface configured to generate observation reports about the financial domains for estate planning purposes.

In another example, a processor readable medium for providing an interactive retirement tool can be provided. The processor readable medium can include instructions that when executed by a processor causes the processor to perform estate planning actions.

BRIEF DESCRIPTION OF THE DRAWINGS

Further features of the invention, its nature and various advantages will be more apparent from the following detailed description, taken in conjunction with the accompanying drawings in which like reference characters refer to like parts throughout, and in which.

DETAILED DESCRIPTION OF PREFERRED EMBODIMENTS

Figure 1:
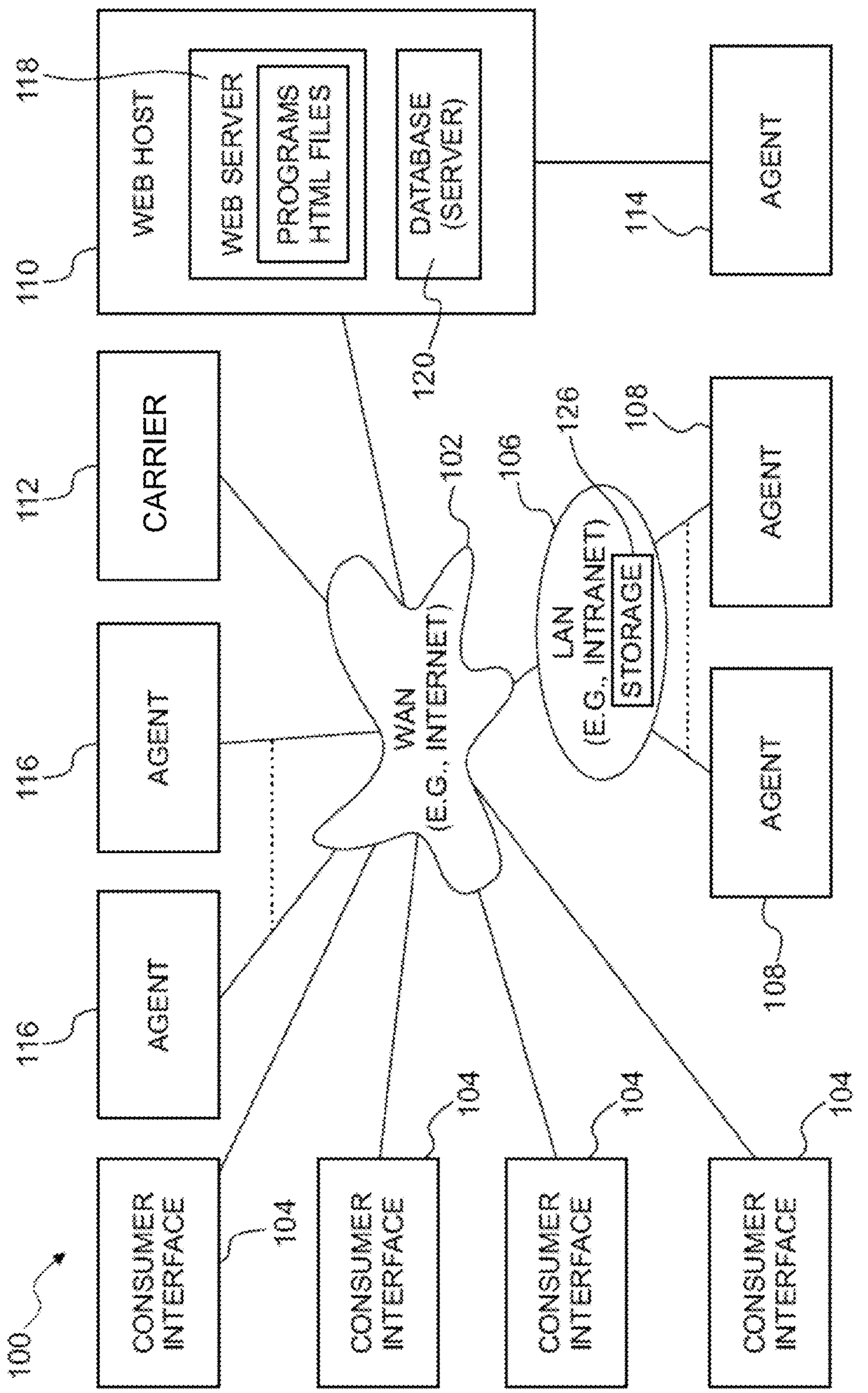
FIG. 1 is a functional block diagram of illustrative systems for providing software-implemented estate planning services in accordance with one embodiment.

Software applications, tools, or features are provided that are intuitive, easy to comprehend, and easy to install. Software, for example, is implemented that can aid those with little software or Internet experience to collect client information, manage clients, track progress with respect to clients, generate reports, and evaluate weaknesses in estate planning. A networked solution can be provided to alleviate data storage needs of users and to increase marketing opportunities by way of sharing information. Aggregation services can be combined with software features to increase the usefulness of the software over time in analyzing estate planning needs. Software can also be implemented with color coordination and navigation tools to ease a user's comprehension and interaction with the software. Another aspect can involve detailed data collection and automatic use of collected data and the automatic configuration of the software (e.g., options, pages) based on the collected data. These and other features that show a general step forward in the estate planning field are also described herein.

For the purposes herein, the term "client" refers to an individual who is interested in or is potentially interested in having estate planning utilizing the tools described herein. A client can refer to an individual, a couple, a married couple, or other combinations. A client can be the user of the system. In some embodiments, a professional can be user of the system and the client can be the professional's client. A client can be a grantor.

For the purposes herein, the term "estate value gross" is the amount or value of a grantor's estate before accounting for estate taxes and/or transfer costs.

For the purposes herein, the term "estate value net" is the amount or value of a grantor's estate after accounting for estate taxes and/or transfer costs.

For the purposes herein, the term "legacy value" is the amount or value of a grantor's estate after estate planning, i.e., the amount of an estate after accounting for estate taxes, with or without any additional funds from out of estate planning options.

For the purposes herein, the term "In Estate" refers to any assets or liabilities that are owned by a client or user.

For the purposes herein, the term "Out of Estate" refers to any assets or liabilities that are not owned by the client.

For the purposes herein, the term "Irrevocable Life Insurance Trust" (ILIT) is a trust separate from a grantor's estate which owns a life insurance policy on a client or a client's spouse for the benefit of the spouse, children or other designated heirs. A life insurance policy that is placed in an ILIT is considered to have no owner. This is also referred to as an "ILIT1" herein.

For the purposes herein, the term "Irrevocable Life Insurance Trust 2" (ILIT2) is a trust funded by a grantor's gifting of rapidly growing assets separate from a grantor's estate, wherein the grantor's estate owns a life insurance policy in estate. After a period of time, for example, at a retirement age, the trust purchases the life insurance policy that the grantor already held in the estate.

For the purposes herein, the term "Grantor Retained Annuity Trust" (GRAT) is an irrevocable trust that is created for a certain term or period of time. The grantor establishes the trust and transfers assets into the trust and out of the estate. The grantor pays a tax when the trust is established and any income taxes accrued during the life of the trust that are owed on growth of the trust assets. Assets within the trust grow and an annuity is paid out every year. When the trust expires the beneficiaries receive the assets.

For the purposes herein, the term "Intentionally Defective Grantor Trust" (IDGT) is a grantor trust wherein a client sells an asset to a trust. The trust pays back to the individual principle and interest of the asset over a period of time. However, the trust is established such that the individual continues to pay income taxes on any growth of the assets over time. Thus the value of the grantor's estate is reduced by the amount of the asset at the time of transfer.

For the purposes herein, the term "Charitable Lead Trust" (CLT) is a trust that is created wherein a grantor transfers assets to a trust that is considered a split interest trust. The charity receives current rights to payments from the trust. The right is generally measured by a term of years (although it can be for the life of the grantor). At the end of the time period, the charity's rights to payments end and the trust's designated beneficiary, generally an heir or a trust for heirs, receives the assets remaining in the trust.

For the purposes herein, the term "Charitable Remainder Trust" (CRT) is a trust that is created outside of an estate wherein a grantor transfers an asset to a trust that is considered a split interest trust. In the split interest, the grantor maintains a flow of income from the trust for life or over a predetermined period. At the end of the period, or at the grantor's death (or the death of a surviving spouse) the designated charities or family foundation will receive whatever assets remain in the trust.

For the purposes herein, the term "Qualified Personal Residence Trust" (QPRT) is a trust that is created outside of an estate wherein the grantor's personal residence is gifted to the trust to be held for the current benefit of the grantor and later transferred to a name beneficiary. This arrangement results in a discount on the value of the residence transferred to the named beneficiary, reducing gift and estate taxes on the residence. The grantor may reside at the residence rent-free for the term of the trust, but must pay rent after the term of the trust, if the grantor continues to live at the residence.

For the purposes herein, the term "Family Limited Partnership" (FLP) is a partnership that is created outside of an estate wherein personally owned assets are transferred out of the estate into the FLP. This transaction is sometimes organized using a Limited Liability Company. The FLP may be divided into two types of ownership interests: General Partner and Limited Partners Interests. Some or all of the Limited Partnership interests are gifted or sold—with the valuation often set at a discount to the full value of the assets held in the FLP. When the arrangement results in a discount, the parties reduce current gift tax results as well as future estate taxes.

With reference now to FIG. 1, an environment such as environment 100 may be used by estate planning agents for receiving estate planning services to, for example, assist the estate planning agent in managing, marketing, and providing estate planning services. Environment 100 may include wide area network (WAN) 102 (e.g., the Internet), WAN consumer interfaces 104, carrier equipment 112, web host equipment 110, and agent equipment 116. If desired, a configuration may be implemented in which carrier equipment 112 and web host equipment 110 are combined (e.g., to provide the carrier as also the web host). If desired, environment 100 may be configured to include a local area network (LAN) 106 (e.g., an intranet) and LAN agent interface equipment 108. If desired, environment 100 may be configured to include agent equipment 114 that is directly connected to web host equipment 110 and/or to include a direct connection from carrier equipment 112 to web host equipment 110. If desired, environment 100 may also be configured in other ways. For example, there may be fewer or greater number of components (e.g., equipment or consumer interfaces) in environment 100. Environment 100 may include software applications implemented in environment 100 to support interactive tools for estate planning professionals and to provide an interface for consumers.

Web host equipment 110 may be central to providing a combination of estate planning tools. If desired, however, a distributed architecture may be used. Web host equipment 110 may include equipment such as web server 118 and a database 120. Database 120 can be part of web server 118, a separate database server, multiple servers, or other such host equipment. One or more applications for providing interactive estate planning tools may be implemented on web server 118 to provide estate planning related services. Database 120 may store information related to consumers, agents, insurance carriers or estate planners that use the tools and services that are available in environment 100.

Web host equipment 110 may have been implemented by an insurance carrier or estate planner to assist their agents and representatives by providing interactive tools available through agent equipment 116 that can drive and manage business for the agents.

Agents preferably interact with estate planning related services, available via WAN 102, such as services tools using agent interface equipment 116. Agent interface equipment 116 preferably includes personal computers such as laptops, workstations, or other types of computer equipment that include a suitable interface for implementing one or more of the estate planning tools available via environment 100. For example, for tools related to data collection and compilation, a computer that provides a convenient interface for data entry such as a full keyboard would be preferred. However, the use of other features may not require such functionality for each instance of their use. LAN 106 may be an enterprise platform implementation in which some or all of the functionality and services available from web host 110 is implemented in LAN 106 to supplement or replace web host equipment 110. Agent interface equipment 108 may comprise equipment such as that mentioned above in connection with agent interface equipment 116. As mentioned above, web host equipment 110 may be configured to include a direct connection with agent interface equipment 114. Agent interface equipment 114 may comprise equipment such as that mentioned above in connection with agent interface equipment 116.

Consumers may preferably interact with estate planning related services available via WAN 102 using consumer interfaces 104. Consumer interfaces 104 may include personal computers, web-books, personal digital assistants, minicomputers, cell phones or other computer equipment that has a suitable communications connection with WAN 102.

Carrier equipment 112 can include an interface for an insurance carrier to interact with web host equipment 110. If desired, carrier equipment 112 may allow an insurance carrier to interact with agents via WAN 102. If desired, carrier equipment 112 may be configured to have a direct connection or a private network connection to web host equipment 110 that is in addition or an alternative to a WAN connection. Carrier equipment 112 may comprise computer equipment such as a personal computer (e.g., a PC on a LAN of the carrier) or other computer equipment suitable for communicating with web host equipment 110.

One or more carriers may participate in environments 100 such as through a plurality of carrier equipment 112. However, preferably, environment 100 is configured to include a private communications network that is sponsored by one particular company, for example, an insurance carrier or an estate planner, to provide tools and assistance to their agents through networked applications and databases. The private communications network can be implemented at least partially through a public packet data network such as the Internet. The applications and services may be branded with the carrier's or estate planner's logo and details.

Communications links within environment 100 may be wireless links, wired links, or combinations thereof. Suitable links may be used for the communications links in environment 100 to allow sufficient data throughput and interaction between end-users (e.g., agents, consumers, insurance carriers, estate planners, web host provider, etc.). Techniques for implementing such communications links are known to those of ordinary skilled in the art.

Environment 100 may provide a variety of estate planning services to agents. For example, environment 100 may be used to provide estate planning services tools to agents to assist them in marketing products, managing information, educating clients, generating presentations, managing clients or developing prospects, managing insurance options for a client with estate interests, or other tools or services illustratively described herein.

Figure 2:
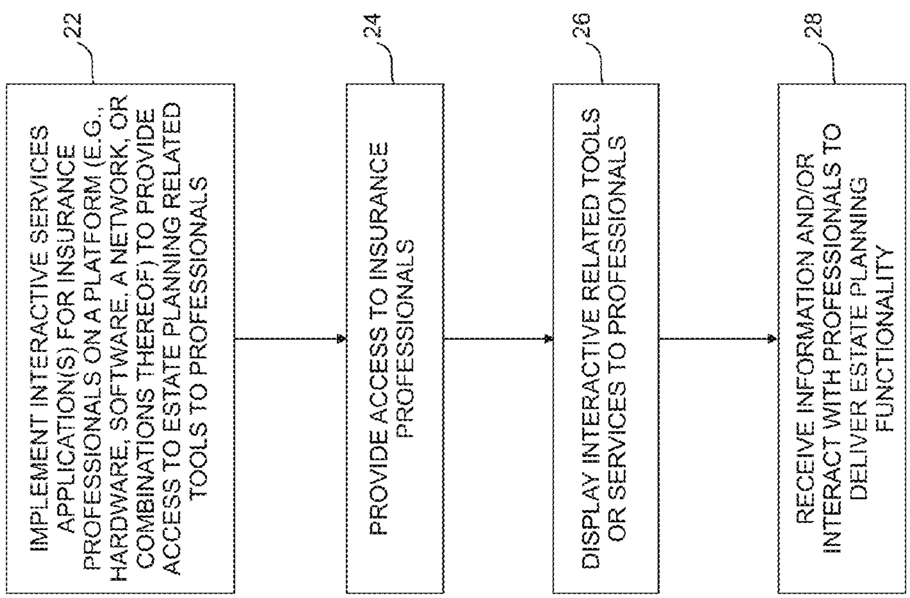
FIG. 2 is a flow chart for providing interactive estate planning services in accordance with one embodiment.

An interactive application for providing estate planning related tools and functionality for professionals can be provided at least based in part on the process illustratively shown in FIG. 2.

With reference now to FIG. 2, at step 22, an interactive estate planning related services application specifically configured for professionals or one or more such applications is implemented on a platform to provide access to estate planning related tools or services to professionals. The platform can comprise hardware, software, a network, or combinations thereof. For example, the combination of the application and the platform can be considered agent-interface equipment (e.g., agent interface equipment 116 of FIG. 1). At step 24, professionals can be provided access to the application. In providing access, authentication techniques are preferably implemented to provide access only to intended types of users and in addition only to those users who are registered to use the application. As such, the general public would not be provided access to the application. At step 26, interactive tools or services are displayed to professionals. For example, after a user is authenticated, an application that implements estate planning related interactive tools or services displays the tools or services to the user. At step 28, the application receives information and/or interacts with one or more professionals to deliver estate planning related functionality to the professional. Accordingly, through interaction with the application, functionality, such as client tracking, data organization, data collection, or preparation of presentations, an agent can benefit from estate planning related services that are designed to enhance and improve the professional's business operations including its efficiency and speed of service.

Figure 3:
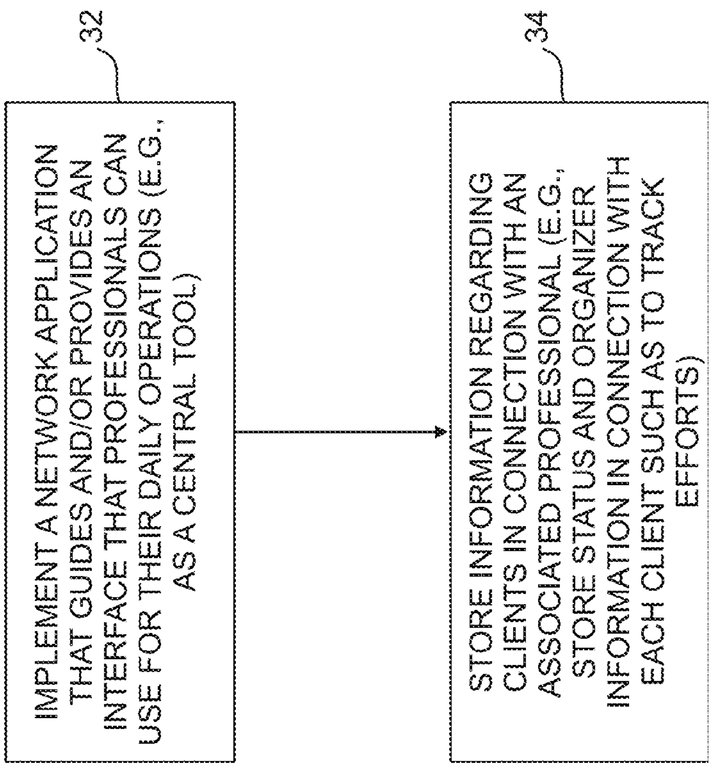
FIG. 3 is a flow chart for providing a network application in accordance with one embodiment.

Illustrative steps involved in, for example, providing network-based estate planning related software tools or services to professionals are shown in FIG. 3. With reference now to FIG. 3, at step 32, a network-based application is implemented that is configured to guide and/or provide a user interface for professionals. The network-based application is, for example, a web application that is configured using HTTP communications in a client-server arrangement. The application is preferably configured to be a central interface for professionals in conducting their daily business operations. As such, professionals would interact with the application to use its various features to achieve their business needs. At step 34, in response to interaction with the professionals, information is stored regarding clients or potential clients in connection with an associated professional. The status information that is stored is, for example, regarding a particular client or status information regarding the extent of progress with respect to a particular client.

Further, by way of example, an organizer tool can be provided that stores information for organizing a professional's client information, tasks, reminders, alerts, etc. (e.g., with respect to an individual client). This implementation allows a professional to review information on the state of discussions with a particular client and to, for example, pick up on discussions from where the professional left off without having to recall from personal memory or by maintaining notes on such activity. For example, the application preferably provides a record of activity completed with respect to a particular client and would preferably provide a record of desired activity that remains to be completed, e.g., using a to-do list feature.

Figure 4:
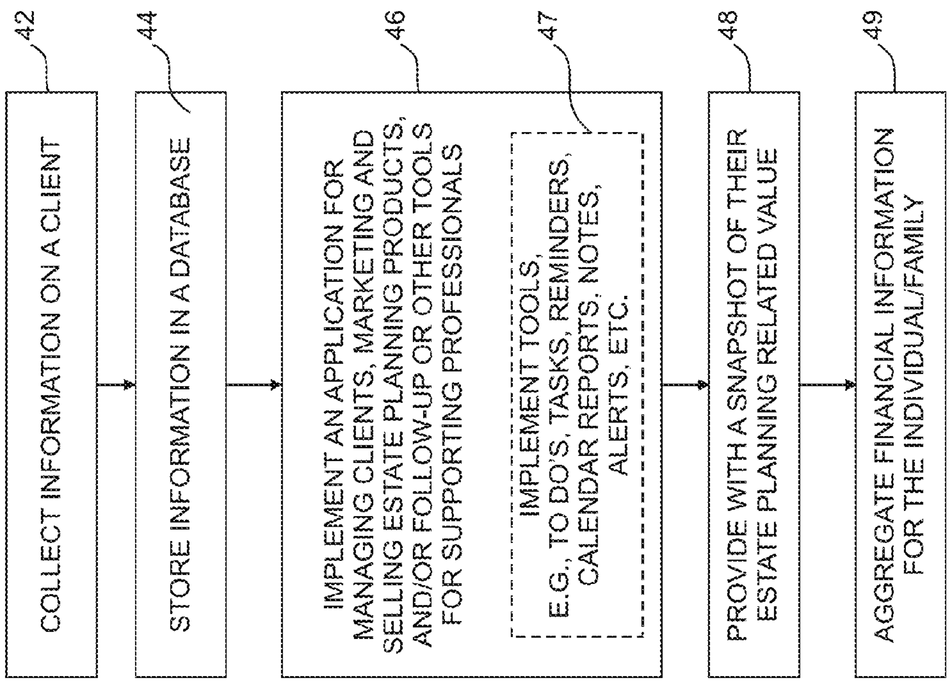
FIG. 4 is a flow chart for providing a software application in accordance with one embodiment.

An application can be implemented to provide a combination of different tools and services to estate planning professionals. The application can be a single application, combination of different applications (e.g., that are electronically connected, that are separately selectable for execution, etc.), or can comprise one or more modules, applets, applications, or other software that is executable for providing desired functionality. Illustrative steps in providing an application that provides various tools and services including a snapshot of a client's estate planning related value are shown in FIG. 4. At step 42, user interface and input functionality is implemented to collect information with respect to a client. For example, a professional interacts with the user interface to collect and input data regarding a particular client and can do so for multiple clients. At step 44, the information is stored in a database for later retrieval by the professional or possibly the client. As illustratively described, the database is preferably stored on a server remote from the professional, but other embodiments can also be implemented if desired. At step 46, estate planning related tools and services are implemented and/or provided for performing activity such as managing clients, marketing, and selling products, providing follow-up, or other tools for supporting professionals. Preferably, the application would be a central source or outlet for the professional such that it would provide a comprehensive and sole resource or interface for the professional. This, for example, would provide the advantage of simplifying computer interactions for professionals such that they only need to interact with this application (e.g., as a dedicated terminal) rather than navigate multiple applications and interact with the operating system which can often times be confusing for less experienced computer users.

Step 46 may, for example, include step 47. At step 47, various specific tools or services can be provided to professionals. The tools or services can, for example, include a "to do" or tasks feature, reminders, calendar, reports, notes, alerts, etc. (e.g., that can be configured to be specific to each particular client).

At step 48, a snapshot feature is provided. The snapshot feature can provide a tool for both presenting information and illustrating the estate planning related needs or value of an individual or a family in connection the information. The snapshot can be interactive to allow variations of the information to illustratively present different scenarios, e.g., levels of insurance protection needed to meet a tax burden for an estate. The snapshot is preferably configured as a tool for illustrating, in connection with a particular category of estate planning, the real life impact on the financial state if an event that would typically trigger the insurance coverage occurred. Thus, the snapshot would be able to display estate planning and its insurance related values that would exist before and after the triggering event. In addition, the snapshot can be configured to provide estate planning related parameters. The estate planning parameters can, for example, be used for controlling how death benefit proceed(s) would be applied or managed, what is an heir's share, and to illustratively vary a snapshot view for analysis by the professional to illustrate for the client.

The snapshot feature can be implemented as a module or a component of a network application. In one embodiment, the module can require communications from an agent's computer to a remote processor that performs the calculations and transmits information, such as, the resultant data to the agent for display. In another embodiment, or in combination with such an embodiment, processing and calculations can be performed locally such that a noticeable delay between selecting a calculate button and the display of the resulting information does not exist (e.g., in a network application, there may be a delay involved in sending and receiving information in connection with the calculation). A benefit of the network-based implementation is that a user would not need to install a resident application on their computer.

Enhanced functionality of the estate planning snapshot feature can be realized by combining this feature with an aggregation feature (step 49). Aggregation provides a functionality in which current financial information about an individual can be aggregated, stored, and updated. For example, an individual would provide account or personal information to a professional. The aggregate feature in combination with the snapshot feature provides a tool by which an individual or professional can periodically evaluate whether the individual's insurance coverage matches the individual's current estate problem (e.g., should the individual now increase or decrease his or her insurance or other death benefit coverage). The aggregated information can also be provided to the professional to conduct such an analysis.

Figure 5:
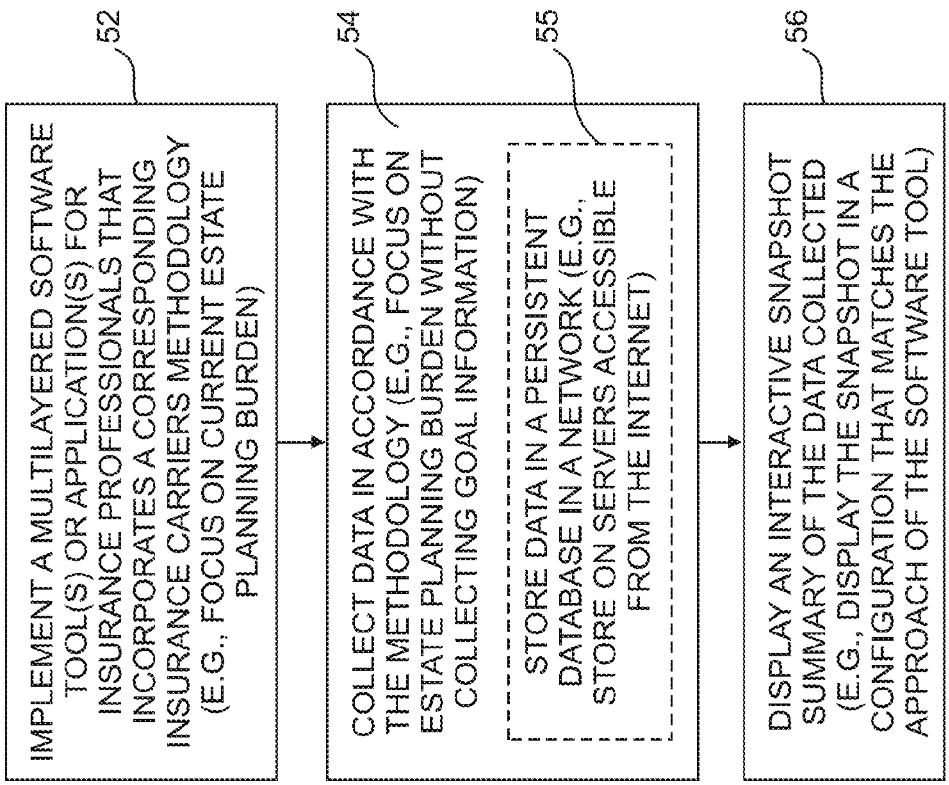
FIG. 5 is a flow chart for implementing a multi-layered software and tool in accordance with one embodiment.

With reference now to FIG. 5, at step 52, a multi-layered software tool(s) or application(s) for estate planning professionals is implemented. The methodology may in particular focus on the estate planning burden of an individual and providing commensurate planning tools using protection. For example, the evaluation of an individual's insurance protection would be based on whether the protection is commensurate with the individual's current estate problem, e.g., what would be required, taking into consideration the future wages, expected time of death and year of retirement of an individual, to provide the same financial picture for the individual's family. Such an approach preferably does not take into consideration the individuals' goals or objectives such as goals with respect to financial condition, savings, or investment goals, which are future term activity which may not be germane to better understanding the current estate tax picture of that individual. A benefit of providing a multi-layered software tool or application is that it provides a convenient interface for the professional to implement the many different but related functions. Thus, for example, issues that often times arise with respect to interoperability of applications and inheritance of persistent data from one application to another can be automatically solved.

At step 54, the software tool(s) or application(s) is implemented to collect data in accordance with the methodology (e.g., focus on current estate tax burden without collecting financial or investment goal information). For example, the software tool may provide professionals with a data entry section specifically configured to match the estate planner's methodology. The data collection can, for example, have a sequence that matches the methodology. The data collection can, for example, focus on the current life value of the individual without collecting or prompting for information on needs of the heirs, charitable contributions, out of estate trusts, educational funding for descendents, etc. A look and feel through colors can be implemented to match the methodology. Step 54 may include step 55. At step 55, the collected data is stored in a persistent database in a network that is accessible by the professionals. For example, the information can be collected by way of computer input by an agent at an agent's computer and stored on a server that is accessible from the Internet using the multilayered software tool or application.

At step 56, an interactive snapshot summary of the estate information of the individual collected at step 54 or aggregated is displayed. The snapshot display can be structured for example to display the snapshot in a configuration that matches the methodology of the software. For example, the information can be displayed in a single page in a hierarchy that matches the methodology. In addition, color schemes can be used to provide the display to be intuitive in connection with the methodology and the configuration of the software. The feature can be interactive in that items of information displayed in the snapshot can be selected to display underlying information with respect to the selected information.

Figure 6:
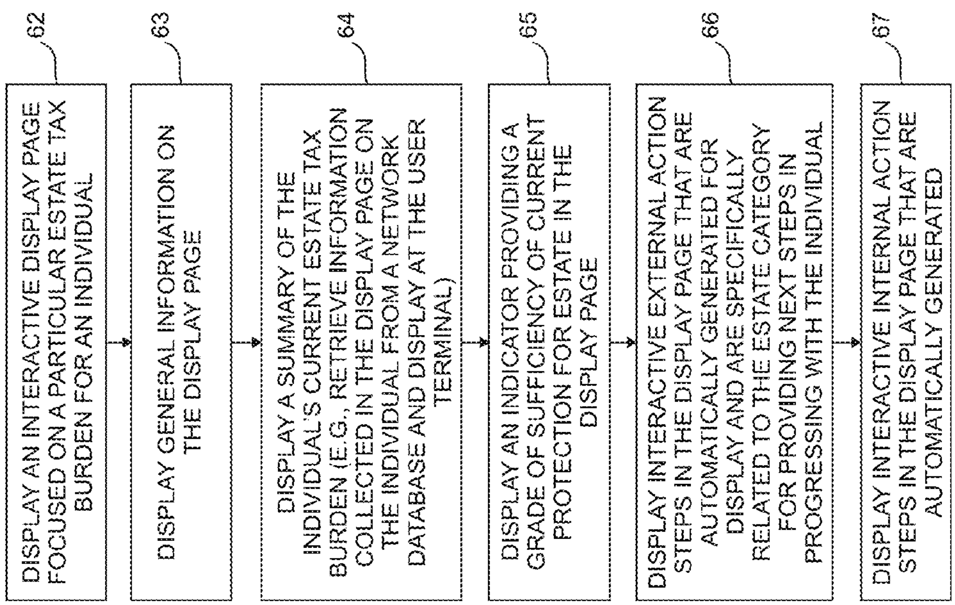
FIG. 6 is a flow chart for providing client and estate planning category focused display pages in accordance with one embodiment.

A component of the software application can be an interactive estate planning information display page that is specific to an individual. Illustrative steps involved in providing such a software feature are shown in FIG. 6. At step 62, an interactive display page is displayed that is focused on a particular estate for an individual. At step 63, general information on the estate is displayed in the display page (e.g., so as to occupy one section of the display page that is dedicated to such information). At step 64, a summary of the individual's current tax burden is displayed in the display page (e.g., so as to occupy one section of the display page that is dedicated to such information). Step 64 can involve retrieving information that was previously collected on the individual from a network database and displaying the information at the user terminal. Alternatively, the information can be stored or cached locally.

At step 65, an indicator is displayed that provides a grade of sufficiency for the current protection for the estate (e.g., so as to occupy one section of the display page that is dedicated to such information). The indicator is displayed in the display page to provide a convenient sufficiency indicator to the viewer. The grade that is assigned can be subjective or objective. For example, the grade may be selected by the agent after reviewing the individual's estate information or, if desired, can be automatically selected based on an algorithm that compares the individual's information to a database of estate information to perform an evaluation. The indicator can be set from the interactive estate planning display page or from a different page as a precursor to generating the interactive estate planning display page.

At step 66, interactive action steps that are related to external tasks are automatically generated and displayed (e.g., so as to occupy one section of the display page that is dedicated to such information). The action steps are specifically related to the estate planning category of the current interactive display page. The action steps are preferably a list of steps suggested for interaction with the client in connection with current estate planning category. For example, a database can be implemented that would store sets of action items in association with different estate planning categories. Each set would be configured to cover the steps needed to, for example, gather, analyze, or consider relevant information in connection with a particular estate planning category with respect to a client. This would provide a tool for an agent such that an automatic list can be generated and tracked for each client. If implemented as a network application, the list can be automatically updated without the need for periodic upgrades such that new strategies or legal requirements can be compiled and addressed with the database of action steps. The external action steps can provide intuitive next steps but can also be implemented as a comprehensive list of actions for the agent's consideration. The external action steps relate to activities that the client needs to perform with an agent, some other client representative or acquaintance, or individually. The action steps displayed in the display page can be displayed on the basis of some level of intelligence or filtering. For example, steps that were selected and marked as being completed are preferably not displayed again when an agent returns to the same page. Thus, the action steps can reflect the state of interaction or progress with respect to a particular client. The information can be persistent. Therefore, a professional would not need to personally track progress or what has been covered with each client. The software automatically provides such functionality and allows the professional to pick up where he or she left off with each client. In addition, filtering based on the information collected on a client can be implemented such as to not display action items that are not applicable to the client.

At step 67, interactive internal action steps are automatically generated and displayed (e.g., so as to occupy one section of the display page that is dedicated to such information). Internal action steps are actions that are suggested to the professional to be performed in the software application. The internal action steps are specifically related to the estate planning category of the current interactive display page. For example, a database can be implemented that would store sets of internal action items in association with different estate planning categories. Each set would be configured to cover the steps needed to support the agent to market the current estate planning category (the displayed estate planning category) or to market other products. This would provide a tool for an estate planning agent such that an automatic list can be generated and tracked for each client. If implemented as a network application, the list can be automatically updated without the need for periodic upgrades of a resident application such that new strategies or legal requirements can be complied within the database of internal action steps. The internal action steps can provide intuitive next steps but can also be implemented as a comprehensive list of actions for the agent's consideration. The internal action steps displayed in the display page can be displayed on the basis of some level of intelligence or filtering. For example, steps that were selected and marked as being completed are preferably not displayed again when an agent returns to the same page. Thus, the action steps can reflect the state of interaction or progress with respect to a particular client. The information can be persistent. Therefore, a professional would not need to personally track progress or what has been covered with each client. The software tool automatically provides such functionality and allows the professional to pick up where he or she left off for each client. In addition, filtering based on the information collected on a client can be implemented such as to not display internal action items that are not applicable to the client (e.g., if the client does not have children, certain action steps may not be applicable and should not be displayed).

By implementing an interactive display page for a particular estate planning category that includes a general information section, client summary section, grade indicator, external action steps, and internal action steps, a software tool can be provided that integrates information, organizational needs, client specific data, and grade indicators together as a convenient tool for quickly viewing information and status with respect to a client for a particular estate planning category and to generate a report on the basis of the information.

Figure 7:
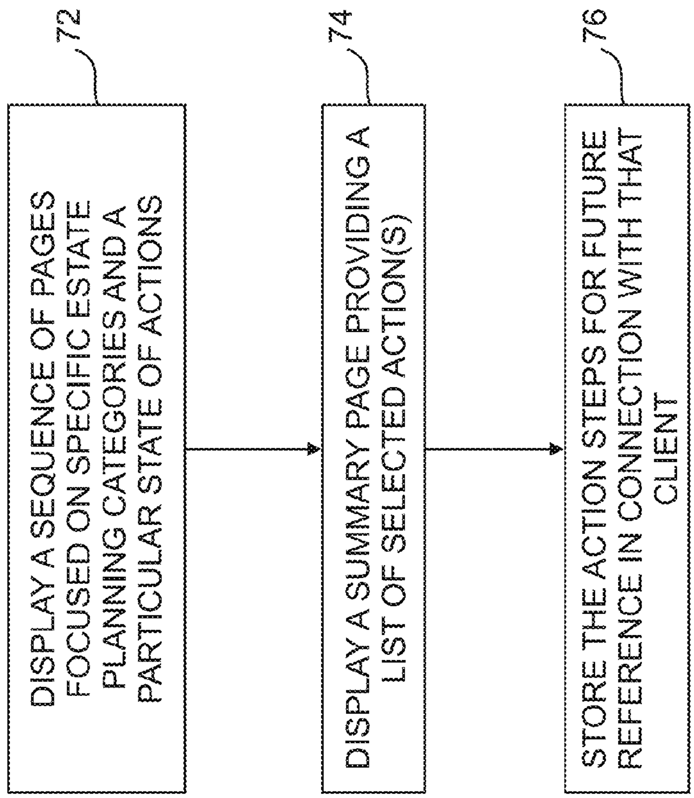
FIG. 7 is a flow chart of a software tool in accordance with one embodiment.

Interactive estate planning display pages can be implemented to provide a particular software tool. For example, a sequential methodology can be implemented such that the pages for different estate planning categories can be implemented to be displayed in sequence and automatically summarized at the end of the sequence. For example, with reference now to FIG. 7, a sequence of interactive estate planning display pages that are each focused on a specific estate planning category and include action steps that reflect the state of interactions with a corresponding or with the application with respect to a particular client (e.g., such as that illustratively described in connection with FIG. 6) can be displayed (step 72). At step 74, an interactive summary page is displayed that provides a list of selected action steps. Thus, the summary page can display a compilation of the actions selected in each interactive estate planning display page as a summary of selected actions to be completed. At step 74, the action steps can be selectable so as to allow the user to reconsider a selected item to remove that step from the list. At step 76, information with respect to the action steps (e.g., which ones selected or not selected) are stored for future reference in connection with that client (e.g., to reflect the status of work with that client).

Figure 8:
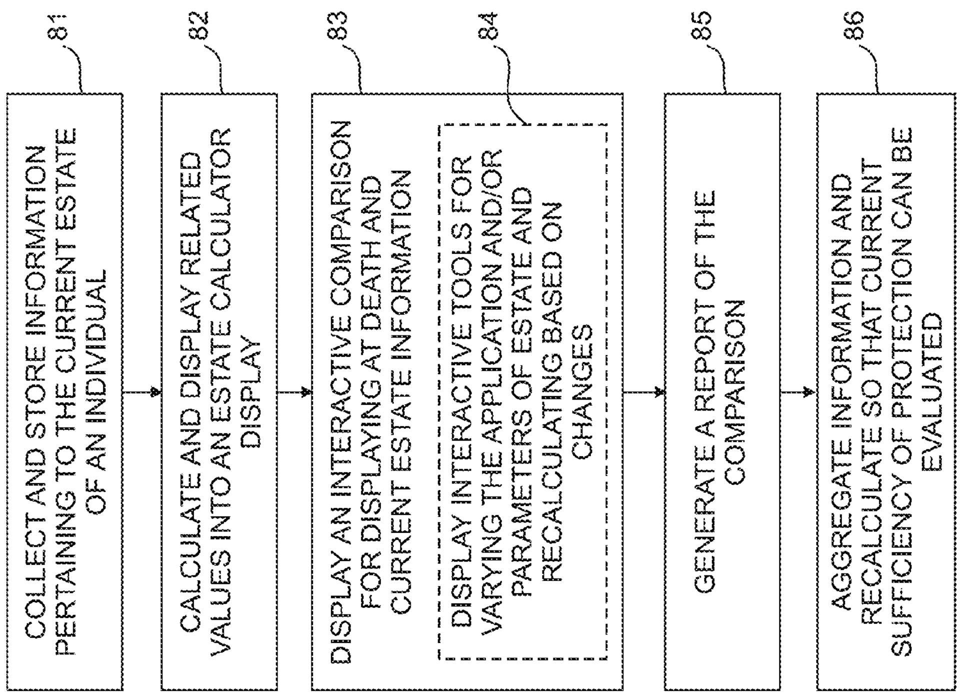
FIG. 8 is a flow chart directed to an estate value tool in accordance with one embodiment.

A current value snapshot feature can be specifically implemented for estate planning. For example, with reference now to FIG. 8, at step 81, information pertaining to the current estate of an individual can be collected and stored. At step 82, the software, calculates values relating to the current estate value based on the collected information and displays the values in an interactive life value calculator display page. At step 83, an interactive comparison for illustrating the at-death and the current estate related information of a particular individual are displayed in the interactive estate calculator display page based in the information that was inputted and calculated. Step 83 may include step 84, which is implemented to allow for user variation of the displayed values to vary the snapshot. At step 84, interactive tools for varying the application and/or parameters of the estate problem are displayed and recalculated based on the changes. At step 85, a report option can be included as part of the page for generating a report of the current comparison information. At step 86, an aggregation feature can be used to update and recalculate relevant values so that the current sufficiency of the client's estate's protection can be periodically evaluated. In one particular embodiment, this feature is part of a network application in which recalculation would require communications to and from a server to redisplay the information. In other words, relevant signals and data are transmitted to a server that calculates and returns the relevant results.

Further Description of Illustrative System

Referring back to FIG. 1, system 100 can provide an account and data aggregation tool that electronically organizes and displays financial holdings identified by the client for the client in a consolidated format and can provide part of a process for determining the client's estate planning needs. Such information can be entered, determined, or otherwise generated on any of the components of system 100, including web host 110. Processes for providing such information are described in further detail in conjunction with FIGS. 2-9.

System 100 can be used by an estate planning professional to assist with recommendations that are suitable for the client's situation. In one embodiment, non-specific strategic advice or product recommendations can be provided, for example, between web host 110 and consumer interfaces 104, and references can be made to property and casualty insurance, estate planning, wills or other legal documents or reports prepared or produced with the insurance, plan, will, or other legal documents. The system can provide indications or suggestions that the certain estate planning should be determined by a properly licensed property and casualty insurance agent, legal counsel, or tax advisor when and where appropriate. In one embodiment, web host 110 can receive available insurance options for providing to the consumer interfaces 104 from, for example, insurance carrier equipment 112.

System 100 can maintain the proper form and level of protection and assist a client to achieve optimum financial balance for a client and the client's business. The implementation of a sound protection program can be provided, for example, through storing client data on database server 120/storage 126, generating protection suggestions based on the client's current estate protection situation and/or desired situation, and/or providing such protection assistance over networks 102/106 to agents 116, carrier 112 and/or consumer interfaces 104.

System 100 can be directed to educating the client of the primary role of insurance to fully indemnify against losses that, if left uninsured, would otherwise create financial hardship, and the general desirability to insure all or substantially all assets and/or all or substantially all future income in an amount equal or substantially equal to their full and complete replacement value against taxes and expenses associated with disbursing an estate.

System 100 can be directed to educating a client on maintenance of insurance equal to, or substantially equal to, existing liabilities such as taxes and expenses associated with the estate problem. This strategy can protect against the possibility of forced liquidation of assets or unnecessary cash flow expense following a particular loss. The suggested strategy can be selected, computed, and generated on web host 110, stored in database server 120/storage 126, and/or sent over networks 102/106 to other devices of system 100.

System 100 can assist in providing protection, decisions and the insurance protections coordinated with important legal documentation to insure that estate planning objectives can be realized. The effective use of legal documents can maximize a share of each heir. The important documents or information about the important documents can be received by web host 110 over networks 102/106 from any device (e.g., agents 108, consumer interface 104). The document information can be associated with the client within, for example, database server 120/storage 126. In one embodiment, the documents can even be parsed to retrieve information about the documents (e.g., type of document, such as buy-sell agreements, business formation agreements, etc.). Suggestions for insurance protections or trust vehicles can be provided based on the documents, as described herein, communicated over, for example, networks 102/106.

System 100 can display representations of current insurance or other protection coverage highlights, asset and liability values, cash flow scenarios, and other financial holdings on, for example, any interface, including consumer interfaces 104. The displayed data can be input from information provided by the client (e.g., through consumer interfaces 104), or obtained by electronic feeds, for example, over networks 102/106, from the client's financial institutions, third-party sources, or the like. Statistical data and/or historical data provided can be received from third-party sources prior to the operations of the interfaces or even in real time, e.g., through electronic feeds.

The data that is input or received can indicate current information, which was provided by the client, or his or her financial institutions, or other third party sources as of the date and time noted. Current information, however, can reflect valuations obtained from an earlier date and time. Actual current valuations can be different, perhaps by a significant amount. Information, data and valuations obtained from either the client or electronically from his or her financial institutions or third party sources can be, but need not be, verified by the professional or the system, thus simplifying the process for providing advice about an estate's needs.

System 100 can periodically request the client to review and update the list of financial holdings appearing in the system materials and/or any valuations or input data that the client provided and was not obtained from electronic feeds (e.g., home, personal property, illiquid securities). The request to review can occur through email reminders, calendar reminders, or the like. The review request can be generated by web host 110 and/or sent over networks 102/106.

Consumer interfaces 104 can display figures, assumptions, and calculations, described herein. This information is hypothetical in nature and can be used for illustrative purposes. The charts and calculations described herein can ignore or take into account deductions for fees, expenses, sales charges or taxes on certain assets or products. Certain hypothetical calculations can also be based on assumptions provided by the client concerning income level, applicable tax rates, tax basis, or the like. The calculations can be performed by, for example, web host 110.

Calculations used in embodiments of the system can produce summaries and reports—for example, portfolio comparisons, Efficient Frontier analysis, e.g., graphs displaying the best possible return against lowest possible risk, and Monte Carlo analysis, or other analyses known in the art. The calculations can be performed on, for example, consumer interfaces 104, agents 116, or web host 110. The summaries are hypothetical in nature and if different assumptions are used, the actual values, cash flows, summaries and results can differ, thereby displaying to the client a possible need for different life insurance, other insurance options, in estate death benefits, out of estate death benefits etc. for different scenarios. In addition, the client can provide certain data assumptions, e.g. his or her current protection coverage, asset and liability values, cash flow scenarios, after tax results, rate of return, reserve fund, debt, mortgage payoff, estate taxes etc. through the interfaces described herein. If different data or assumptions are input, summaries and reports would be affected.

Calculations of estate taxes are based on taxing information, such as tax rates and estate values. Tax information can be stored on database server 120/storage 126 and can be used to compute taxable values, described herein. The taxing information can be changed periodically or received over a computer network to reflect changes in law, or even changed/received in real-time on an on-demand basis when the taxing information is required by the tax based calculations described herein.

As stated above, calculations utilize a complex series of information, including but not limited to information from clients, agents, government entities such as the Internal Revenue Service (IRS) and the United States Congress in a variety of algorithms in order to aid an agent in properly planning a client's estate. Information from which calculators function (e.g., interest rates, tax code requirements, stock market data) can be automatically updated via scheduled updates, or can be manually adjusted. User accessible fields can have maximum and minimum values that may be entered. Attempting to enter information outside of an acceptable range (e.g., maximum or minimum) may result in an error message. User accessible fields can have specific alpha or numeric values that may be entered. Attempting to enter information not specific to an alpha or numeric data entry field (e.g., attempting to enter letters into a numerical data entry field) may result in an error message. The error message may occur at the time the data is input, or when the user selects a calculate button. The calculations can be used, without limitation, for estimating life expectancies, estate values, legacy values, estate liquidity, cash flow, life style realization, or combinations thereof. Information entered into one calculator may be accessible to another calculator so that a client does not need to reenter similar information.

Illustrative Apparatus(es)

Figure 10:
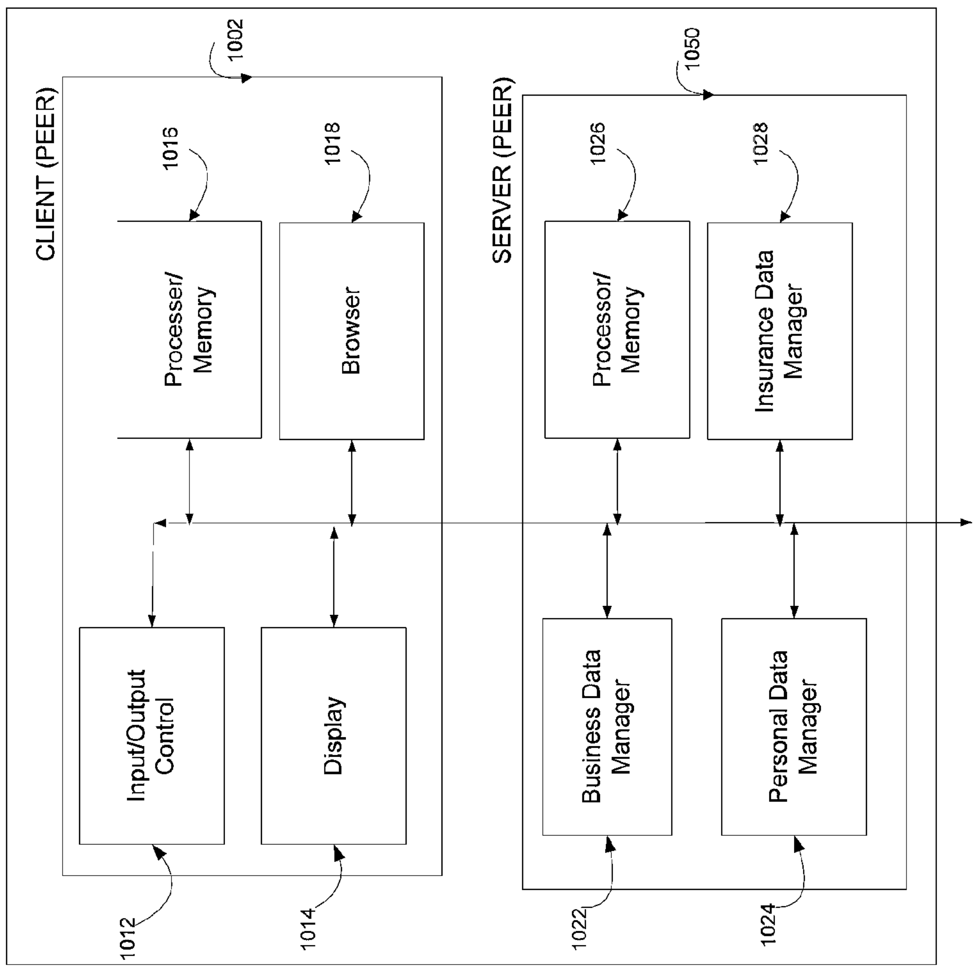
FIG. 10 shows a block diagram for one or more apparatuses for providing estate planning services in accordance with one embodiment.

FIG. 10 shows a block diagram for one or more apparatuses for providing estate planning related services to professionals in accordance with one embodiment of the invention. As shown, system 1000 includes client device 1002 in communication with server 1050 over a communication channel. In one embodiment, client device 1002 and server 1050 can be separate devices in communication over a computer network. The network communications can be via network interfaces. In one embodiment, client device 1002 and server 1050 can be components of device 1000, wherein the client device 1002 and server 1050 are in communication over a communication interfaces, such as a bus. There can be more or fewer components without departing from the scope of the invention. For example, there can be other processors computing different aspects of the operations of the modules of server 1050. In other embodiments, the processor of the client and the server can be the same processor. Also, other communication configurations can also be used besides client-server, such as a peer-to-peer configuration with a plurality of interconnected peers, wherein any node in the peer-to-peer network can perform the actions of the client device 1002 or server 1050.

Client device 1002 comprises components in communication with each other, including input/output control 1012, processor/memory 1016, display 1014 and browser 1018. Input/output control 1012 provides an interface for entering user commands and/or receiving feedback from the device. The control 1012 can comprise a keyboard, mouse, sound output, haptic output, visual output, etc. Processor/memory 1016 includes any computing component and/or computer memory component. For example, the processor includes any device for performing computerized operations, such as running a program based on processor-readable instructions stored within a memory such as RAM, ROM, EEPROM, hard-disk drive, etc. Browser 1018 includes any component for providing a user interface. Browser 1018 can provide interfaces for providing insurance related services as described herein. Browser 1018 can provide business data management interfaces, personal data management interfaces, insurance interfaces, or the like. The interfaces provided can be the interfaces of FIGS. 11-129. A user can manage the services provided in the browser and over display 1014 using input/output control 1012.

Server 1050 comprises components in communication with each other, including business data manager 1022, processor/memory 1026, personal data manager 1024, and insurance data manager 1028. Processor/memory 1026 includes a computing component and/or computer memory component suitable or sufficient for performing processing. In one embodiment, processor/memory 1026 can perform at least some of the operations of the processes of FIGS. 2-9.

The components of the devices can be managed by separate functional multi-layer components, wherein the layers can be software and/or hardware and can be rendered or represented as visual components, for example, on a display. For example, a layer can manage an estate problem of a client. Another (sub) layer can manage a sub-domain of the domain, and the like. For example, an estate's protection domain may include a layer directed to managing a type of insurance protection for the business and personal financial information in the estate, wherein the layer can be represented visually and enabled in hardware, software and/or over a network.

Data manager 1022 includes a component for managing information related to a client, including information about the domains of the client (e.g., assets, liabilities, cash flow, and protections). The database can be SQL database, flat file, XML file, or any formatted data. Fields of the business database can be associated with procedures, such as stored procedures, triggers, event based routines, or the like. When business data is entered into the database, the routines can trigger and compute other information for the database or other databases (e.g., for business, personal, or insurance data), such as net worth, tax amounts, valuation, etc., automatically, and store such computed information in the business database associated with the entered business data.

Personal data manager 1024 includes a component for managing information related to the client, the client's family, home, or other personal data. The personal information can include information about the domains of the client (e.g., assets, liabilities, cash flow, and protections). The personal data can be stored in a database, indexed by the identity of the client, or the like, substantially similar to the business data described above. Routines and/or triggers can be associated with the fields of the database such that when personal data is entered, other data can be computed, such as personal tax rates, mortgage amounts, projected incomes, etc.

Business data can be based on or related to the financial condition or state of the business including the ownership of the business (e.g., corporation, corporate entity, LLP, LLC, partnership, sole proprietorship, etc.), tax structure for the business, and obligations unique to the business such as paying taxes for employees, stock or bonds obligations, etc. As described herein, the apparatuses, processes, user interfaces, or other mechanisms for providing business data provides added benefit beyond only displaying personal data (e.g., provided by personal data manager 1024), because the business information enables a user or client to understand the unique problems of a business and to manage the future financial conditions of the business with respect to insurance and insurability. Also, providing business data in conjunction with personal data allows the user or client to understand the interrelationship between the business financial condition and the personal financial condition.

Insurance data manager 1028 includes a component for managing information related to mechanisms for solving the estate problem for the client. Insurance information can be data associated with the protection domains for the client and/or the client's business(es). Insurance information can include actual current insurance owned by the client and/or in a trust to cover the estate problem. Scenarios at death and/or disability can also be stored and managed by the manager 1028. Insurance information can be stored in a database substantially similar to business and/or personal information as described above. Information about projected insurance protection coverage to reduce the impact of the estate tax problem can also be stored. Routines and/or triggers can be associated with the fields of the database such that when insurance data is entered, other data can be computed, such as adequate insurance coverage for particular at-death scenarios, a change in cash flow, owner's equity, and/or net worth due to more or fewer protections, or the like.

Other Illustrative Processes

Many individuals put off planning their estate. For some, it is because they simply have a difficult time contemplating their own death. A well-structured estate plan is invaluable. Through it, one can control the distribution of assets and possessions during their lifetime and after their death, as well as name guardians for your children or plan care for other dependents. A first step in developing an estate plan is to assemble a competent, professional estate planning team. Generally, the size and complexity of an estate, as well as the existence of an established relationship with an advisor, dictates the overall involvement and/or need for professional expertise or emotional support.

Initially, an estate planning team focuses on a client's current financial position. This is a very important part of the estate planning process, because one needs to know where they stand today in order to accurately plan for the future. For this reason, a client is advised to gather any and all materials involving current or future income, property ownership, insurance, and legal arrangements already in place. Here is some of the information a client may need:

Current income from employment and all investments.

Investment documents, certificates, statements, passbooks, etc.

All retirement benefits: Social Security (including survivors' benefits), Individual Retirement Accounts (IRAs), pension and profit sharing plans.

Any expected deferred compensation.

Deeds to primary and vacation residences.

Life insurance policies of which you are the owner, the insured, or the beneficiary.

A list of all personal property.

Current and expected debts and obligations, including mortgage and loan balances, real estate liens, taxes payable, consumer debts, and estimates of funeral costs and estate settlement expenses.

A Will, if there is one.

Trust Agreements, if any.

A complete analysis can begin once this information is assembled. This will allow a client to take a closer look at the client's family's needs. Some important questions that are answered are:

How does the family's overall cost of living requirement change in the years ahead?

Who will take care of any minor children if something happens to the client?

Who will make medical and financial decisions on a client's behalf if the client becomes incapacitated due to illness or injury?

What are the estimated educational expenses when a client's children reach college age?

Is there a family member who needs special care or medical attention?

How will estate taxes affect the assets as they are currently held?

The careful planning of an estate requires a client to share a lot of personal and financial information with one or more professional advisors. This fact alone often serves as an initial stumbling block to the planning process. However, without an accurate financial and personal portrait, an estate plan may not accomplish a client's goals and objectives. In addition, while most of the initial time can be spent creating your first estate plan, a client's circumstances—both personal and financial—are bound to change over time. Therefore, an estate plan needs to evolve so it will continue to address a client's needs and wishes.

Figure 9:
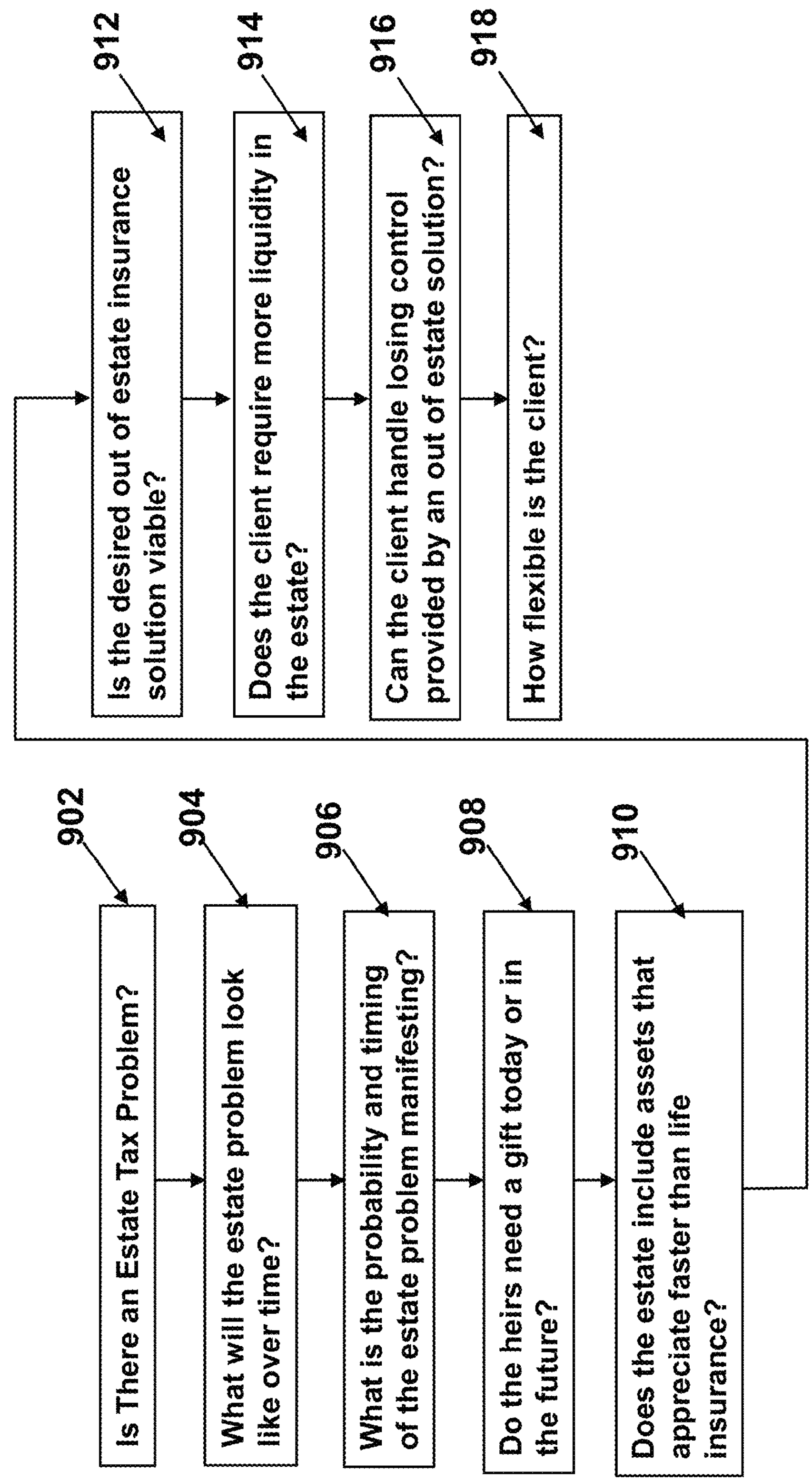
FIG. 9 is a flow chart directed to determine the necessity of using an estate planning tool in accordance with one embodiment.
Figure 19:
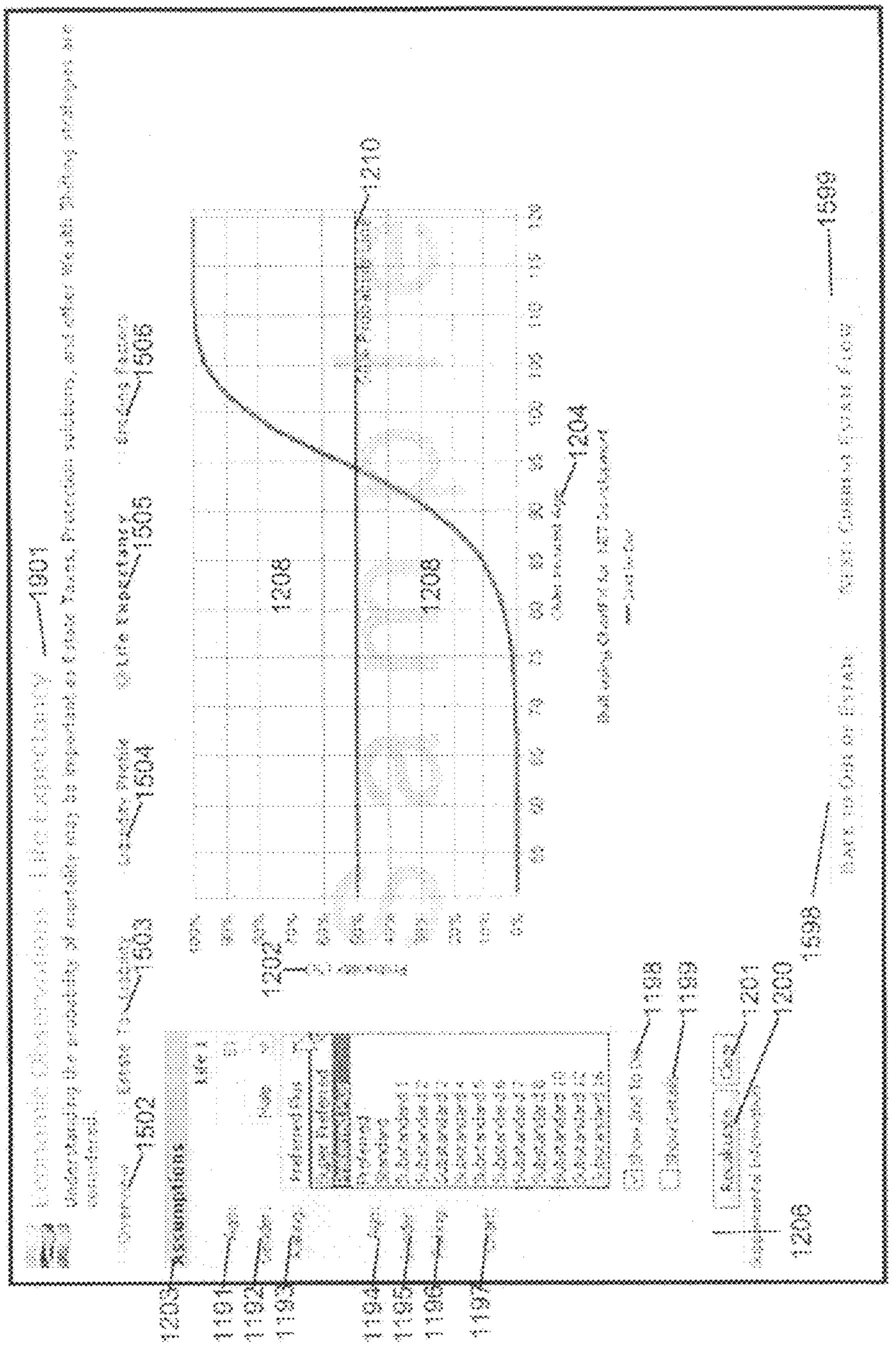
Figure 20:
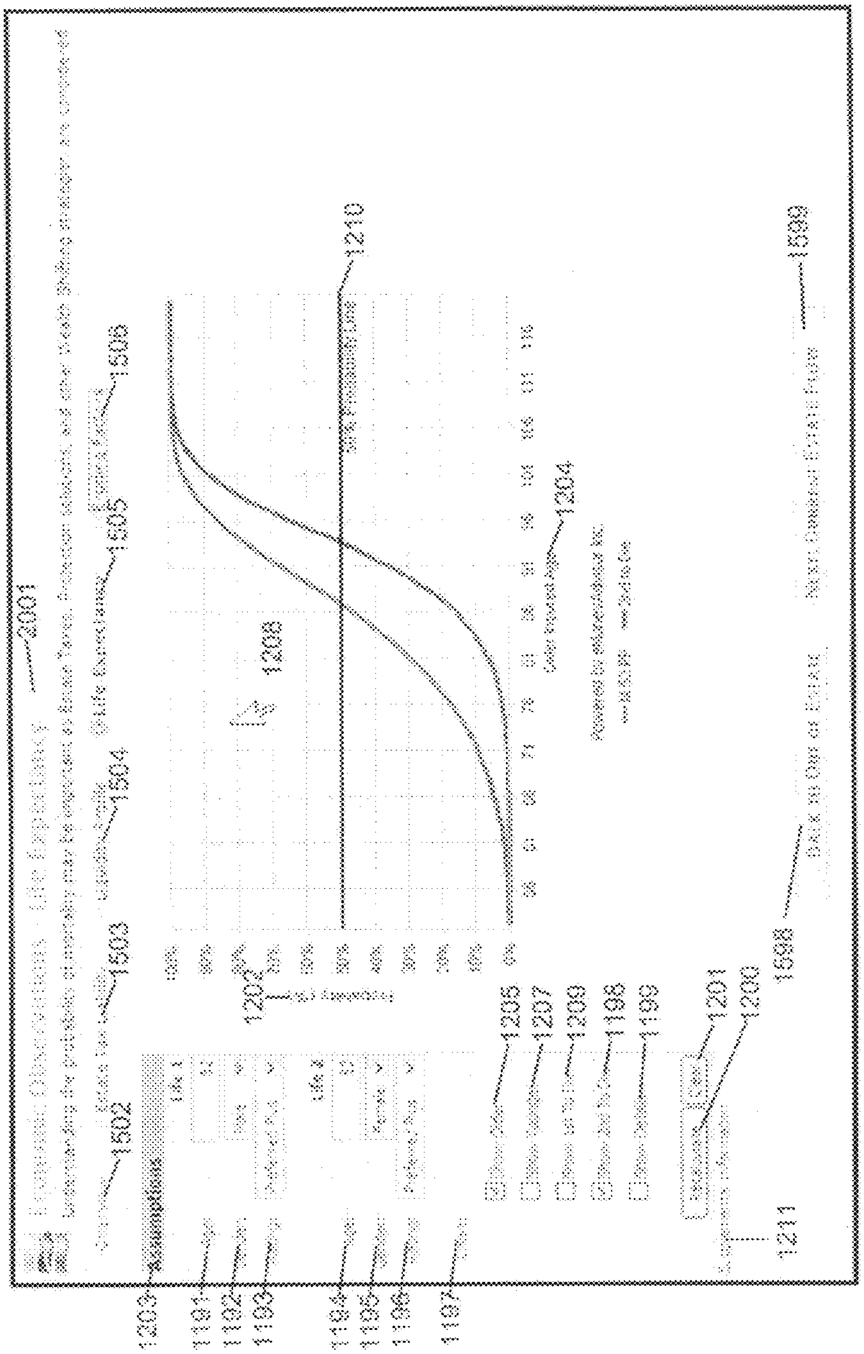
Figure 21:
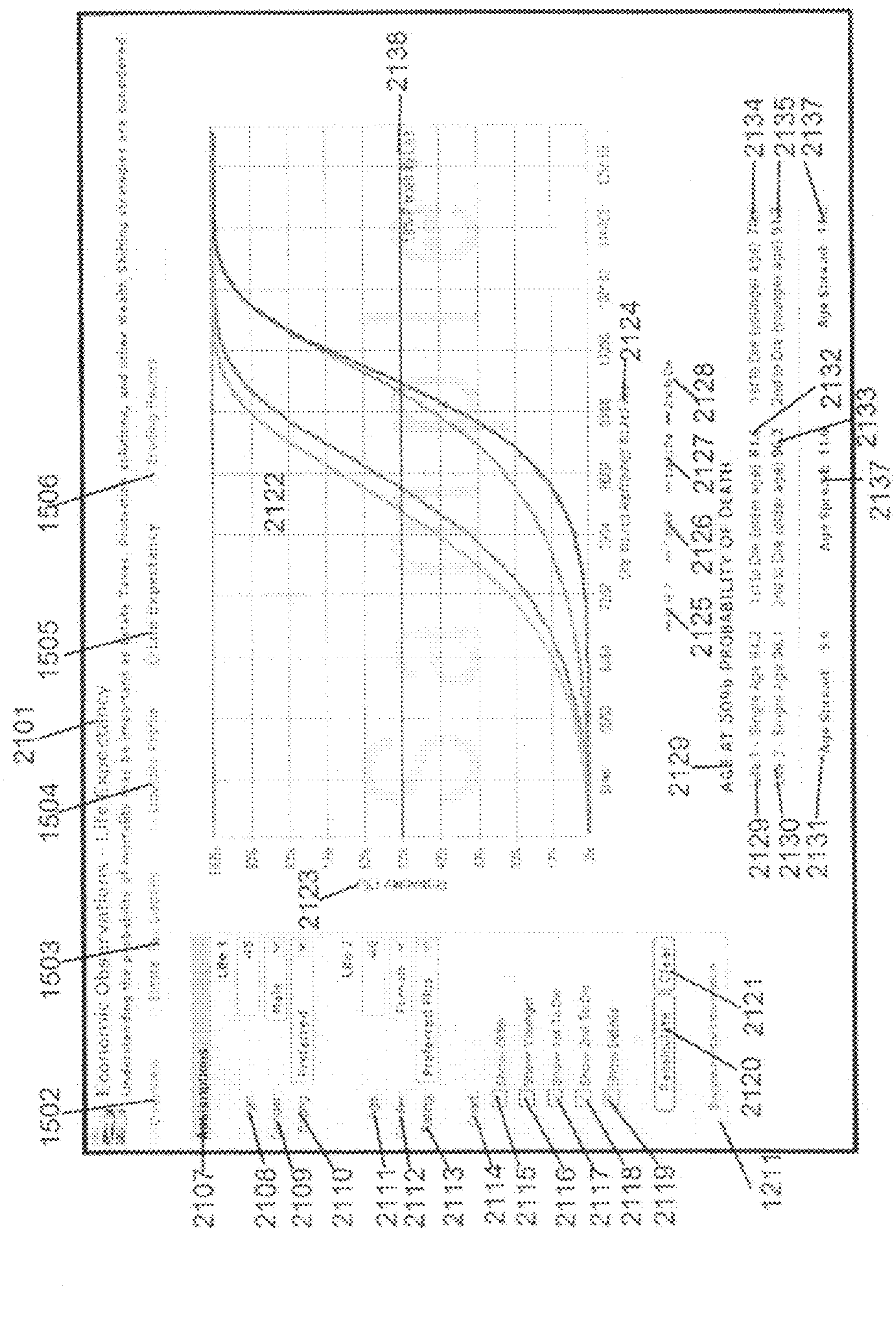
Figure 36:
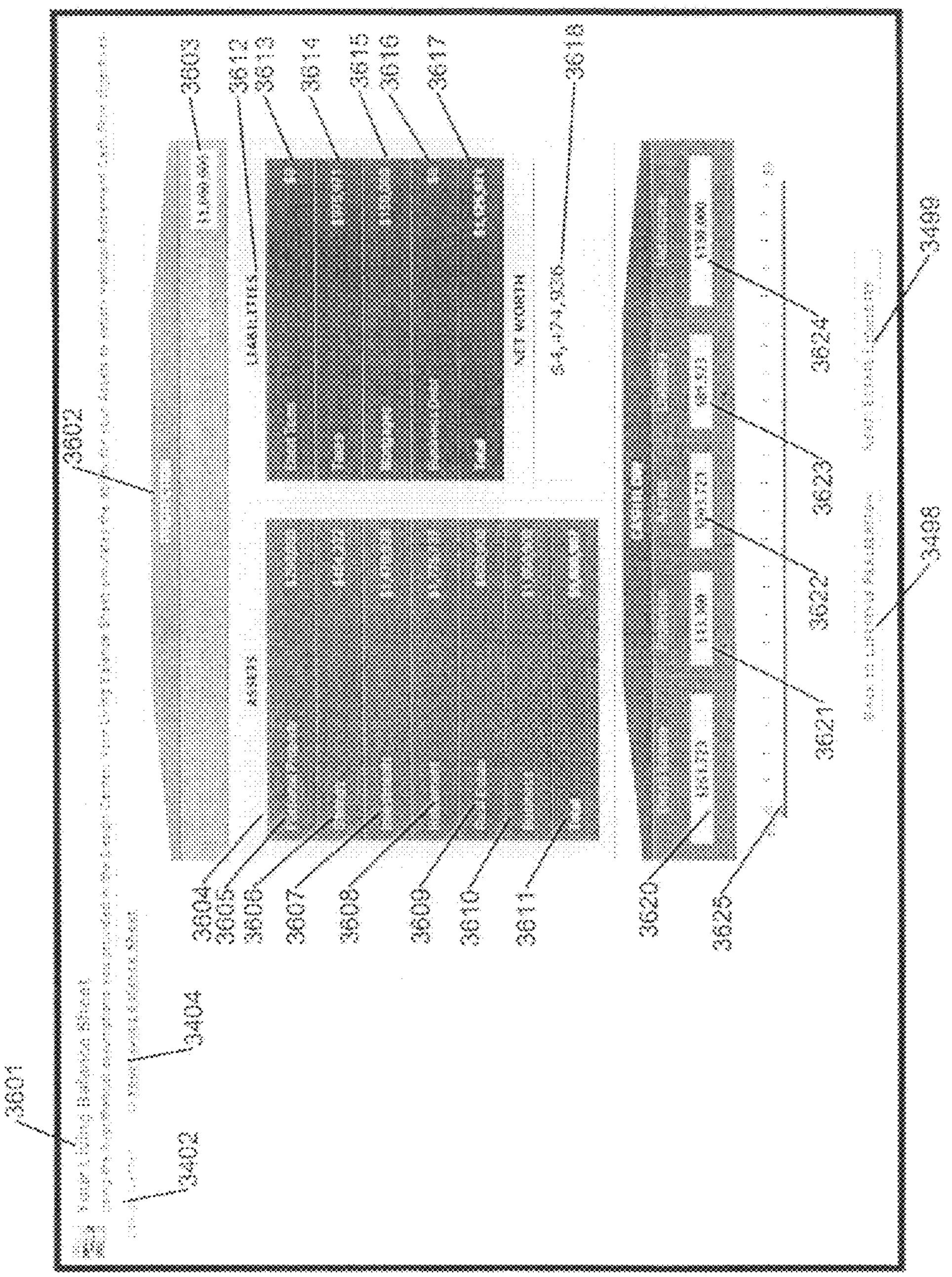

FIG. 9 illustrates a nine step diagnostic test that a professional can use to determine the appropriateness of estate planning for a client. The idea is to not have life insurance proceeds generate estate tax events, but to reduce estate tax problems. In step 902, the professional has to recognize whether the client has an estate tax problem. This can be recognized quickly from the estate cash flow screen, e.g., as illustrated in FIG. 25. In step 904, the professional has to determine and illustrate what the estate problem will look like over time. This can be viewed by moving the slider on the living balance sheet as seen in FIG. 36. This can allow a client to view whether the client will be able to live their life as they desire while maintaining the estate or would the estate be depleted during the lifetime of a client. Step 906 can illustrate what is the timing and the probability of estate problem manifesting. This is illustrated, for example, in an economic observations life expectancy as illustrated in FIGS. 19-21. In step 908, the professional can determine whether there is any value to gifting the estate today to the client's heirs that would not include life insurance. For example, the heirs could need the cash now. Basically, an agent can determine whether a cash gift today is more important to the heirs than a life insurance paid out in 30 years as illustrated in FIGS. 37-48. In step 910, an agent can determine if the client is likely to appreciate his assets at a faster rate than life insurance. If the client believes that he has the golden touch and determines that he can outperform a life insurance policy over 30 or 40 years, the agent can plot the expected value of the estate tax problem when the assets appreciate at a high rate, for example, in FIGS. 22-24 in field 1233. In step 912, an agent can determine the current tax law limitations that restrict cash flow out of the estate or, in other words, is the desired out of estate insurance solution viable. If available cash flow is low due to limitations on the number of inheritors or number of donors, should an ILIT be used anyhow (see FIGS. 65-79). Will a client's ability to place assets out of estate under current tax law, affect the kind of investments available? For example, placing assets out of estate affect the amount, the type or the structure of life insurance available. In step 914, the agent can determine the client's preference to having liquidity in the estate. In step 916, the agent can determine the client's preference to losing control in an ILIT and giving the control to a trustee. In step 918, the agent can determine the client's desire to be flexible or change his mind. Flexibly can be put into affect by using a defective ILIT. The less liquid the estate is, the more appropriate the use of an ILIT is to solve the estate problem. Where cash flow and cash flow redeployment opportunities are not limited, an ILIT is appropriate. Examples of illiquid assets are, farms, factories, and family held businesses.

As described below, a user can use the processes or interfaces to navigate between different interfaces. Navigation can be enabled by a user interaction, such as a mouse press, touch screen input, gesture, voice, etc. Clicking, pressing, or pushing a user interface element described below is non-limiting and can include any user interface input. Navigation can also be automatic and/or timed and can not require user input.

While a sequence of sections or steps of a process flow between interfaces are also described, other sequences can also be used without departing from the scope of the invention. For example, a user can navigate backwards and forwards in the step, or even skip certain steps, or jump from one step of one process to another step of another process. The sequence of steps can be stored in processor readable media and presented to or selected or chosen by the user, chosen by user preferences (e.g., based on past behavior of the user or other similar users), or the like.

Illustrative Interfaces and Related Processes

The systems, apparatuses, processes, user interfaces, reports, and other mechanisms described herein can be used in conjunction with any or all or any combination of components, processes, etc., described in more detail in U.S. patent application Ser. Nos. 61/290,579; 12/380,564; 12/113,087; 11/891,616; 11/510,537; and/or 60/763,200. Generally, the interfaces partition the pages into different stages, including an introduction stage, data gathering stage, presentation stage, and/or delivery stage. The unique systems, apparatuses, processes, user interfaces, reports, and other mechanisms described herein provide comprehensive, user-friendly realistic short and long term estimations of estate wealth by considering cumulatively, the client's and spouse's health and realistic life expectancy, what the client's estate value and estimated tax burden will be in 1, 5, 10, 20, 30 or more years, minimizing the tax burden on the estate, and determining whether the client's estate can carry the estimated tax burden and other transfer costs while maximizing the amount of the client's legacy that is going to realistically be transferable to heirs. The client can assess key assets, and determine which estate planning tools can best be utilized in order to protect those key assets from forced liquidation while maximizing the amount transferable to heirs while minimizing transfer costs in order to ensure the client's legacy is rightfully transferred to his or hers intended heirs.

Figure 11:
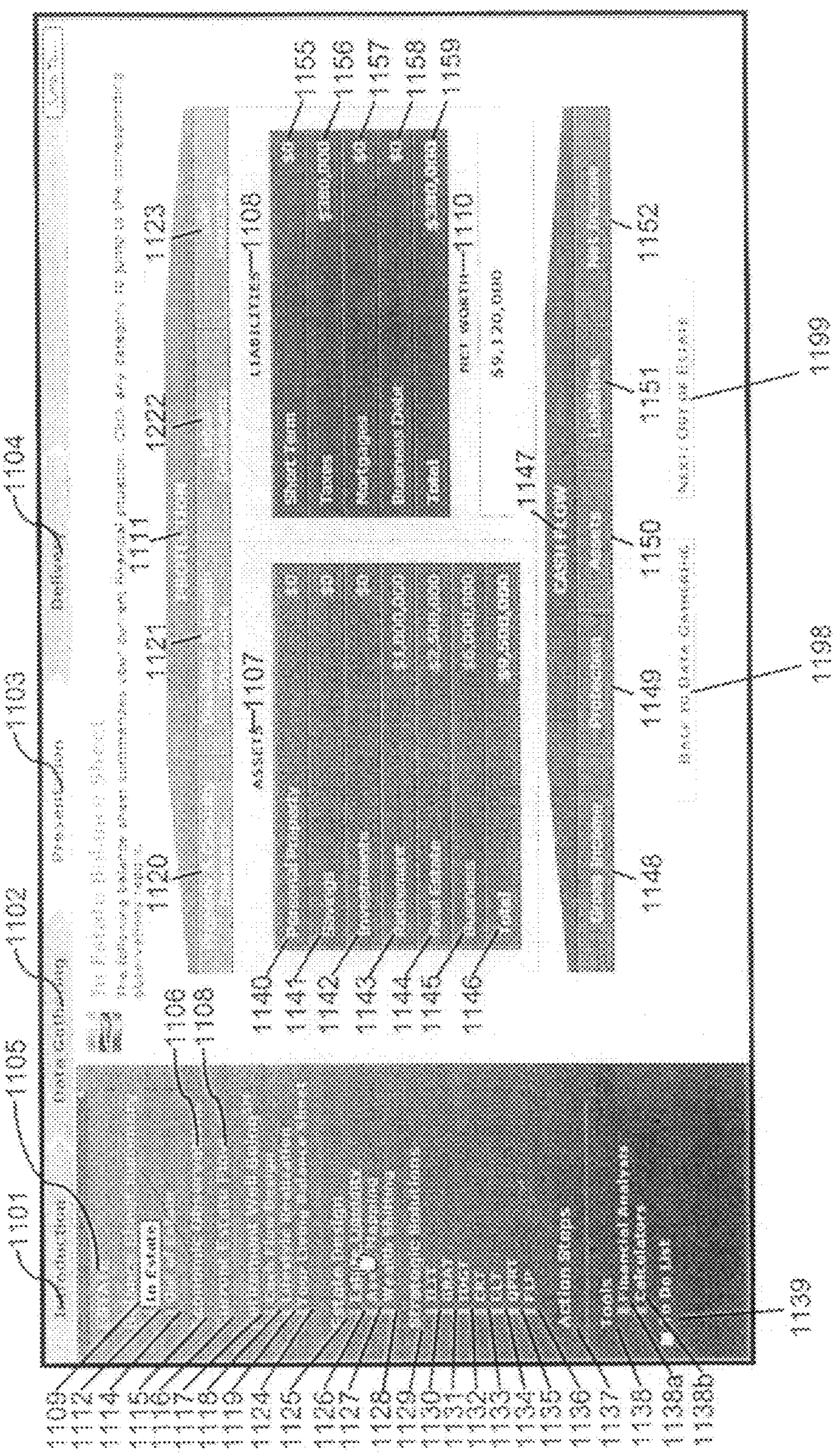
FIGS. 11-129 are diagrams of illustrative display pages for implementing interactive methods and systems for estate planning related activities in accordance with embodiments of the present invention.
Figure 129:
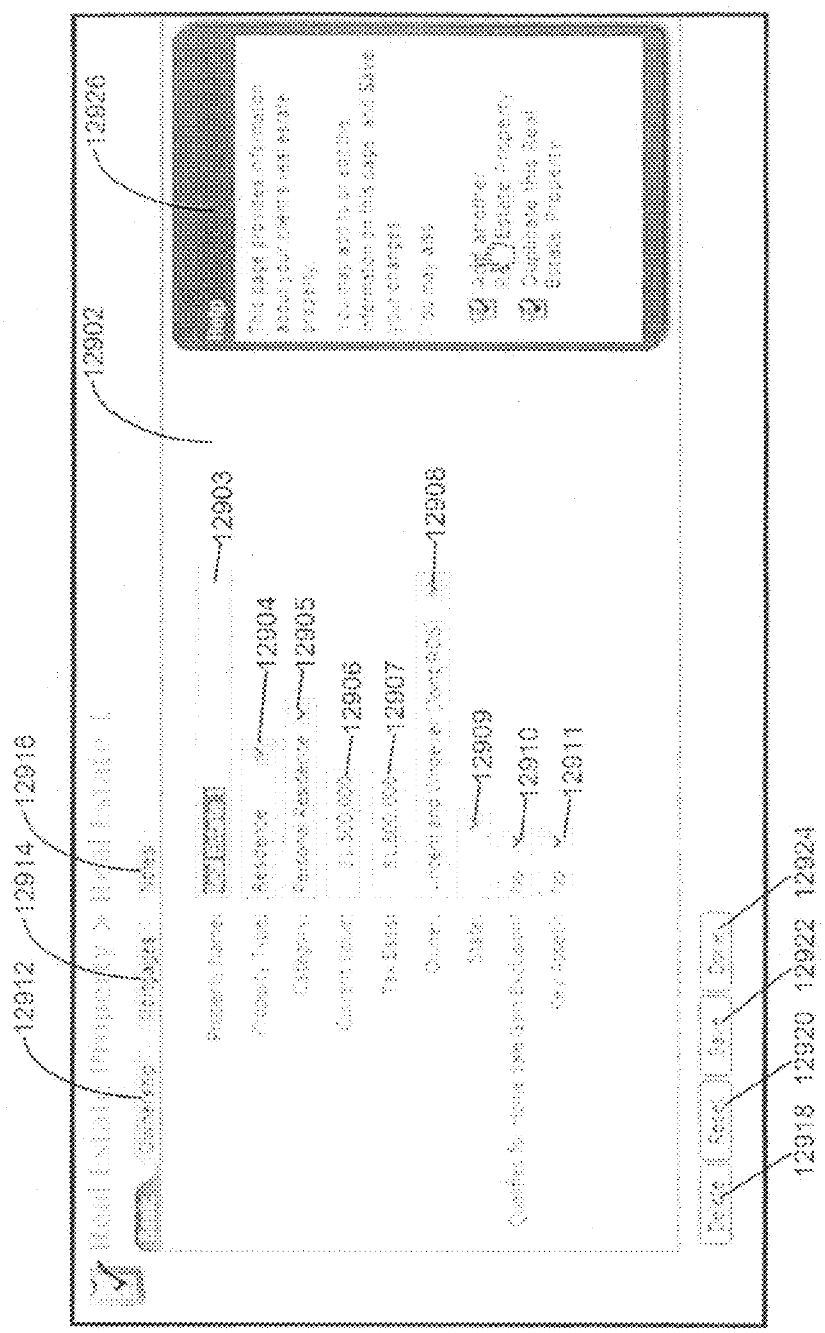

FIGS. 11-129 are diagrams of illustrative display pages for implementing interactive methods and systems for insurance related activities in accordance with embodiments of the invention. FIGS. 11-129 show user interfaces and processes for managing business scenarios for life insurance or other insurance choices, among other things.

The interfaces described herein show various layouts of components for managing different types of data about an estate. The components for managing the different types of data can be shown side-by-side to show the interrelationship between the types of data. The components can enable financial factors to be associated with one or more categories or domains such as protection, assets or asset building, liabilities and cash flow. The one or more factors can be displayed in a table on the display page, which can be arranged to illustrate the factors within each category. Moreover, the table can be arranged in columns and rows. The categories and factors can be positioned in the columns and rows. Each category can be displayed on the display page in a different color such that the one or more factors can be displayed in substantially the same color as the category with which the one or more factors is associated. In one embodiment, a cursor or pointer can be positioned proximate the one or more factors such that an indicia appears. The indicia can be a field containing a description or definition of the factor.

For example, a layer can provide different data types associated with different financial domains of an estate and can show the domains side-by-side, or one on top of another, or any other arrangement, such that a user can easily see the interrelationship between the data. Also, domain views for an estate, e.g., protection, assets, liabilities, and cash flow, can be shown side-by-side. The types of data can be color coordinated. For example, protection data can be colored one color, while assets can be colored another, liabilities another color, and cash flow another color. In this way, a client or user can easily understand the interrelationship between the financial information between the client and the client's business.

Generally, there can be a plurality of steps to manage data provided by the interfaces, such that stepping through the steps allows the users to understand more about the financial health of the business and/or client and to better show the client the need for business and/or personal insurance protections.

The interfaces described herein can provide a plurality of screens with varying details. The screens can be navigated by sending a request to a web host and receiving another web page, for example, or the screens can be changed dynamically within a browser of an agent or a user. The dynamic changes can be enabled by various mechanisms, including embedded objects, e.g., Flash, ActiveX, dynamic HTML, JavaScript, ASPX, .Net, JAVA etc.

Business Data Gathering and Presentation

At least some examples shown in the interfaces described use a hypothetical scenario to illustrate a process and do not constrain the process to the examples shown. Any client or business can be managed by the interfaces and processes shown. For general purposes, all capitalized terms are descriptive and/or functional as the data, input, or characteristic of a component of the technology described herein.

A presentation for managing and/or presenting estate options to a client can begin with a presentation stage for providing an overview of the estate for a client. FIG. 11 shows an example of a user interface including a dashboard for managing a client's estate. As shown, a current balance sheet section is initially displayed, which can provide an effective starting point for discussion with a client and for understanding the client's life insurance needs. Interactive summary section 1100 is preferably an initial display page that can be presented to a user when the user begins managing the presentation. As shown, the interface includes a data flow menu which includes an introduction phase 1101, a data gathering phase 1102, a presentation phase 1103, and a delivery phase 1104. As shown, the current option selected is presentation phase 1103. A user can select any of the steps to display an interface for providing the appropriate information (e.g., introduction, data gathering, presentation, and delivery).

The interface also includes a left hand menu which includes estate heading 1105, balance sheet summary item 1109, an In Estate link 1112 (shown as currently selected), an Out of Estate link 1114, an Economic Observations link 1115, a Current Estate Flow link 1116, a Retirement Well Being link 1117, a Cash Flow Design link 1118; a Life Style Realization link 1119, a Your Living Balance Sheet link 1124, an Estate Design 1125 link, an Estate Liquidity link 1126, an Asset Mapping link 1127, a Wealth Shifting link 1128, a Strategic Solutions link 1129, an ILIT link 1130, a GRAT link 1131, an IDGT link 1132, a CRT link 1133, a CLT link 1134, a QPRT link 1135, a FLP link 1136, an Action Steps link 1137, a Tools link 1138, a Financial Analysis link 1138*a*, a Calculators link 1138*b*, and a To Do list link 1139. A user can select any of the links to navigate to any tool for managing the client's life insurance or other insurance related needs identified by the link.

In operation, the user can click on any of the components to navigate to the interfaces associated with the component. For example, selecting the In Estate link 1109 can navigate the user to the pages the In Estate Balance Sheet illustrated in FIG. 11 as described herein, or selecting the Estate Liquidity link 1125 can navigate the user to the pages related to liquid assets of the estate as described herein, etc.

Action Steps link 1137 can display a checklist of follow-up action items for the financial representative and the client. The user can click a box to check/uncheck the item. The Action Steps for the Estate module can include:

Add additional Life Insurance protection to meet estate liquidity needs.
Create a Will.
Review an outdated Will.
Review executor provisions.
Review guardian selection/authority.
Review asset coordination with titling/ownership.
Review beneficiary designations.
Review distribution timing.
Review special needs language.
Consider testamentary trust.
Consider QTRP trust.
Consider Irrevocable Life Insurance Trust.
Implement important Wealth Shifting strategies.

Checked items can appear on the Action Steps Scorecard in the Delivery phase of the Workflow Wizard. The Action Steps can be clickable/clearable when accessed through Action Steps link 1137 in the Presentation phase of the Workflow Wizard.

The interface shows the interactive summary section 1100 of the client for the client's personal and family related information. In Estate balance sheet 1170 can include a protection layer 1111 (which can include property and casualty insurance layer 1120, disability and health insurance layer 1121, legal documents layer 1122, life insurance layer 1123), assets layer 1107 (which can include personal property assets layer 1140, savings assets layer 1141, investments assets layer 1142, retirement assets layer 1143, real estate assets layer 1144, business assets layer 1145, total assets layer 1146), liabilities layer 1108 (which can include short term liabilities layer 1155, taxes liabilities layer 1156, mortgages liabilities layer 1157, business debt liabilities layer 1158, total liabilities layer 1159), net worth total layer 1110 which shows the assets total layer 1146 less the liabilities total layer 1159. In Estate balance sheet 1170 can also include a cash flow layer 1147, which may include a gross income cash flow layer 1148, protection cash flow layer 1149, assets cash flow layer 1150, liabilities cash flow layer 1151, and net income cash flow layer 1152.

In operation, the user can click on any of the layers to navigate to the interfaces associated with the layer. For example, protection layer 1111 can navigate the user to a page related to the personal (life) insurance protection pages as described herein, casualty insurance layer 1120 can navigate the user to a page related to the personal casualty insurance pages as described herein, assets layer 1107 can navigate the user to a page related to the personal assets pages of the client as described herein, etc. The user can also select a Back to Data Gathering button 1198 or a Out of Estate button 1199 to navigate utilizing the Workflow Wizard to interfaces for data gathering of personal data of the client, and/or for providing business data for a business of the client, respectively.

Figure 12:
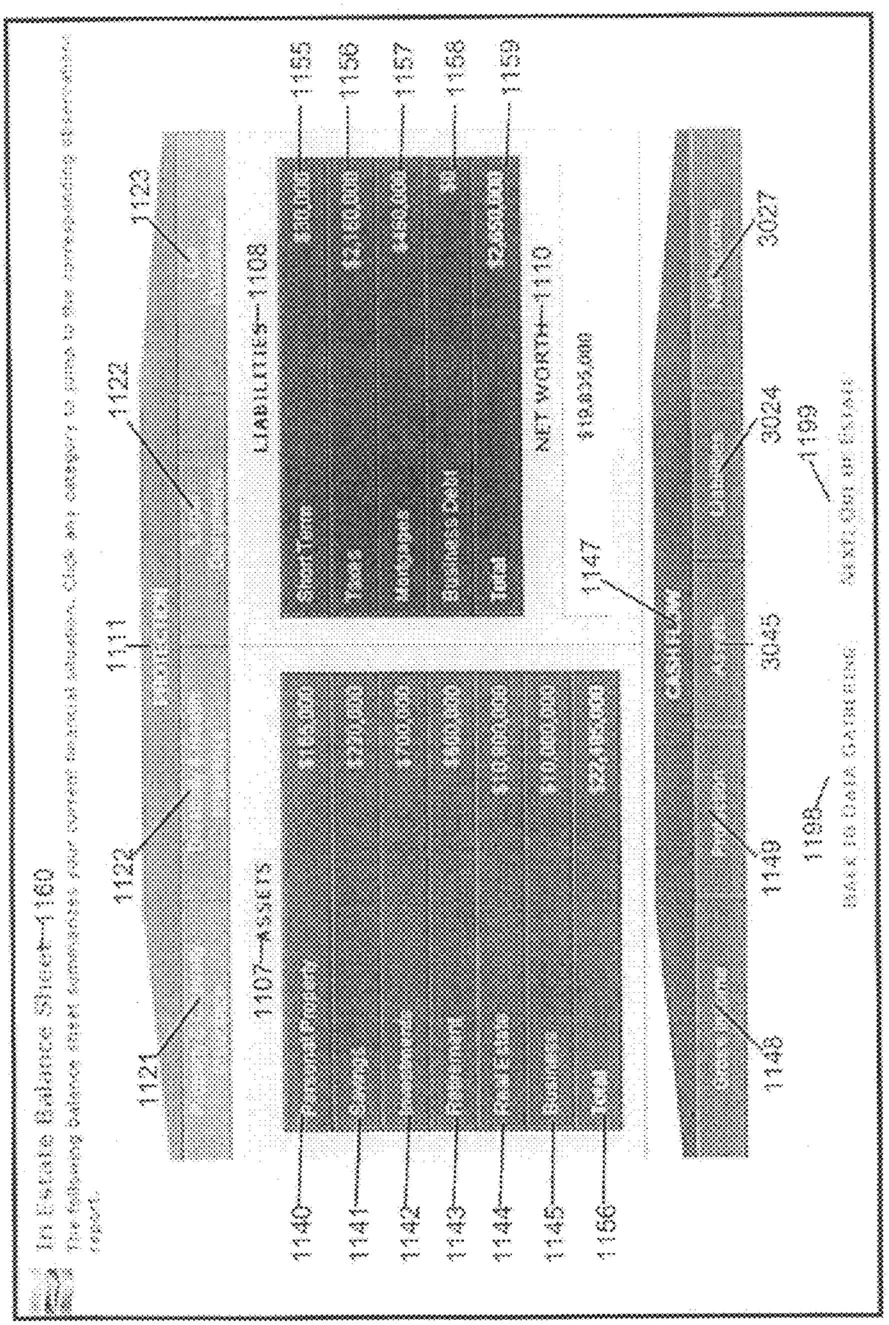

FIG. 12 illustrates an In Estate Balance sheet for a hypothetical user. In this example the interface illustrates the interactive summary section 1100 of the client for the client's personal and family related information. Current balance sheet 1160 displays personal property assets 1140 to be $165,000, savings assets 1141 to be $220,000, investments assets 1142 to be $700,000, retirement assets 1143 to be $600,000, real estate assets 1144 to be $10,800,000, and business assets 1145 to be $10,000,000. The value of total assets 1146 for the asset In Estate is displayed to be $22,485,000. The short term liabilities 1155 are $30,000, taxes liabilities 1156 to be $2,160,000, mortgages liabilities 1157 to be $460,000, business debt liabilities 1158 to be $0, and the total liabilities 1159 to be $2,650,000. The net worth total 1110 displays the total net worth for in estate to be $19,835,000.

Figure 13:
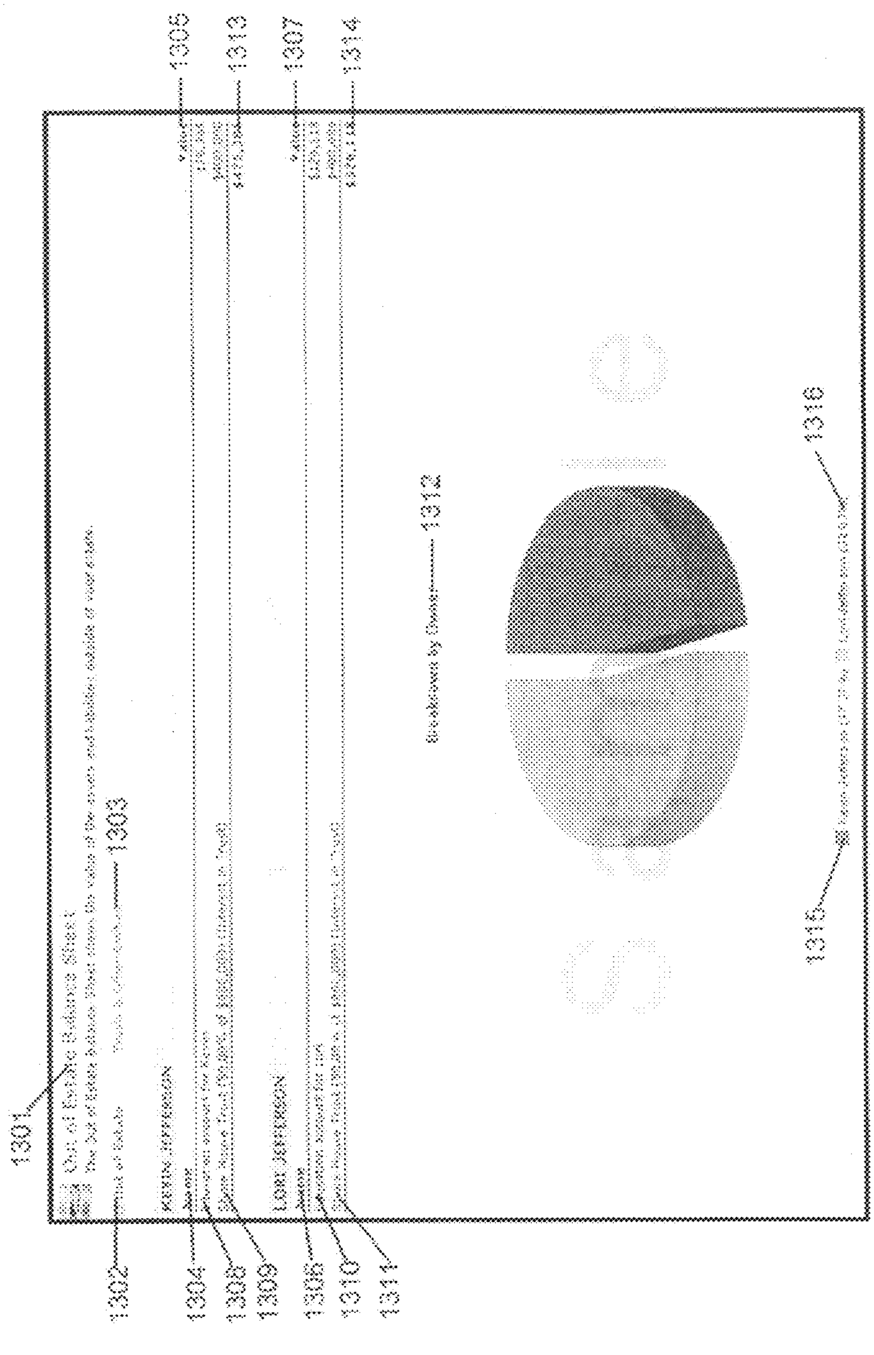

FIG. 13 illustrates an Out of Estate Balance sheet 1301, which can illustrate all assets and liabilities that have components both in and out of the estate, where the out of estate portion is owned by a lineal family member of the client or spouse (e.g., a parent, child, or grandchild, but not a brother, uncle, or cousin). The assets and liabilities can be grouped by owner, with a total for each owner. Liability amounts can be shown in parentheses in a colored font (i.e., red). The total for each owner equals all assets for that owner minus all liabilities for that owner. An Out of Estate Balance sheet 1301 can have multiple display menus across the screen. In one example, the Out of Estate Balance sheet 1301 includes components such as Out of Estate 1302 (shown as selected) and Trusts and Other Entities 1303. The Out of Estate Balance sheet 1301 can provide a table listing all out of estate liabilities. For example, the Table may include columns for the Name 1304, 1306 for any out of estate liability and the Value 1305, 1307 for any out of estate liability. In this example, a user has two distinct out of estate liabilities. There is an education account 1308 for Kevin Jefferson valued at $75,385, and a Shore House trust 1309 also for Kevin Jefferson valued at $400,000. Thus, the total value of the out of estate liabilities for Kevin Jefferson is $475,385. The second out of estate liability is an education account 1310 for Lori Jefferson valued at $126,118 and a Shore House trust 1307 also for Lori Jefferson valued at $400,000. Thus, the total value of the out of estate liabilities for Lori Jefferson is $528,118. The Out of Estate balance sheet 1301 can graphically represent the out of estate liabilities. In this example, the pie chart Breakdown by Owner 1312 shows the total percentage of out of estate liability encompassed by Kevin Jefferson 1315, and the total percentage of out of estate liability encompassed by Lori Jefferson 1316.

Figure 14:
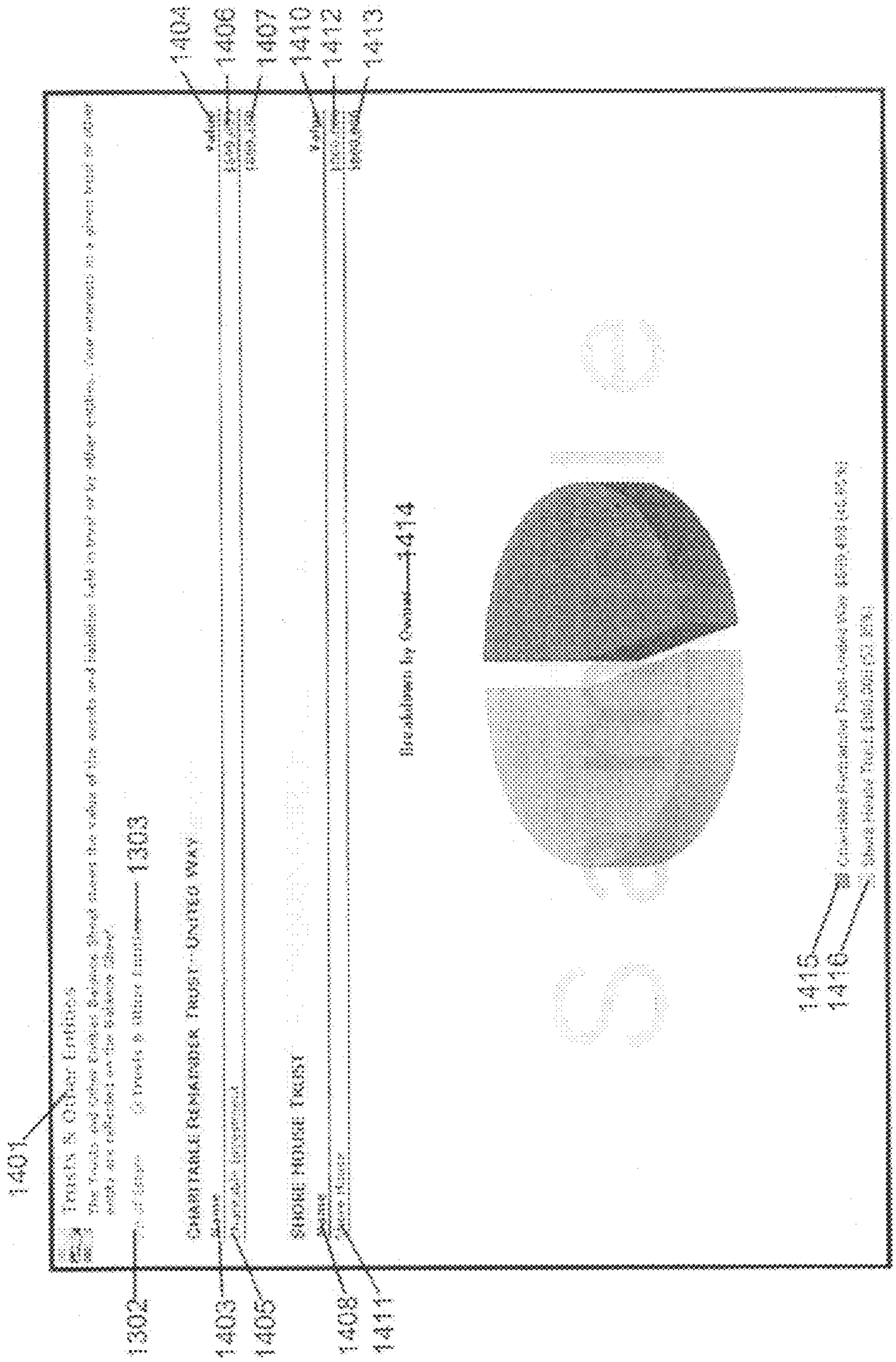

FIG. 14 demonstrates, in one example, all assets that have components both in and out of the estate, where the out of estate portion is owned by a trust and the income or remainder beneficiary of the trust is a lineal family member of the client or spouse (i.e., a parent, child, or grandchild, but not a brother, uncle, or cousin). The assets and liabilities are grouped by owner, with a total for each owner. Liability amounts can be shown in parentheses in a colored font (i.e., red). The total for each owner equals all assets for that owner minus all liabilities for that owner. For example, the Table may include columns for the Name 1403, 1408 for any out of estate Trust liability and the Value 1404, 1410 for any out of estate trust liability. In this example, a user has two distinct out of estate liabilities assigned to a trust. There is a charitable investment account 1405 valued at $699,459, and a Shore House trust 1411 valued at $800,000. The Out of Estate liabilities assigned to Trusts and Other Entities 1303 can graphically represent the out of estate liabilities assigned to Trusts and other Entities. In this example, the pie chart Breakdown by Owner 1414 shows the total percentage of out of estate liability encompassed by charitable contributions to the United Way 1415, and the total percentage of out of estate liability assigned to the Shore House trust 1416.

Economic Observations

Figure 15:
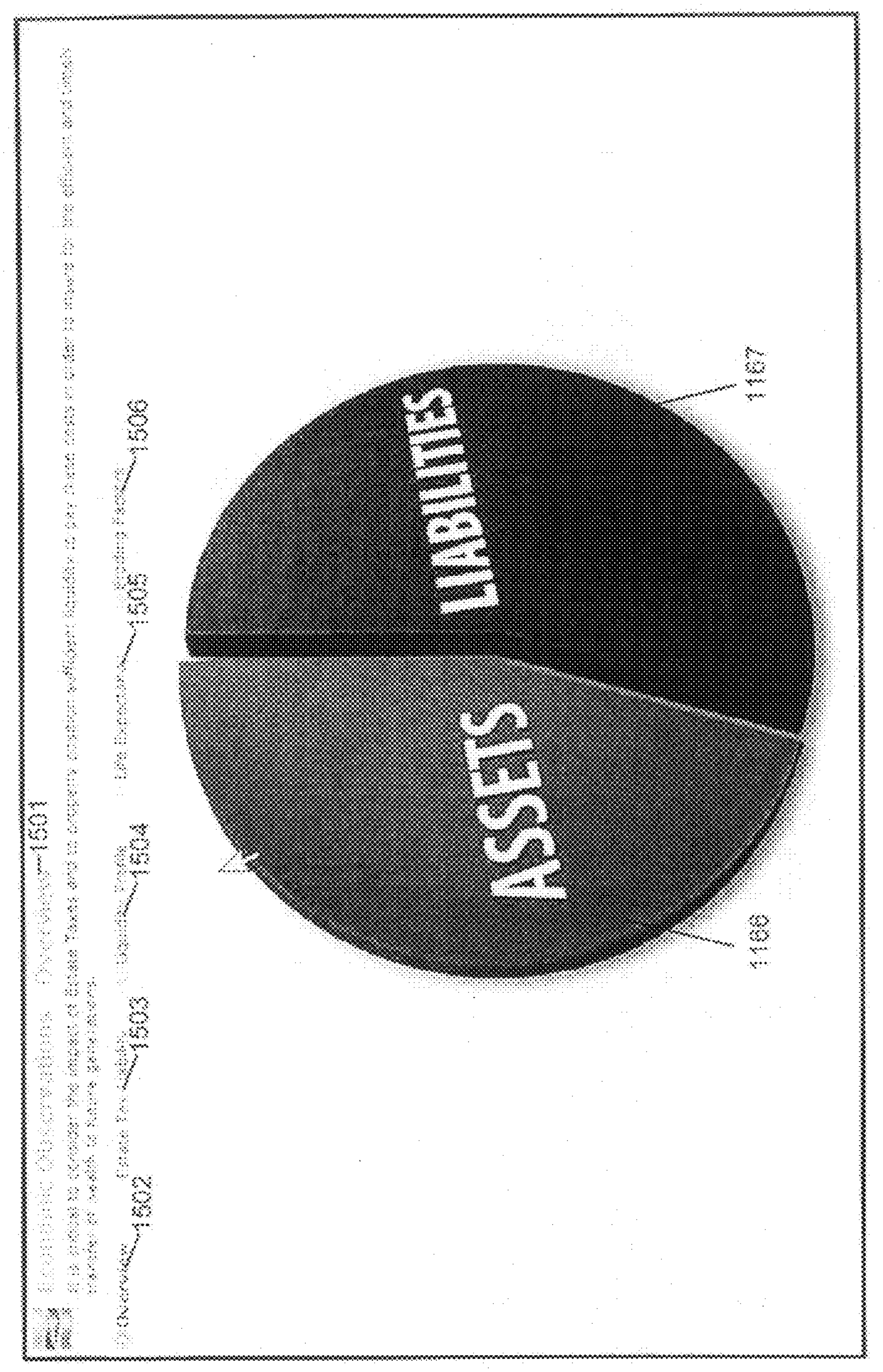

FIG. 15 illustrates an example of a user interface that is presented to a user when the user begins managing the presentation menu 1103 and chooses Economic Observations link 1106 from the left hand menu as discussed in FIG. 11 above. When a user chooses Economic Observations link 1106, Economic Observations-Overview interface 1501 is displayed. The interface shows the interactive summary section 1200 of the client's economic assets versus liabilities related information. In one embodiment, a graphical representation of the client's economic assets 1166 versus economic liabilities 1167 is shown. In one embodiment, the graphical representation is a pie chart. Other non-limiting embodiments of the client's economic assets versus economic liabilities graphical representations include bar graphs, line graphs, Venn diagrams, etc., or combinations thereof. The Economic Observations-Overview interface 1501 can also include a menu across the page which includes an Overview link 1502 (shown as currently selected), an estate tax liability link 1503, a Liquidity Profile link 1504, a Life Expectancy link 1505 and an Eroding factors link 1506.

Figure 16:
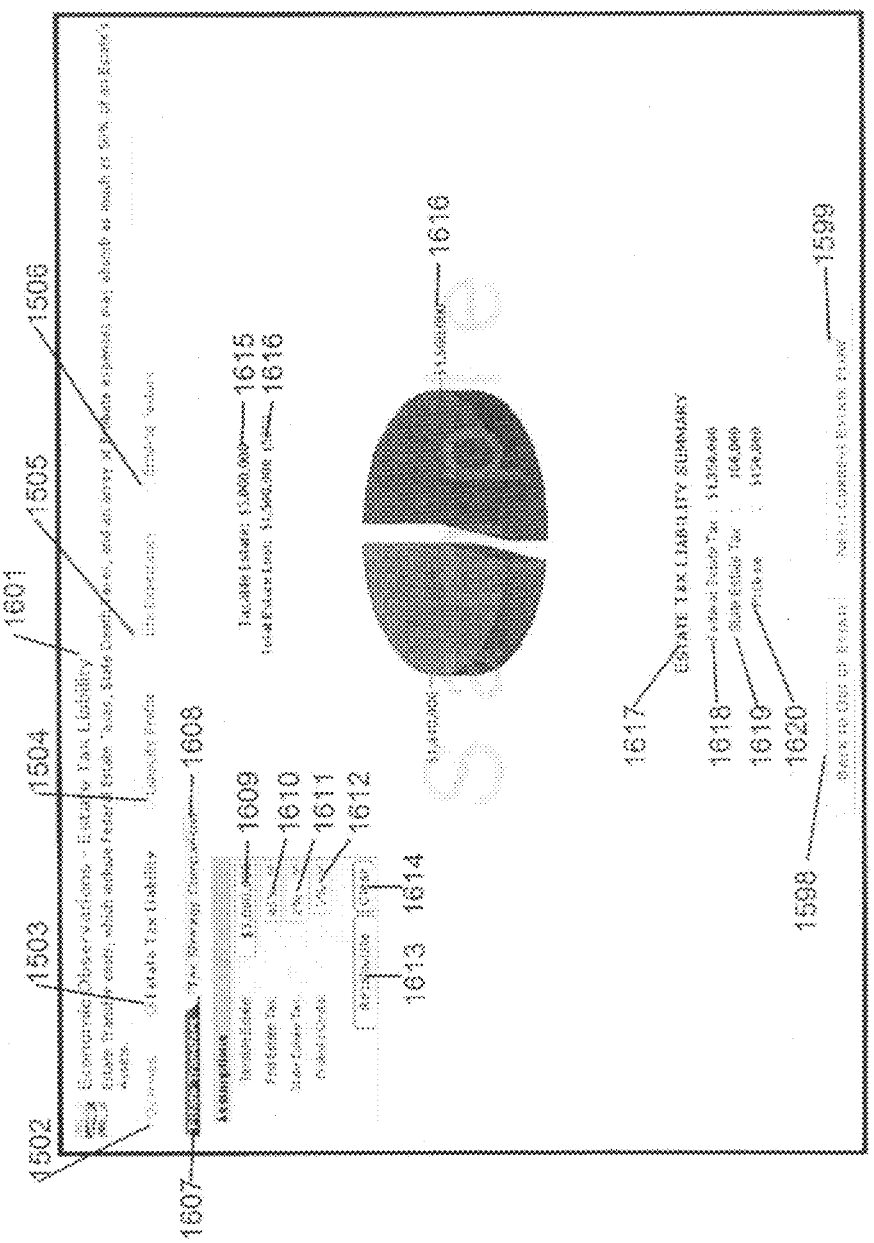

FIG. 16 illustrates an example of an Economic Observations-Estate Tax Liability interface 1601 displayed when a user chooses Estate Tax Liability 1503 from the menu under the Economic Observations-Overview interface 1501 from FIG. 15. The interface 1601 shows multiple tabs which allow the user to navigate. For example, Estate Transfers tab 1607 provides a calculator to determine estate transfer tax liabilities. Tax Strategy Comparison tab 1608 allows the user to compare various scenarios in order to best determine their estate needs. The Estate Transfers tab 1607 may include an estate transfers tax calculator 1621, which calculates the estimated estate taxes based on a series of assumptions. In one embodiment calculator 1621 has a Taxable Estate field 1609, a Federal Estate Tax field 1610, a State Estate Tax field 1611, and a Probate Costs field 1612. Calculator 1621 can also have a Recalculate button 1613 and a Clear button 1614 in order to allow the user to easily input and change the information used within calculator 1621.

In one embodiment, a graphical representation of the client's taxable estate 1615 versus the Total Estate Lost 1616 is displayed. In one embodiment, the graphical representation is a pie chart. Other non-limiting embodiments of the client's economic assets versus economic liabilities graphical representations include bar graphs, line graphs, Venn diagrams, etc. or combinations thereof. The pie chart is produced at least from data provided from calculator 1621 and Estate Tax Liability Summary 1617. Estate Tax Liability Summary 1617 provides an estimate of the Federal Estate Tax 1618, the State Estate Tax 1619, and the Probate Costs 1620. In the instant example, a user has a total Estate worth approximately $3,000,000, and a total Estate Lost to Taxes of $1,560,000. Thus, more than half of this estate is estimated to be lost to taxes.

Figure 17:
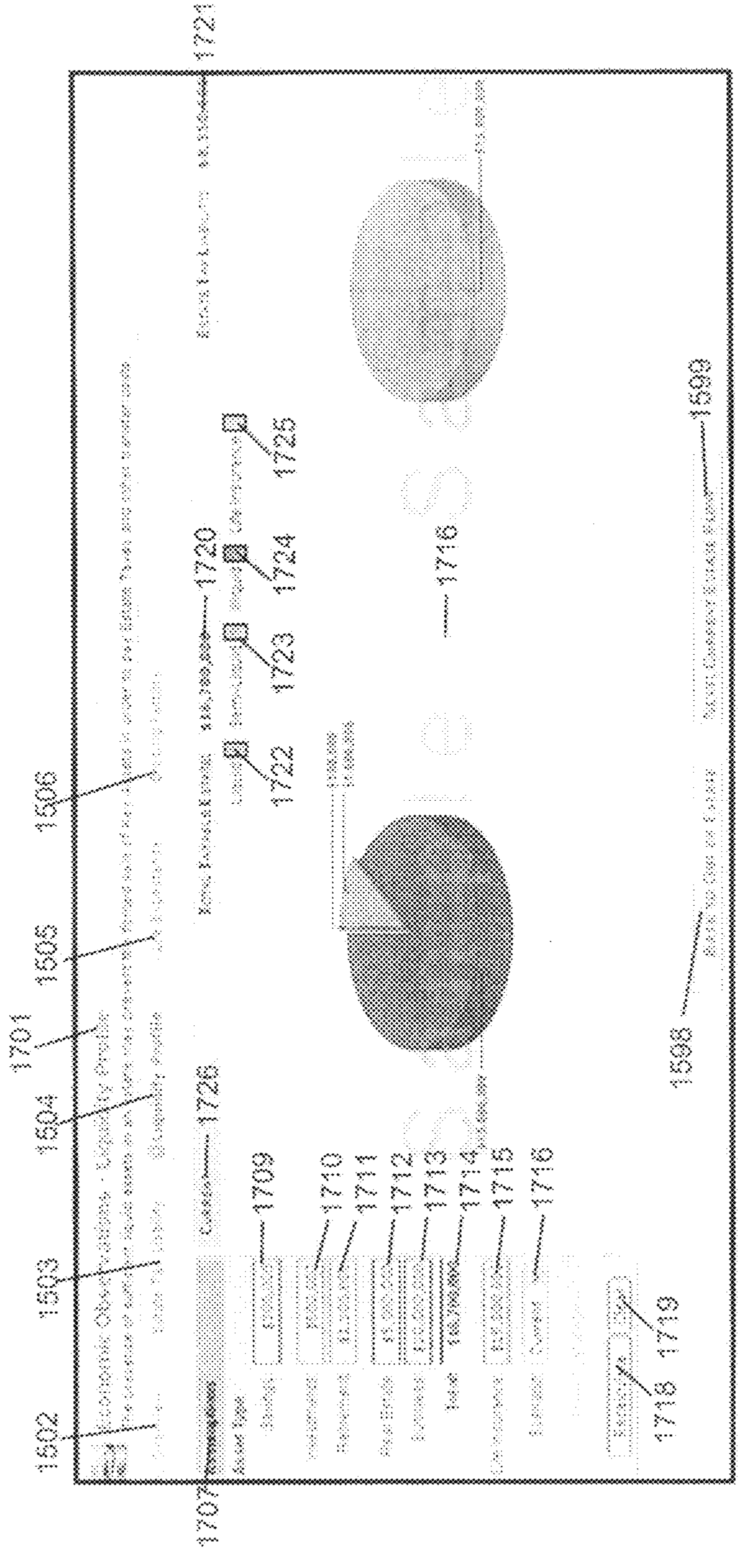

FIG. 17 displays an example of an Economic Observations—current Liquidity Profile user interface 1701 when Liquidity Profile 1504 is selected from the menu under the Economic Observations-Overview interface 1501 from FIG. 15. The Liquidity Profile 1701 can provide a Liquidity Calculator 1734 which is based off of a series of Assumptions 1707. In one embodiment, Liquidity Calculator 1734 can provide a section for Asset Types 1708, that includes a Savings field 1709, an Investments field 1710, a Retirement field 1711, a Real Estate field 1712, and a Business field 1713. The Asset Types can be added together and presented in Total field 1714. Liquidity Calculator 1734 can further provide a Life Insurance field 1715, and a Scenario field 1716. Liquidity Calculator 1734 can also provide an optional check box Show Lost Income 1717 which displays any lost income. Finally, Liquidity Calculator can also have a Recalculate button 1718 and a Clear button 1719 in order to allow the user to easily input and change the information used within calculator 1734.

In one embodiment, a graphical representation of the client's Liquidity Profile 1504 is shown. In one embodiment, the graphical representation is one or more pie charts. Other non-limiting embodiments of the client's economic assets versus economic liabilities graphical representations include bar graphs, line graphs, Venn diagrams, etc. or combinations thereof. The charts can be produced from data provided from calculator 1734. The graphical representation of the client's Liquidity Profile 1504 can display the current 1726 Total Taxable Estate 1720 and the total Tax Liability 1721 of the estate. The charts can further distinguish between Liquid 1722, Semi-Liquid 1723, Illiquid 1724, and Life Insurance 1725. In the current example the Total Taxable Estate is estimated to be $16,700,000 and the Estate Tax Liability 1721 is estimated to be 8,350,000 (i.e., approximately half of the Total Taxable Estate).

Figure 18:
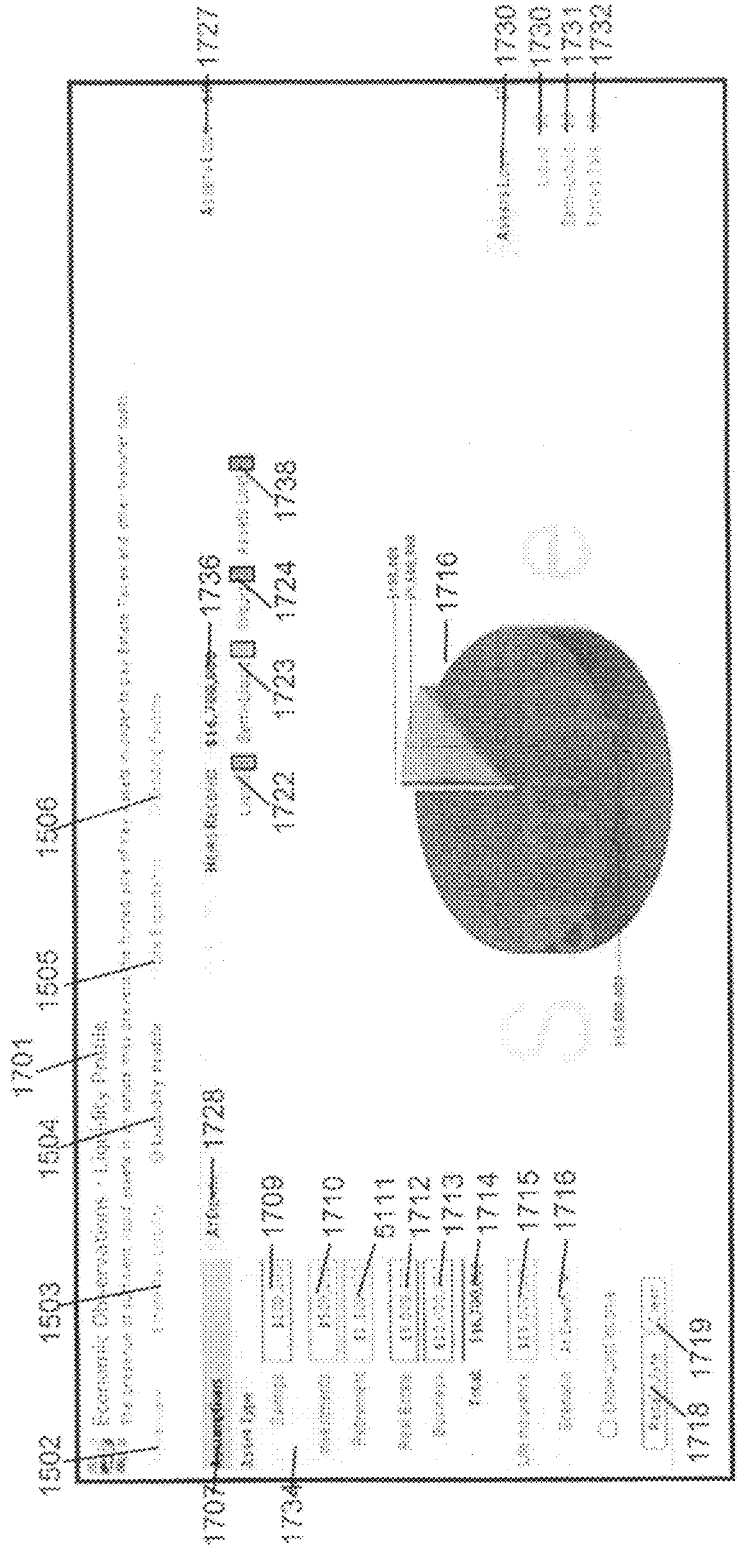

FIG. 18 displays an example of a Liquidity Profile user interface 1505 at death when selected from the menu under the Economic Observations-Overview interface 1501 from FIG. 15. The Liquidity Profile 1504 can provide a Liquidity Calculator 1734 which is based off of a series of assumptions 1707. In one embodiment, Liquidity Calculator provides a section for Asset Types 1708, includes Savings field 1709, an Investments field 1710, a Retirement field 1711, a Real Estate field 1712, and a Business field 1713. The Asset Types can be added together and presented in Total field 1714. Liquidity Calculator 1734 can further provide a Life Insurance field 1715, and a Scenario field 1716. Liquidity Calculator 1734 can also provide an optional check box Show Lost Income 1717 which displays any lost income. Finally, Liquidity Calculator 1734 can also have a Recalculate button 1718 and a Clear button 1719 in order to allow the user to easily input and change the information used within calculator 1734.

In one embodiment, a graphical representation of the client's Liquidity Profile 1504 at death is shown. In one embodiment, the graphical representation is one or more pie charts. Other non-limiting embodiments of the client's economic assets versus economic liabilities graphical representations include bar graphs, line graphs, Venn diagrams, etc. or combinations thereof. The pie charts are produced from data provided from calculator 1734. The graphical representation of the client's Liquidity Profile 1504 displays in field At Death 1728 the total amount the Heirs Receive 1736 after all estate taxes are paid. The charts can further distinguish between Liquid 1722, Semi-Liquid 1723, Illiquid 1724, and Assets Lost 1738. A summary of the Assets Lost 1729 shows the amounts (in dollars) of any liquid assets lost 1730, any semi-liquid assets lost 1731, and any forced sale assets lost 1732. Because in the current example the user has adequate life insurance coverage as shown in Life Insurance field 1715, in the current example the total amount the Heirs Receive 1736 is estimated to be $16,700,000—as all estate costs (as determined in FIG. 17) are adequately covered by Life Insurance, and no liquid, semi-liquid or forced sales are necessary in order to pay for transfer costs.

FIG. 19 illustrates an example of a user interface that is presented to a user when the user chooses Life Expectancy link 1505 from the menu displayed across the page under Economic Observation as discussed in FIGS. 11 and 12 above. The Life Expectancy user interface 1901 can provide a graphical representation 1208 of the client's life expectancy plotted as age of the client and/or spouse along the X-axis versus the probability of death along the Y-axis. In one embodiment, graphical representation 1208 is a line 1214 with older insured age 1204 along the X-axis, and the percent probability of being deceased along the Y-axis 1202. In one embodiment, graphical representation 1208 has a 50% probability line of death 1210. Other non-limiting embodiments of the client's life expectancy graphical representations include bar graphs, pie charts, Venn diagrams, etc., or combinations thereof.

The graphical representation of the client's life expectancy can be plotted based on an insurer's actuarial tables. For a Preferred Plus category client, line 1214 illustrates that the chances of the second to die are near zero till about the age of 70. Line 1214 also illustrates that there is a 50% percent that the second to die will be dead around age 94, and a near 100% chance that the second to die is dead around 104. Line 1214 can thus make a dramatic impact on a client on how long they are expected to be retired, how long are they expected to be expending the potential estate, and how long their beneficiaries may have to wait to inherit. Line 1214 can illustrate the time period for setting up trusts, gifts and the like for estate planning purposes. In one embodiment, users can select various parameters for the life expectancy calculator 1206 to view various life style expectancies. In this example, assumptions 1203 are entered into calculator 1206. Assumptions 1203 can comprise client data options for age 1191, gender 1192, and insurability rating 1193 for the client. Assumptions 1203 can include age 1194, gender 1195, and insurability rating 1196 for the client's spouse.

Calculator 1206 can have multiple display options under Chart 1197 field. For example, in one embodiment, Chart 1197 field includes options for displaying Show Older 1205 (see FIG. 14), Show Younger 1207 (see FIG. 14), Show 1st to Die 1209 (see FIG. 14), Show 2nd to Die 1198 and Show Details 1999 button options. Calculator 1206 can have option 1198 field box to opt to display or not to display a spouse's information by checking the field box. In FIG. 13, the information for only the 2nd to Die is displayed on graph 1208. Calculator 1206 can have a Recalculate button 1200 in order to recalculate and graph the Life Expectancy graphs based off the changing assumptions. Calculator 1206 can also have a Clear button 1201 in order to clear or delete all or part of previously input data in order to change information by the client if an error has been made or the assumptions have changes with time. Calculator 1206 can have user input interfaces via typed responses, drop down menus, check boxes, etc. or other options known in the art. The user can also select and/or press element Back to Out of Estate button 1598 or Next: Current Estate Flow button 1599 to navigate utilizing the Workflow Wizard to the previous or next steps in a workflow, respectively.

FIG. 20 also illustrates an example of a user interface 2001 that is presented to a user when the user chooses Life Expectancy link 1505 from the menu displayed across the page under Economic Observation as discussed in FIG. 15 above. In this example, the information for both Show Older and the Show 2nd to Die is displayed on graph 1208. This allows a comparison and contrast of the life expectancies of a couple in an estate. As can be seen in FIG. 14, chances are that the 2nd to Die will out live the 1st to Die by anywhere from 20 to 5 years (the gap between the two lines).

FIG. 21 illustrates an example of a user interface 2101 that can be presented to a user when the user chooses Life Expectancy link 1505 from the menu displayed across the page under Economic Observation as discussed in FIG. 15 above. In the present example, the calculator 1206 comprises client data entered for age 45, "Male," and "Preferred" rating for the primary client (Life 1), and age 40, "Female," and "Preferred Plus" rating for the spouse. Calculator 1206 can have multiple display options under Chart 1197 field. In this example, a user has opted to display Show Older 1205, Show Younger 1207, Show 1st to Die 1209, Show 2nd to Die and Show Details 2119 by checking button options. Thus information for Life 1 1212, Life 2, 1213, 1st to Die 1215 and 2nd to Die 1215 is displayed on graph 1208. Additionally, a summary Age at 50% Probability of Death 2101 displays the calculated 50% probability of death for Life 1 Single Age 2102, Life 2 Single Age 2104, and calculates the age difference between the two as Age Spread 2106. The summary 2101 also displays the calculated 50% probability of death for First to Die (older) Age 2108, Second to Die (older) Age 2110, and calculates the age difference between the two as Age spread 2112. The summary 2101 also displays the calculated 50% probability of death for First to Die (younger) Age 2114, Second to Die (younger) Age 2116, and calculates the age difference between the two as Age spread 2118. Understanding the probability of death may be important for a user when considering estate taxes, protection solutions, transfer costs, etc.

Figure 22:
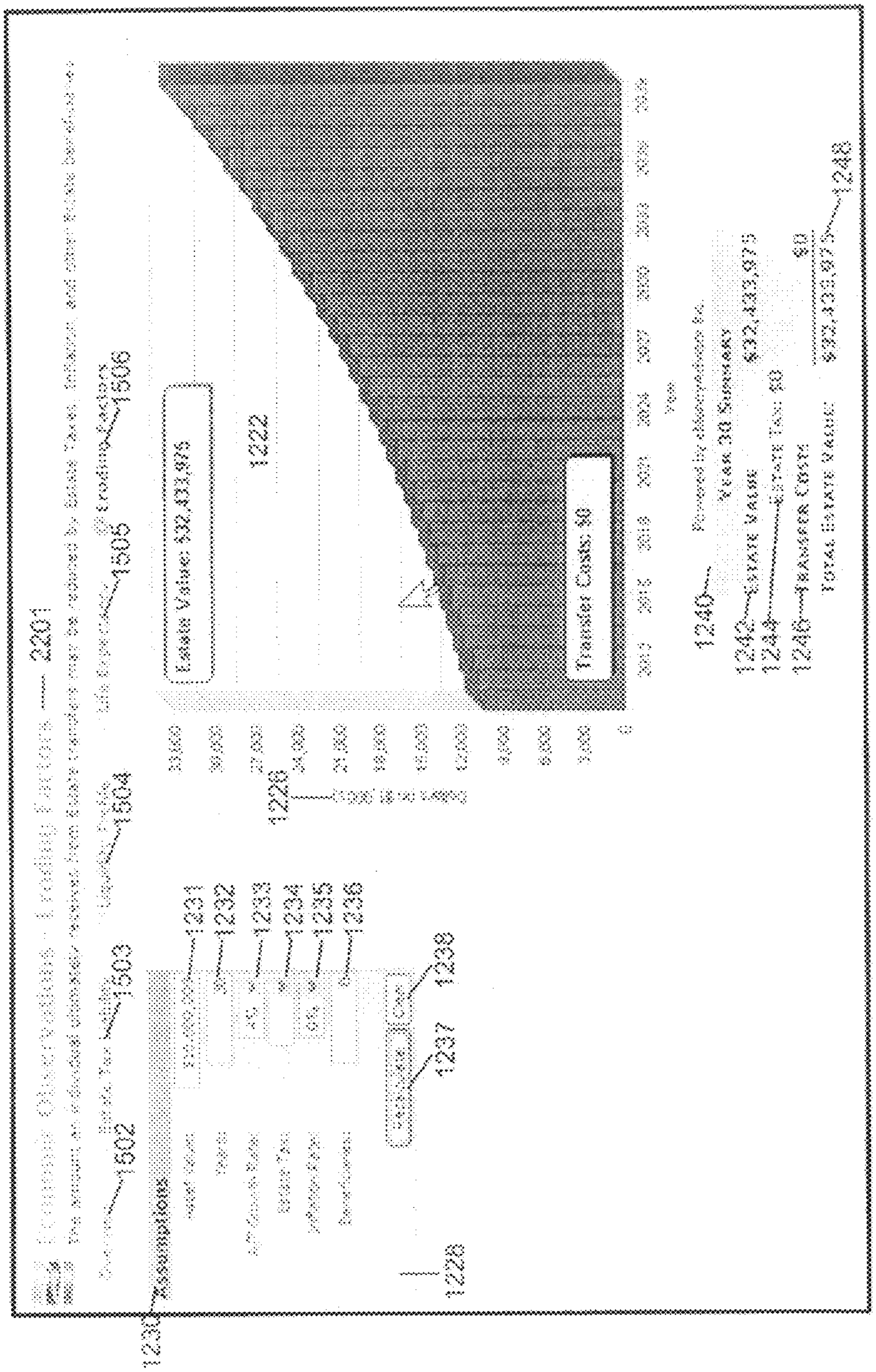

FIG. 22 illustrates an example of a user interface 2201 that can be presented to a user when the user chooses Eroding Factors link 1165 from the menu displayed across the page under Economic Observation as discussed in FIGS. 11 and 12 above. The Eroding Factors user interface 2201 can provide graphical representation 1222 of the client's estate value after being reduced by a variety of eroding assumptions 1230 plotted over time. An estate's value is affected by many factors that can reduce the overall value of the estate at the time of transfer to a beneficiary. For instance, an estate may be affected by estate taxes, inflation, and other estate beneficiaries. In one embodiment, graphical representation 1222 is a bar graph with time in years 1224 along the X-axis, and the estimated value in dollars along the Y-axis 1226. In this embodiment, graph 1222 represents the estate after eroding factors have been subtracted for a time period of 30 years. Alternately, graph 1222 can represent the estate after eroding factors have been subtracted for single or multiple years as set by the years field 1232.

The graphical representation of the client's estate value at the time of transfer to a beneficiary can be calculated by a variety of user input data per assumptions 1230. For example, the Eroding Factors user interface 2201 can comprise calculator 1228 that can account for various estate data options. These factors can include the present Asset Value 1231, the number of Years to calculate 1232, A/T Growth Rate 1233, predicted Estate Tax 1234, Inflation Rate 1235, and the number of Beneficiaries 1236 of the estate. Calculator 1228 can have a Recalculate button 1237 in order to recalculate and graph the estate value graphs based off of changing information by the client's estate as time progresses. Calculator 1228 can also have a Clear button 1238 in order to clear or delete all or part of previously input data in order to change information by the client if an error has been made or the assumptions have changes with time. Calculator 1228 can have user input interfaces via typed responses, drop down menus, check boxes, etc., or other options known in the art. The Eroding Factors 1165 user interface can provide summary 1240 of the client's estate value after being reduced by a variety of eroding factors plotted overtime. Summary 1240 can provide a total estate value 1242 after subtracting estate taxes 1244, and transfer costs 1246.

Figure 23:
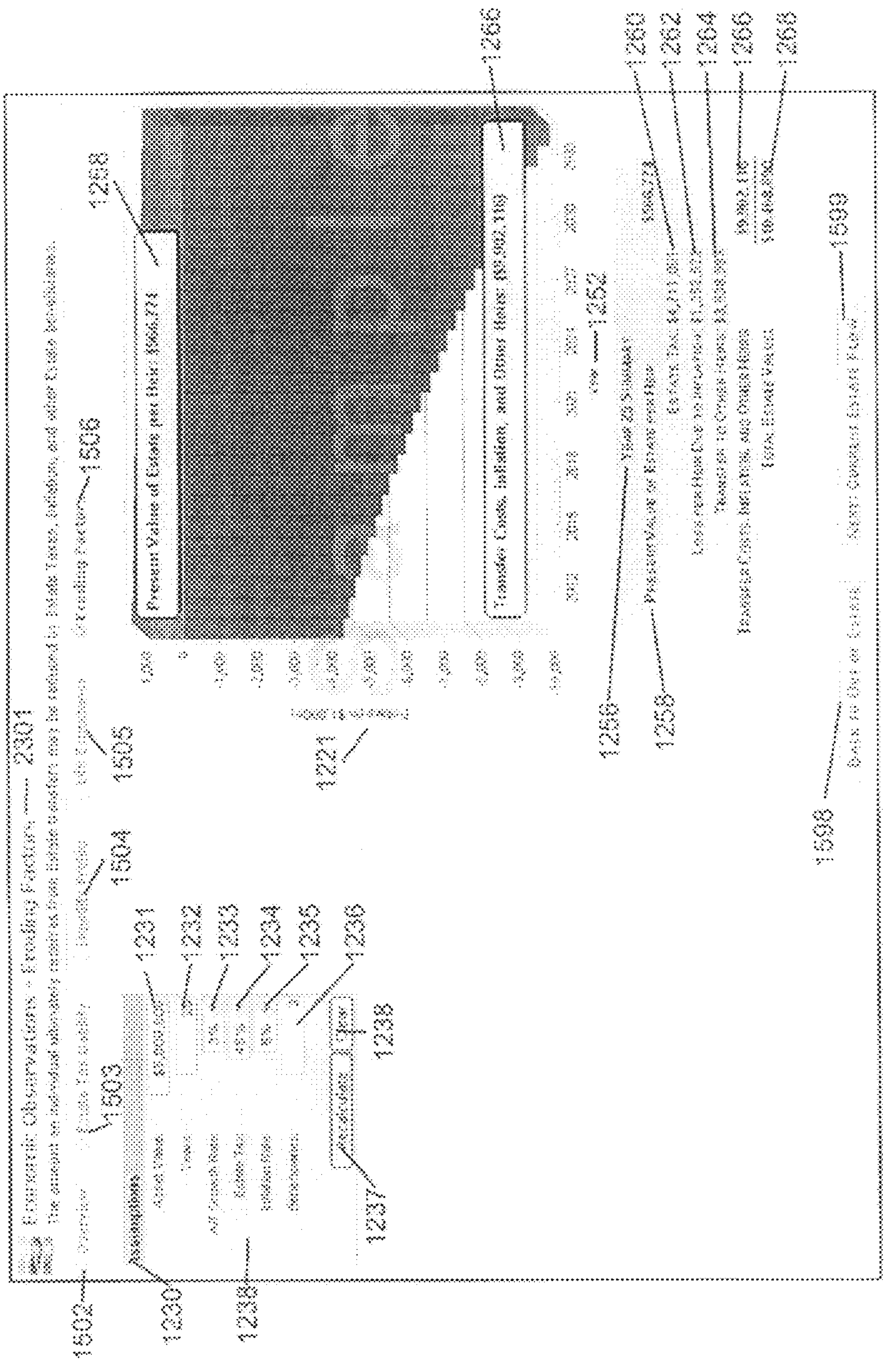

FIG. 23 illustrates the Eroding Factors 1506 user interface 2301 for the Present Value of the Estate per Heir when there are multiple beneficiaries and there is no estate tax calculated (as similarly seen in FIG. 22). In this example, calculator 1228 comprises estate data for Asset Value today 1231 as $5,000,000, the number of years to calculate 1232 as 25, an A/T Growth Rate 1233 of 3%, a predicted estate tax 1234 as 45%, the inflation rate 1235 as 5%, and the number of beneficiaries 1236 for the estate as 3. As can be seen from graphical representation 1250 the present value of estate per heir 1258 is $2,449,767. Summary 1256 provides the total present value per heir 1258 after subtracting estate taxes 1260, loss per heir due to inflation 1262, the amount transferred to other heirs 1264, and totaling those losses independently as Transfer Costs, Inflation, and Other Heirs 1266 to produce a total estate value 1268 of $10,468,890. Total estate value 1268 may represent the legacy value of the client's estate.

Figure 24:
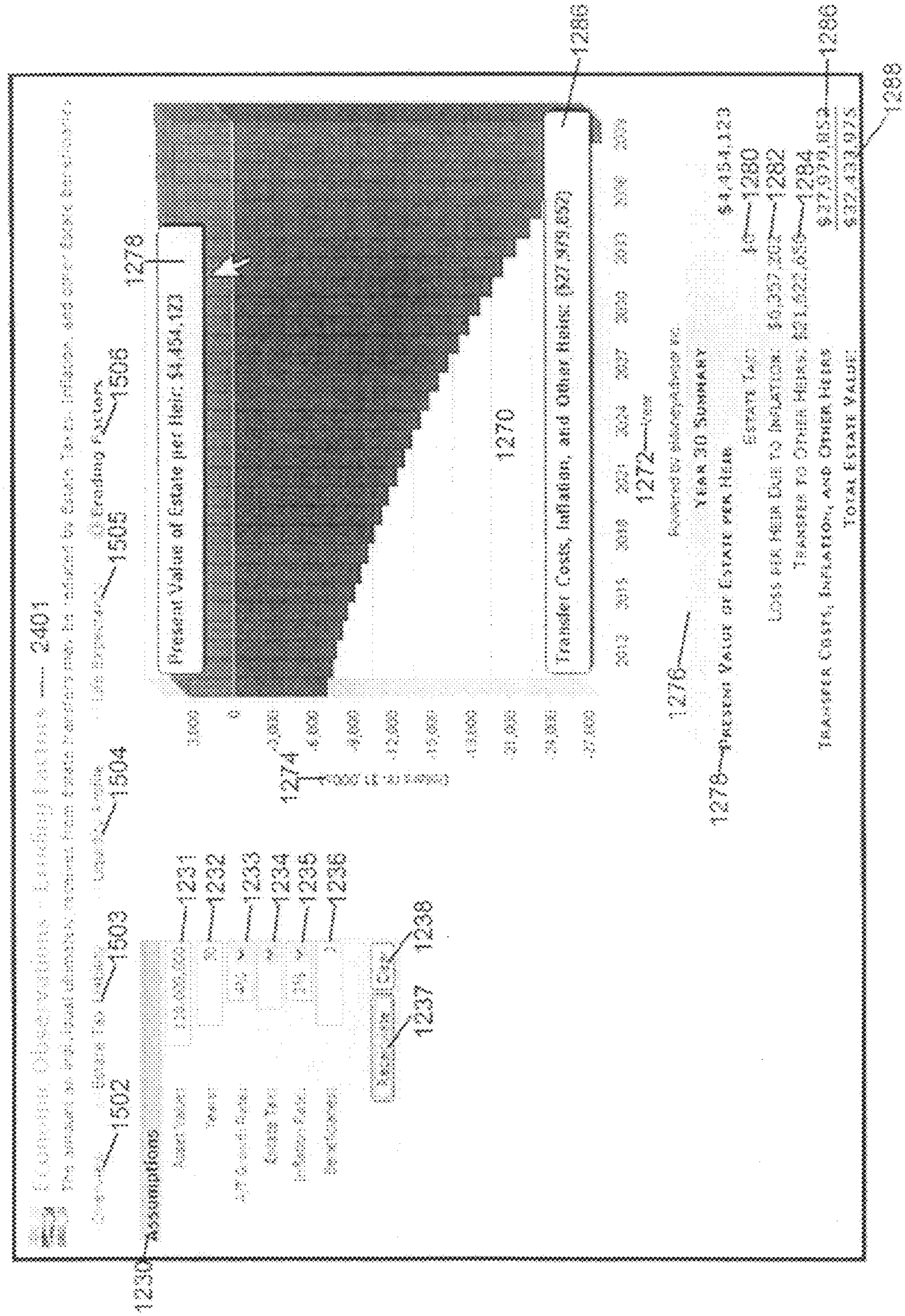
Figure 25:
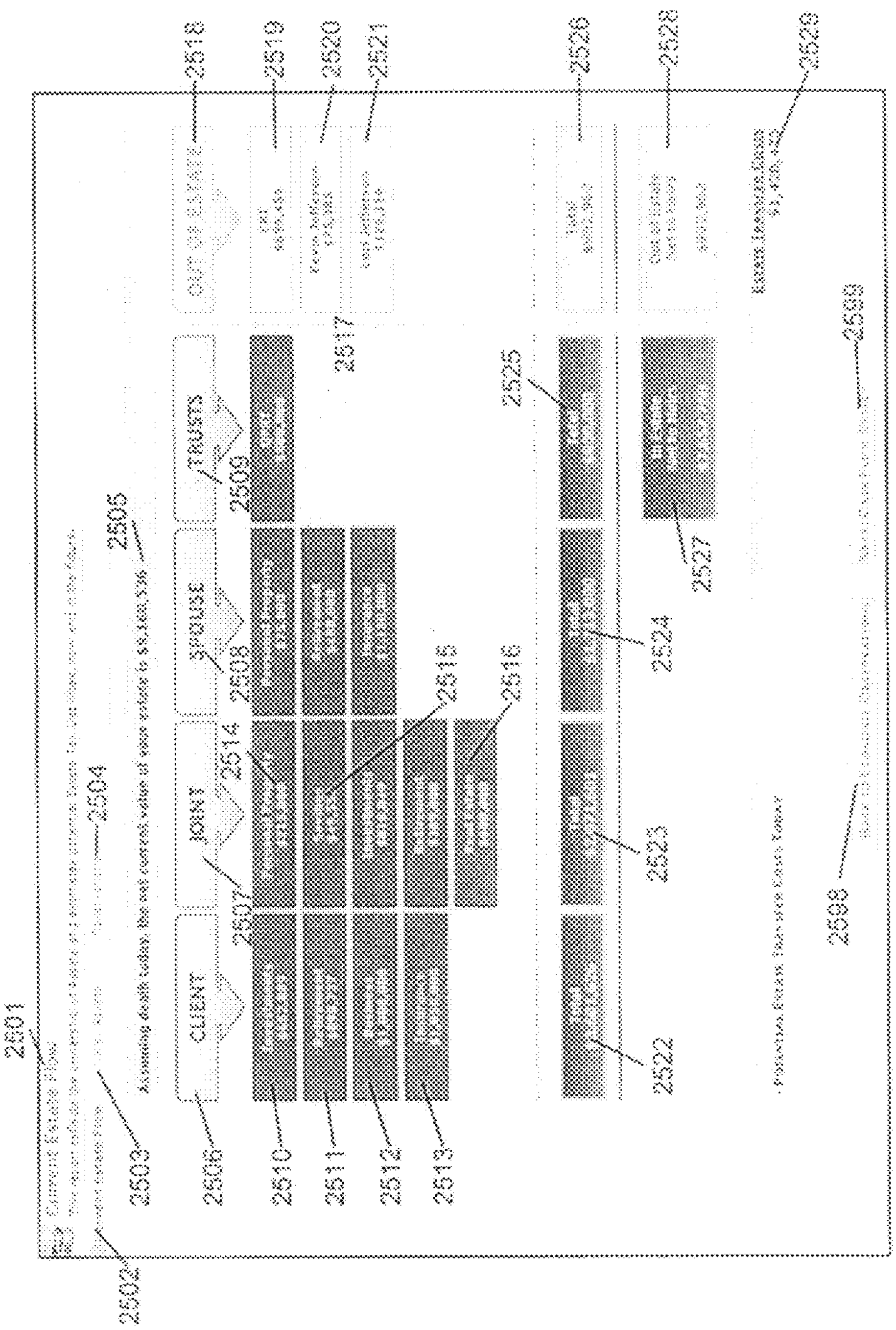

FIG. 24 illustrates the Eroding Factors 1506 user interface 2401 for the Present Value of the Estate per Heir when there are multiple beneficiaries and there is no estate tax calculated. Essentially, this user interface tells the client how much each beneficiary will receive after the estate has subtracted losses to inflation and other heirs. In this example, calculator 1228 comprises estate data options for Asset Value today 1231, the number of Years to calculate 1232, A/T Growth Rate 1233, predicted Estate Tax 1234 as not entered (i.e., zero), Inflation Rate 1235, and the number of Beneficiaries for the estate as 3. As can be seen from graphical representation 1270 representing time in years 1272 along the X-axis, and the estimated value loss in dollars along the Y-axis 1274, and summary there is much greater present value of estate per heir at $4,454,123. Compared to the value presented in FIG. 16 at $2,449,767. This difference is shown again in summary 1276. Summary 1276 provides the total present value per heir 1278 (the black area above the $0 line in the graph) after subtracting estate taxes 1280, loss per heir due to inflation 1282, the amount transferred to other heirs 1284, and totaling those losses independently as Transfer Costs, Inflation, and Other Heirs 1286 to produce a total estate value 1288 (the black area under the $0 line in the graph). So solving the estate tax scenario can lead to almost $2,000,000 more per heir.

Current Estate Flow

FIG. 25 demonstrates an example of a Current Estate Flow 2501 user interface that reflects the ownership of assets and estimates the potential estate tax liabilities. The Current Estate Flow 2501 user interface includes a menu displaying a Current Estate Flow link 2502 (shown as currently selected), a Key Assets link 2503, and an Observations link 2504. When a user chooses Current Estate Flow link 2502, the interface illustrates the summary section of a client's net current value of the estate 2505, the total in estate net to heirs 2527, the out of estate net to heirs 2528 and the estimated estate transfer costs 2529. In this example the client's assets are broken down by in estate assets assigned to the client 2506, those assigned to jointly between the client and a spouse 2507, those assigned solely to a spouse 2508, and those assigned to any trusts 2509. The client's net value is broken down by out of estate assets 2518. The types of assets assigned in this example include those for Investments 2510, Retirement 2511, Businesses 2512, Insurance 2513, Personal Property 2514, Savings 2515, Real Estate 2516, QPRTs 2517, CRTs 2519, and to any Heirs 2520, 2521. The total assets assigned to the client 2522, jointly to the client and a spouse 2523, solely to a spouse 2524, trusts 2525 and all out of estate 2526 may be provided.

Figure 26:
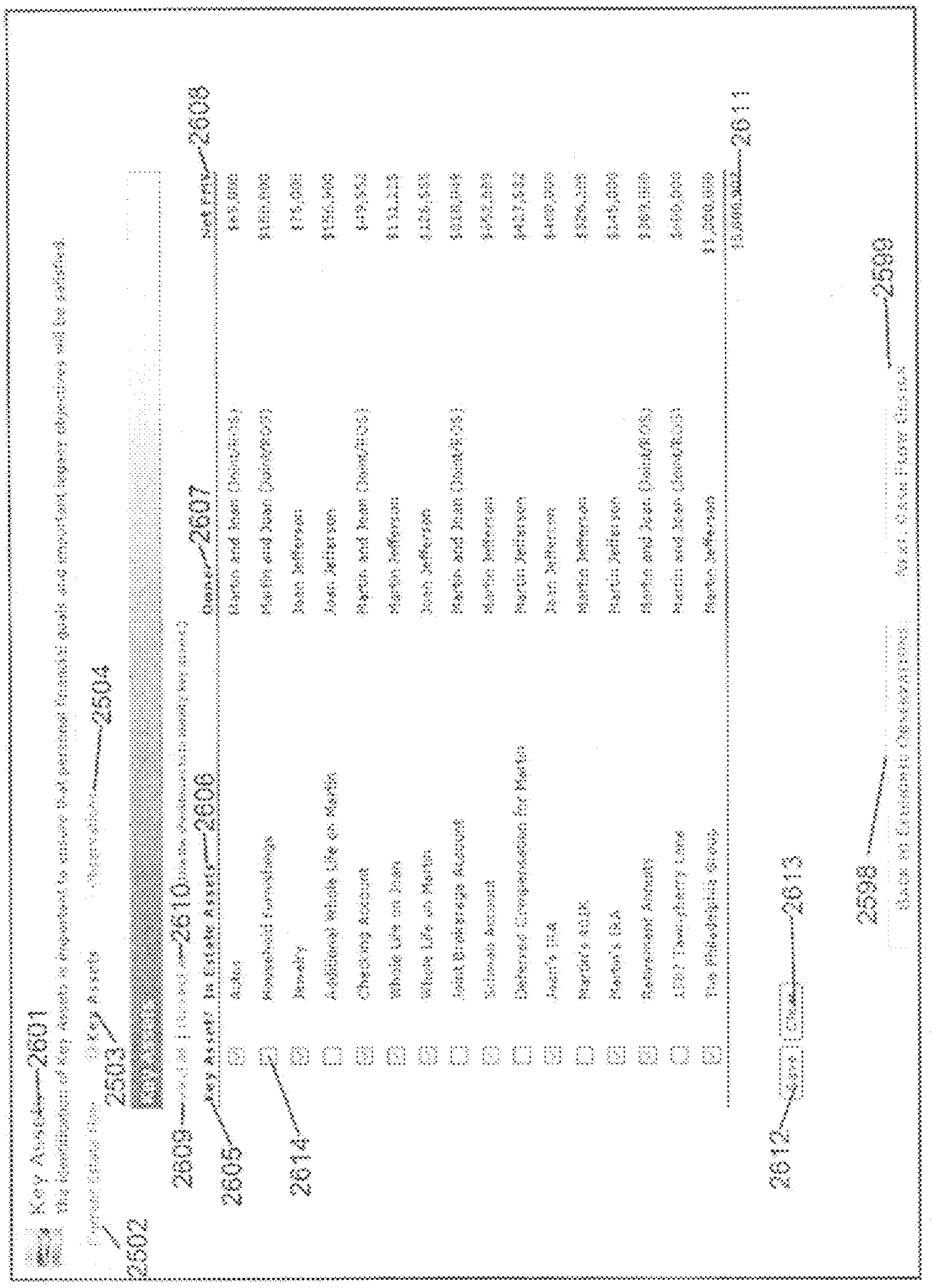

FIG. 26 illustrates an example of a Current Estate Flow—Key Assets user interface 2601 that allows a user to determine which assets are key assets in the estate. A Key Assets User interface 2601 includes a menu which displays a Current Estate Flow link 2502, a Key Assets link 2503 (shown as currently selected), and an Observations link 2504. When a user chooses Key Assets link 2503, the interface shows a table 2602 listing In Estate Assets. Table 2602 may provide columns for the designation of Key Assets 2605 via optional check boxes 2614, In Estate Assets 2606, Owner 2607 and Net FMV 2608. Table 2602 also may provide an optional Select All 2609 and Unselect All 2610 links which allow a user to either select all boxes or unselect all boxes in Key Assets column 2605 with a single command. Table 2602 may also provide a Total 2611 for Net FMV column 2608. Finally, Table 2602 provides a Save 2612 and a Clear 2613 button in order to allow a user to easily save and make changes to table 2602.

Figure 27:
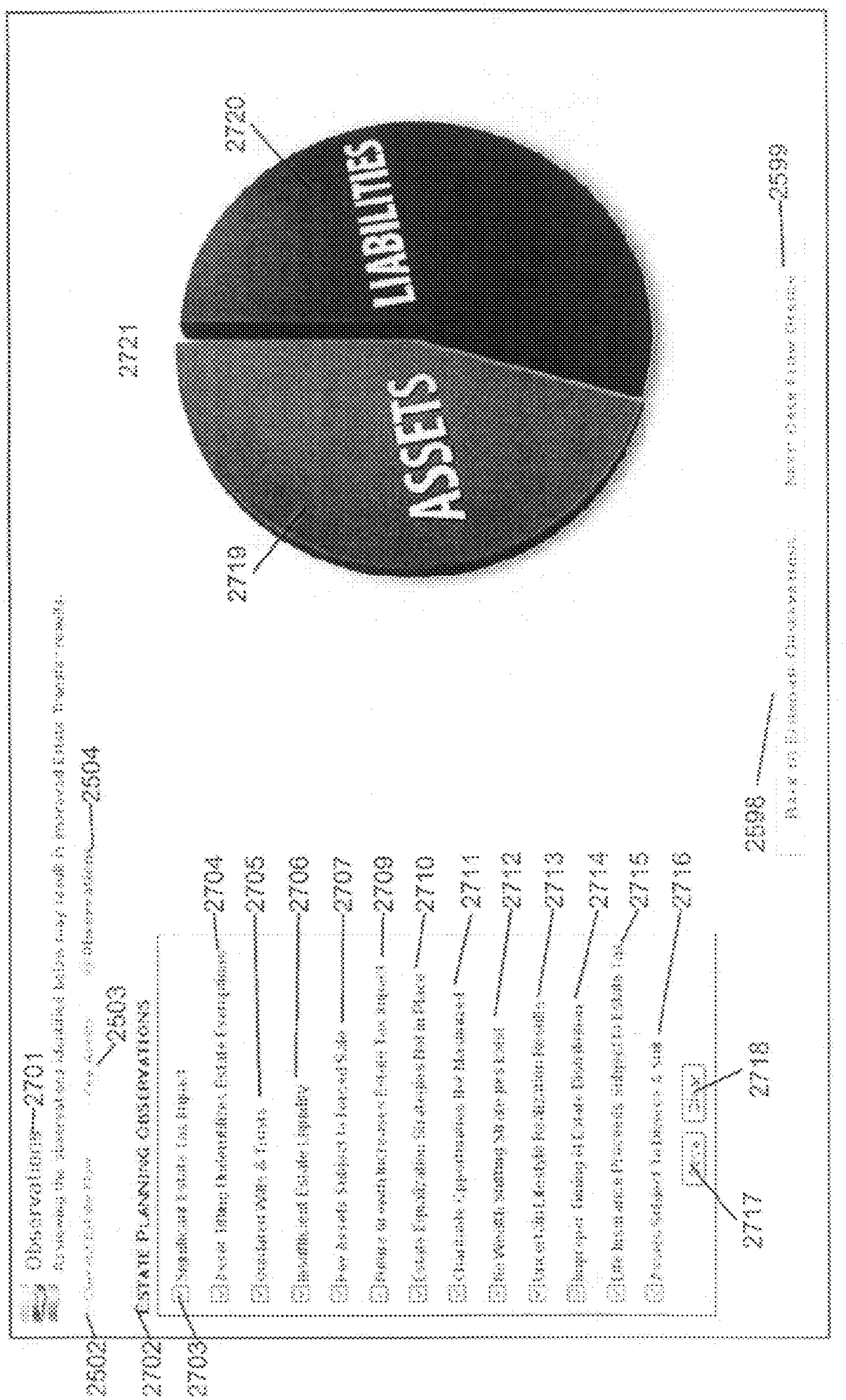

FIG. 27 demonstrates an example of a Current Estate Flow—Observations user interface 2701 that allows a user to review different estate planning observations in order to improve Estate transfer results. Current Estate Flow—Observations user interface 2701 includes a menu which displays a Current Estate Flow link 2502, a Key Assets link 2503, and an Observations link 2504 (shown as currently selected). When a user chooses Current Estate Flow—Observations link 2504, the interface illustrates an Estate Planning Observations Table 2702 listing various line items that can be selected via check boxes. For example, Table 2702 can have line items for Significant Estate Tax Impact 2703, Asset Titling Underutilizes Estate Exemptions 2704, Outdated Wills & Trusts 2705, Insufficient Estate Liquidity 2706, Key Assets Subject to Forced Sale 2707, Future Growth Increases Estate tax Impact 2709, Estate Equalization Strategies Not In Place 2710, Charitable Opportunities Not Maximized 2711, No Wealth Shifting Strategies Exist 2712, Uncertain Lifestyle Realization Results 2713, Improper Timing of Estate Distributions 2714, Life Insurance Proceeds Subject to Estate Tax 2715, and Assets Subject to Divorce & Suit 2715. Additionally, Table 2702 provides a Save 2717 and a Clear 2718 button in order to allow a user to easily save and make changes to Table 2702. When a user selects any or all of the various line items via the available check boxes, a graphical representation 2721 for the Current Estate assets 2719 versus liabilities 2720 is displayed. The graphical representation can be a pie chart. The Current Estate assets 2719 and liabilities 2720 will change depending upon which observations are checked in Table 2702. This allows a user to visualize how that or those observations affect the estate.

LifeStyle Realization

Figure 28:
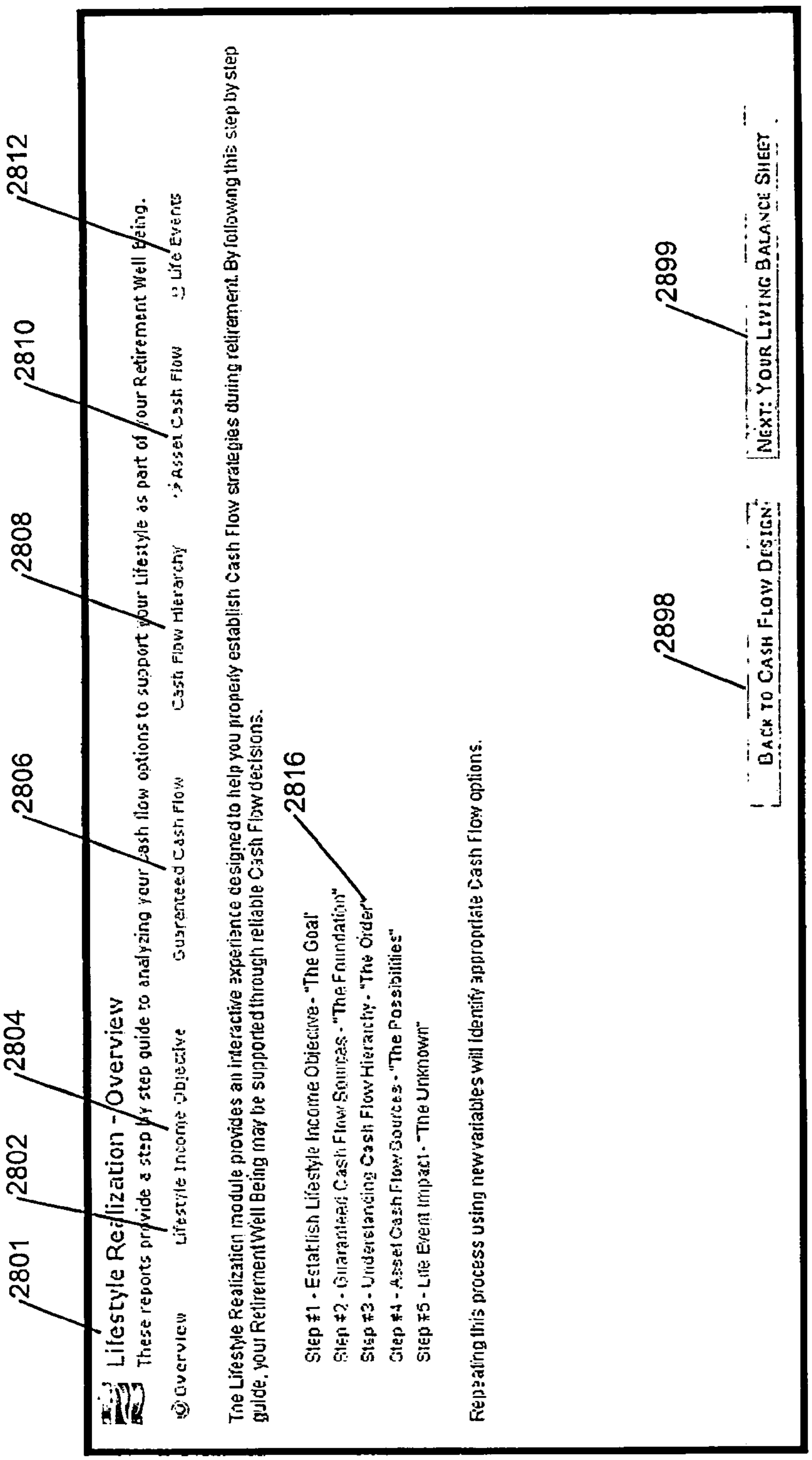

FIG. 28 illustrates an example of a Lifestyle Realization overview user interface 2801 that provides an overview of the interactive experience designed to held a user establish cash flow strategies for retirement. The Lifestyle Realization Overview 2801 user interface includes a menu which displays an Overview link 2802 (shown as currently selected), a Lifestyle Income Objective link 2804, a Guaranteed Cash Flow link 2806, a Cash Flow Hierarchy Link 2808, an Asset Cash Flow link 2810, and a Life Events link 2512. When a user chooses Overview link 2802, the interface illustrates a summary of the steps 2816 involved that will identify appropriate cash flow options for the user. For example, there may be 1, 2, 3, 4, 5, 10 or more steps, without limitation. For the purposes of this example, there are 5 steps, including Step 1—Establish Lifestyle Income Objective; Step 2—Guaranteed Cash Flow Sources; Step 3—Understanding Cash Flow Hierarchy; Step 4 Asset Cash Flow Sources; and Step 5—Life Event Impact. A graphical representation 2818 may represent Dollars (in 1000s) in the Y-axis 2820, and years in the X-axis 2822. The graph may represent actual values uploaded by the user.

Figure 29:
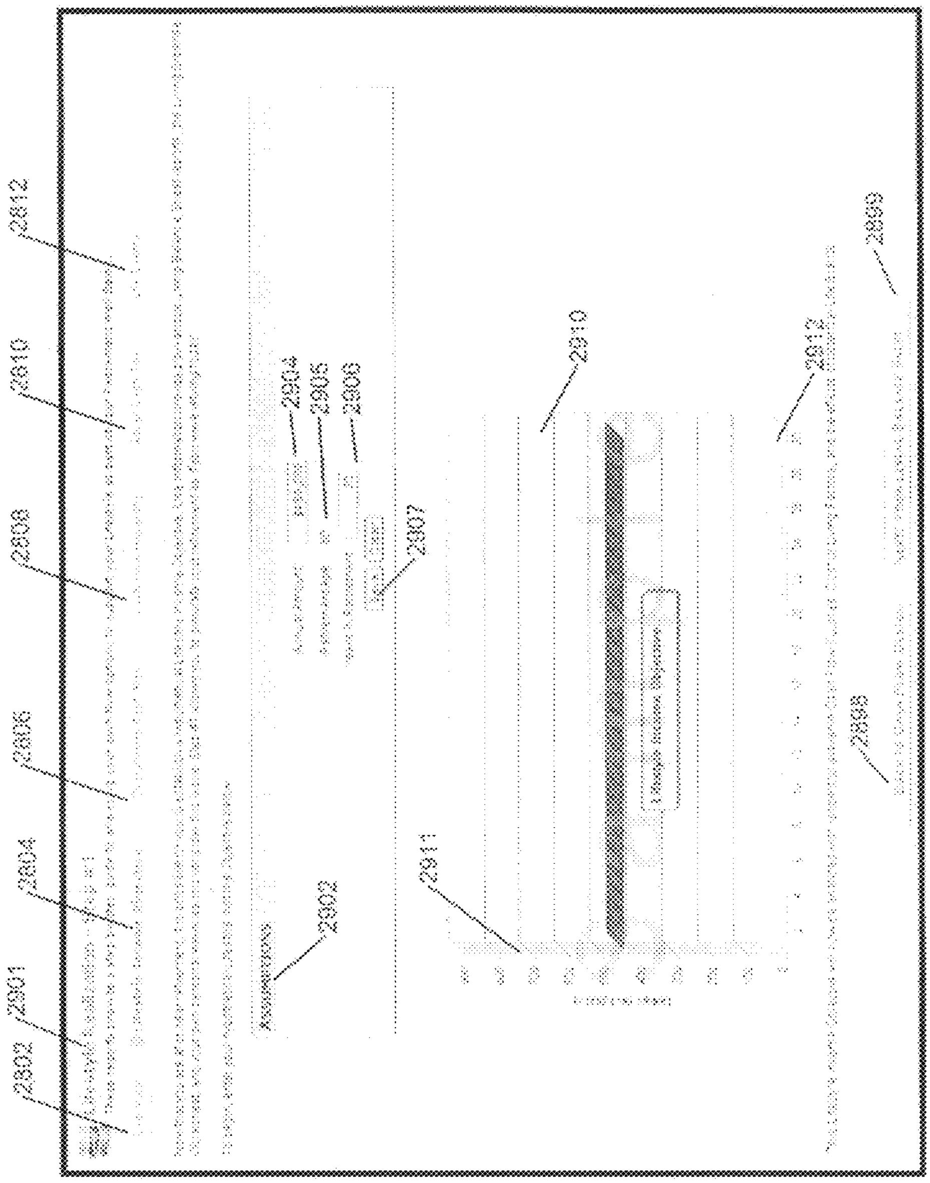

FIG. 29 illustrates an example of a Lifestyle Realization Step 1 user interface 2901 that provides data entry fields when Lifestyle Income Objective link 2804 is selected (see FIG. 28). The Lifestyle Realization Step 1 2901 user interface includes an assumptions section 2902 which can include data entry fields for Annual Amount 2904, Retirement Age 2905, And Years in Retirement 2906. Assumptions sections 2902 can include Save 2907 and Clear 2908 buttons in order to allow a user to easily retain or change data points. A Lifestyle Income Objective graph 2910 may represent Dollars (in 1000*s*) in the Y-axis 2911, and years in the X-axis 2912 that the user believes is necessary to live in their retirement according to their wishes. The graph may represent actual values uploaded by the user. In the current example, a user believes that they will require $450,000 annually in order to live comfortably during their retirement.

Figure 30:
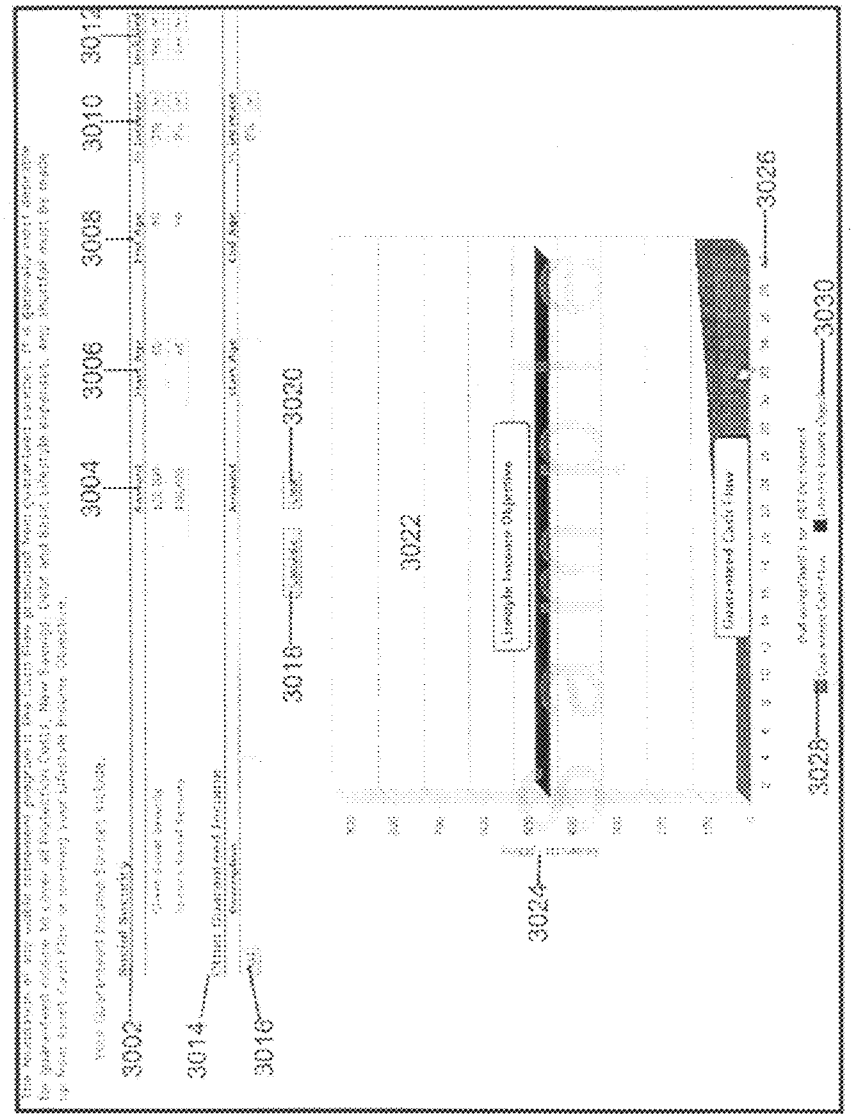

FIG. 30 illustrates how Life Style Realization models can be given to the client in order to ensure that the client can live in their retirement according to their desires. A client who wants to live on $450,000 a year, but only has $44,000 in guaranteed income can pictorially see the difference, and can make the necessary adjustments. Table 3001 allows the user to input sources of Guaranteed Income. For example, Table 3001 can have Amount Column Header 3004, Start Receiving Income Age Column Header 3006, End Receiving Income Age Column Header 3008, % Increase Column Header 3010, Included Column Header 3012. Rows can be sources of guaranteed income including Social Security 3002, or Other Guaranteed Income 3014. Table 3001 can have an Add button for Other Guaranteed Income 3016, as well as a Calculate Button 3018 and Clear Button 3020. A user can recalculate user input data when a user presses a Calculate button 3018, and can Clear the data using a Clear button 3020 so that a user can readily adjust the data when warranted. Table 3001 can be depicted as a Graph of Predicted Cash Flow from Guaranteed Income Source 3022, wherein the Y-axis 3024 is Dollars and X-axis 3026 is in Years. Graph 3022 shows how Guaranteed Cash Flow 3028 compared with a user's Life Style Income Objective 3030.

Figure 31:
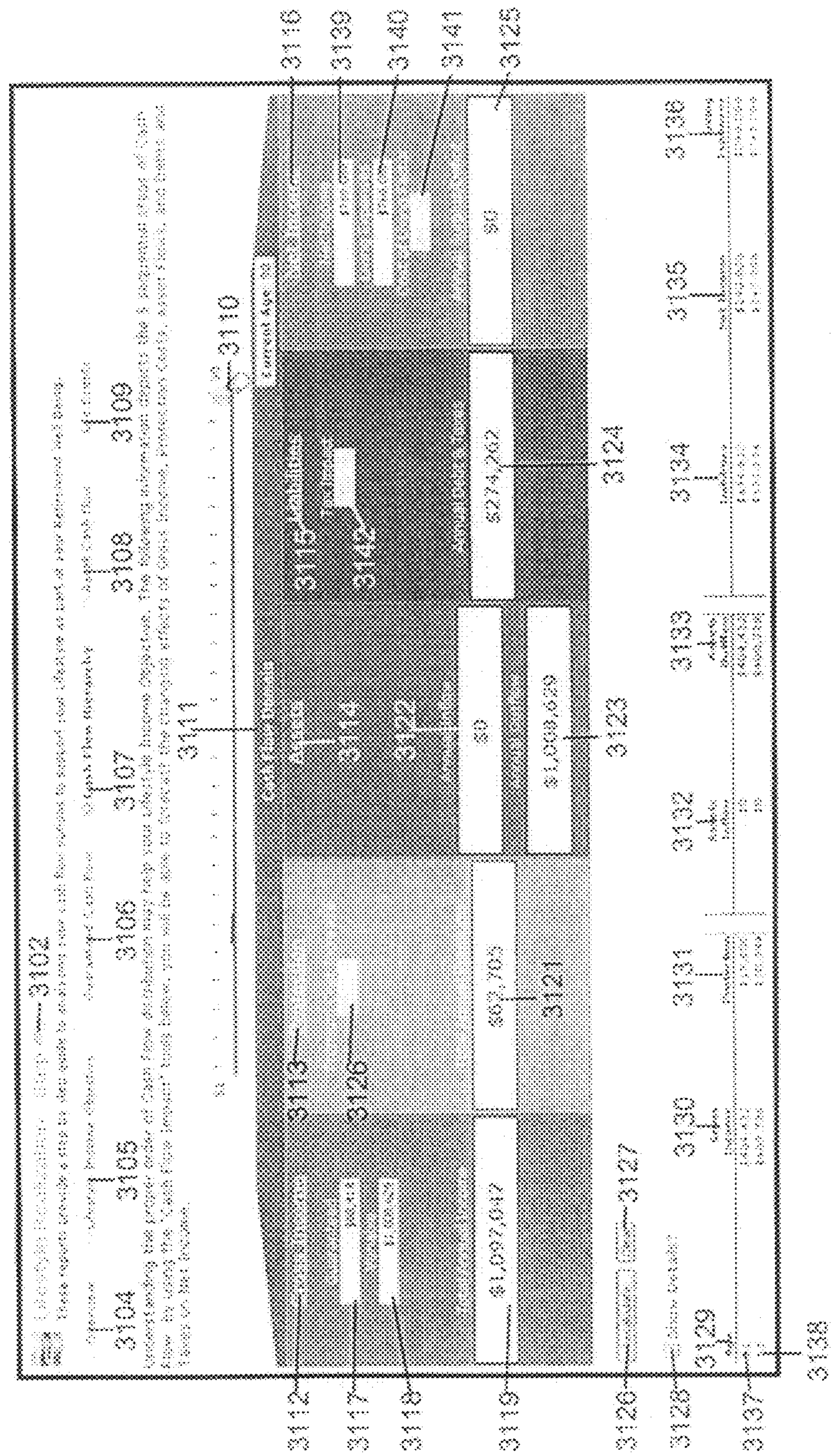

FIG. 31 illustrates a rolling model of how inflationary pressures can affect the income and expenses necessary to maintain the life style desired by the client. For this example, a Lifestyle Realization user interface 3101 presents a header Lifestyle Realization 3102. The Lifestyle user interface 3101 can have a menu across the top of the page comprising a variety of tabs, including Overview link 3104, Lifestyle Income Objective 3105, Guaranteed Cash Flow link 3106, Cash Flow Hierarchy link 3107 (shown as currently selected), Asset Cash Flow link 3108, and Life Events link 3109. A sliding bar 3110 can adjust the Annual Outflow of cash depending upon the number of years from Retirement. Thus, in this example, sliding bar 3110 is set to age 90, or 40 years from the date of retirement. Lifestyle Realization user interface 3101 presents Cash Flow Domain 3111 which calculates cash flow according to Gross Income 3112, Protection 3113, Assets 3114, Liabilities 3115 and Net Income 3116. The user can input information regarding gross income into a Guaranteed field 3117 or a variable field 3118, and the total annual guaranteed income is displayed 3119. The user can adjust insurance protection premium costs in field 3120, and the total annual cost of insurance premiums is displayed in field 3121. The user can determine the annual inflow of cash from assets in field 3122. The use can adjust the estimated tax impact on the estate in field 3142, and that annual debt and taxes liability is displayed in field 3124. The user can adjust the net income in Net Income field 3139, the cost of living expenses in Living expenses field 3140, and may even adjust for the cost of living factor (e.g., inflation) in field 3141. The total Net Income, e.g., the Annual Surplus/Deficit can be displayed in field 3125. The Cash Flow Domain 3111 can recalculate user input data when a user presses a Recalculate button 3126, and can clear the data using a Clear button 3127, so that a user can readily adjust the data when warranted.

Further the Life Style Realization user interface 3101, cash flow hierarchy can optionally display all of the individual data that is used to calculate the annual outflow if the user chooses, by selecting a Show Details box 3128. If Show Details box 3128 is selected, the data displayed may include columns for age of the client and/or spouse 3129, a column for Gross Income 3130, a column for Protection 3131, a column for Asset Inflow 3132, a column for Asset Outflow, a column for liabilities 3134, a column for Net Income 3135 and a column for Living Expenses 3136. The end result cumulates in the Annual Outflow of cash necessary to realize the client's lifestyle in field 3123. In this scenario, by age 90, a client needs over a $1 million in order to maintain today's life style of $450,000.

Figure 32:
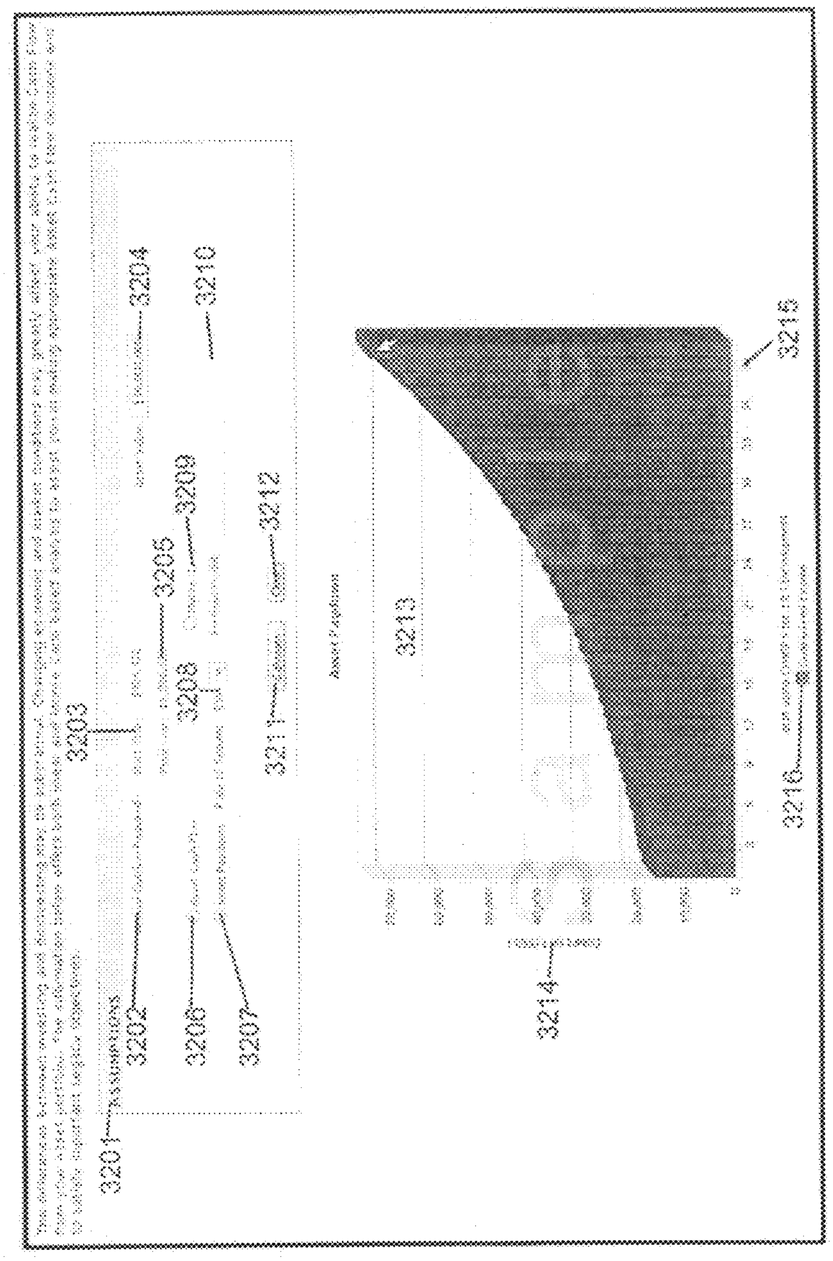

FIG. 32 illustrates how, when starting with $16 million in assets, those assets will be able to generate $1 million annually in order to maintain a life style of $450,000. Thus the client can make on-going gifting to lower the tax burden on the estate without leaving the client without assets and adequate cash flow. For example, an Asset Cash Flow Calculator 3201 can include information relating to Annual Outflow Required 3202, which considers the amount of Cash Outflow 3203 for the starting year, the estate's starting assets 3204, and an estimation of the Final Year Cash Outflow 3205. The Asset Cash Flow Calculator 3201 can further include Asset Cash Flow field 3206 which allows a user to choose linear analysis over time. If a user chooses linear analysis, the user can further choose Asset Paydown field 3207, and can input a percentage into a Rate of Return field 3208. The Asset Cash Flow Calculator 3201 can further include Monte Carlo field 3209 which allows a user to choose Monte Carlo-based analysis over time. If a user chooses Monte Carlo field 3208, the user can further choose Portfolio Model field 3210. Further, the Asset Cash Flow Calculator 3201 can include a Calculate button 3211 and a Clear button 3212 in order to allow the user to adjust the Asset Cash Flow Calculator 3201 as necessary. In this example, a user has the starting year Cash Flow to be $404,432, with the total assets to be $16,000,000, and the estimate end year Cash Flow to be $1,008,629. The user has also chosen asset paydown analysis with an expected rate of return to be 6%. A graphical representation of the Asset Cash Flow allows the user to visualize the asset paydown necessary over time. Graph 3213 represents dollars in thousands along the Y-axis 3214, and guaranteed income 3216 along the X-axis 3215.

Figure 33:
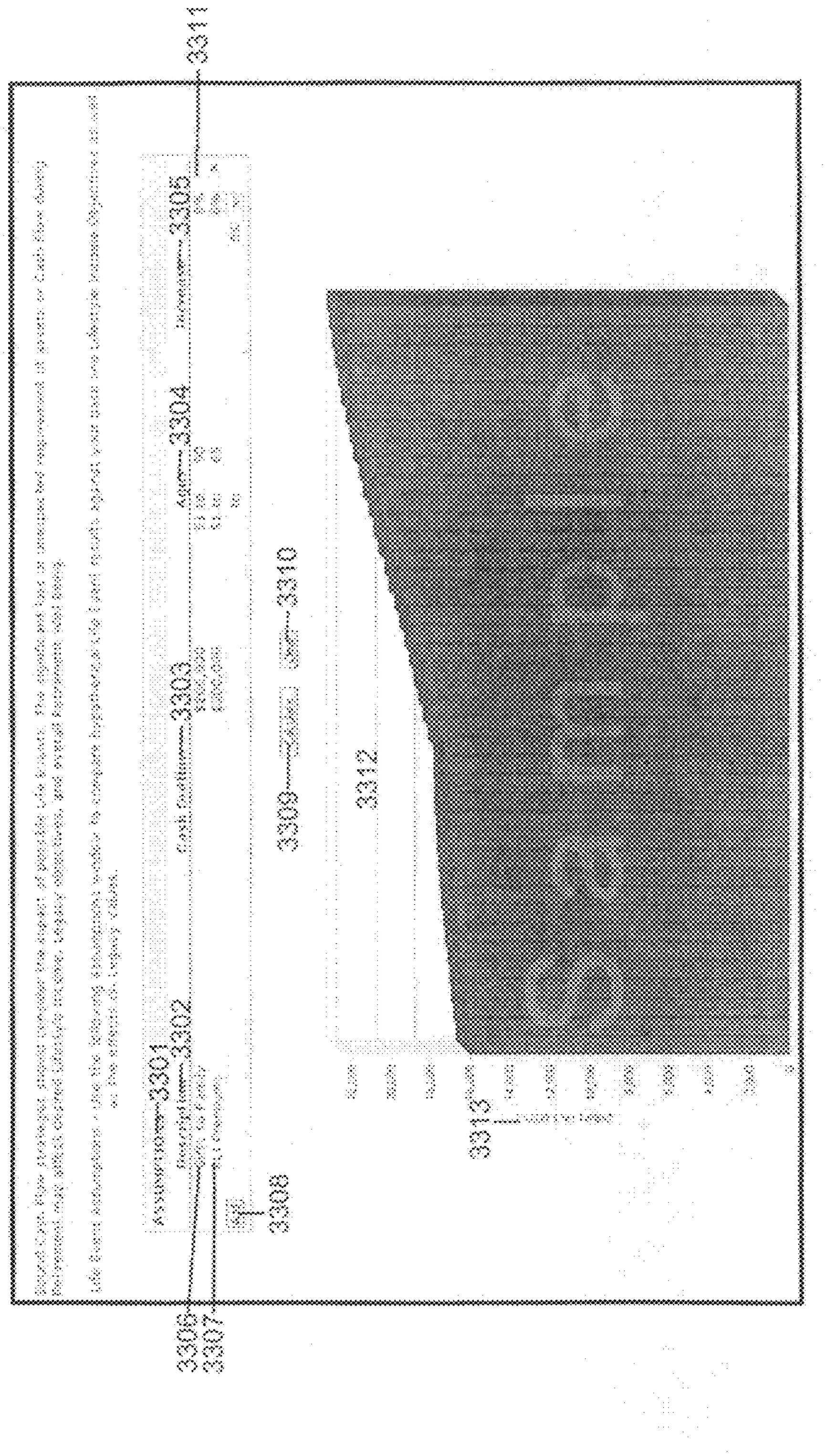

FIG. 33 illustrates that gifting out portions of the client's estate can distribute the wealth, by gifting and/or buying life insurance, and still maintain the desired life style and lower the estate's the tax burden. An appropriate life insurance policy can assist in lowering the tax burden and provide a net gain. When there is no key asset, i.e., a business to be passed down through the generations, there is no hierarchical difference in the asset distribution. For example, a Life Event Assumptions Calculator 3301 can include a column for a description of the Life Event 3302, a column for Cash Outflow 3303, a column for ages 3304, and a column for Increase 3305. The Life Event Assumptions Calculator 3301 can further include "X" fields 3311 which allow a user to clear or delete the fields in any one row, and an Add button 3308 which allows a user to add in additional Life Events to the Assumption calculator 3301. Further, the Life Events Calculator 3301 can include a Calculate button 3309 and a Clear button 3310 in order to allow the user to adjust the Life Events Assumption Calculator 3301 as necessary. In this Example, a user has included the costs of Gifts to Family 3306 worth $200,000 from ages 51 to 90, and also has included the costs of PLI premiums worth $200,000 from ages 51 to 65. A graphical representation of the Cash Flow based upon Life Events allows the user to visualize the assets value over time in light of Life Events Assumptions. Graph 3312 represents dollars (in thousands) along the Y-axis 3313, and guaranteed income (not shown) along the X-axis 3314.

Your Living Balance Sheet

Figure 34:
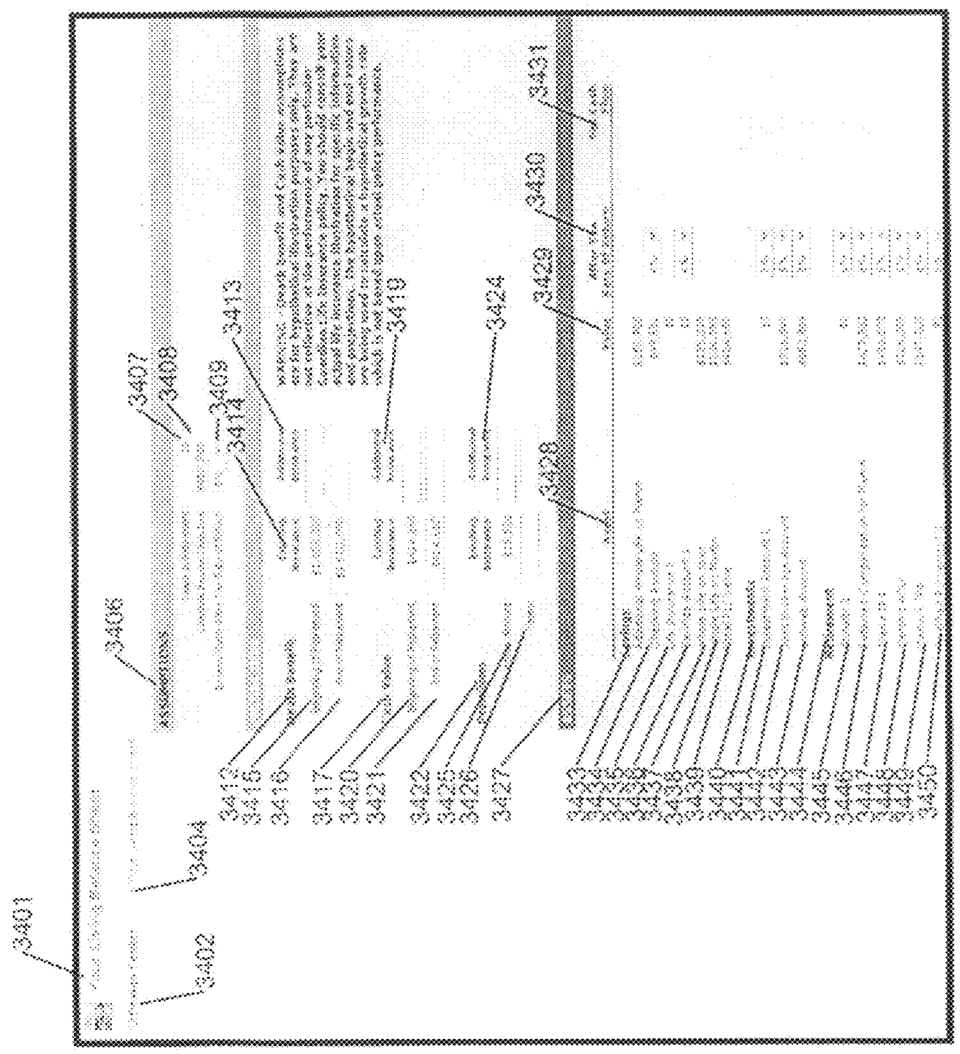
Figure 35:
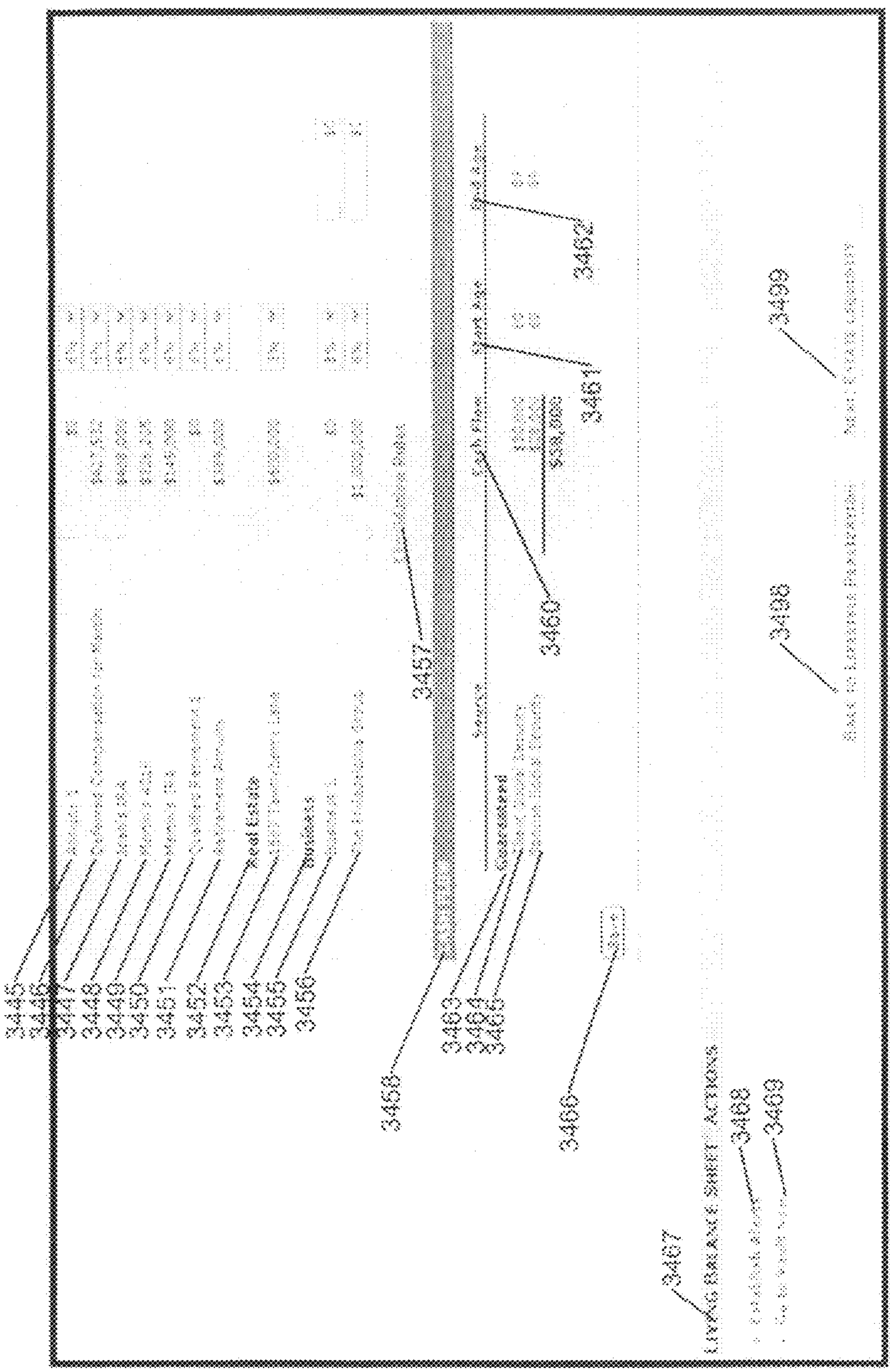

FIGS. 34 and 35 illustrate a Your Living Balance Sheet Design Center user interface 3401 when a user chooses Your Living Balance Sheet 1124 link (FIG. 11). Your Living Balance Sheet user interface 3401 can have Design Center link 3402 (shown as currently selected) and Your Living Balance Sheet link 3404. Design Center user interface 3401 may have several sections including an Assumptions section 3406, a Protection Section 3410, an Assets Section 3427, and a Cash Flow Section 3458 (shown in FIG. 35). Under Assumptions section 3406 data fields relating to Years in Retirement 3406, Lifestyle Income Objection 3408, and Excess Cash After Tax Rate Return 3409 may be viewed. These fields may be manipulatable by the user, or may represent data input in an earlier data gathering field (e.g., FIG. 29).

Protection section 3410 can be further divided into multiple sections, for example, a Death Benefit 3412 section, a Cash Value 3417 section, and a Premiums 3422 section.

Death Benefit 3412 section may provide data fields in columns for Existing Insurance 3413, and Additional Insurance 3414, and rows for Beginning of Retirement 3415, and End of retirement 3416. Cash Value 3417 section may provide data fields in columns for Existing Insurance 3418, and Additional Insurance 3419, and rows for Beginning of Retirement 3420, and End of Retirement 3421. Premium 3422 section may provide data fields in columns for Existing Insurance 3423, and Additional Insurance 3424, and rows for Premium Amount 3425, and Years 3426.

Assets section 3427 be further divided into multiple sections relating to different of asset types, for example, a Savings 3432 section, an Investments 3440 section, a Retirement 3422 section, a Real Estate sections 3452 (FIG. 35) and a Business section 3454 (FIG. 35). The Assets section 3427 may further be organized by columns relating to Assets 3428, Value 3429, After Tax Rate of Return 3430, and Net Cash Flow 3434. Each column may or may not be appropriate for every type of asset or asset section.

Savings 3432 section may provide data fields relating to any known personal checking or savings accounts, and life insurance policies. Investments 3440 section may provide data fields relating to any known investment accounts such as mutual funds, brokerage accounts, etc. Retirement 3444 section spans both FIGS. 34 and 35 may provide data fields for any known annuities, IRAs, 401K, Qualified Retirement plans, Thrift Savings Plans, etc.

Cash Flow section 3458 (FIG. 35) may provide data fields in columns for Source 3459 of the cash flow, Cash Flow 3460, Start Age 3461, and End Age 3462, and provide information relating to Guaranteed Income sources under a Guaranteed section 3463. A Save button 3464 allows a user to save any data entered into a field. Finally a Living Balance Sheet Actions section 3466 provides Establish Alerts 3468 links, and a Go to Vault link Now link 3469 in order to view review any documents uploaded for the client.

FIG. 36 illustrates an example of a Your Living Balance Sheet user interface 3601 when a user selects Your Living Balance Sheet link 3404 (FIG. 34). The Your Living Balance Sheet user interface 3601 may present a comprehensive overview of a user's current estate, including available Protection 3602, Assets 3604, Liabilities 3612, total Net Worth 3618, and Cash Flow 3619.

Protection section 3602 can provide the total value of life insurance protection in the Life Insurance field 3603. Assets section 3604 may present values reflecting Personal Property 3605, Savings 3606, Investments 3607, Retirement 3608, Real Estate 3609, Business 3610, and Total Assets 3611. Liabilities section 3612 may provide values reflecting Short Term Liabilities 3613, Taxes 3614, Mortgages 3615, Business Debt 3616, and Total Liabilities 3617. As mentioned above, the total Net Worth is reflected in field 3618. The estimated Cash Flow of the estate 3619 may be broken down into values representing Gross Income 3620, Protection 3621, Assets 3622, Liabilities 3623, and Net Income 3624.

A sliding bar 3625 represents the estate in years, and can be changed to reflect the estimated estate value at any year within the slider bar. A user can utilize the slider bar by clicking and dragging the bar and releasing the bar over a particular year. The numbers represented within the data fields may change according to what year is currently selected. The user can also select and/or press element Back to Lifestyle Realization button 3498 and/or Next: Estate Liquidity button 3499 to navigate via Workflow Wizard to interfaces for data gathering of personal data of the client, and/or for providing asset data for the client.

Estate Liquidity

Figure 37:
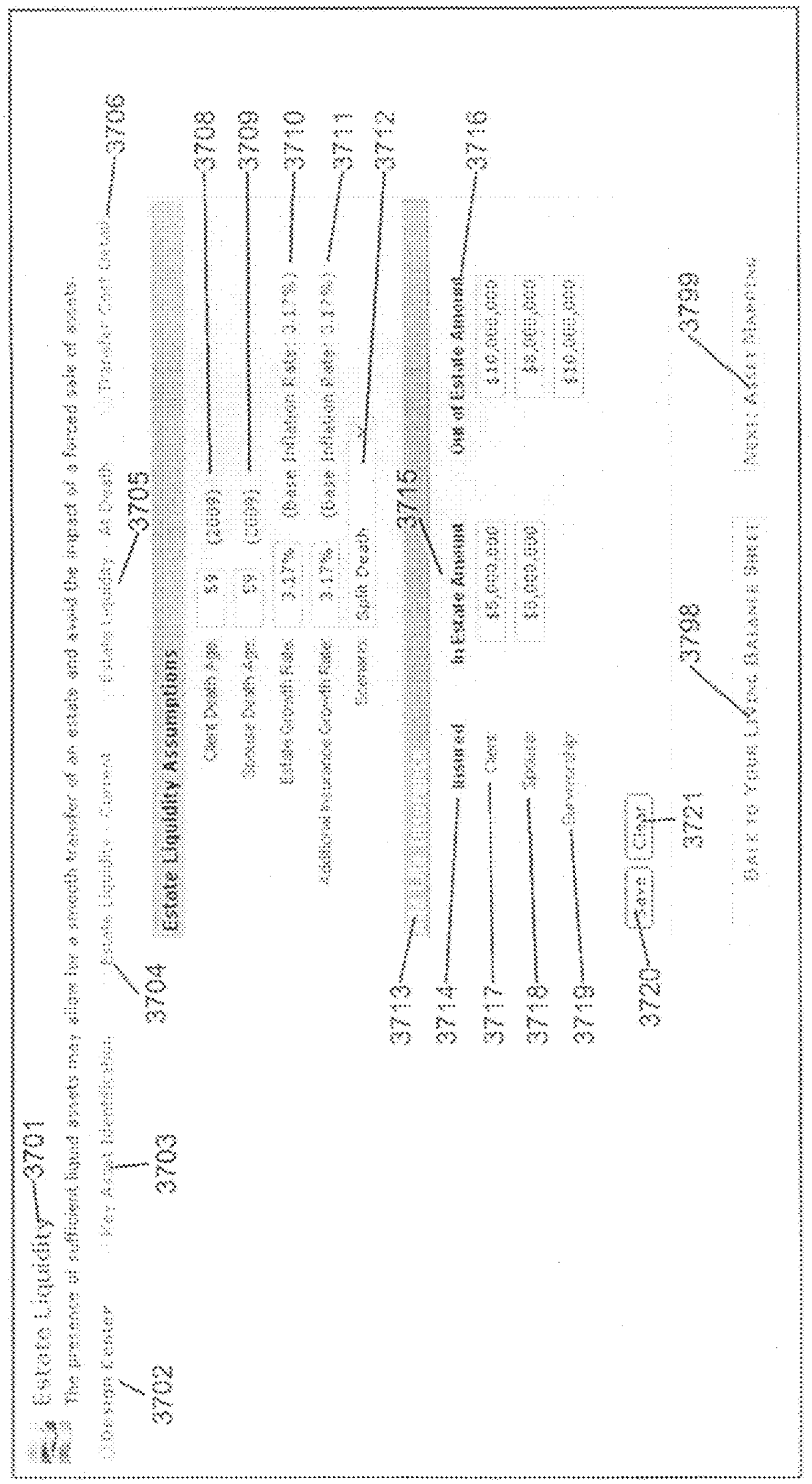

FIG. 37 demonstrates an example of an Estate Liquidity—Design Center user interface 3701 that allows a user to ensure sufficient estate liquidity in order to improve Estate transfer results. Estate Liquidity—Design Center user interface 3701 can include a menu which displays a Design Center link 3702 (shown as currently selected), a Key Asset Identification link 3703, an Estate Liquidity—Current link 3704, an Estate Liquidity—At Death link 3705, and a Transfer Cost Details link 3706. When a user chooses Design Center link 3702, the interface shows an Estate Liquidity table 3707 listing various assumption line items that can be manipulated by the user. For example, table 3707 can have line items for Client Death Age 3708, Spouse Death Age 3709, Estate Growth Rate 3710, Additional Insurance Growth Rate 3711, and Scenario 3712. Table 3707 can also include a section regarding liquidity which would be provided by Life Insurance. Thus under Add Life Insurance 3713, columns for Insured 3714, In Estate Amount 3715 and Out of Estate Amount 3716 can be entered for each of the client 3714, a Spouse 3717, and any Survivorships 3718. Additionally, Table 3707 provides a Save 3720 and a Clear 3721 button in order to allow a user to easily save and make changes to Table 3707.

Figure 38:
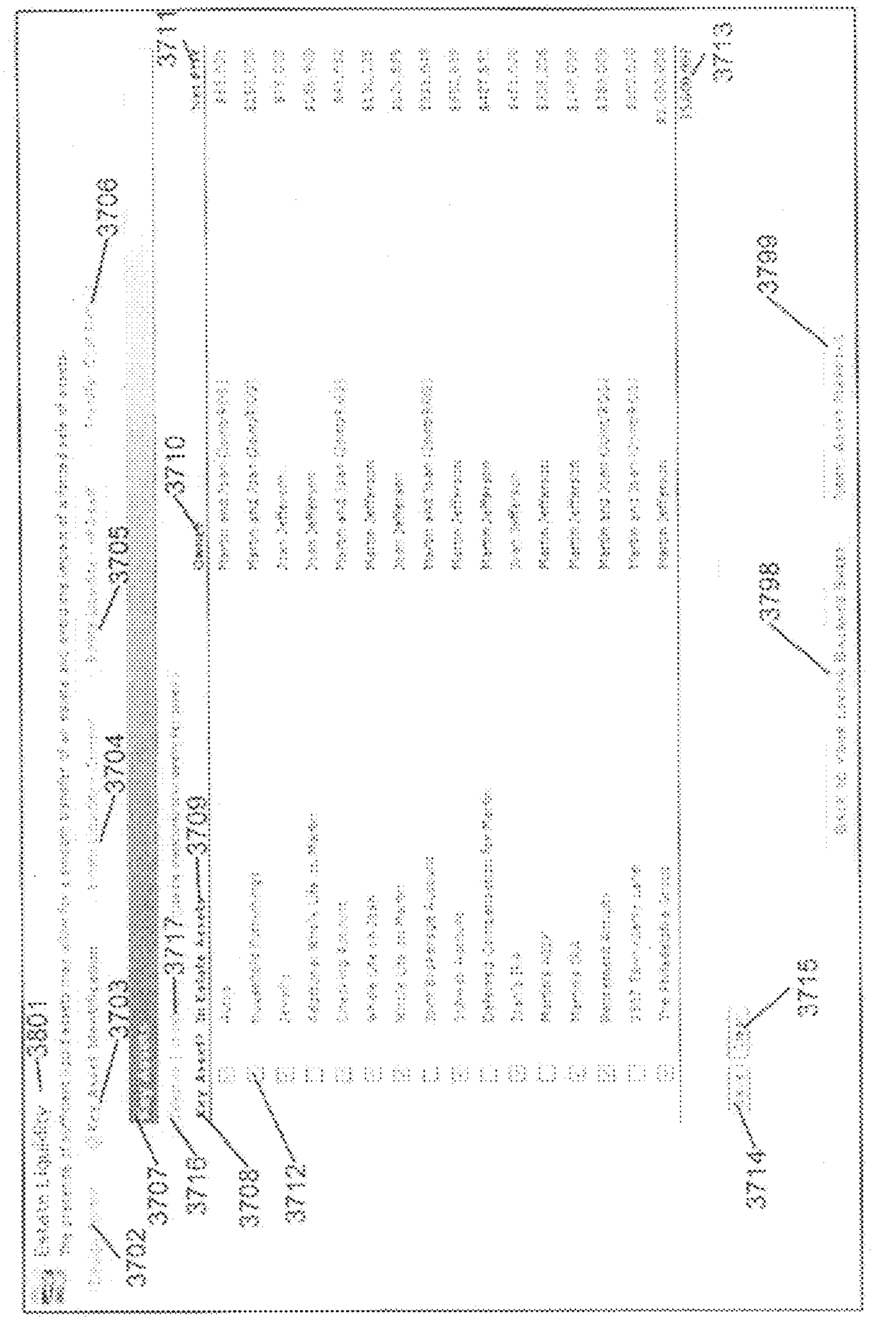

FIG. 38 demonstrates an example of an Estate Liquidity—Key Asset Identification user interface 6001 that allows a user to ensure sufficient estate liquidity in order to improve Estate transfer results. Estate Liquidity—Key Asset Identification user interface 6001 includes a menu which displays a Design Center link 3702, a Key Asset Identification link 3703 (shown as currently selected), an Estate Liquidity—Current link 3704, an Estate Liquidity—At Death link 3705, and a Transfer Cost Details link 3706. When a user chooses Key Asset Identification link 3703, the interface can display a table 3707 listing potential Key Assets. Table 3707 provides columns for the designation of Key Assets 3708 via optional check boxes 3712, In Estate Assets 3709, Owner 3710 and Net FMV 3711. Table 3707 also provides an optional Select All 3716 and Unselect All 3717 links which allow a user to either select all boxes or unselect all boxes in Key Assets column 3708 with a single command. Table 3707 also provides a Total 3713 for Net FMV column 3711. Finally, Table 3707 provides a Save 3714 and a Clear 3715 button in order to allow a user to easily save and make changes to Table 3707.

Figure 39:
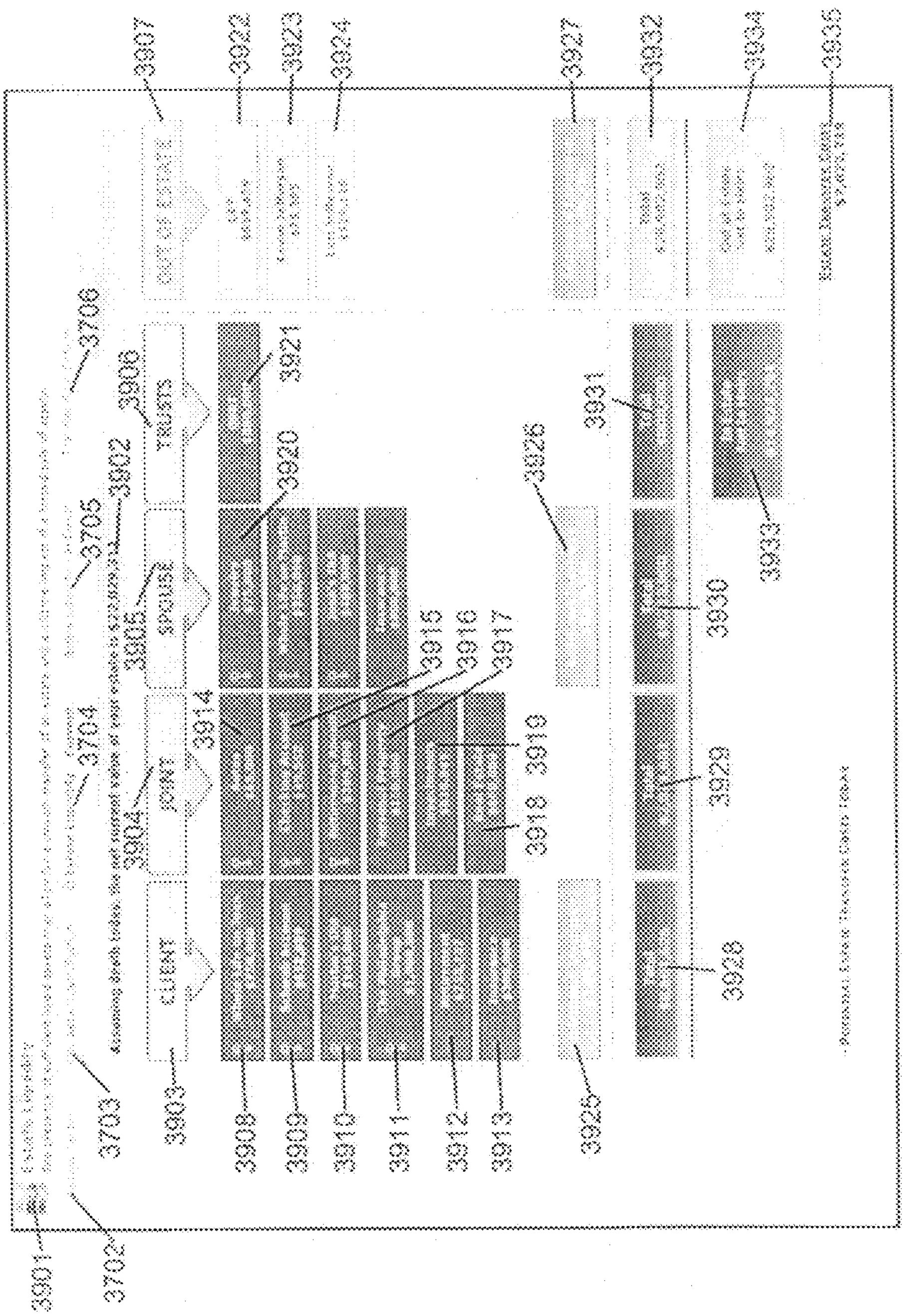

FIG. 39 illustrates an example of an Estate Liquidity 6101 user interface that reflects the presence of sufficient liquid assets in the Estate in order to allow for a smooth transfer of an estate, thereby preventing or mitigating the impact of a forced sale of assets at the time of transfer. The Estate Liquidity 3901 user interface can include a menu which includes a Design Center link 3702, a Key Asset Identification link 3703, an Estate Liquidity—Current link 3704 (shown as currently selected), an Estate Liquidity—At Death link 3705, and a Transfer Cost Details link 3706. When a user chooses Estate Liquidity—Current link 3704, the interface shows the current net value of a clients estate 3902. The client's assets can be broken down by in estate assets assigned to the Client 3903, those assigned to jointly between the client and a spouse (Joint) 3904, those assigned solely to a Spouse 3905, and those assigned to any Trusts 3906. The client's net value can be broken down by Out of Estate assets 3907. The types of assets assigned include, but are not limited to, those for Investments 3918, Retirement 3912, Insurance 3908, Personal Property 3917, Jewelry 3920, Autos 3914, Checking Accounts 3915, Real Estate 3919, QPRTs 3921, CRTs 3922, and to any Heirs 3923, 3924. Any additional life insurance policies assigned to the Client 3925, the total assets assigned to the client 3928, jointly to the client and a spouse 3929, solely to a spouse 3930, trusts 3931 and all out of estate 3932 can be provided. Additionally, the estimated Estate Transfer Costs 6135 are provided.

Figure 40:
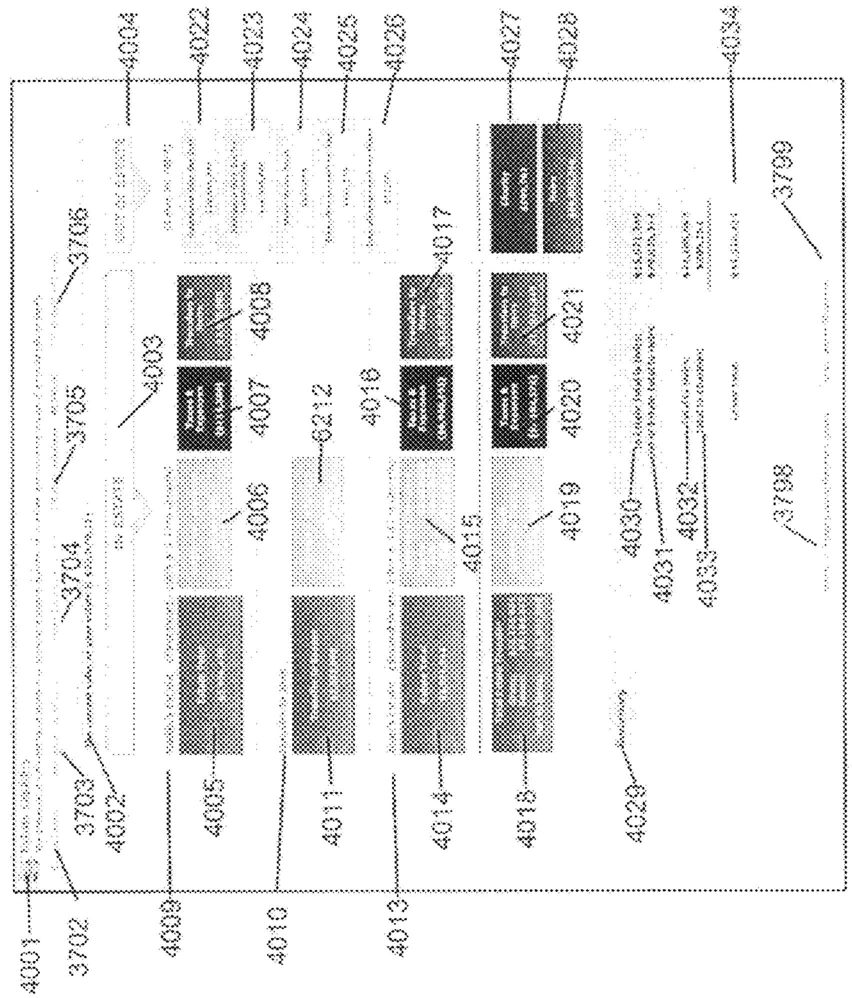

FIG. 40 illustrates an example of an Estate Liquidity at Death 4001 user interface that reflects the presence of sufficient liquid assets in the Estate in order to allow for a smooth transfer of an estate, thereby preventing or mitigating the impact of a forced sale of assets at the time of transfer. The Estate Liquidity at Death 4001 user interface includes a menu which displays a Design Center link 3702, a Key Asset Identification link 3703, an Estate Liquidity—Current link 3704, an Estate Liquidity—At Death link 3705 (shown as currently selected), and a Transfer Cost Details link 3706. When a user chooses Estate Liquidity—At Death link 3704, the interface shows the current net value of a clients estate 4002. The client's estate is displayed as In Estate 4003, and Out of Estate 4004. The client's In Estate displays the in estate values of the estate for the first to die 4009, and displays the client's Estate Total 4005, any Additional Insurance 4006, the estimated Taxes and Expenses 4007, and the estimated amount Transferred to Heirs 4008. The In Estate section also displays the amount transferred to a spouse 4010, illustrating both the total transferred to Spouse 4011 and any Additional Insurance 4012. The In Estate section 4003 further includes estimates of the Spouse's estate at the time of death 4013, and provides the estate total 4014, any additional insurance 4015, estimated Taxes and Expenses 4016, and the total Transfer to Heirs 4017. Out of estate values for any out of estate trusts, such as an ILIT 4022, Other Out of Estate Insurance 4023, Out of Estate Properties 4024, and out of estate Education Accounts for Heirs 4025, 4026. Totals for estate transfers, both net and gross 4018, for additional insurances 4019, for Taxes and Expenses 4020 and Transfer to Heirs 4021 can be provided. Additionally the totals for any out of estate Charities 4027, and the totals of out of estate to Heirs 4028 can also be provided.

A summary section 4029 can provide the In estate Total to Heirs 4030, the Out of Estate Total to Heirs 4031, the Total to Heirs 4032, the Total to Charities 4033, and provides a Grand Total 4034 for easy viewing. The user can also select and/or press element Back to Your Living Balance Sheet button 3798 and/or Next: Asset Mapping button 3799 to navigate via the Workflow Wizard to interfaces for data gathering of personal data of the client, and/or for providing asset data for the client.

Figure 41:
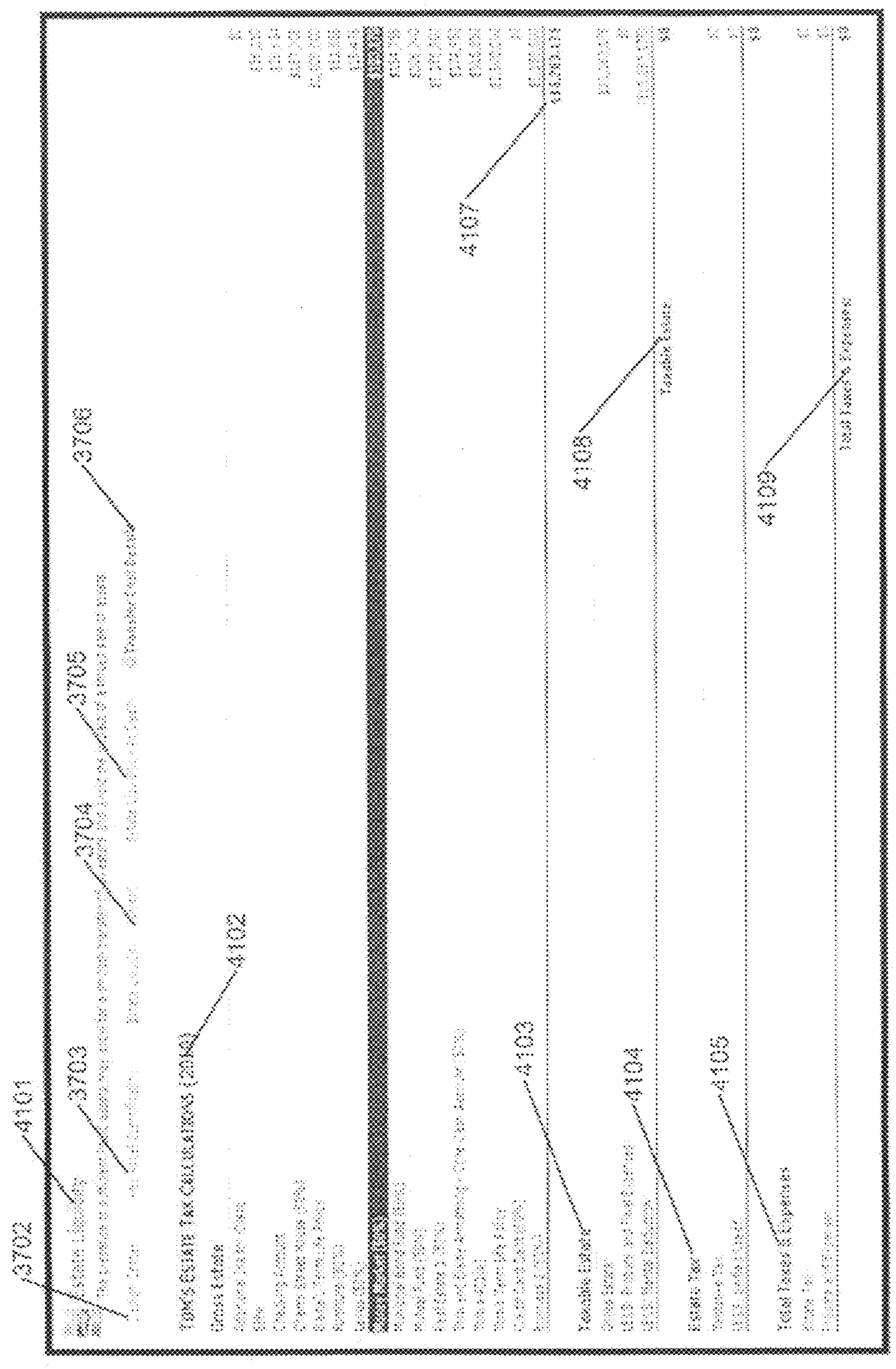
Figure 42:
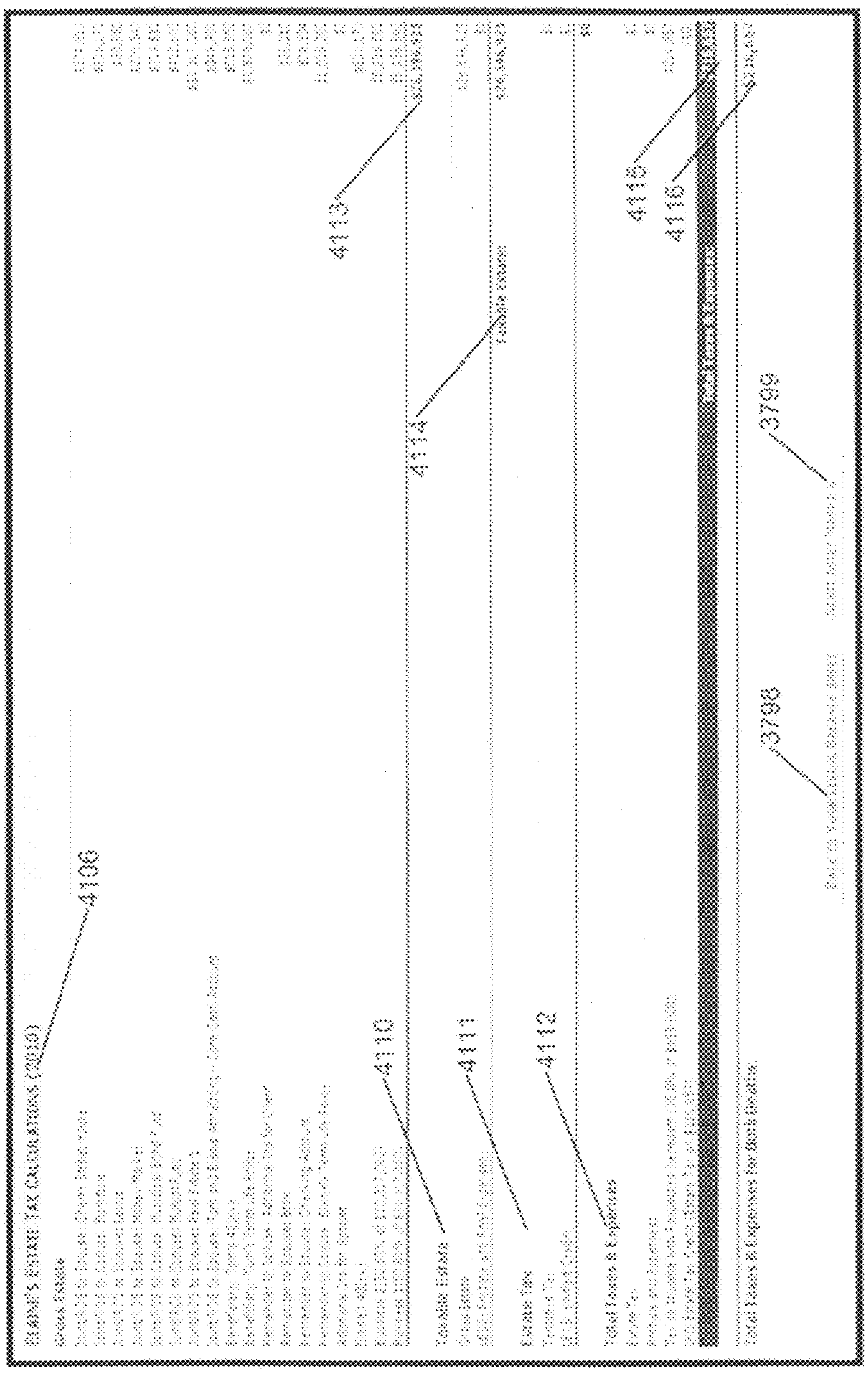

FIGS. 41 and 42 illustrate an example of an Estate Liquidity Transfer Cost Details user interface 4101 when a user chooses Transfer Cost Details 3706 link (FIG. 59) (currently Shown as selected). Transfer Cost Details 3706 user interface may have several sections including a Client's Estate Tax Calculations 4102 section, which may be further separated into a Gross Estate 4017 section, a Taxable Estate 4103 section, and a Total Taxes and Expenses 4106 section. Totals for Gross Estate 4107, Taxable Estate 4108, and Total Taxes and Expenses 4109 can also be displayed.

The Estate Liquidity Transfer Cost Details 3706 user interface may also include a section for a Spouse's Estate Tax Calculations 4106, which may be further separated into a Gross Estate 4106 section, a Taxable Estate 4110 section (FIG. 42), an Estate Tax section 4111 (FIG. 42), and a Total Taxes and Expenses 4112 section (FIG. 42). Totals for Gross Estate 4113 (FIG. 42), Taxable Estate 4114 (FIG. 42), and Total Taxes and Expenses 4115 (FIG. 42) are also displayed. Finally, the Total Taxes and Expenses for Both Deaths 4116 can be displayed. The user can also select and/or press element Back to Your Living Balance Sheet button 3798 and/or Next: Asset Mapping button 3799 to navigate via the Workflow Wizard to interfaces for data gathering of personal data of the client, and/or for providing asset data for the client.

Figure 43:
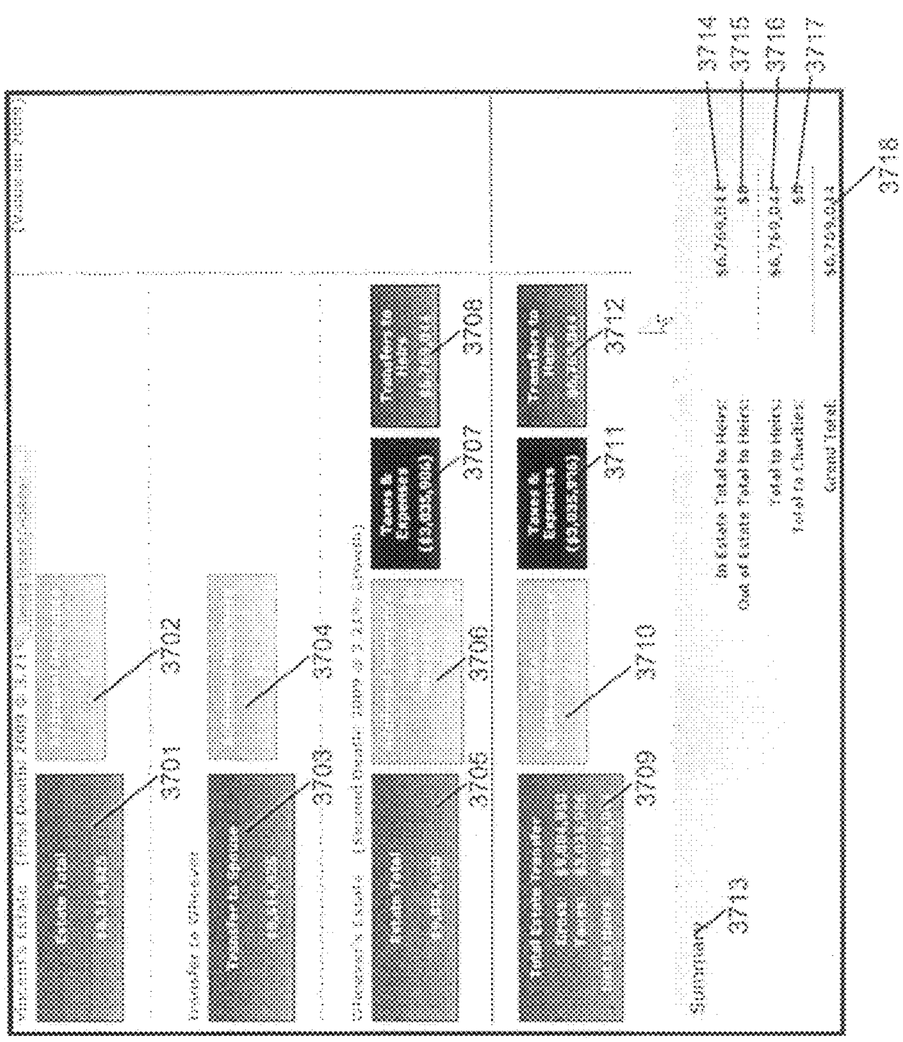

FIG. 43 illustrates an example of a user interface 4300 that is presented to a user to summarize an estate if the client were to die today in a living balance sheet. In user interface 4300 the estate total is presented in field 4301 and the amount of insurance (shown as zero) is presented in field 4301. The amount of the estate that is available to be transferred to any beneficiaries is presented in field 4303, with the amount of insurance (left blank here to indicate zero) is presented in field 4304. The estate total for the spouse is presented in field 4305, and any additional insurance (i.e., zero) is presented in field 4306, and the estimated taxes and expenses are presented in field 4307 and the total that transfers to heirs is presented in field 4308. The total estate to transfer is presented in field 4309, the total insurance payout (i.e., zero) is presented in field 4310, the total expenses are presented in field 4311, and the transfer of heirs is presented in 4312. A Summary 4313 can provide the total of In Estate Total to Heirs in field 4314, and the Out of Estate Total to Heirs in field 4315 in field 4316, and subtracts any monies donated to charities in field 4317 in order to give the total of the estate that is available to transfer to heirs in field 4318.

Figure 44:
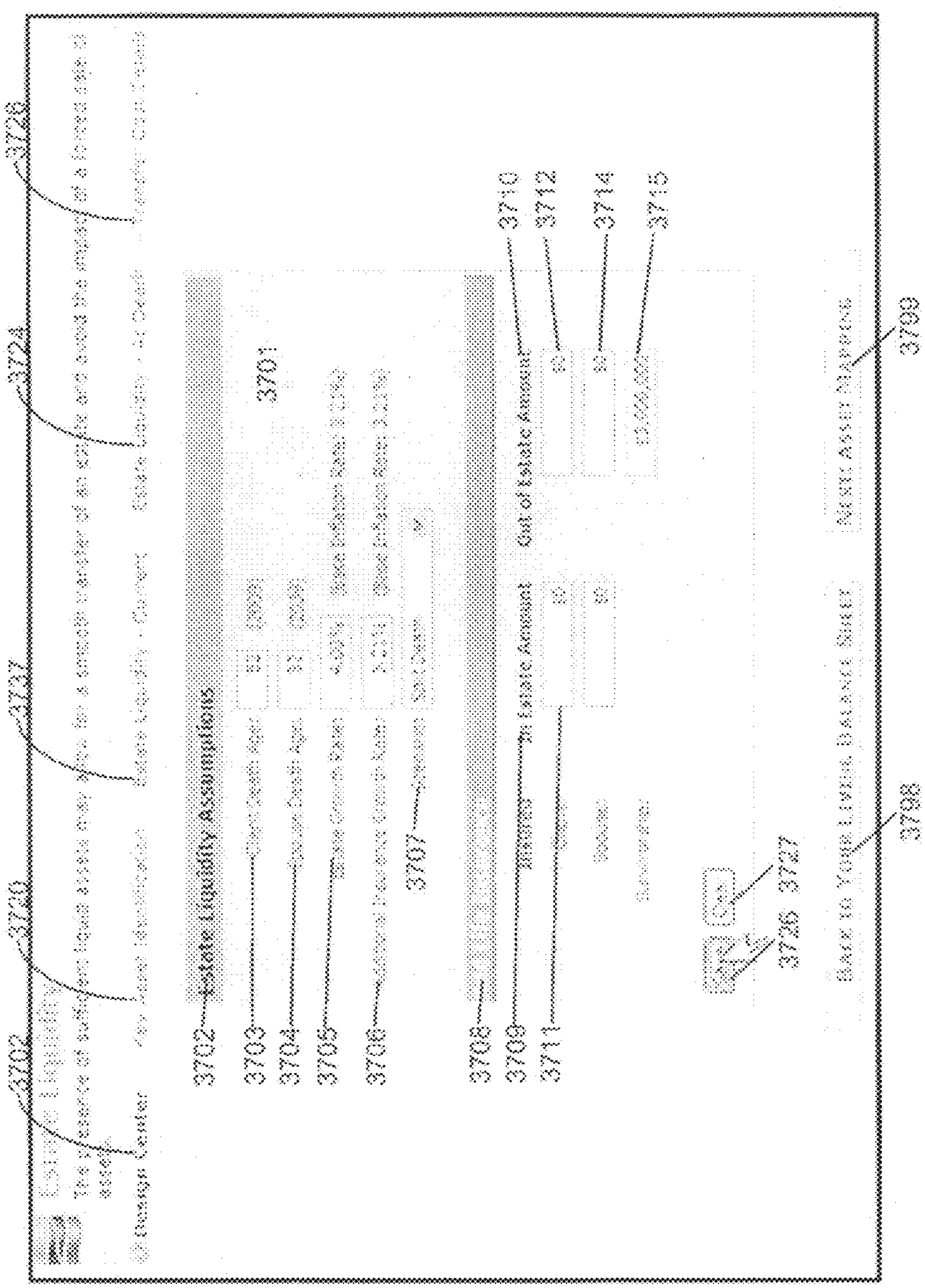

In FIG. 44 user interface 2300 illustrates how a life insurance policy with a death benefit of $3,000,000 can be used to pay estate taxes. This works if the client dies quickly and without complications. In this example, the Estate Liquidity user interface 3901 assumes Client Death Age 3708 at 52 in the year 2009, and Spouse Death Age 82 in the year 2104. The Estate Growth Rate 3710 is estimated to be at 4.0%, and the Additional Insurance Growth Rate 3711 is estimated at 3.21%, and Scenario 3712 is split death. The client can then enter the In Estate Amount or Out Estate Amount for the client 3714 in the respective fields. The client can then also enter the In Estate Amount or Out Estate Amount for the Spouse 3717 in the respective fields. The client can then enter the Out Estate Amount for any survivorship options in field 3718, in this case, $3,000,000. These assumptions can be used to present various scenarios to the client. The user can also select and/or press element Back to Your Living Balance Sheet button 3798 and/or Next: Asset Mapping button 3799 to navigate via Workflow Wizard to interfaces for data gathering of personal data of the client, and/or for providing asset data for the client. Once the assumptions are enters a user can save the data by hitting the Save button 3720.

Figure 45:
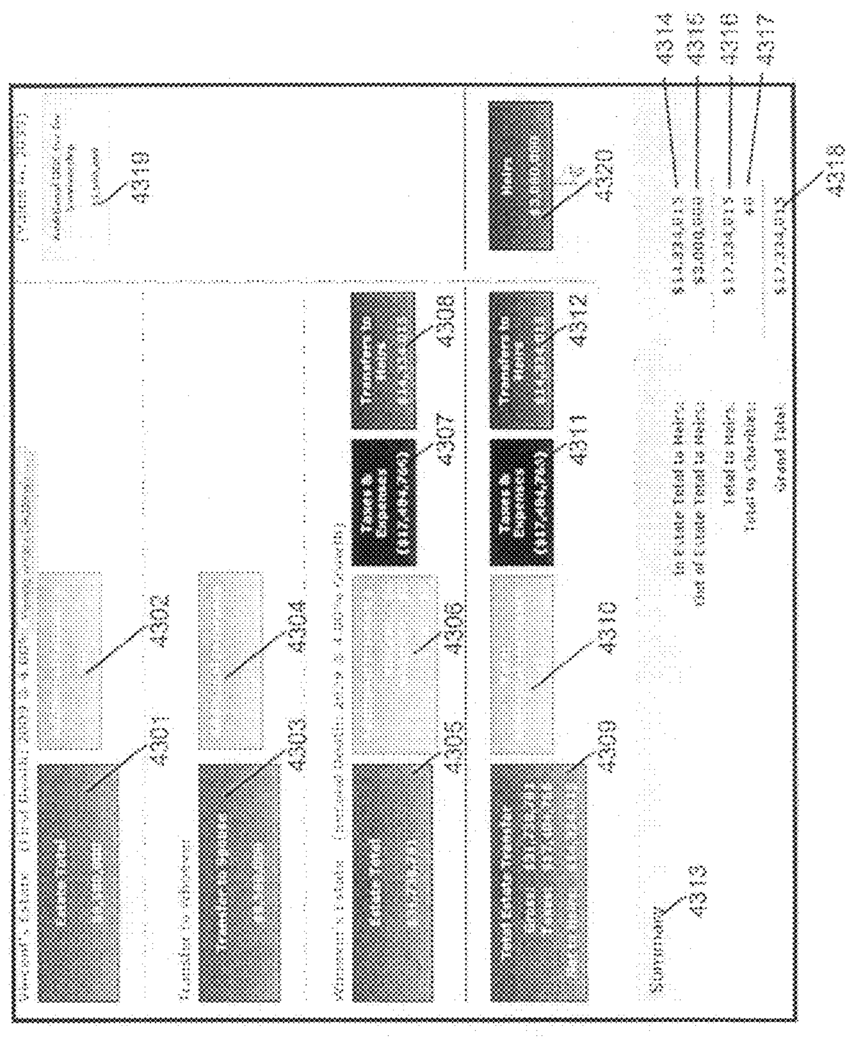

FIG. 45 illustrates the living balance sheet after changing the scenario of FIG. 37 to a split death scenario and with the second death occurring at age 82 (i.e., 30 years after the first death). The assumptions entered in FIG. 44, e.g., a return of 4% on the assets and a life insurance policy of $3,000,000 dollars, is for comparison with the numbers of FIG. 43. When FIG. 43 is viewed in view of FIG. 45, the additional DOE Insurance for Survivorship field 4319 and Total field 430 illustrate the inadequacy of the $3,000,000 insurance. In 30 years, the assets have grown to be about $32,000,000 per Estate Total 4305 but the estate tax problem is about $17 million per Taxes and Expenses field 4311, which far exceeds the $3,000,000 life insurance policy payout. Thus in this scenario, the $3,000,000 life insurance policy is not an effective solution. A substantial portion of the estate would have to be liquidated in order to meet the taxes and expenses burden in scenario. In this scenario, the death of the surviving spouse occurs 30 years after the death of the first, which results in the life insurance payment 30 years before the estate taxes are due.

Figure 46:
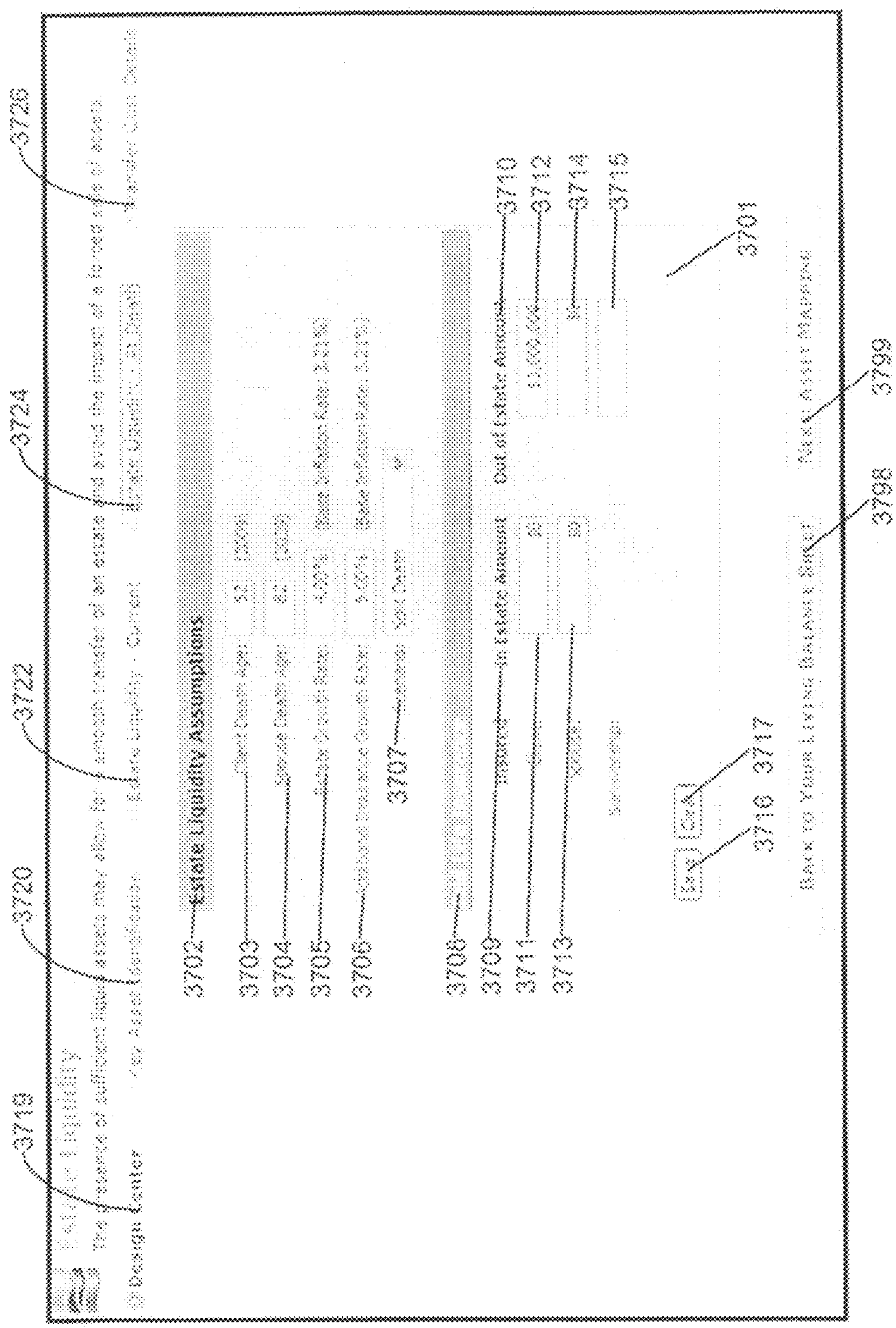

FIG. 46 illustrates another solution where life insurance payouts are used solely to pay the estate taxes. In this scenario, the first spouse dies today at age 52 and the survivor spouse dies in 30 years at age 82 in the year 2104. The Estate Growth Rate 3710 is estimated to be at 4.0%, and the Additional Insurance Growth Rate 5911 is estimated at 5.0%, and Scenario 3712 is set to split death. The In Estate Amount and Out Estate Amount for the client 3714 in is set as zero and $3,000,000, respectively. The In Estate Amount or Out Estate Amount for the Spouse 3717 is set as zero. The Out of Estate Amount for any survivorship options in field 3719, in this case, is set to zero. With the assumptions of FIG. 46, the life insurance matures and it is delivered in trust as its only purpose is to pay the estate tax.

Figure 47:
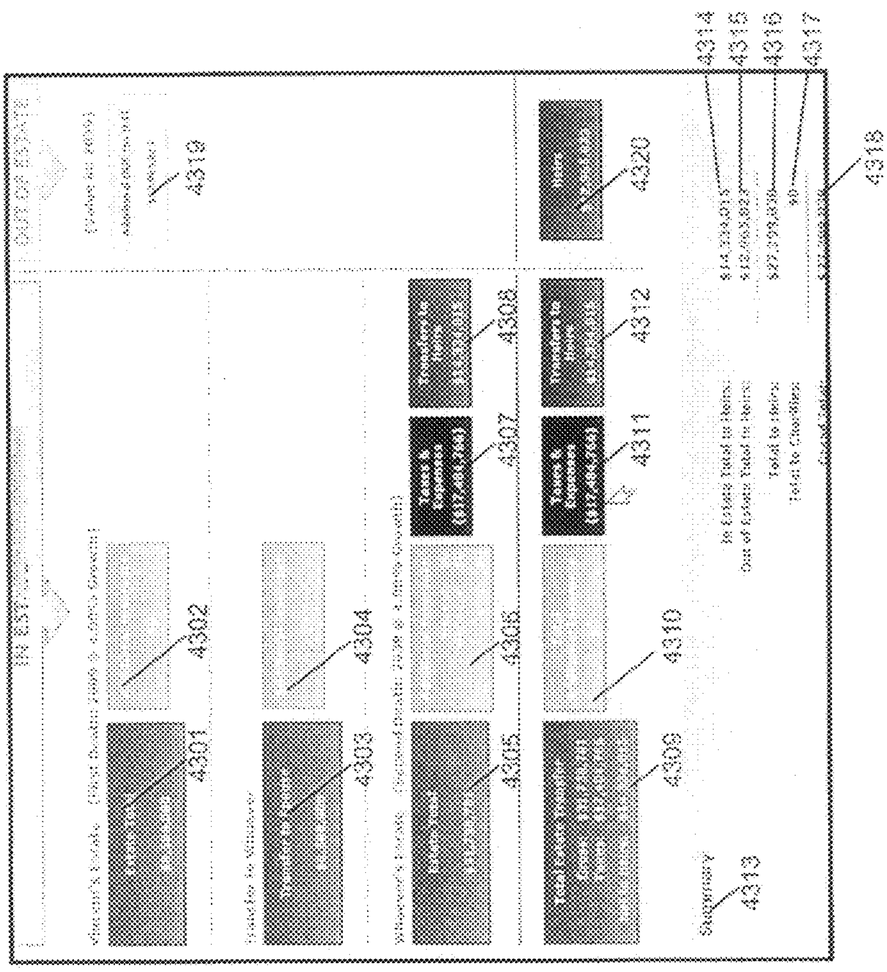

As illustrated in FIG. 47, the $3,000,000 insurance assumed in FIG. 46, invested at a 5% return grows to about $13 million out of trust. The trust can be liquidated to pay for the expected estate taxes, when one spouse dies today and one spouse dies in 30 years. In this scenario, that the total estate value upon the death of the spouse is still about $32,000,000 as shown in field 4305, and the total taxes and expenses still equal about $17,500,000 as shown in field 4307 and 4311. However, the total available to transfer to heirs from the same value life insurance of the assumptions of FIG. 44 have grown to about $14,000,000 as shown in field 4308 and 4312. Now there is $13,000,000 to pay the estate taxes. Thus, the estate actually receives $14,500,000 in In Estate total monies, and $13,000,000 in Out of Estate monies, resulting in the heirs receiving about $27,000,000 total out of the initial $32,000,000 originally available in field 4305.

Figure 48:
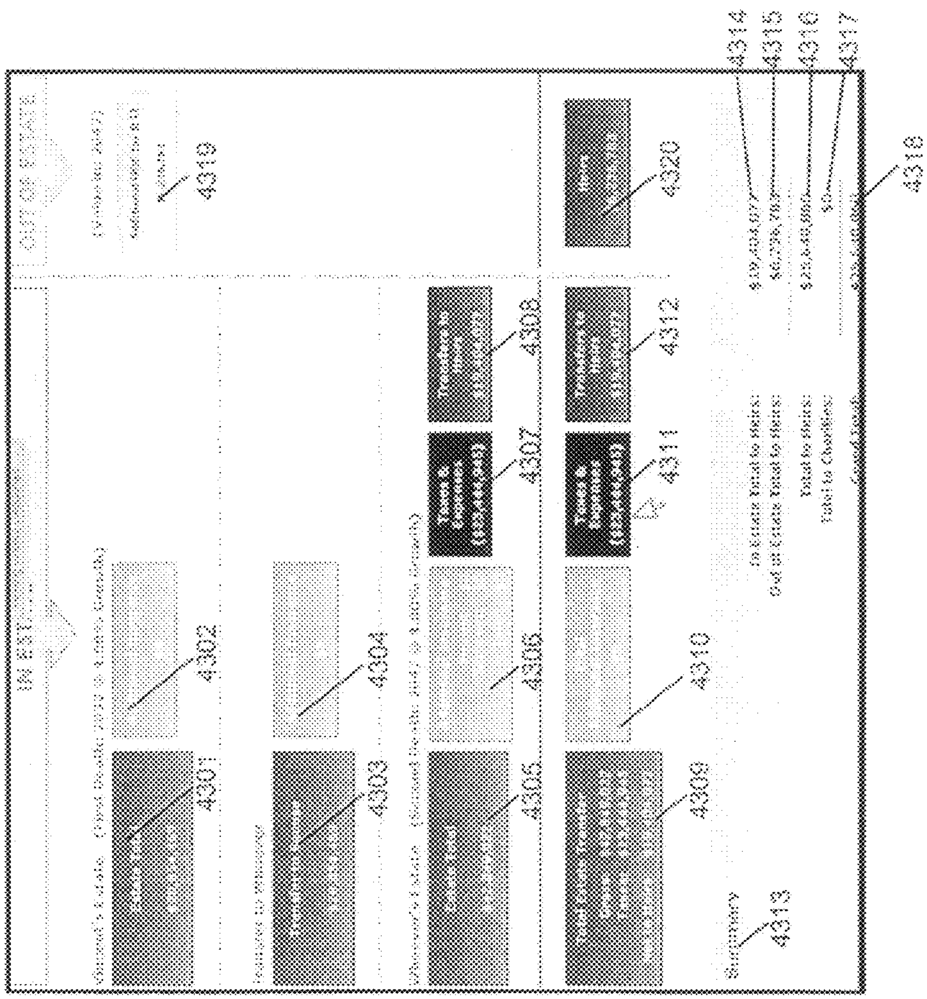

However, in all likelihood, a 30 year gap between the first death and the second death is not a common scenario. The more likely scenario of deaths of the first spouse at age 75 and the death of the surviving spouse at age 90 is shown in FIG. 48. In this scenario, the same life insurance policy worth $3,000,000 is to be used to pay the estate taxes. However, the life insurance policy only produces $6,000,000 (rather than the $13,000,000) in the 15 year period between the initial policy payout and when the second dies as shown in field 4319. This is still better than the $3,000,000 initial life insurance policy payment at the death of the surviving spouse, if a second to life insurance of $3,000,000 was bought. However, in this scenario the tax burden is now $23,000,000 as shown in fields 4307 and 4311 rather than the original $3,000,000 policy payout. Had the client been properly informed, a life insurance policy worth more may have been purchased, which would have provided sufficient funds for paying for estate taxes upon the death of the second spouse, thereby maximizing the amount of the estate transferred to heirs. Knowing how much tax is due and when the probability of death is likely (see FIGS. 19-21) are valuable tools in buying and selling life insurance in order to properly address a client's family and estates' immediate and long term futures.

Asset Mapping

Figure 49:
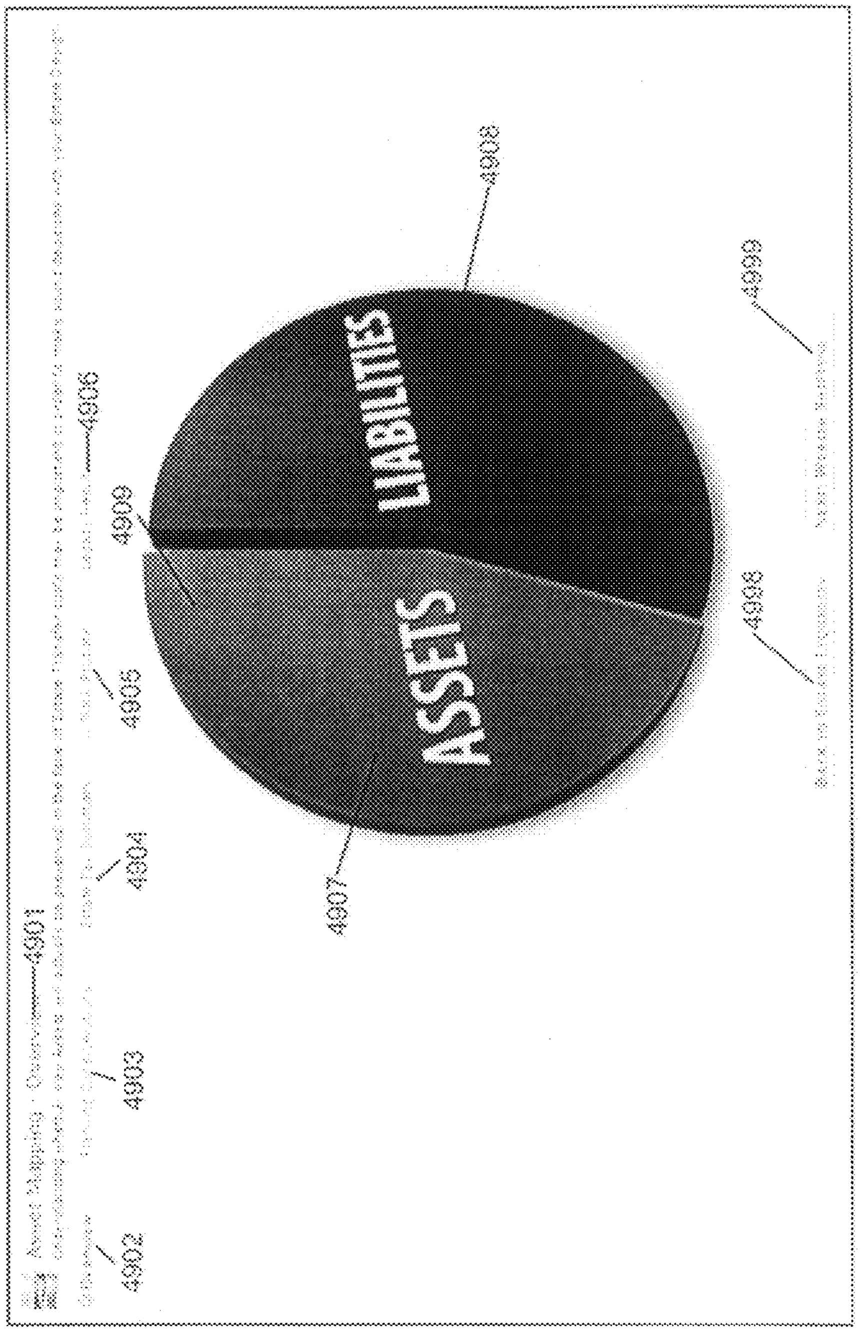

FIG. 49 illustrates when the user clicks the Asset Mapping link on the left side navigation bar (see FIG. 11) a default Asset Mapping Overview user interface 4901 is displayed. The user can access the other pages by clicking the corresponding links across the top of the page such as overview 4902, planning considerations 4903, Estate Tax Summary 4904, Mock Probate 4905, and Legacy Results 4906. Understanding whether Key Assets will actually be preserved in the face of Estate Transfer costs may be important in order to make sound decisions in estate design. The user can also navigate to other areas of the navigation bar (see FIG. 11) by selecting Back to Estate Liquidity 4998 or Next: Wealth Shifting 4999 buttons in the Workflow Wizard.

Figure 50:
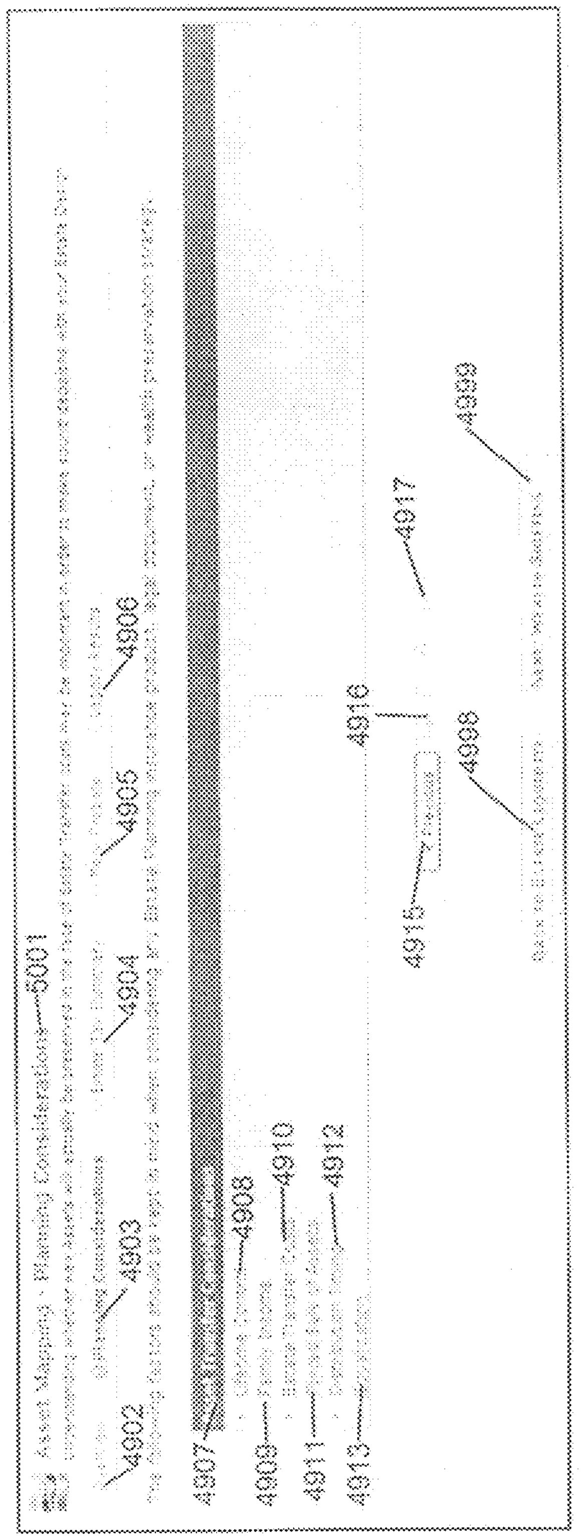

FIG. 50 demonstrates when the user selects the Planning Considerations option 4903. Specific factors that should be considered during any Estate Planning insurance product, legal document, or wealth preservation strategy are displayed in an Asset Transfer Consideration summary table 4907. Such factors may be displayed as bullets, including Lifetime Control 4908, Family Income 4909, Estate Transfer Costs 4910, Forced Sale of Assets 4911, Distribution Timing 4912, and Equalization 4913. Each of the list items or bullets in the Asset Transfer Considerations section may be a hyperlink providing a pop-up window or indicia containing explanations and definitions. The user can also navigate to other areas within Asset Mapping by selecting Previous 4915, Next 4916, or Show All 4917 buttons. Additionally, the user can also navigate to other areas of the navigation bar (see FIG. 11) by selecting Back to Estate Liquidity 4998 or Next: Wealth Shifting 4999 buttons via the Workflow Wizard.

For example, choosing Lifetime Control 4908 may describe how many estate planning strategies involve the transfer of assets to children or trusts. For most of these strategies to successfully remove the asset from one's estate, one must give up the ability to personally control the asset. However, particularly in trust situations, one may create a set of instructions for the trustee that will guide investments and determine how distributions are made. There are certain planning techniques where one may be able to maintain certain elements of control. In any case, be sure that a client is comfortable with the level of lifetime control given away or maintained when implementing any planning strategy. For example, choosing Family Income 4909 may describe how estate planning techniques may impact how a family receives income from assets. When contemplating techniques that transfer assets out of one's estate, be sure that one's personal income will continue at levels that are comfortable to the estate owner. There are a number of techniques that will allow one to retain an income stream from the asset even after having transferred the asset to another party. Retained interest gifts (as they are called) may help balance the estate planning needs and income needs. As another example, choosing Estate Transfer Costs 4910 may describe how there are many estate transfer costs that need to be considered. The most obvious are federal estate taxes and state death taxes (if any). In addition to the transfer tax costs, probate expenses should be considered which can eat up anywhere from 1-7% of the estate. There are the decedent's final expenses, such as funeral costs. There may be income taxes to pay on the decedent's income earned in the year of death. For the beneficiaries, an income tax may be due upon the receipt of certain assets called "income in respect of a decedent." That is income from items such as annuities, deferred compensation, and pension payments. The good news is that the death benefit from life insurance should be received by the beneficiary income tax free.

Choosing Forced Sale of Assets 4911 may describe how when a family is confronted with paying estate transfer costs (taxes, probate, funeral expenses), there is an almost immediate need for liquidity. For instance, federal estate taxes are, generally, due within 9 months of the date of death. If the estate does not have liquidity—that is, cash—then the executor must find a way to obtain cash. That will generally mean selling family assets. In a forced sale, sometimes called a fire sale, the executor may have to sell the asset at less than prime price. In addition, the executor may be forced to sell assets that would have been valuable to the family for financial or emotional reasons. An estate plan should examine what assets would be available to pay the estate bills and whether there is a better way to obtain liquidity for the family and the estate. Choosing Distribution Timing 4912 may describe how there are a number of estate planning strategies that establish payments to the beneficiaries at some time in the future. Most often, irrevocable trusts are the conduits for plans that will make income and or principal payments to the beneficiaries at set times. There are some trusts that give the trustee the power to make distributions on a discretionary basis. In other trusts, the trustee is directed to make income and principal payments to the beneficiary. In yet other trusts, the beneficiary is given the right to demand a payment of a portion of the trust assets. It is also possible to have a combination of these distribution timings in a trust. When assets are held in trust for a beneficiary, there is an element of ongoing asset protection—basically, the beneficiary's creditors may not be able to reach the assets. In addition, the assets in the trust will, generally, not be included in the beneficiary's estate for estate tax purposes. That may eliminate a tax liability from the assets in a generation. This means more of the assets can be retained in the family.

As another example, choosing Equalization 4913 may describe the situation when one has more than one beneficiary, one is faced with the question of whether one wants one's beneficiaries to have an absolutely equal share of the estate. For instance, if one has three children, there is a suggestion whether the estate should be split into three equal shares. This is the case especially where there are assets of value that are not easily shared but the grantor wants the assets to remain in the estate. It is also an issue where there is a family business that not all the children work in and should own. Once taxes are paid, the remaining estate may not be sufficiently liquid to split equally and fairly. It's important to note that equal and fair are not the same thing. Where one wants to provide equal bequests to one's family, it is important to analyze the type of assets one has, what will remain after estate taxes, and whether one should provide a liquidity source to help equalize the distributions.

Figure 51:
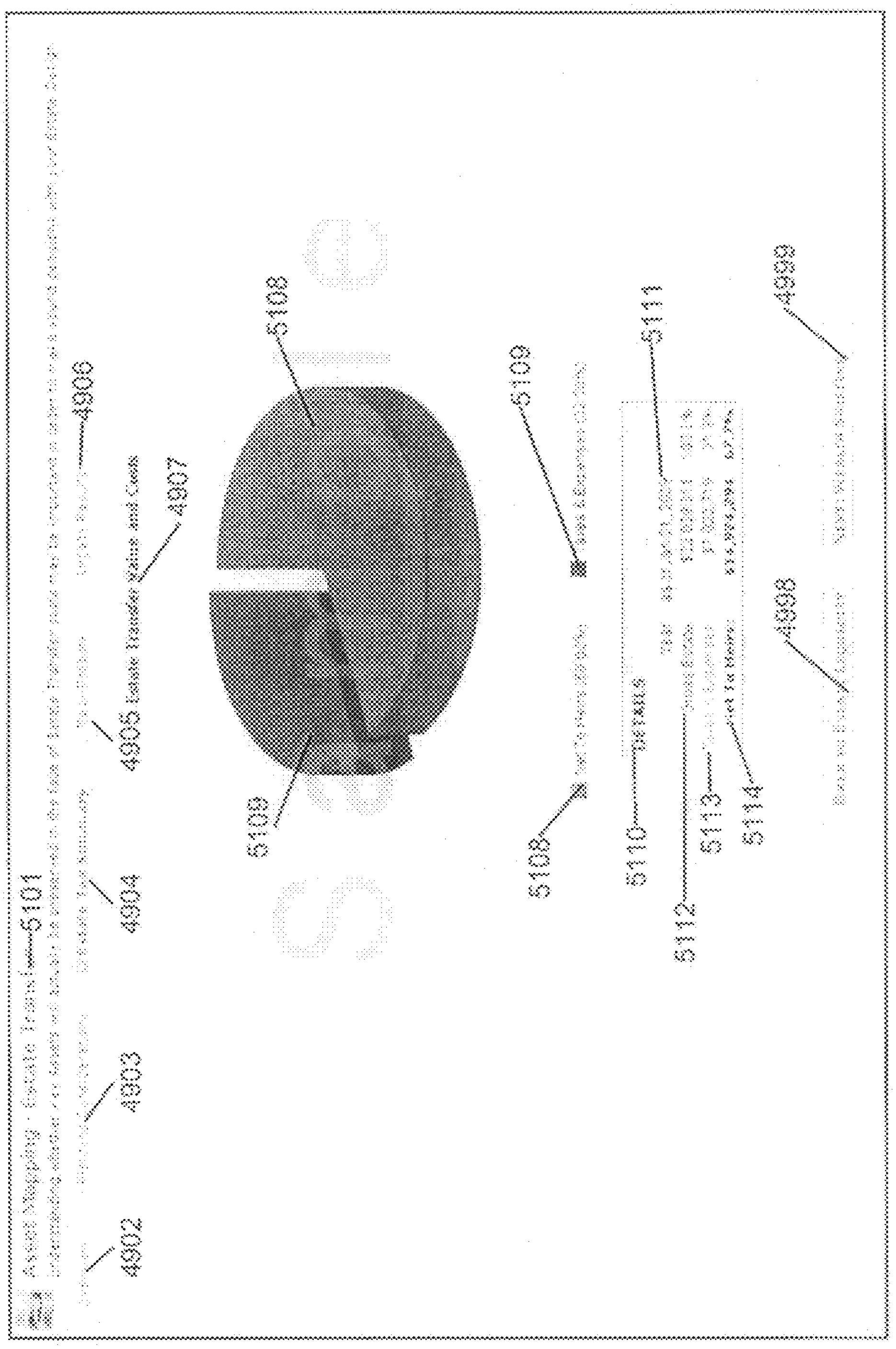

FIG. 51 demonstrates when the user selects Estate Tax Summary option 4904. An Asset Mapping—Estate Transfer user interface 5101 is displayed. Understanding whether Key Assets will actually be preserved in the face of Estate Transfer costs may be important in order to make sound decisions with one's Estate Design. Asset Mapping—Estate Transfer user interface 5101 may show a two-slice pie chart Estate Transfer Value and Costs 4907 depicting the client's estate transfer value and costs. For example, Net to Heirs 5108 may be displayed as a color (e.g. blue) and Taxes & Expenses 5109 may be displayed as a second color (e.g. red). A legend under the chart may show the percentage of the total estate value for each slice. Additionally, Details section 5110 may show the following values Year (first day of current year) 5111, Gross Estate 5112 (dollar value and percentage (100%) of total estate before death), Taxes & Expenses 5113 (dollar value and percentage at death) and Net to Heirs 5114 (dollar value and percentage at death).

When the user clicks the "Taxes & Expenses" 5113 in Details section 5110, the system may display a report titled "Breakdown of Estate Transfer Costs" (NOT SHOWN). The report may contain a three-slice pie chart depicting the Estate Tax Payable in one color (e.g. red), the State Death Tax in a second color (e.g. blue), and Income Tax on IRD in a third color (e.g. yellow). A pie chart depicting the Estate Tax Payable may also contain a Details section (NOT SHOWN) that represents dollar values for Non-Discounted Estate Value (where Decedent=Client and where Decedent=Spouse), Taxable Estate (where Decedent=Client, where Decedent=Spouse, and Total), Estate Tax Payable (where Decedent=Client, where Decedent=Spouse, and Total), State Death Tax (where Decedent=Client, where Decedent=Spouse, and Total), Probate & Expenses (where Decedent=Client, where Decedent=Spouse, and Total), Tax on IRD (where Decedent=Client, where Decedent=Spouse, and Total), GST Tax (where Decedent=Client, where Decedent=Spouse, and Total), Total Taxes & Expenses (where Decedent=Client, where Decedent=Spouse, and Total). If the user clicks the "Estate Tax Payable" link in the "Details" section of the "Breakdown of Estate Transfer Costs" report, a new report may be displayed titled "Year By Year Projected Estate Tax" (NOT SHOWN). The top section of the report contains a bar chart (NOT SHOWN) depicting the estate transfer costs; for example Estate Value may be shown in one color (e.g. blue), and Estate Tax Payable may be shown in a second color (e.g. orange). The chart and legend maybe followed by a Details section that shows the following dollar values such as Non-Discounted Estate Value (where Decedent=Client, where Decedent=Spouse, and Total), Discounts and Deductions (where Decedent=Client and where Decedent=Spouse), Taxable Estate (where Decedent=Client and where Decedent=Spouse), Lifetime Giving (where Decedent=Client and where Decedent=Spouse), Gifts Rolled Back (where Decedent=Client and where Decedent=Spouse), Adjusted Taxable Gifts (where Decedent=Client and where Decedent=Spouse), Tentative Tax Base (where Decedent=Client and where Decedent=Spouse), Tentative Tax (where Decedent=Client and where Decedent=Spouse), Tax Credits (where Decedent=Client and where Decedent=Spouse), Estate Tax Payable (where Decedent=Client, where Decedent=Spouse, and Total), The user can click a "Transfer Costs" link at the upper left portion of the page to return to the "Breakdown of Estate Transfer Costs" page, or click the "Estate Transfer" link to return to the main Estate Tax Summary page. Further, when a user clicks the "Tax on IRD" link in the "Details" section of the "Breakdown of Estate Transfer Costs" report (NOT SHOWN), a new report is displayed titled "IRD Value and Taxation" (NOT SHOWN). The top section of the report may contain a 3-slice pie chart depicting the IRD taxation as Income Tax on IRD shown in one color (e.g. red), Estate Tax on IRD in a second color (e.g. blue) and IRD Net of Taxes in a third color (e.g. green). A legend under the chart may show the percentage of the total IRD costs represented by each slice. The chart and legend are followed by a Details section that shows the following dollar values: Total Tax Deferred Assets (where Decedent=Client and where Decedent=Spouse), Tax-Deferred Assets To Spouse (where Decedent=Client and where Decedent=Spouse), Tax-Deferred Assets To Heirs (where Decedent=Client and where Decedent=Spouse), Income with Respect to Decedent (where Decedent=Client, where Decedent=Spouse, and Total), Estate Tax on IRD (where Decedent=Client and where Decedent=Spouse), Income Tax on IRD (where Decedent=Client and where Decedent=Spouse), Total Tax on IRD (where Decedent=Client, where Decedent=Spouse, and Total), IRD Net of Taxes (where Decedent=Client, where Decedent=Spouse, and Total), and IRD Depletion (where Decedent=Client, where Decedent=Spouse, and Total). The user can click the "Transfer Costs" link at the upper left portion of the page to return to the "Breakdown of Estate Transfer Costs" page, or click the "Estate Transfer" link to return to the main Estate Tax Summary page.

The user can click the Estate Transfer link at the upper left portion of the page to return to the main Estate Tax user interface 5101. Additionally, the user can also navigate to other areas of the navigation bar (see FIG. 11) by selecting Back to Estate Liquidity 4998 or Next: Wealth Shifting 4999 buttons via the Workflow Wizard.

Figure 52:
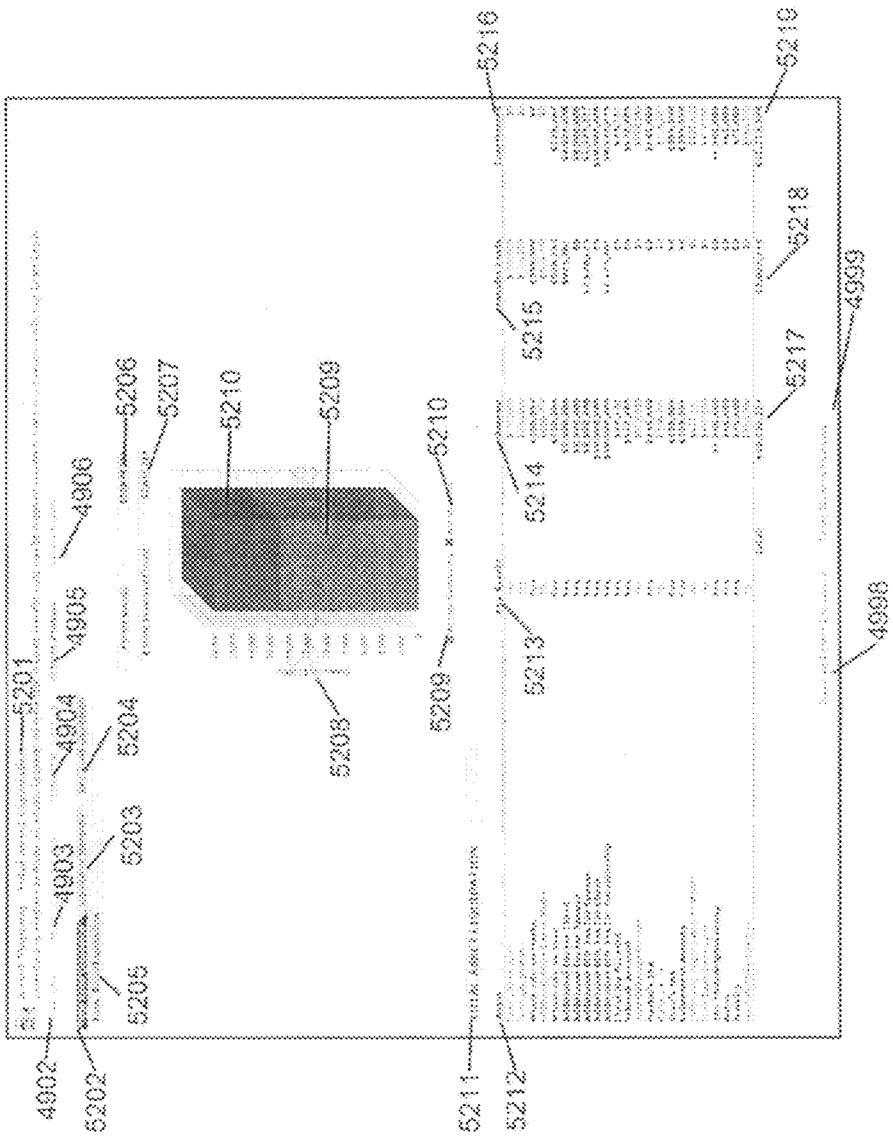

FIG. 52 demonstrates when the user selects Mock Probate option 4905. A Total Asset Liquidation user interface 5201 is displayed. Understanding whether Key Assets will actually be preserved in the face of Estate Transfer costs may be important in order to make sound decisions with one's Estate Design. The Mock Probate Total Asset Liquidation user interface 5201 section consists of three subsections, organized by tabs Total Asset Liquidation 5202 (currently shown as selected), Liquidation Hierarchy 5203, and Key Asset Liquidation 5204. When selected, Total Asset Liquidation 5202 presents a Total Asset Liquidation user interface 5205. A single bar chart with color-coded sections such as Asset Remaining 5209 may be shown in one color (e.g. blue), and Assets Lost 5210 may be shown in a second color (e.g. red). Further, values for Estate Value 5206 may be shown in a third color (e.g. green), and Estate Transfer Costs 5207 may be shown in another color (e.g. red). Total Asset Liquidation user interface 5205 may also display a table titled Total Asset Liquidation 5211. Total Asset Liquidation table 5211 lists all of the client's and spouse's assets per the Fact Finder, and indicates how much of each asset would need to be liquidated to cover the estate costs. Table 5211 contains the following columns of data for each asset: Asset (description) 5212, Key Asset? 5213, Amount (value per Fact Finder) 5214, Transfer Costs (i.e., liquidated portion of asset) 5215, (Amount) Transferred 5216. Totals for Amount 5217, Transfer Costs 5218, and Transferred 5219 are shown at the bottom of table 5211.

Figure 53:
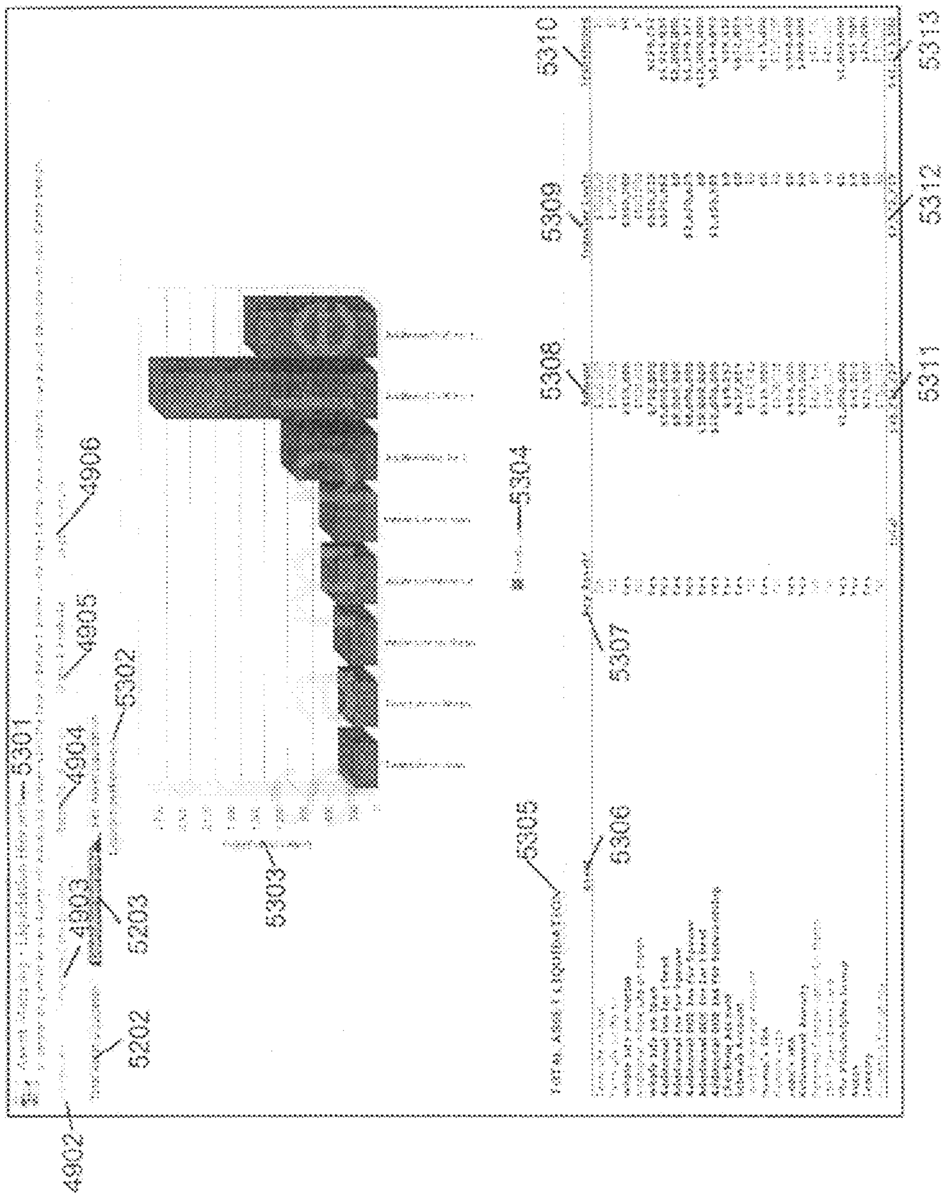

FIG. 53 illustrates when Liquidation Hierarchy tab 5203 is selected. An example of a Liquidation Hierarchy user interface 5301 is displayed. Liquidation Hierarchy 5302 bar chart may show a series of bars (in color, such as red), each depicting an asset lost 5304, in whole or in part, to meet estate costs. Y-axis 5303 displays dollars (in thousands) of assets lost. Below bar chart 5302 is table Total Asset Liquidation 5305. Table 5305 lists all of the client's and spouse's assets per the Fact Finder, and indicates how much of each asset would need to be liquidated to cover the estate costs. Table 5305 may contain the columns of data for each asset: Asset (description) 5306, Key Asset? 5307, Amount (value per Fact Finder) 5308, Transfer Costs (i.e., liquidated portion of asset) 5309, (Amount) Transferred 5310. Further, totals for Amount 5311, Transfer Costs 5312, and Transferred 5313 may be shown at the bottom of the table.

Figure 54:
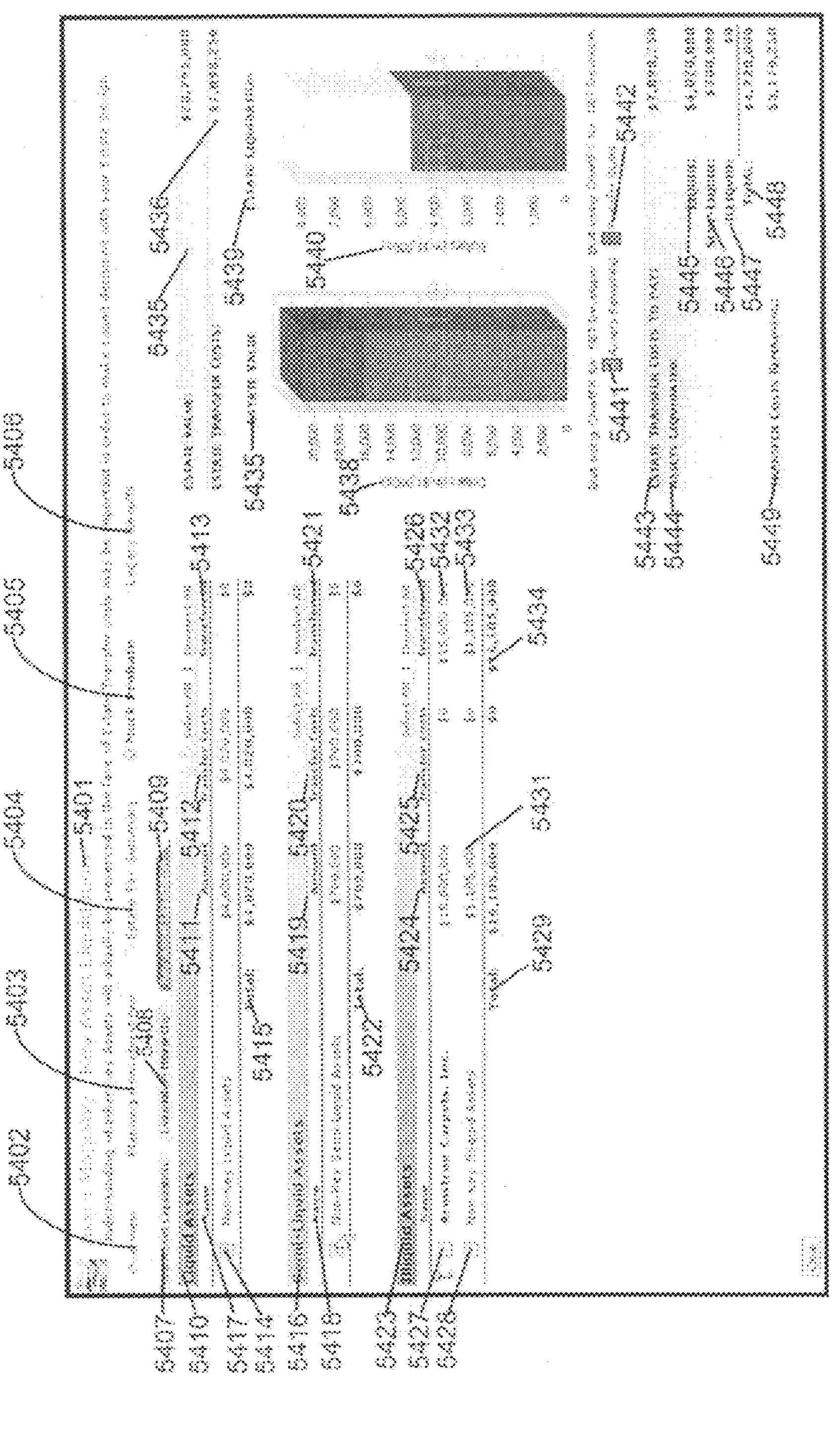

FIG. 54 demonstrates examples of wealth shifting options of the estate. The client can determine whether the value today will be enough to cover the key asset many years down the road. Under Asset Mapping-Key Asset Liquidation user interface 5401, a menu across the top of the user interface will direct the user to information regarding asset liquidation and how that affects their estate. For example, a menu can have Overview option 5402, a Planning Considerations option 5402, an Estate Tax Summary option 5404, a Mock Probate option 5405 (Currently shown as selected) and a Legacy Results option 5406. Under Mock Probate option 5405, a user is directed to multiple tabs which house information regarding asset liquidation. For example, Mock Probate option 5405 can have Total Asset Liquidation tab 5407, a Liquidation Hierarchy tab 5408, and a Key Asset Liquidation tab 5409. Under Total Liquid Asset tab 5407, a table displays information regarding the user's total liquid assets. The table may include columns for the Name 5410 of any Liquid Assets, which includes rows for Non-key Liquid Assets 5414, a column for Semi-Liquid Assets 5416, which includes rows for Non-Key Semi-Liquid Assets 5449, and a column for Illiquid Assets, which includes rows for Non-key Illiquid Assets 5428, or other individual Illiquid assets, such as Armstrong Carpets 5427, as shown in this example. The table for all liquid assets can have columns for the Amount of any asset 5411, the Transfer Costs for any asset 5412, and the Amount Transferred 5413, as well as provide the Total 5415 for all liquid asset columns. The table for all semi-liquid assets can have columns for the Amount of any asset 5419, the Transfer Costs for any asset 5412, and the Amount Transferred 5421, as well as provide the Total for all semi-liquid columns. The table for all illiquid assets can have columns for the Amount of any asset 5424, the Transfer Costs for any asset 5425, and the Amount Transferred 5426, as well as provide the Total 5429 for all Illiquid Asset columns. The Asset Mapping Mock Probate user interface 5401 can also graphically represent The Estate Value and predicted estate transfer costs to aid in a user's decisions to liquidate assets in order to pay for Estate Transfer Costs. For example, a field for Estate value 5435 can be graphically represented in graph 5437 which shows dollar (in thousands) in the Y-axis 5438 of both the Assets remaining 5441 and Transfer costs 5442. Comparatively, a graphical representation of the Estate Liquidation 5439 displays dollars (in thousands) along the Y-axis 5438 of the Transfer costs 5442. A summary of the Estate Transfer costs to Pay 5443 is represented as a Total 5448 of the Transfer Costs of the Liquid Assets 5445, plus the Transfer Costs of the Semi-Liquid Assets 5446, and the Transfer Costs of any Illiquid Assets. The summary then subtracts the total transfer costs from Asset Liquidation 5448 from the total Estate Transfer Costs to Pay 5443 in order to determine the total Transfer Costs Remaining after asset liquidation. In this example, a user has approximately $4,000,000 in Non-Key Liquid Assets, of which approximately $4,000,000 is counted towards estate Transfer costs. A user also has approximately $700,000 in Non-key Semi-liquid Assets, of which approximately $700,000 is counted towards estate Transfer Costs. Finally, a user also has approximately $16,000,000 in illiquid Assets, of which is not counted towards Transfer Costs of the estate, and all $16,000,000 is capable of being transferred to heirs. The total estate value is approximately $21,000,000, and the total Estate Transfer Costs are approximately $8,000,000. The graphical representation shows that although there is approximately $5,000,000 in liquid or semi-liquid assets capable of being applied to Estate Transfer Costs, the user will still have to account for an additional $3,000,000 in transfer costs in order to transfer the estate properly.

Figure 55:
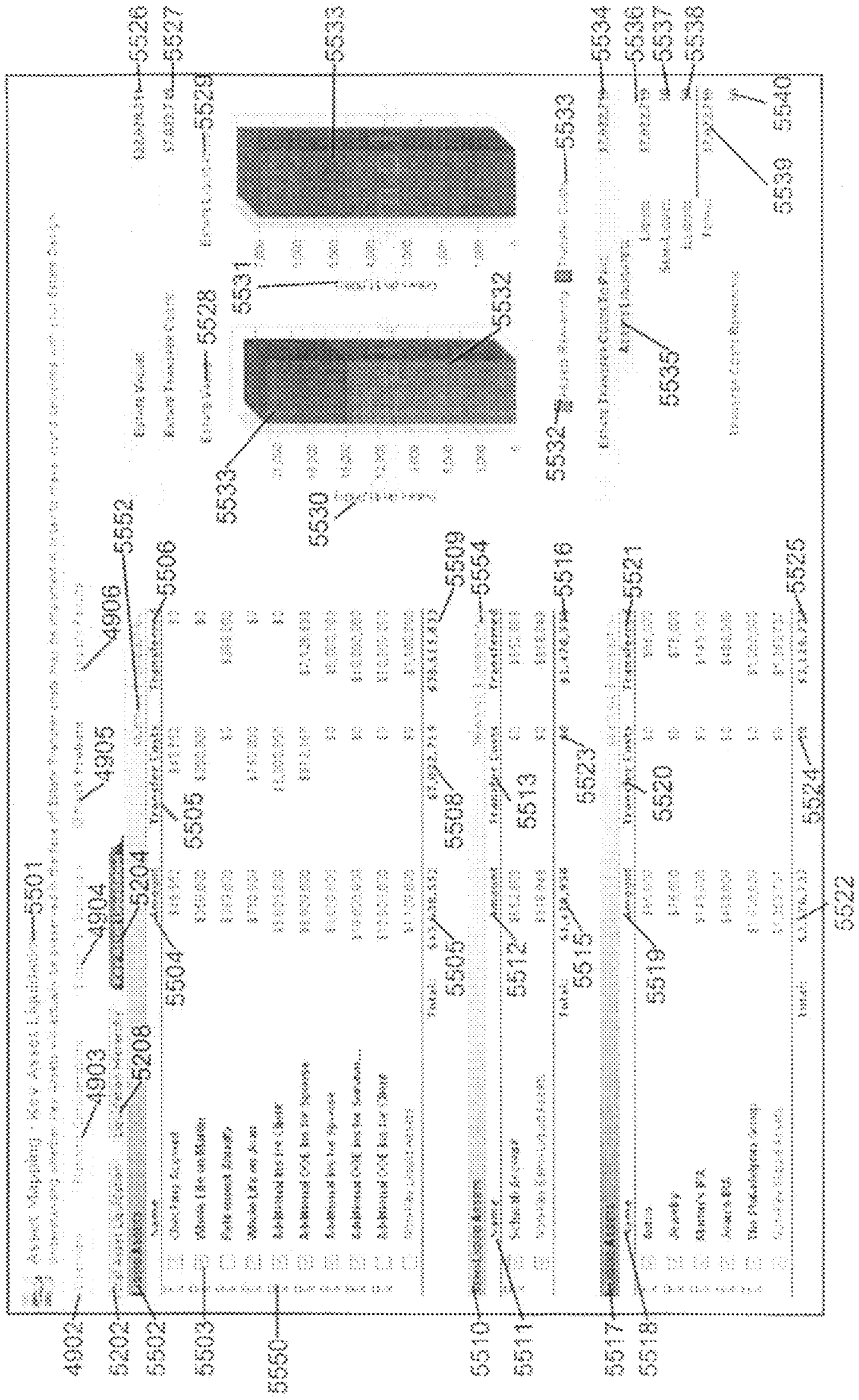

FIG. 55 illustrates when Key Asset Liquidation tab 5204 is selected. A Key Asset Liquidation user interface 5501 is displayed. The Key Asset Liquidation user interface 5501 allows the user to explore alternative asset liquidation scenarios, outside of the standard LBS liquidation order. The left side of the page contains a list of the client's asset value totals (per the Fact Finder) categorized as follows: Liquid Assets table 5502, Semi-Liquid Assets table 5510, and Illiquid Assets table 5517. Key assets may be identified by a key icon or symbol 5550 and are displayed individually. Non-key assets are simply included in the grouped totals. For assets listed under Liquid Assets table 5502, columns of data for each asset representing Amount 5504, Transfer Costs 5506, and Transferred 5506 are listed. Totals for Amount 5507, Transfer Costs 5508 and Transferred 5509 may be shown along the bottom of the table. For assets listed under Semi-Liquid Assets table 5510, columns of data for each asset representing Amount 5512, Transfer Costs 5513, and Transferred 5514 may be listed. Totals for Amount 5515, Transfer Costs 5516 and Transferred 5517 may be shown along the bottom of the table. For assets listed under Illiquid Assets table 5517, columns of data for each asset representing Amount 5519, Transfer Costs 5520, and Transferred 5521 may be listed. Totals for Amount 5522, Transfer Costs 5523 and Transferred 5524 may be shown along the bottom of the table. Liquidity may be determined as follows:

| Category | Assets Included |
|---|---|
| Liquid | Life Insurance death benefit, Savings, and Annuities (Fixed and Variable) |
| Semi-Liquid | Investment Accounts, 529 Plans, Stock Options/Grants, and Notes Receivable |
| Illiquid | Personal Property, Retirement Accounts, Real Estate, and Business Interests |

Key Asset Liquidation user interface 5501 may have Estate Value 5526 and Estate Transfer Costs 5527 banners along the top, right-hand portion of the user interface. Below the banners may be two bar charts depicting the following: Estate Value/Assets Remaining 5528, and Estate Liquidation/Transfer Costs 5529. Y-axis 5530 and 5531 represent dollars (in thousands). When the user first accesses this page for a client, the Estate Value/Assets Remaining 5528 chart may be all a single color (e.g. blue), and the Estate Liquidation/Transfer Costs bar 5529 may be all a second color (e.g. white). The user may then select various assets to liquidate by selecting the checkbox 5503 to the left of the assets/groups he or she wants to liquidate. As each asset/group is checked, the system updates the bar charts as follows: Estate Value/Assets Remaining 5528: A section 5533 is added to the top of the bar (which may be displayed in third color (e.g. red) representing transfer costs associated with the liquidation of that asset, and expands as each asset/group is selected for liquidation. The assets remaining 5532 (which may be displayed in another color (e.g. blue) of the chart depicts the assets remaining in the estate. Further, as a user selects various assets to liquidate by selecting the checkboxes 5503 to the left of the assets/groups he or she wants to liquidate, a section 5533 is added to the bottom of the Estate Liquidation/Transfer Costs bar, expands as each asset/group is selected for liquidation. The 5533 portion of the chart depicts the portion of the transfer costs that still must be met. A summary section below may display the following totals: Estate Transfer Costs to Pay 5534, Assets Liquidated 5535, including Liquid 5536, Semi-Liquid 5537, Illiquid 5538, a total of all Assets Liquidated 5539, and any Transfer Costs Remaining 5540. A Select All link 5552 in each category may select all checkboxes in that category. The Unselect All link 5554 in each category may unselect all checkboxes in that category. A Clear button (NOT SHOWN) at the bottom of the page will restore the entire display to the original default values.

Figure 56:
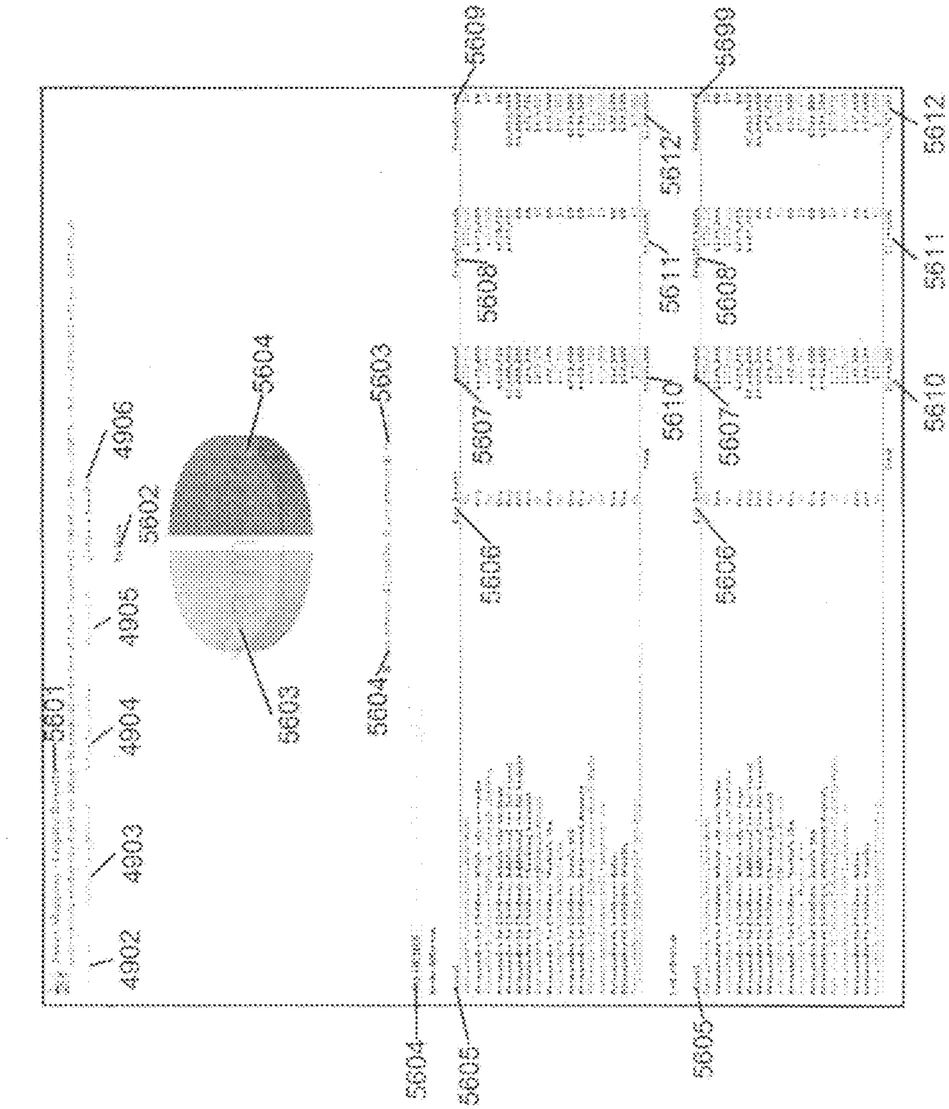

FIG. 56 demonstrates when Legacy Results tab 5205 is selected. An example of A Legacy Results user interface 5601 may be displayed. The Legacy Results user interface 5501 illuminates how understanding whether Key Assets will actually be preserved in the face of Estate Transfer costs may be important in order to make sound decisions with one's Estate Design. The Legacy Results user interface may contain a pie chart To Heirs 5602 depicting the distribution of the post-tax estate value to the heirs, with one pie slice 5603, 5604 per heir. To Heirs chart 5602 may only include heirs that are lineal family members of the client/spouse. (Lineal family members include parents, children, and grandchildren, but not siblings, aunts, uncles, nieces, nephews, cousins, business partners, etc.). A legend 5604, 5603 under the pie chart shows the dollar amount represented by each slice.

Below the bar chart may be a table titled To Heirs 5604. The table may include one section per heir. Each section may list all of the client's and spouse's assets per the Fact Finder, and indicates how much of each asset may need to be liquidated to cover the estate costs and the remaining asset value that may be transferred to the heir. The table may contain the following columns of data for each asset for each heir: Asset (description) 5605, Key Asset? 5606, Amount (value per Fact Finder) 5607, Transfer Costs (i.e., liquidated portion of asset) 5608, (Amount) Transferred (to heir) 5609. Totals for Amount 6410, Transfer Costs 6411, and Transferred 6412 may be shown at the bottom of the table.

Wealth Shifting

Figure 57:
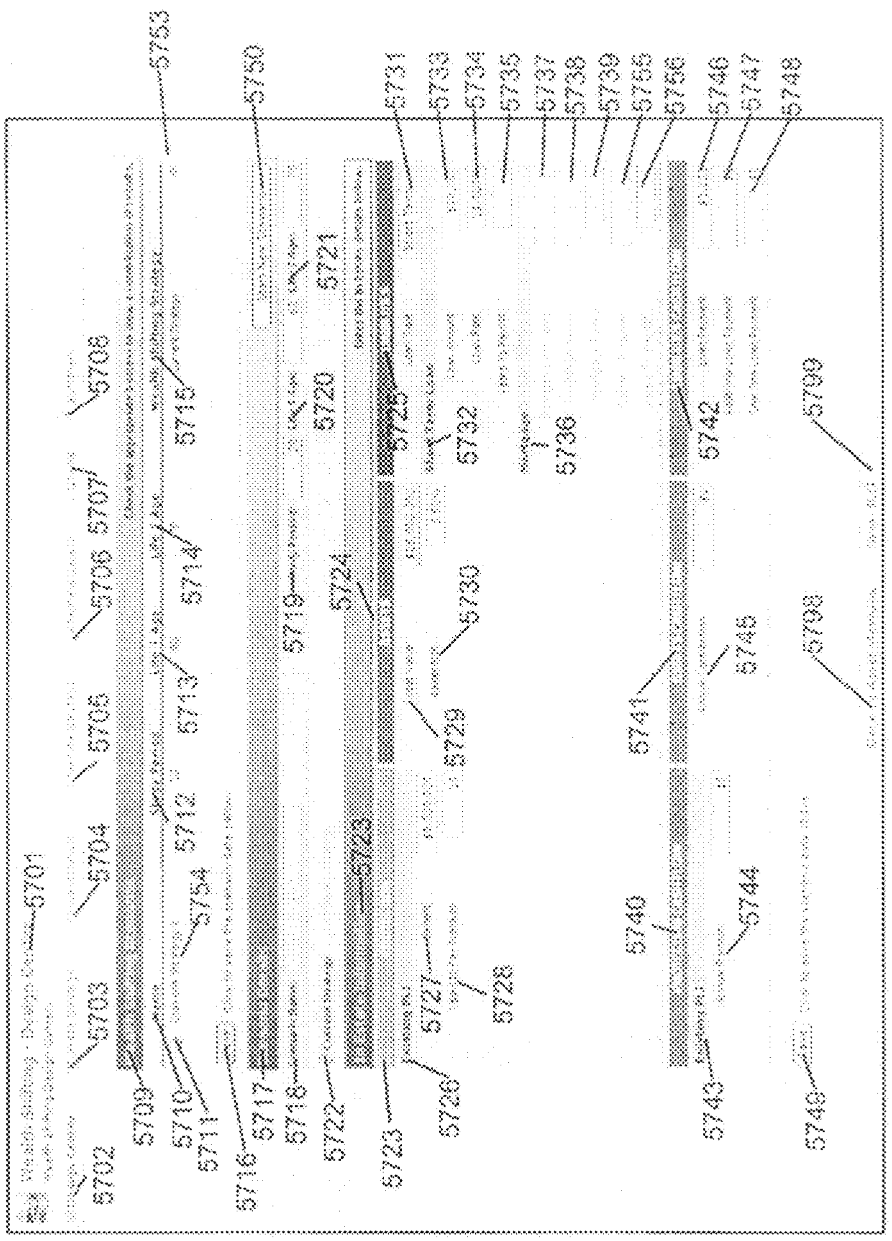

FIG. 57 demonstrates an example user interface when the user selects the Wealth Shifting link 1128 navigation bar in the Estate module 1105 (FIG. 11). Wealth Shifting User interface 1128 allows the agent to illustrate and compare various hypothetical wealth shifting scenarios for estate planning. The user can view a summary or details of one scenario or a composite of multiple scenarios. For each scenario, the user can define a Current Strategy and/or an Alternate Strategy, to show how the same cash flow can yield very different Net Worth and Protection results that affect the client's estate value. The Wealth Shifting user interface 1128 can include seven pages, each accessible via links across the top of the page including Design Center 5702, Current Strategy 5703, Current Details 5704, Alternate Strategy 5705, Alternate Details 5706, Charts 5707, and Summary 5708. Design center, 5702 (shown as currently selected) displays a Design Center user interface 5701. The design center user interface 5701 allows a user to add, edit, delete, and select/deselect hypothetical cash flow scenarios. For each scenario, the user can define a current strategy, an alternate strategy, and/or a retirement strategy to compare the cash flow implications of two similar strategies, and also see how distributions during retirement can affect cash flow. Design Center user interface 5701 can allow the user can create, edit, delete, and select/deselect wealth shifting scenarios to view and compare. Scenarios that have already been created and saved are listed at the top of the page under a Wealth Shifting Scenarios section 5709. A table under section 5709 may contain the following columns of data: Name 5711, Study Period 5712, Life 1 Age 5713, Life 2 Age 5714, and Wealth Shifting Strategy 5715. Each scenario has two strategy pages—Current Strategy and Alternate Strategy. If a user wishes to add a new scenario, a user needs to input data into Scenario Name 5718, Study Period 5719, Life 1 Age 5720 and Life 2 Age 5721 fields. A user may then select the Start New Scenario button 5750 to add the scenario to wealth Shifting Scenario section 5709. The user can enter or edit the details for each available strategy by clicking the radio button 5773 for the strategy he or she wants to work with. If a user wishes to create a strategy, a user needs to enter information into a Scenario Name 5718, Study Period 5719, Life 1 Age 5720, and Life 2 Age 5721 fields in a Scenario Details 5717 section. A user may then enter information regarding the scenario in the In Estate Information 5723 section. Under In Estate Information 5723 there may be information fields relating to Protection 5723, Assets 5724, Liabilities 5725, Protection Cash Flow 5740, Assets Cash Flow 5741, and Liabilities Cash Flow 5742 sections. A user can enter information regarding PLI under an Existing PLI 5726 section, which allows data entry for the Total Benefit 5727 and the Years to Pay Premium 5728 Sections. Under Protection Cash Flow section 5740, a user can enter annual costs for existing life insurance policies under an Existing PLI 5742 section, which includes a field Annual Premium 5744. A user can then enter asset information regarding Asset Value 5729 and Asset Rate of Return (RoR) 5730 sections. A user can also enter any liquidity necessary for funding assets under Asset RoR 5745 section. A user can then enter liabilities information regarding loan type drop down menu 5731.

Under Assets Cash Flow section 5741, a user can enter annual costs for existing life insurance policies under an Existing PLI 5742 section, which includes a field Annual Premium 5744. A user can then enter any short term loans under a Short Term Loans 5732 section, which includes fields for Loan Amount 5733, Loan Rate 5734, and Years to Payoff 5735. A user can then enter any mortgage information under a Mortgage 5736 section, which can include fields for Mortgage Amount 5737, Mortgage Term 5738, Mortgage Rate 5739, Current Balance 5738 and Years to Payoff 5739. Under Liabilities Cash Flow section 5742, a user can enter annual costs for liabilities such as Loan Payment 5746, Additional Loan Payment 5747, and One Time Loan Payment field 5748. The user can view the current strategy, current details, alternate strategy, alternate details, chart, or summary for one or more scenarios at a time. The user selects the scenarios to be viewed by checking the boxes 5711 next to the scenarios he or she wants to view, and then clicking the Select Scenario(s) button (NOT SHOWN). Once the scenarios of interest have been selected, the agent can use the links at the top of the page to view the current or alternate strategy or details. When multiple scenarios are selected, the numbers that appear in the current and alternate strategies and details will be a composite of all the scenarios selected (that is, the total sum for each category for all selected scenarios). When multiple scenarios are selected, the Study Period 5719, Life 1 Age 5720, and Life 2 Age 5721 (if applicable) must be the same for all selected scenarios. If nothing was changed in the Alternate Strategy in the Design Center, or if Strategy Type=Current Strategy (where Alternate Strategy inputs cannot be entered), then the displays for Alternate Strategy and Alternate Details will be identical to the displays for Current Strategy and Current Details, respectively. To edit an existing scenario, the agent can select the scenario by clicking the link 5754 for that scenario at the top of the page. This will populate the input fields with the previously entered data for that scenario. To save changes to a scenario, the user will need to click the Save button 5716 or 5749 after editing. Importantly if Current Strategy is selected in the Strategy Type 5715 drop-down when a scenario is created, an Alternate Strategy cannot be added for that scenario. For gifting, the system may use the designated Cash Flow. If no Cash Flow, then takes from Asset Value. If Liabilities have been entered in the Design Center user interface 5701, the estate tax will be based on the net worth of estate (i.e., asset value–remaining loan/mortgage amount). The user can delete an existing scenario by clicking the "X" 5753 next to the scenario name in the list at the top of the page. Additionally, the user can also navigate to other areas of the navigation bar (see FIG. 11) by selecting Back to Asset Mapping 5798 or Next: ILIT 5799 buttons via the Workflow Wizard.

Figure 58:
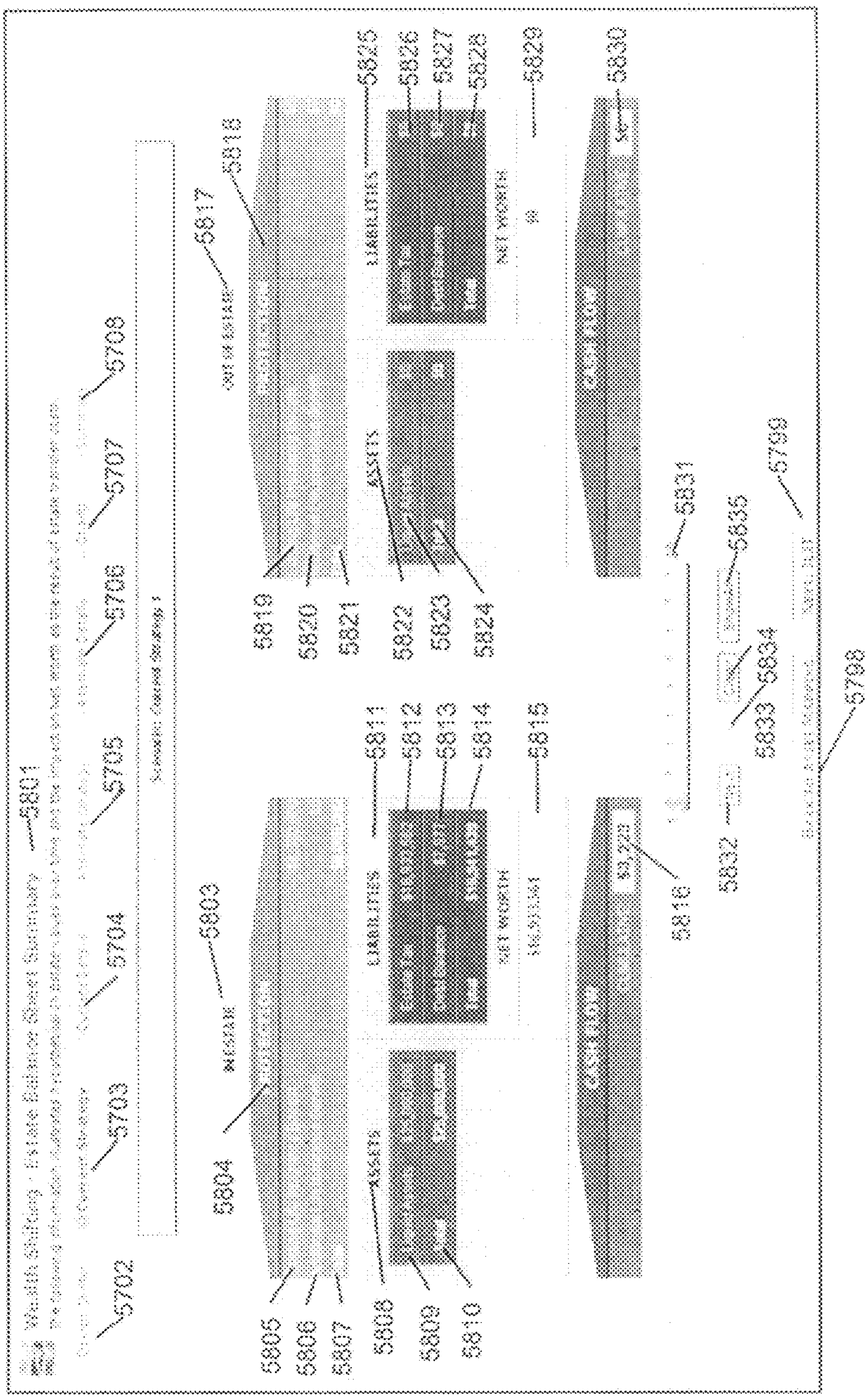

As shown in FIG. 58, Current Strategy 5703 reveals an example of a summary of the currently selected scenario(s) in the form of a mini-Living Balance Sheet reflecting the current strategy inputs in the Design Center 5702. A multi-click display enables the user to discuss the strategy with a step-by-step approach, if desired. The Current Strategy page may show two mini-Living Balance Sheet replicas. A box at the top of the page can shows the scenario's name (for example, "Savings 1 Scenario." If multiple scenarios were selected, the box may contain the text "Composite Scenario". When the user first arrives on the Current Strategy page for the first time for a scenario, no values are displayed. The user can click the Next button 5832 repeatedly to display the values in the following eight-click sequence:

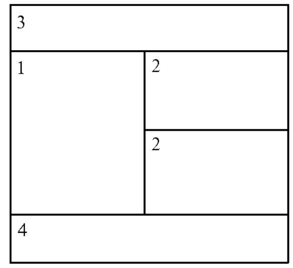

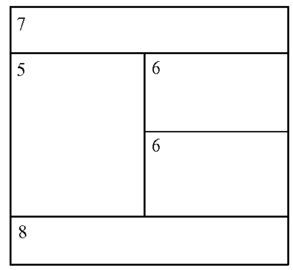

The Previous 5833 button will take the click sequence back one step. Show All 5835 will display all values with a single click. Clear 5834 button will clear all values. When all values are displayed, the fully populated Current Strategy page may show totals for Protection, Assets, Liabilities, Net Worth, and Cash Flow for the present year—not including first year taxes (on the left) and at the end of the study period (on the right) using the Current Strategy data that was entered for the selected scenario(s) in the Design Center. For example, a header "Scenario: Current Strategy 1" 5802 shows a mini-balance sheet summary for In Estate 5803 and Out of Estate 5817 data. Both In Estate 5803 and Out of Estate 5817 sections may provide information related to Protection 5803, 5818, providing values for Existing Life Insurance Benefit 5805, 5819, Additional Life Insurance Benefit 5806, 5820, and Totals 5807, and 5821 respectively. Further, both In Estate 5803 and Out of Estate 5817 sections may provide information related to Assets 5808, 5822, providing Liquid Assets 5809, 5823 and totals for all Assets 5810, 5824, respectively. Both In Estate 5803 and Out of Estate 5817 sections may provide information related to Liabilities 5811, 5825, providing values for Estate Tax 5812, 5826, Debt Balance 5813, 5827, and Totals 5814, and 5829 respectively. Further, both In Estate 5803 and Out of Estate 5817 sections may provide information related the estimated Net Worth 5815, 5829 and the estimated Cash Flow 5816, and 5830 for the selected Strategy 5802. Importantly, the Assets 5808, 5822 value may represent the beginning-of-year value, while the Estate Tax 5721, 5825 may be based on 50% of the end-of-year asset value. Additionally, the user can view a prediction of these values estimated for the selected scenario for any year within the study period by adjusting sliding bar 5831. The user can also navigate to other areas of the navigation bar (see FIG. 11) by selecting Back to Asset Mapping 5798 or Next: ILIT 5799 buttons.

Figure 59:
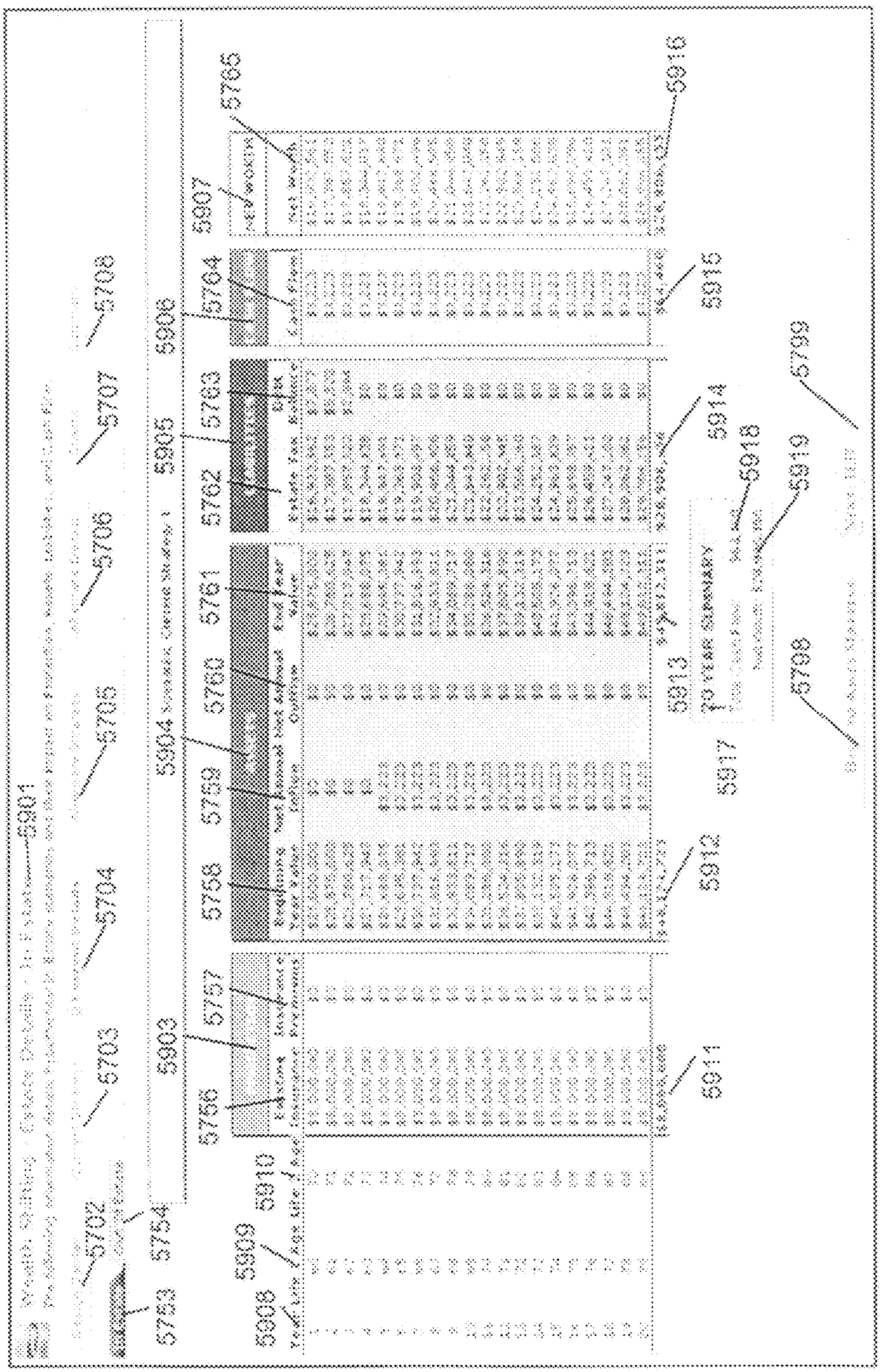

FIG. 59 demonstrates an example of a Current Details user interface 5901 when Current Details 5704 is selected from the menu in FIG. 57. As shown in FIG. 59, Current Details 5704 allows a user to view the cash flow details of the currently selected scenario(s) in a tabular numeric format reflecting the current strategy inputs in the Design Center. The Current Details page may contain tables of data showing the following totals the selected scenario(s) for each year of the study period, using the Current In Estate Strategy data that was entered for the selected scenario(s) in the Design Center. A box 5902 at the top of the page shows the scenario's name (for example, "Scenario: Lifetime Exemption 1"). If multiple scenarios were selected, all selected scenarios may be listed (for example, "Scenarios: Current Strategy 1, Lifetime Exemption 1"). The user can see the details for In Estate 5753 or Out of Estate 5754 by selecting the corresponding tab. A table corresponding to Year 5908 can provide the year of the study period, Life 1 Age 5909 provides Life 1 Age during each year of the study period, and Life 2 Age 5910 provides Life 2 Age during each year of the study period. A Protection 5903 column can include specific columns for Existing Insurance 5756, e.g., the total death benefit of all existing in-estate life insurance (Note: This column may display only if at least one year's value is greater than $0) and Insurance Premiums 5757 providing total annual premiums of all existing in-estate life insurance. An Assets 5904 column may include specific columns for Beginning Year Value which reflect the first year Beginning Year Value=initial asset value. Each subsequent Beginning Year Value=previous year's End Year Value. A column for Net Annual Inflow 5759, which may provide the Annual Asset Contribution plus the savings from paid off liabilities, Net Annual Outflow which may provide the total annual premiums, and End Year Value 5761 may be displayed. End Year Value 5761 may provide calculations for Until Liabilities paid off by calculating this year's Beginning Year Value+((this year's Beginning Year Value+this year's Annual Inflow−this year's Net Annual Outflow)*Asset Return Rate)+this year's Annual Inflow−this year's Net Annual Outflow. End Year Value 5761 may provide values for after Liabilities paid off by calculating this year's Beginning Year Value+((this year's Beginning Year Value+this year's Annual Asset Contribution−this year's Net Annual Outflow) *Asset Return Rate)+(Net Annual Inflow−Annual Asset Contribution). A Liabilities 5905 column may include specific columns for Estate Tax 5762 which reflects 50% of (Existing Insurance+End Year Value−Debt Balance), and Debt Balance 5763. For short-term Debt Balance the values may reflect: Debt Balance=previous year's Debt Balance+(last year's Debt Balance*Loan/Mortgage Rate)−(loan payment). For mortgages, debt Balance may reflect: Debt Balance=previous year's Debt Balance+(last year's Debt Balance* Loan/Mortgage Rate)−(loan payment*12). A Cash Flow 5906 column may include a specific column Cash Flow 5764 which may provide Annual Contribution+Loan Payment. A Net Worth 5909 specific column may provides Net Worth 5756 which reflects Existing Insurance+End Year Value−Estate Tax−Debt Balance. Total for Existing Insurance 5911, Beginning Year Value 5912, End Year Value 5913, Estate Tax 5914, Cash Flow 5915 and Net Worth 5916 may be provided. A summary box 5917 at the bottom of the page displays the Total Cash Flow 5918 and Net Worth 5919. The user can also navigate to other areas of the navigation bar (see FIG. 11) by selecting Back to Asset Mapping 5798 or Next: ILIT 5799 buttons via the Workflow Wizard.

Figure 60:
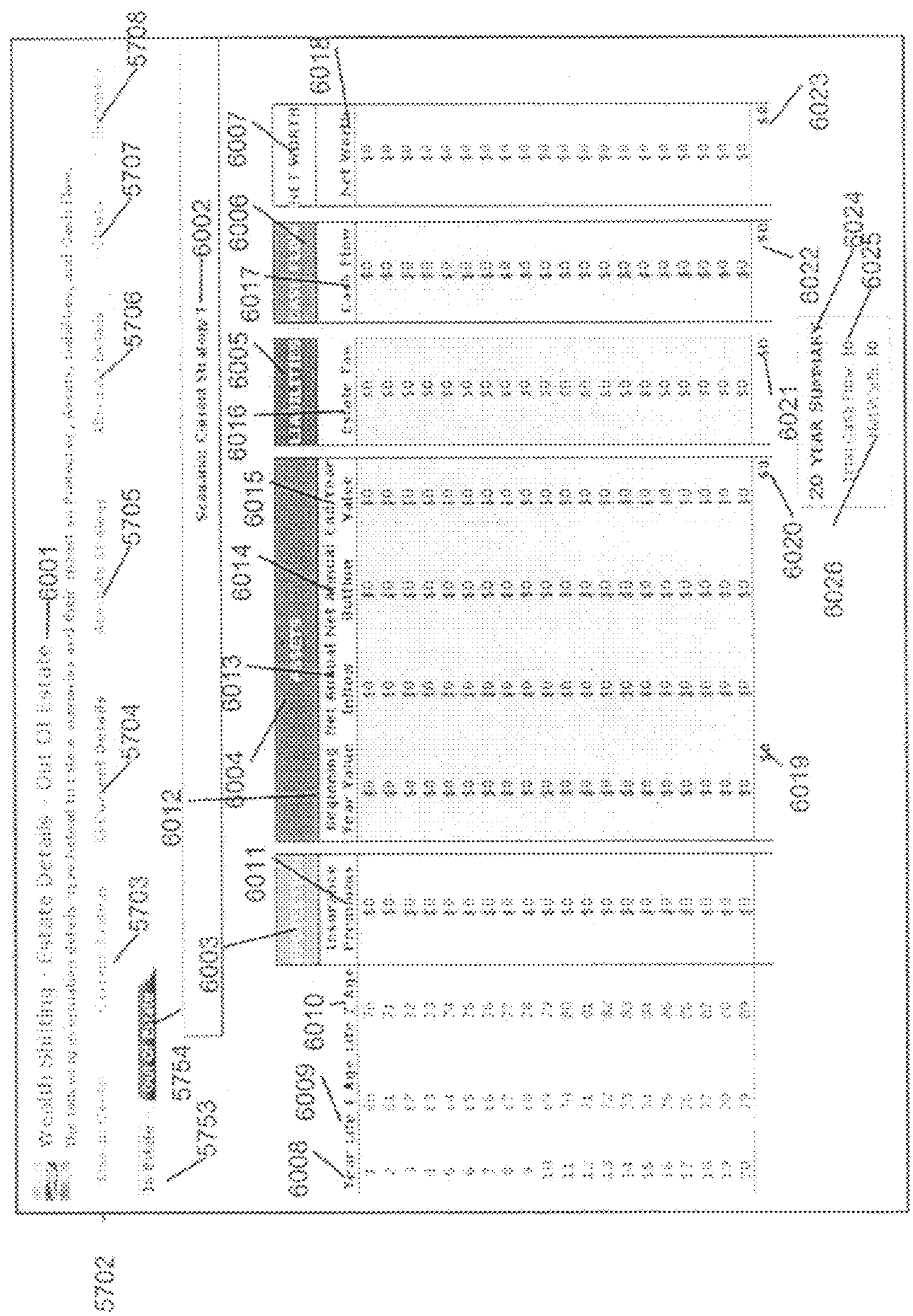

FIG. 60 illustrates an example of a Current Details user interface 6001 when Current Details 5704 is selected from the menu in FIG. 57. As shown in FIG. 60, Current Details 5704 allows a user to view the cash flow details of the currently selected scenario(s) in a tabular numeric format reflecting the current strategy inputs in the Design Center. The Current Details page may contain tables of data showing the following totals the selected scenario(s) for each year of the study period, using the Current Out of Estate Strategy data that was entered for the selected scenario(s) in the Design Center. A box 6002 at the top of the page may show the scenario's name (for example, "Scenario: Current Strategy 1"). If multiple scenarios were selected, all selected scenarios may be listed (for example, "Scenarios: Current Strategy 1, Lifetime Exemption 1"). The user can see the details for In Estate 5753 or Out of Estate 5754 (shown as selected) by selecting the corresponding tab. A table corresponding to Year 6008 may provide the year of the study period, Life 1 Age 6009 may provide Life 1 Age during each year of the study period, and Life 2 Age 6010 may provide Life 2 Age during each year of the study period. A Protection 6003 column may include specific columns for Insurance Premiums 6011. An Assets 6004 column may include specific columns for Beginning Year Value 6012, Net Annual Inflow 6013, Net Annual Outflow 6014, and End Year Value 6015. A Liabilities 6005 column may include specific columns for Estate Tax 6016, a Cash Flow 6006 column includes a specific column Cash Flow 6017, and a Net Worth 6007 specific column provides Net Worth 6018. Total for Beginning Year Value 6019, End Year Value 6020, Cash Flow 6022 and Net Worth 6023 may be provided. A summary box 6024 at the bottom of the page can display the Total Cash Flow 6024 and Net Worth 6026.

Figure 61:
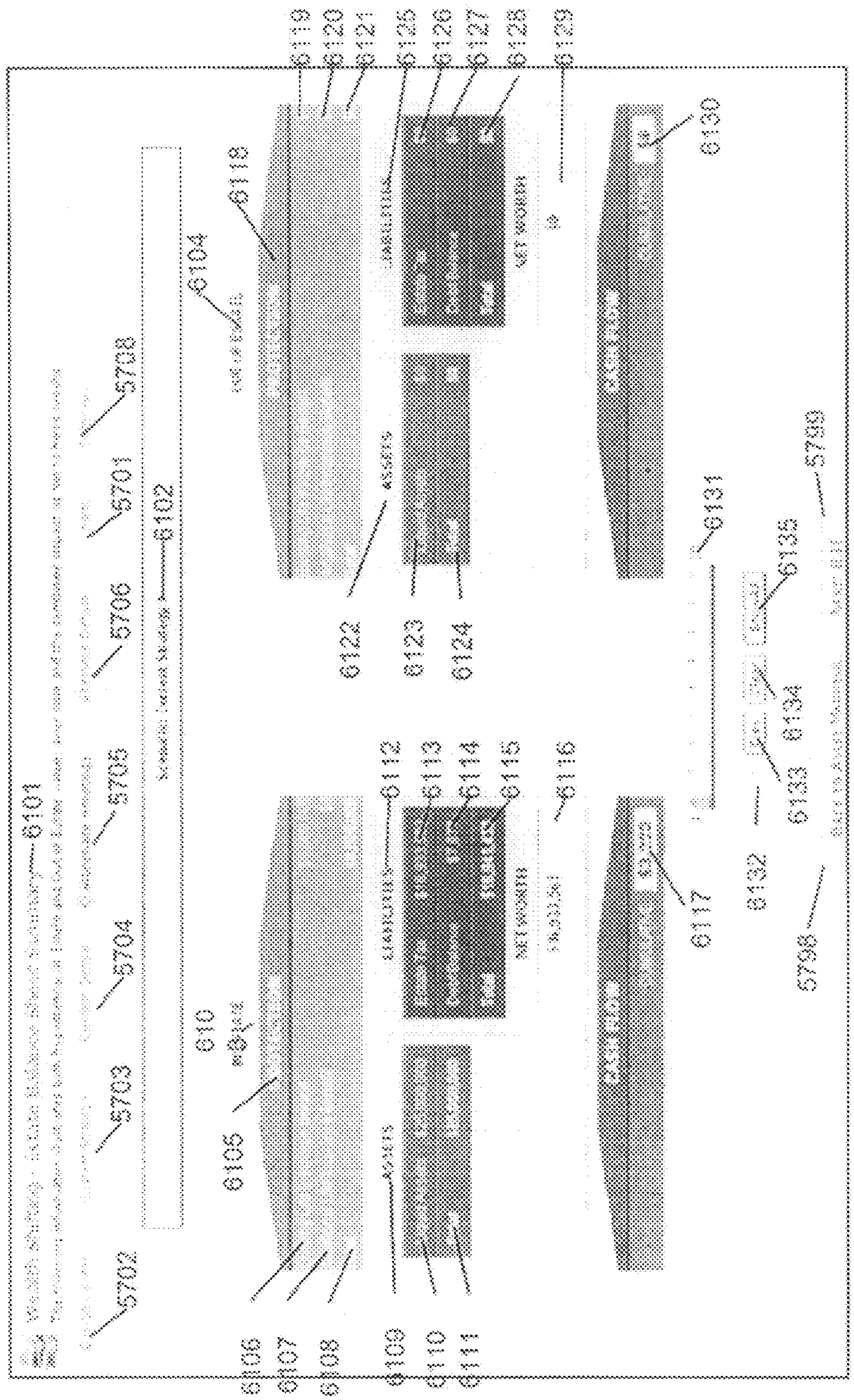

FIG. 61 demonstrates an example of an Alternate Strategy user interface 6101 when Alternate Strategy 5705 is selected from the menu in FIG. 57. Alternate Strategy user interface 6101 provides a summary of the currently selected scenario(s) in the form of a mini-Living Balance Sheet reflecting the current strategy inputs in the Design Center. A multi-click display enables the user to discuss the strategy with a step-by-step approach, if desired. The Alternate Strategy page may display two mini-Living Balance Sheet replicas. A box at the top of the page may display the scenario's name (for example, "Savings 1 Scenario"). If multiple scenarios were selected, the box may contain the text "Composite Scenario." When the user first arrives on the Alternate Strategy page for the first time for a scenario, no values may be displayed. The user can click the Next button 6132 repeatedly to display the values in the following eight-click sequence:

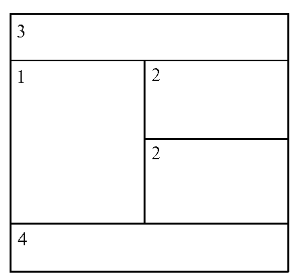

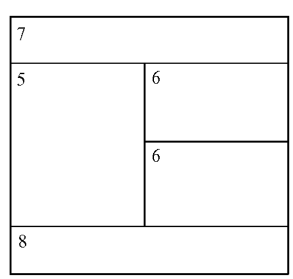

The Previous 6133 button may take the click sequence back one step. Show All 6135 button may display all values with a single click. Clear 6134 button may clear all values. When all values are displayed, the fully populated Alternate Strategy page may show totals for Protection 6103, 6104, Assets 6109, 6122, Liabilities, 6112, 6125, Net Worth 6116, 6129, and Cash Flow 6115, 6130 for the present year—not including first year taxes (on the left) and at the end of the study period (on the right) using the Alternate Strategy data that was entered for the selected scenario(s) in the Design Center user interface 5701 (FIG. 57). For example, a header "Scenario: Current Strategy 1" 6102 shows a mini-balance sheet summary for In Estate 6103 and Out of Estate 6104 data. Both In Estate 6103 and Out of Estate 6104 sections may provide information related to Protection 6105, 6118, providing values for Existing Life Insurance Benefit 6106, 6119, Additional Life Insurance Benefit 6107, 6120, and Totals 6108, and 6121 respectively. Further, both In Estate 6103 and Out of Estate 6104 sections may provide information related to Assets 6109, 6122, providing Liquid Assets 6110, 6123 and totals for all Assets 6111, 6124, respectively. Both In Estate 6103 and Out of Estate 6104 sections may provide information related to Liabilities 6112, 6125, providing values for Estate Tax 6113, 6126, Debt Balance 6114, 6127, and Totals 6115, and 6128 respectively. Further, both In Estate 6103 and Out of Estate 6104 sections may provide information related the estimated Net Worth 6116, 6129 and the estimated Cash Flow 6117, and 6130 for the selected Strategy 6102. Additionally, the user can view a prediction of these values estimated for the selected scenario for any year within the study period by adjusting sliding bar 6131. The user can also navigate to other areas of the navigation bar (see FIG. 11) by selecting Back to Asset Mapping 5798 or Next: ILIT 5799 buttons via the Workflow Wizard.

Figure 62:
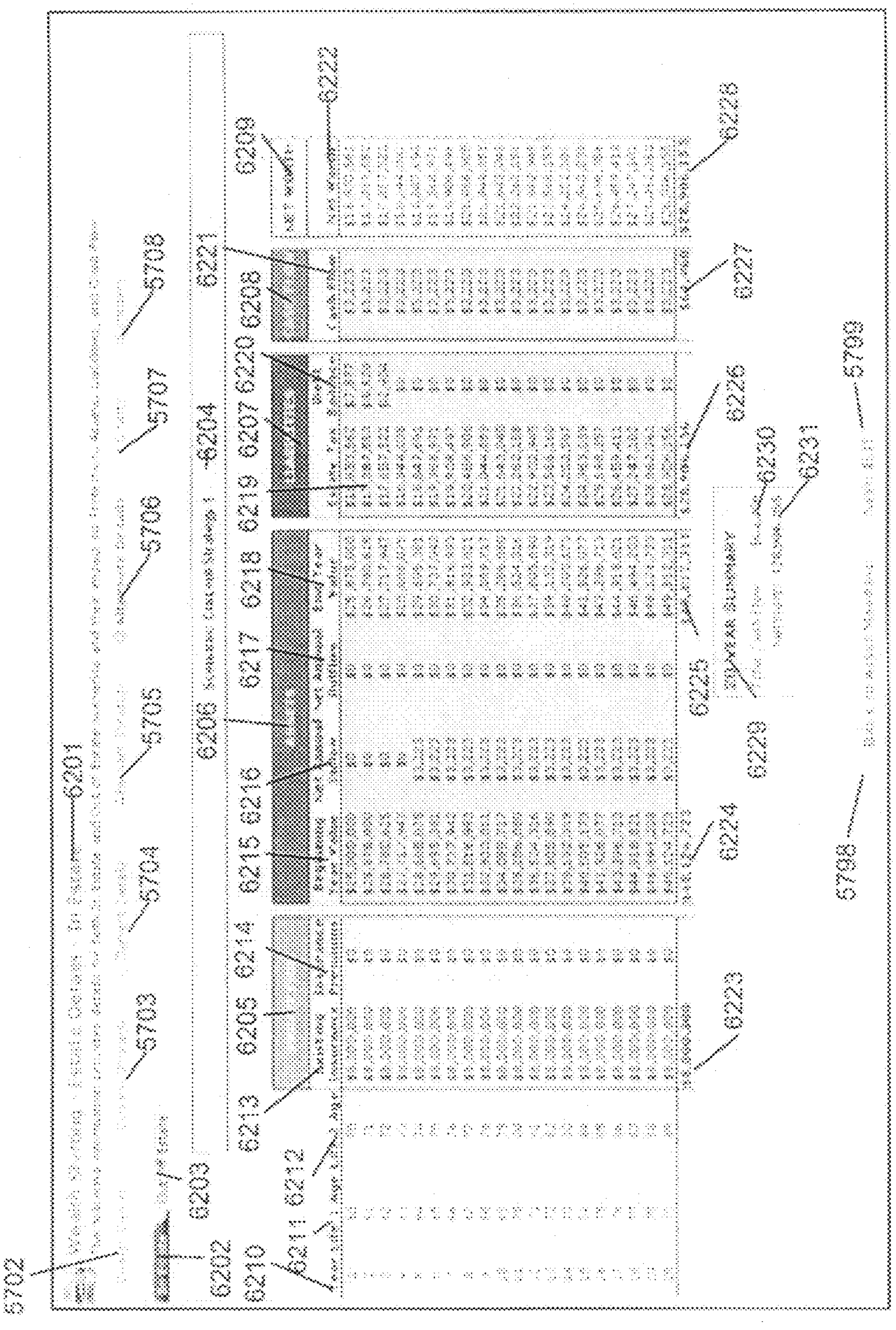

FIG. 62 demonstrates and example of an Estate Details—In Estate user interface 6201 when Alternate details 5706 is selected from the menu in FIG. 57. The Estate Details—In Estate user interface 6201 may allow the user to view the cash flow details of the currently selected scenario(s) in a tabular numeric format reflecting the current strategy inputs in the Design Center. The Alternate Strategy user interface 6201 may be identical to the Current Strategy user interface 6001 (see FIG. 60), except that the numbers shown may reflect the Alternate Strategy data that was entered for the selected scenario(s) in the Design Center, rather than the Current Strategy data. A box 6204 at the top of the page can show the scenario's name (for example, "Scenario: Current Strategy 1"). If multiple scenarios were selected, all selected scenarios may be listed (for example, "Scenarios: Current Strategy 1, Lifetime Exemption 1"). The user can see the details for In Estate 6202 (shown as selected) or Out of Estate 6203 by selecting the corresponding tab. A table corresponding to Year 6210 can provide the year of the study period, Life 1 Age 6211 provides Life 1 Age during each year of the study period, and Life 2 Age 6212 provides Life 2 Age during each year of the study period. A Protection column 6205 can include specific columns for Existing Insurance 6213, i.e. the total death benefit of all existing in-estate life insurance (Note: This column displays only if at least one year's value is greater than $0) and Insurance Premiums 6214 providing total annual premiums of all existing in-estate life insurance. An Assets 6206 column can include specific columns for Beginning Year Value 6215 which reflect the first year Beginning Year Value=initial asset value. Each subsequent Beginning Year Value=previous year's End Year Value. A column for Net Annual Inflow 6216, can provide the Annual Asset Contribution plus the savings from paid off liabilities, Net Annual Outflow 6217 which provides the total annual premiums, and End Year Value 6218. End Year Value 6218 can provide calculations for Until Liabilities paid off by computing: This year's Beginning Year Value+((this year's Beginning Year Value+this year's Annual Inflow−this year's Net Annual Outflow)*Asset Return Rate)+this year's Annual Inflow−this year's Net Annual Outflow. End Year Value 6218 can provide calculations for After Liabilities paid off by computing: This year's Beginning Year Value+((this year's Beginning Year Value+this year's Annual Asset Contribution−this year's Net Annual Outflow)*Asset Return Rate)+(Net Annual Inflow−Annual Asset Contribution). A Liabilities 6207 column includes specific columns for Estate Tax 6219 which reflects 50% of (Existing Insurance+End Year Value−Debt Balance), and Debt Balance 6220. For short-term Debt Balance the values can reflect: Debt Balance=previous year's Debt Balance+(last year's Debt Balance*Loan/Mortgage Rate)−(loan payment). For mortgages, debt Balance can reflect: Debt Balance=previous year's Debt Balance+(last year's Debt Balance* Loan/Mortgage Rate)−(loan payment*12). A Cash Flow 6208 column can include a specific column Cash Flow 6221 which provides Annual Contribution+Loan Payment. A Net Worth 6209 specific column can provide Net Worth 6222 which reflects Existing Insurance+End Year Value−Estate Tax−Debt Balance. Totals for Existing Insurance 6223, Beginning Year Value 6224, End Year Value 6225, Estate Tax 6226, Cash Flow 6227 and Net Worth 6228 can be provided. A summary box 6229 at the bottom of the page can display the Total Cash Flow 6230 and Net Worth 6231. The user can also navigate to other areas of the navigation bar (see FIG. 11) by selecting Back to Asset Mapping 5798 or Next: ILIT 5799 buttons via the Workflow Wizard.

Figure 63:
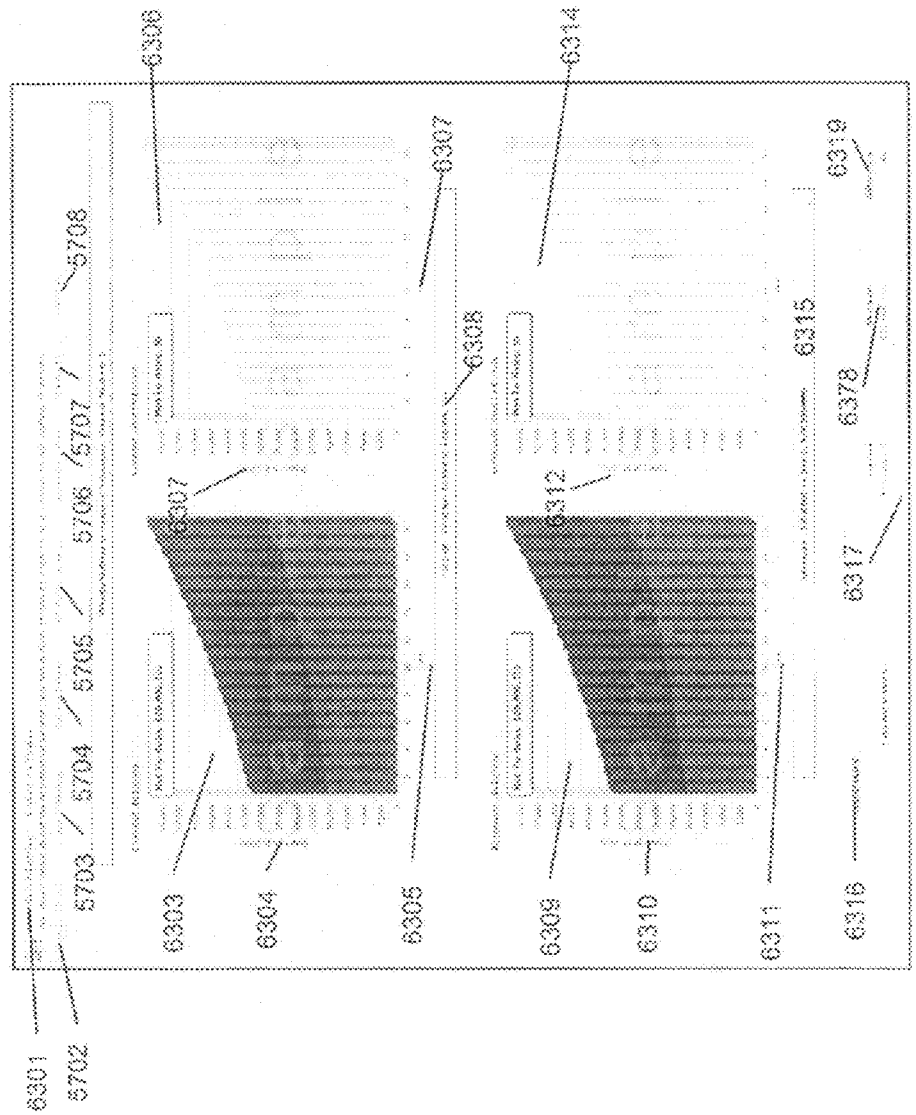

FIG. 63 illustrates an example of an Estate Charts user interface 6301 when Charts 5707 is selected from the menu in FIG. 57. Estate Charts user interface 6301 allows a user to view bar charts depicting Net Value Lifetime and Life Insurance Death Benefit for Current and/or Alternate Strategy. When the user clicks the "Charts 1" 5707 link, up to four bar charts can be displayed, depicting the following values respectively, year by year of the Study Period: 1) Current—In Estate: Net to Heirs 6303 which displays years along X-axis 6305, and dollars (in thousands) along Y-axis 6304; and 2) Current—Out of Estate: Net to Heirs 6306 displays years along X-axis 6320, and dollars (in thousands) along Y-axis 6307. Under the two Current bar charts, a box can display the Current—Total Net to Heirs 6308 value: (Current In Estate Net to Heirs+Current Out of Estate Net to Heirs). Additionally, charts Alternate—In Estate: Net to Heirs 6309 can display years along X-axis 6311, and dollars (in thousands) along Y-axis 6310; and 2) Alternate—Out of Estate: Net to Heirs 6314 can display years along X-axis 6313, and dollars (in thousands) along Y-axis 6312. Under the two Alternate bar charts, a box can display the Alternate−Total Net to Heirs 6313 value: (Alternate In Estate Net to Heirs+Alternate Out of Estate Net to Heirs). A summary section 6316 can display the Total Net to Heirs values as Current 6317, Alternate 6318, Difference 6319 (where Difference=the difference between the Current amount and the Alternate amount).

Figure 64:
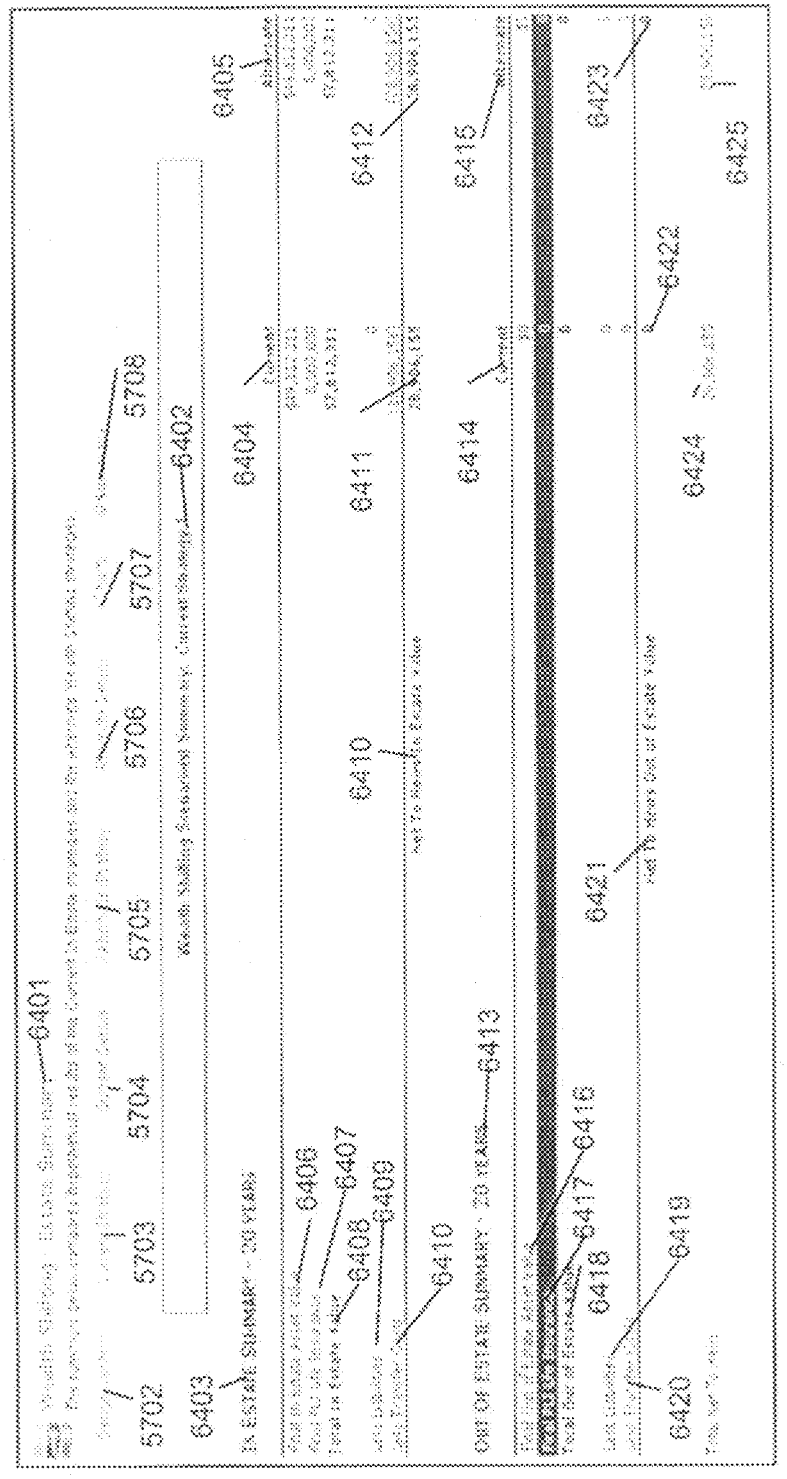

FIG. 64 demonstrates an example of an Estate Charts user interface 6301 when Charts 5707 is selected from the menu in FIG. 57. Estate Charts user interface 6301 allows a user to view a summary of the highlights for the Current and/or Alternate Strategy. When the user clicks the Summary 5708 link, an Estate Summary user interface 6401 can appear. A top section In Estate Summary—nn Years 6403 can show values for Final In Estate Asset Value 6406, Final PLI Life Insurance 6406, Total In Estate Value 6407 (reflecting the Final In Estate Asset Value+Final PLI Life Insurance), Less Liabilities 6409, and Less Transfer Costs that can all be displayed in both Current 6404 and Alternate 6405 columns. The Net to Heirs In Estate Value totals 6410 can also displayed in both Current 6411 and Alternate 6412 columns. Generally, the Net to Heirs In Estate Value equals the Total In Estate Value–Liabilities and Transfer Costs. A second section Out Of Estate Summary—nn Years: 6413 can show values for Final Out of Estate Asset Value 6416, Final PLI Life Insurance 6417, Total Out Estate Value 6418 (which equals Final Out of Estate Asset Value+Final PLI Life Insurance), Less Liabilities 6419, and Less Transfer Costs 6420 that can all be displayed in both Current 6414 and Alternate 6415 columns. The Net to Heirs Out of Estate Value totals 6421 can also be displayed in both Current 6422 and Alternate 6423 columns. Generally, the Net to Heirs Out of Estate Value equals the Total Out of Estate Value–Liabilities and Transfer Costs. Finally, the total Net to Heir can be displayed in both Current 6424 and Alternate columns 6425.

ILIT

Figure 65:
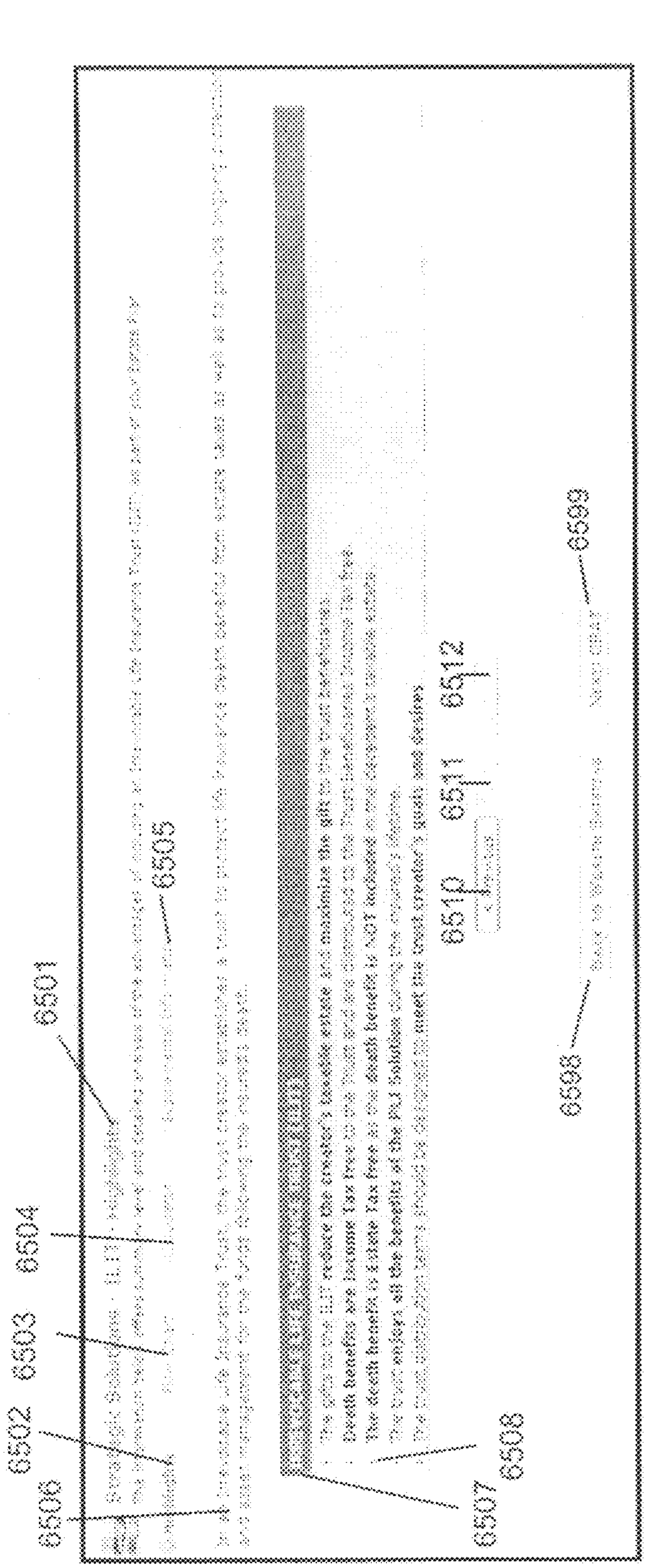

FIG. 65 illustrates an example of a user interface when the user selects the ILIT link 1130 navigation bar in the Estate module 1105 (FIG. 11). The ILIT user interface 6501 features may be presented on four pages, accessed by clicking the corresponding Highlights 6502, Flow Chart 6503, Calculator 6504, and Supplemental 6505 link at the top of the page. By selecting Highlights 6502 the Strategic Solutions—GRAT-Highlights user interface 6501 may be displayed. The information within the highlights section provides a summary level and detailed analysis of the advantages of including an ILIT as part of an Estate Plan. The Highlights user interface 6501 page may contain static text. When first displayed, only the introductory paragraph 6505 may appear, along with a first bullet item 6507 from the ILIT Section 6506. The user can click Next 6511 to display the next bullet item, one at a time. Show All 6512 will display all bulleted items. The Previous 6510 button will remove the most recently added bullet item.

Figure 66:
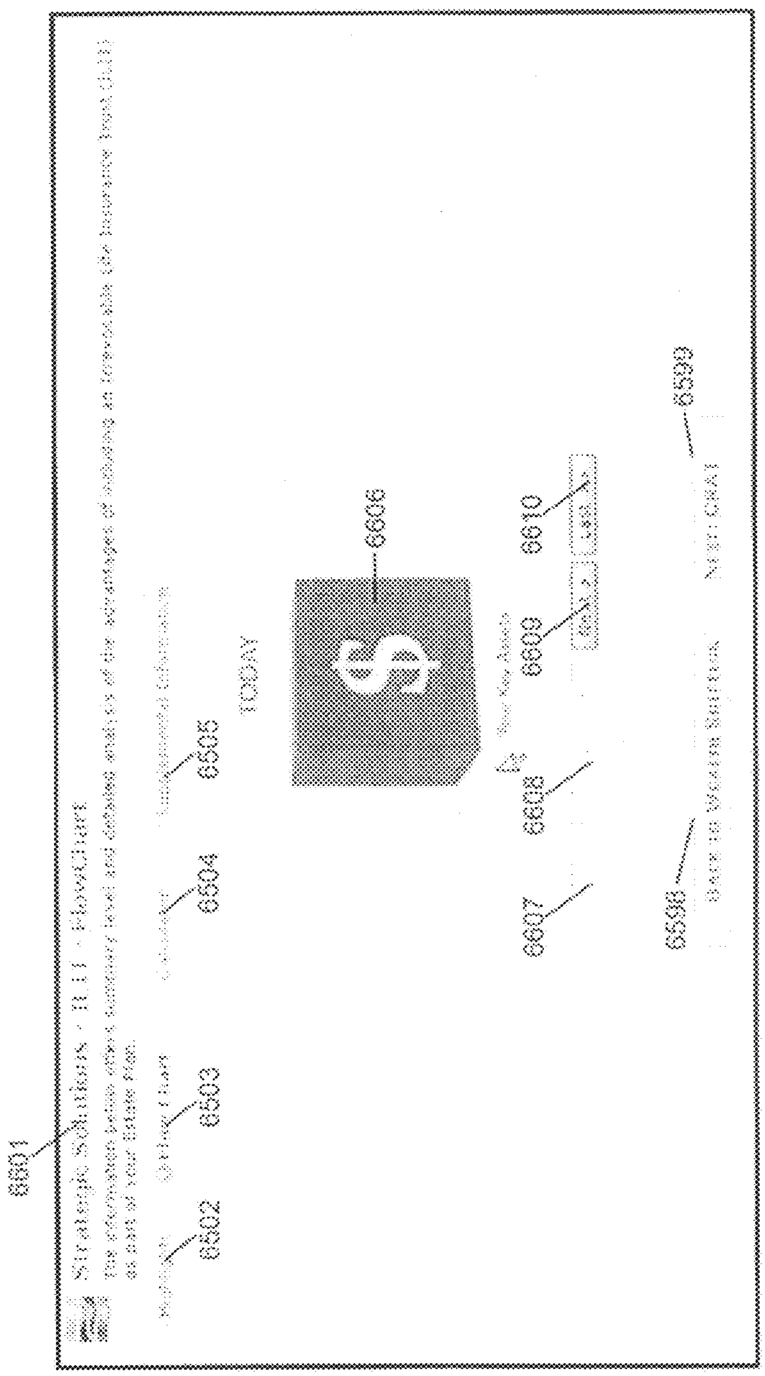

FIG. 66 illustrates an example of a user interface 6601 that is presented to a user when the user chooses ILIT link 1130 from the menu displayed in left hand menu in FIGS. 11 and 12. The ILIT interface 1130 also can include a menu across the page which can display Highlight link 6602, Flow chart link 6603 (shown as currently selected), Calculator link 6604, and Supplemental Information link 6605. User interface 6601 can provide graphics, symbols and animated symbols representation demonstrating the benefits and scenarios of an ILIT. Graphic representation 6606 can represent a user's key assets. User interface 6601 can also include a menu across the bottom of the page that allows the user to navigate through out the flow chart fields. For example, the menu may include a First button 6607, a Previous button 6608, a Next button 6609, and a Last Button 6610. Further, the ILIT flow chart interface 6603 also may include Back to Wealth Shifting 6598 and Next: GRAT 6599 buttons which allow a user to navigate via Workflow Wizard.

Figure 67:
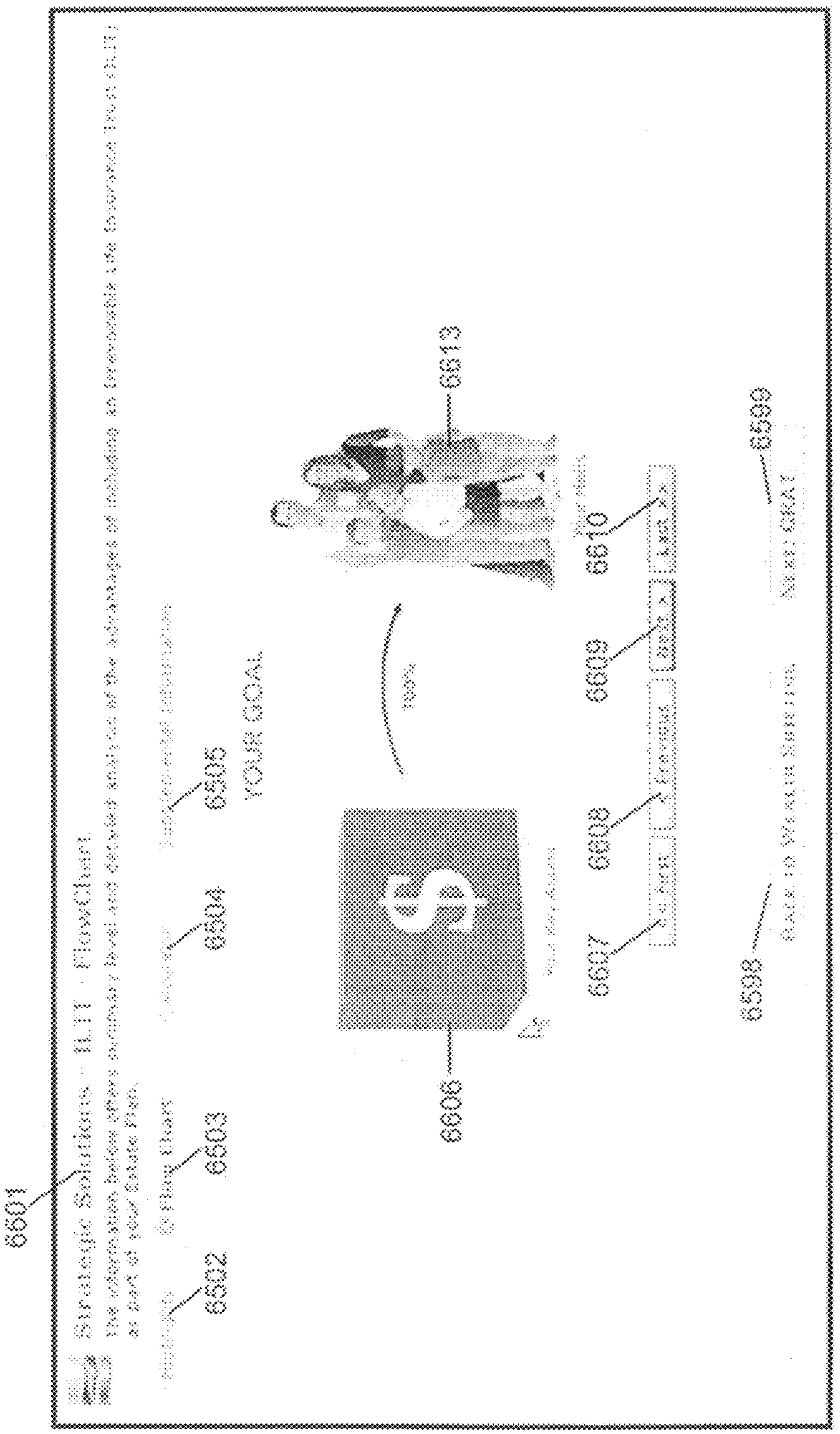

FIG. 67 illustrates user interface 6601 as a client progresses through the flowchart. In this example, the graphics demonstrate the ultimate goal of any estate: a user wants to ensure that their key assets 6606 are 100% transferred to their heirs 6613.

Figure 68:
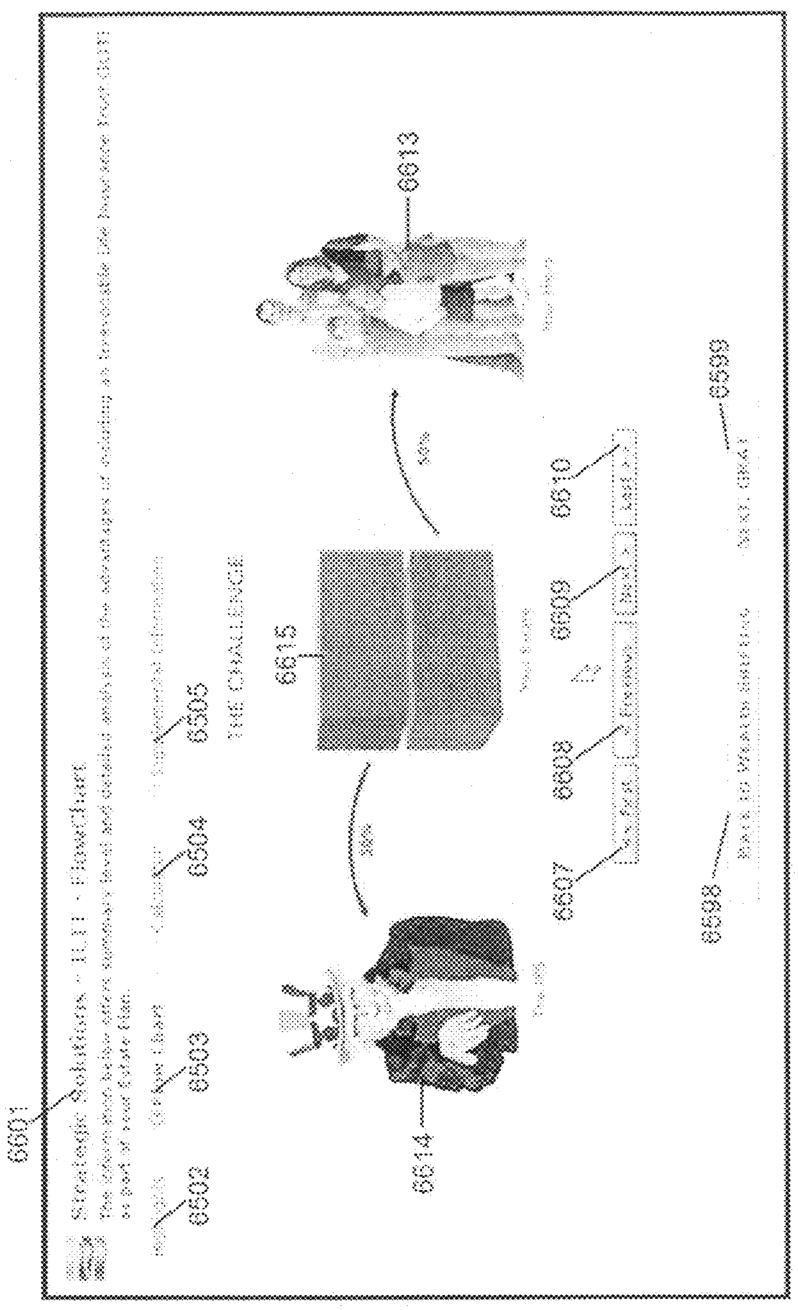

FIG. 68 illustrates user interface 6601 as a client progresses through the flowchart. In this example, the graphics demonstrate the hurdles of meeting the goals of FIG. 67. Because an estate is subject to taxation, the IRS, represented by graphic 6614 can receive about 50% of the estate 6615 and only 50% is transferred to heirs 6613.

Figure 69:
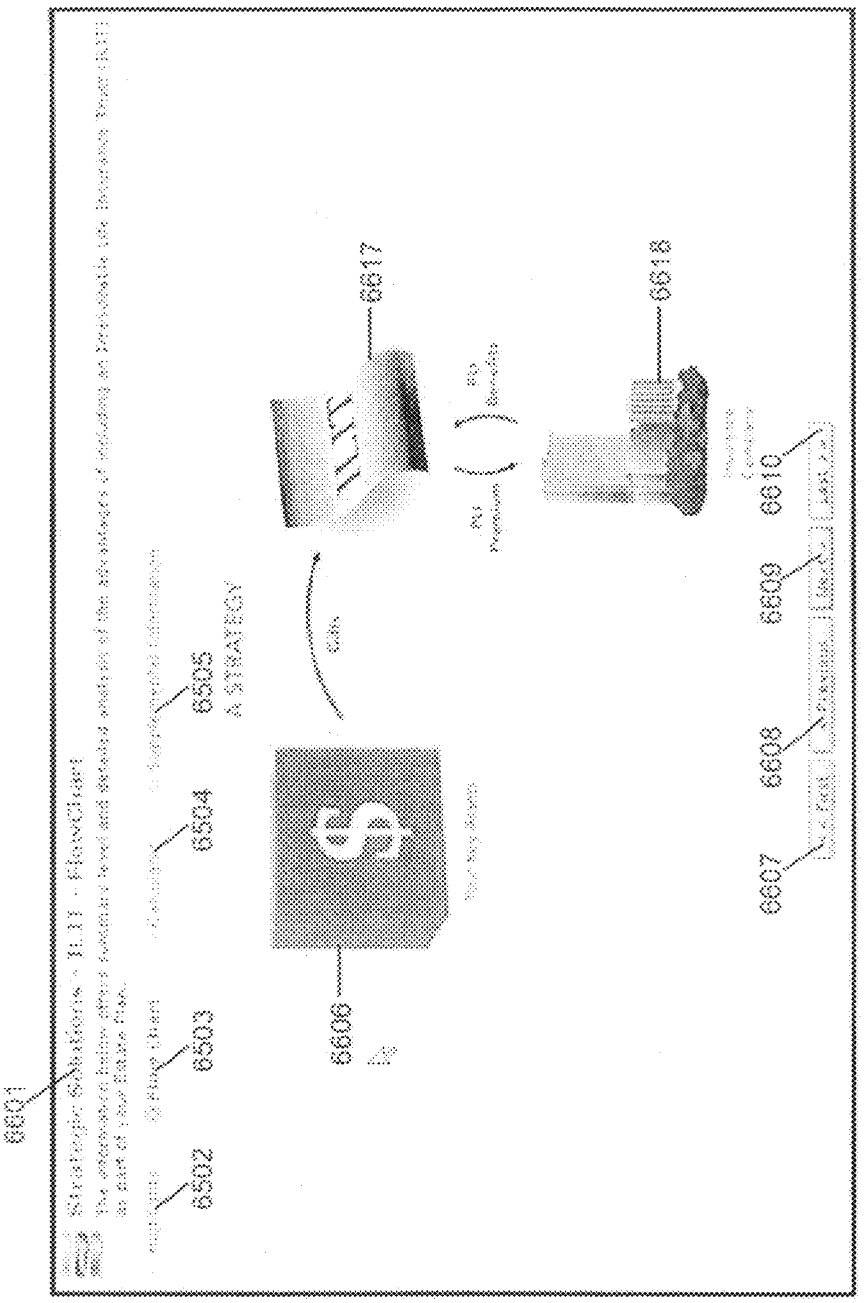

FIG. 69 illustrates user interface 6601 as a client progresses through the flowchart. In this example, the graphics demonstrate the strategy of utilizing an ILIT in order to meet the goals of FIG. 67. One strategy is for an estate to utilize gifts to fund an ILIT 6617. ILIT 6617 can purchase life insurance policies via insurance company 6618, and the ILIT 6617 can receive any policy payouts directly. Such payouts are not considered part of the key assets of the estate 6606, but such funds can be used to the protect the assets.

Figure 70:
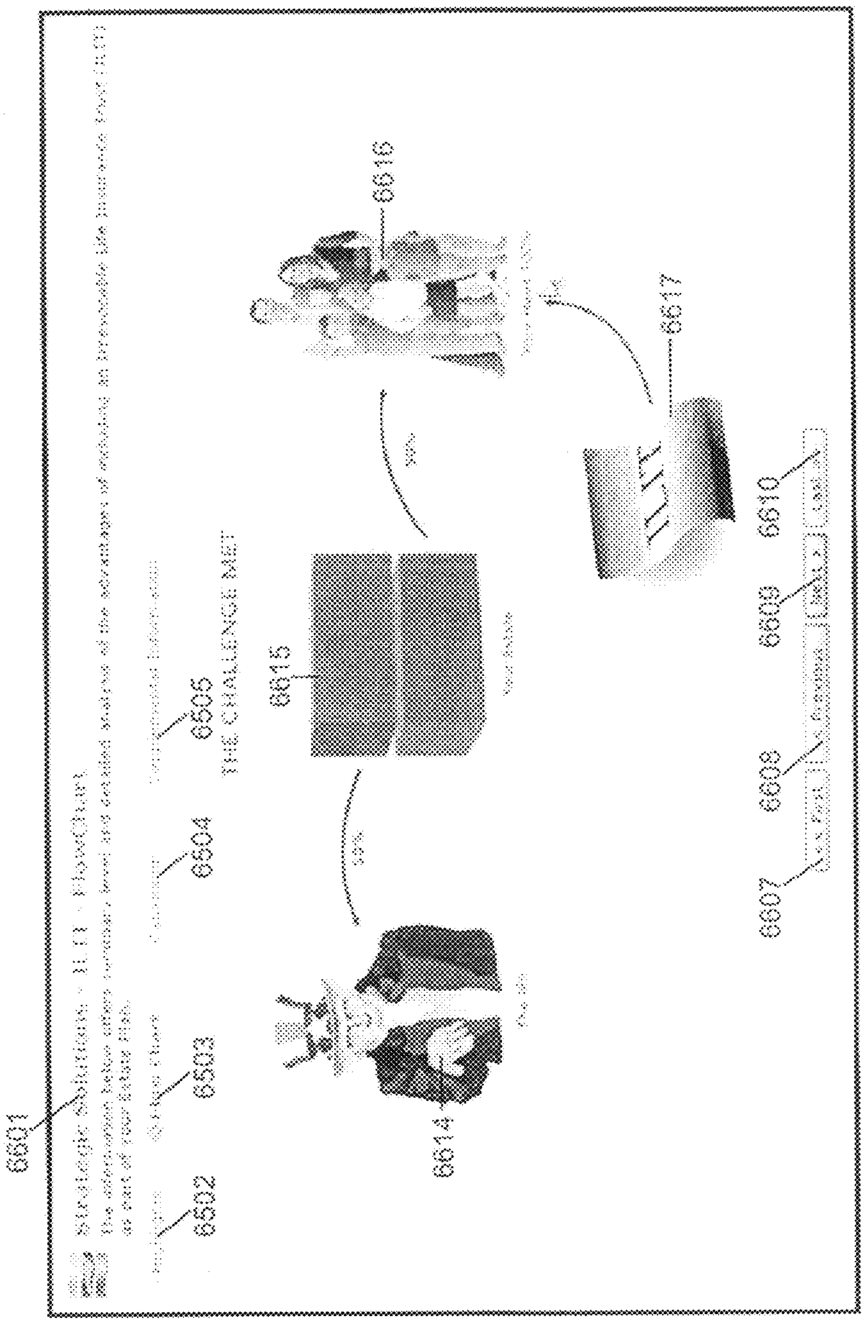

FIG. 70 illustrates user interface 6601 as a client progresses through the flowchart. In this example, the graphics demonstrate that even though the IRS 6614 receives 50% of the estate value in taxes, the heirs to the estate 6616 receive both 50% of the estate 6615 and the proceeds from ILIT 6617.

Figure 71:
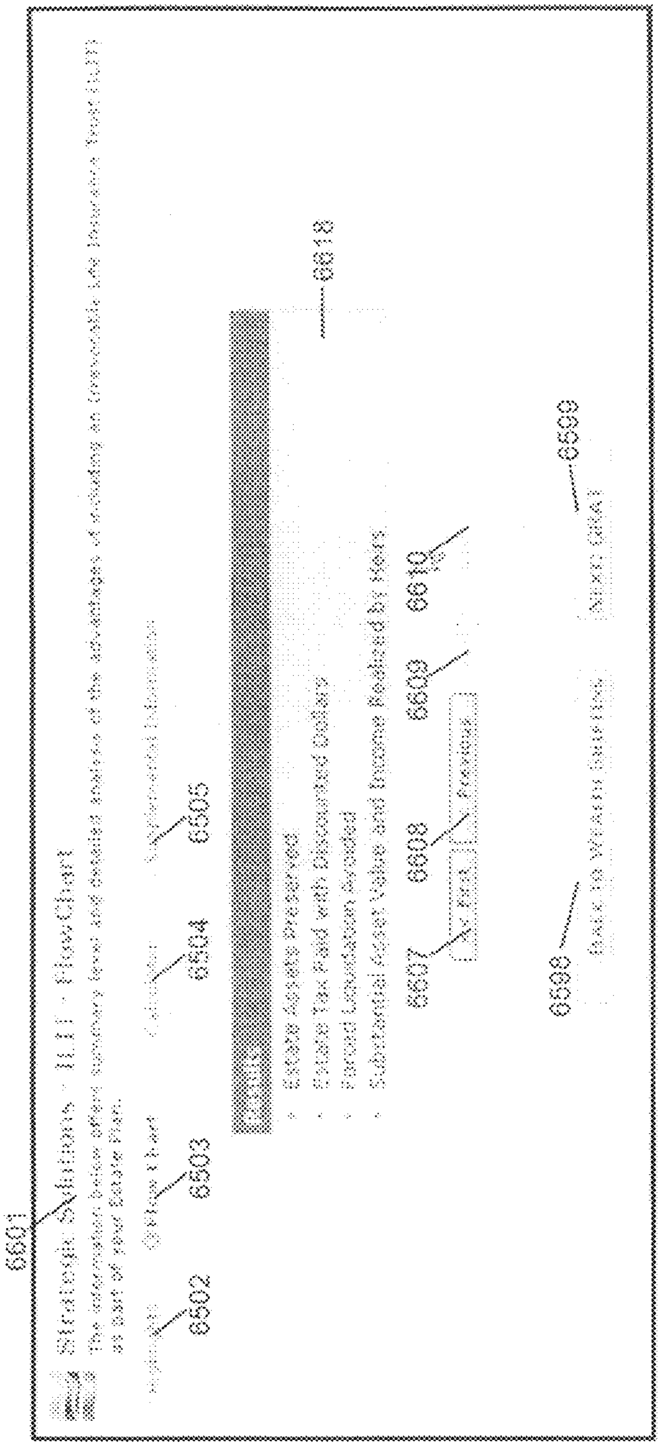

FIG. 71 illustrates user interface 6601 as a client progresses through the flowchart and reaches the end summary 6618. The user is told at least how an ILIT can preserve the key assets of the estate, how the estate taxes are paid with discounted dollars, how the forced liquidation of the estate is avoided, and that heirs are able to receive a substantial asset's value and income as a result.

Figure 72:
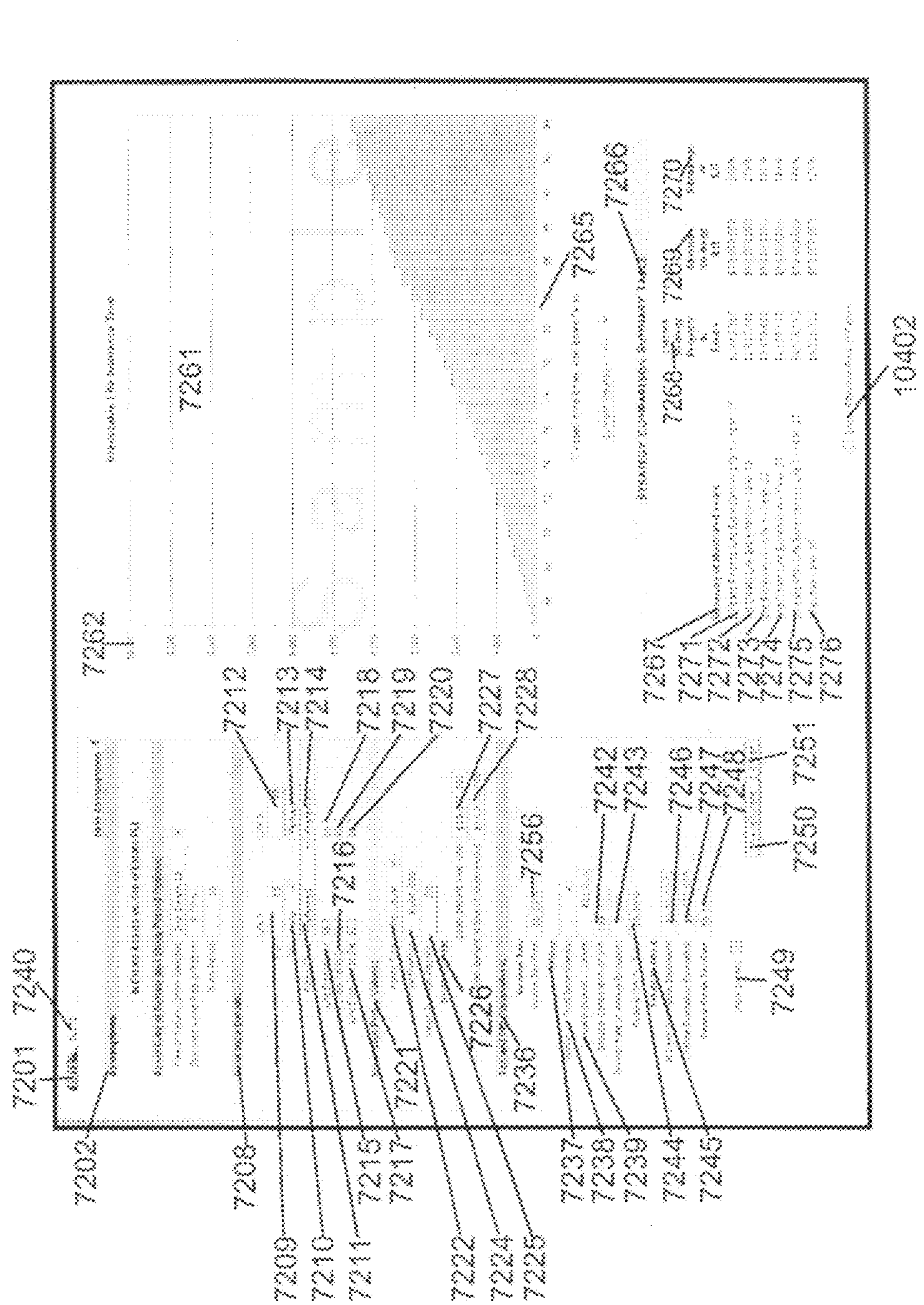

FIG. 72 can provide a calculator for providing information, summary and analysis for including an ILIT as part of an estate. When the Strategic Solutions—ILIT-Calculator User interface 7200 ILIT1 calculator 7201 is selected, a user interface may be produced where a user can enter information relating to general information assumptions of a ILIT. A menu can comprise several headings, such as Assumptions 7202 and Asset Rate of Return and Study Period Options that can define a Rate of Return Option Selected, e.g., 2nd Death LE; Specified Asset Rate of Return, e.g., 5.00%; and Study Period, e.g., 30 years. An Insurance Details heading 7208 can include a value of 65 in Age field 7209, Male in Sex field 7210 and Preferred in Rating Class field 7211 for the first Life; and 65 in Age field 7212, Female in Sex field 7213 and Preferred in Rating Class field 7214 for the second Life. The ILIT calculator can use this information to predict that the life expectancy for Life 1 to be 86.7 in field 7215, Life Expectancy 1st to Die to be 82.8 in field 7216, and Life Expectancy 2nd to Die to be 92.7 in field 7217. The ILIT calculator can use this information to predict that the life expectancy for Life 2 to be 88.8 in field 7218, Life Expectancy, 1st to Die to be 82.8 in field 7219, and Life Expectancy 2nd to Die to be 92.2 in field 7220. Under Insurance Policy Values heading 7221, the hypothetical user has entered Individual in Policy Type 7222, $104,000 in Annual Premium field 7224, and 40 in Years Premium Payable field 7225. The user has also entered $10,000,000 in Death Benefit Year One field 7227 and $10,000,000 in a Death Benefit at End of Study Period field 7241. Under Tax and Gift Parameters heading 7236, the user has entered 4 in Number of Trust Beneficiaries field 7238, and $13,000 in Annual Exclusion-Current field 7239. Additionally, field Spousal Combination of Gift 7242 is set to Yes, Growth Rate of Annual Exclusion field 7243 is entered as 0.0%, and a Federal Gift Tax Rate field 7244 is entered as 0.00%. An Estate Related heading 7245 can further comprise the fields At Death Exemption Equivalent field 7246, which in this example is entered as 3,500,000, a Lifetime Exemption Equivalent field 7247 field, which in this example is entered as $1,000,000 and a Total Estate Tax Rate field 7248, which in this example is entered as 50.00%. The ILIT calculator can also have a field Show Details 7249, and Recalculate 7250 and Clear 7251 buttons in order for the user to input, display and change any information as warranted.

A graphical representation of the ILIT data entered into the user interface tabs ILIT1 7201 can be graphically represented as graph 7261. In this graph, the Y-axis 7262 represents dollar amounts and X-axis 7265 represents years. The ILIT data can also be presented in Strategy Comparison Summary Table 7266. Strategy Comparison Summary Table 7266 can have multiple columns including Summary of Illustrated Years Column Header 7267, Current Strategy: Property In Estate Column Header 7268, Alternate Strategy ILIT Column Header 7269, and Advantage of ILIT Column Header 7270. The Strategy Comparison Summary Table 7266 can have multiple rows including 5 Years Prior to Life Expectancy—Life 1-Year: 17 row 7271, 1st Death Life Expectancy—Year: 18 row 7272, Life Expectancy—Life 1—Year: 22 row 7273, 2nd Death Life Expectancy—Year: 27 row 7274, 5 Years After Life Expectancy—Life 1-Year: 39 row 7275, Specified Year: 30 row 7276. As such, the Strategy Comparison Summary Table 7266 provides estimate values for the data input for ILIT tabs in order to view potential estate performance of the current strategy. Thus, in the current strategy, summary table 7266 shows that for 5 Years Prior to Life Expectancy—Life 1-Year: 17, Current Strategy: Property In Estate field 7277 the estimate is $2,443,967. For 1st Death Life Expectancy—Year: 18 Current Strategy: Property In Estate field 7278, the estimate is $2,637,146. For Life Expectancy—Life 1—Year: 22 Current Strategy: Property In Estate field 7279, the estimate is $3,479,882 for 2nd Death Life Expectancy—Year: 27, Current Strategy: Property In Estate field 7380, the estimate is $4,105,112. For 5 Years After Life Expectancy—Life 1—Year: 27, Current Strategy: Property In Estate field 7381, the estimate is $4,528,332. For Specified Year: 30, Current Strategy: Property In Estate field 7382, the estimate is $4,528,332.

For the second column, the table summary 7266 estimates 5 Years Prior to Life Expectancy—Life 1—Year: 17, Alternate Strategy ILIT field 7383 to be $10,000,000. For 1st Death Life Expectancy—Year: 22 Alternate Strategy ILIT field 7384 the estimate is $10,000,000. For Life Expectancy—Life 1—Year: 27, Alternate Strategy ILIT field 7385, the estimate is $10,000,000. For 2nd Death Life Expectancy—Year: 27, Alternate Strategy ILIT field 7386, the estimate is $10,000,000. For 5 Years After Life Expectancy—Life 1—Year: 27, Alternate Strategy ILIT field 7387, the estimate is $10,000,000. For Specified Year: 30, Alternate Strategy ILIT field 7388 the estimate is $10,000,000.

For the third column, the table summary 7266 estimates 5 Years Prior to Life Expectancy—Life 1—Year: 17, the Advantage of ILIT field 7389 is 309%. For 1st Death Life Expectancy—Year: 22, the Advantage of ILIT field 7390 is 279%. For Life Expectancy—Life 1—Year: 27, the Advantage of ILIT field 7391 is 187%. For 2nd Death Life Expectancy—Year: 27, the Advantage of ILIT field 7392 is 144%. For 5 Years After Life Expectancy—Life 1—Year: 27, the Advantage of ILIT field 7393 is 144%. For Specified Year: 30, the Advantage of ILIT field 7394 is 121%.

Figure 73:
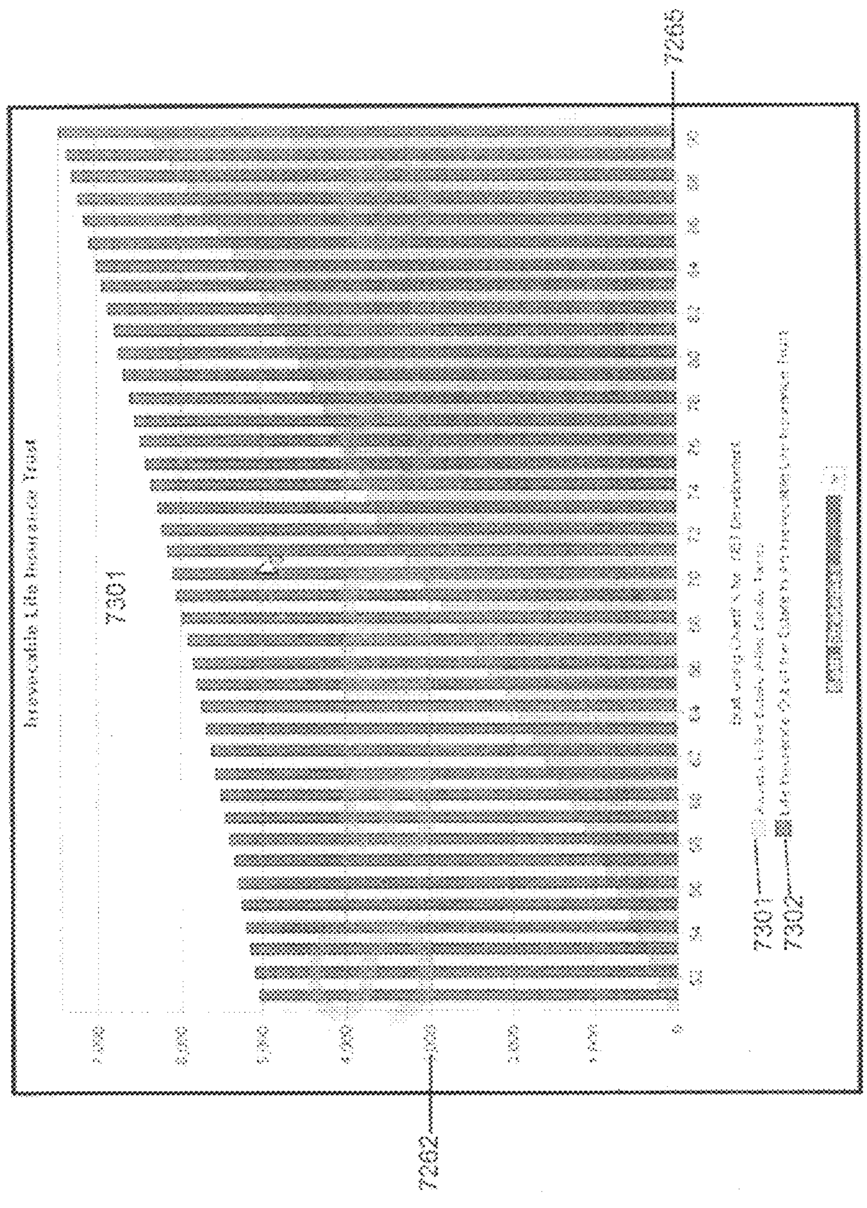

FIG. 73 demonstrates an example of a composite showing the difference between an ILIT and in estate life insurance policy. In this example, graph 7301 presents the difference between the data presented from ILIT tab 7201 compared to the total of the estate to be transferred to the heirs after estate taxes 7301, but without an ILIT. The values for the ILIT are presented at 7302.

Figure 74:
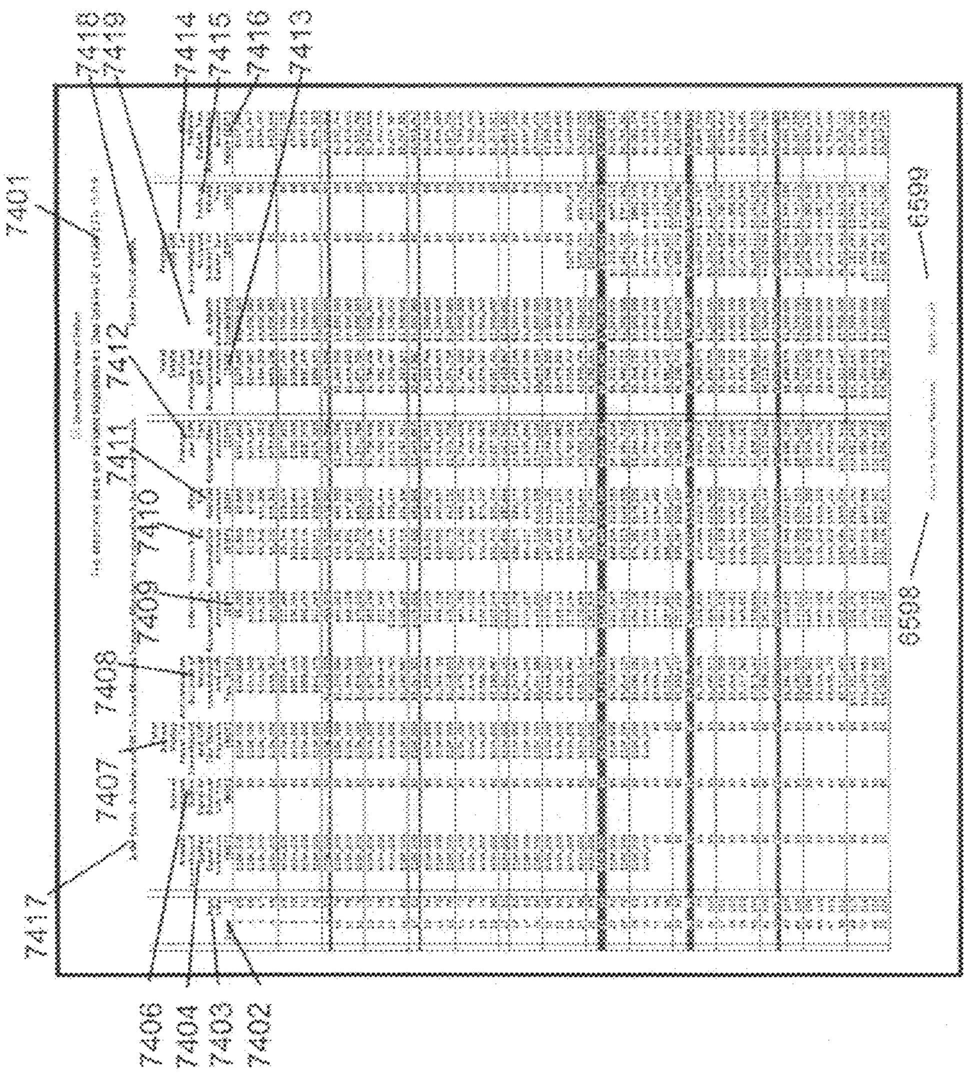

FIG. 74 illustrates some of the possible calculations used to generate the ILIT data when Show Detail box 7249 of calculator 7201 (FIG. 72) is selected. A table The Effective Rate of Return Required by 2nd Death LE 7401 presents data directed towards Out of Estate—Premium and Gift Tax from Alternate Scenario Allocated to Accumulation In the Current Scenario 7517 and Estate Tax Calculation 7418. Specific column headers can include Year 7402, Age Life 1 7403, Annual Investment Outlay Equal to Premium ((Beginning of Year) (BOY)) 7404, Annual Investment Outlay Equal to Annual Gift Tax (BOY) 7406, Total Annual Outlay Equal To: Investment and Gift Tax Total Payable (BOY) 7407, Accumulation Account of Annual Investment and Gift Tax (BOY) 7408, Interest on Accumulation Account ((End of Year) (EOY)) 7409, Income Tax on Accumulation Account (EOY) 7410, After Tax Annual Interest (EOY) 7411, and Premium and Gift Tax Accumulation Account (EOY) 7412 under the Out of Estate—Premium and Gift Tax from Alternate Scenario Allocated to Accumulation In the Current Scenario 7517 section. Specific columns for Total Estate Value: Premium and Gift Tax Accumulation Account (EOY) 7413, At Death Exemption Equivalent 7419, Premium and Gift Tax Accumulation Account Subject to Estate Tax (EOY) 7414, and Federal Estate Tax (EOY) 7415 can be included under the Estate Tax Calculation 7418 section. Additional sections and columns are contemplated herein, and may include columns for After Federal Estate Tax Accumulations Account Value (EOY) 7416. User interface 7400 also may include Back to Wealth Shifting 6598 and Next: GRAT 6599 buttons for a user to navigate using the Workflow Wizard.

Figure 75:
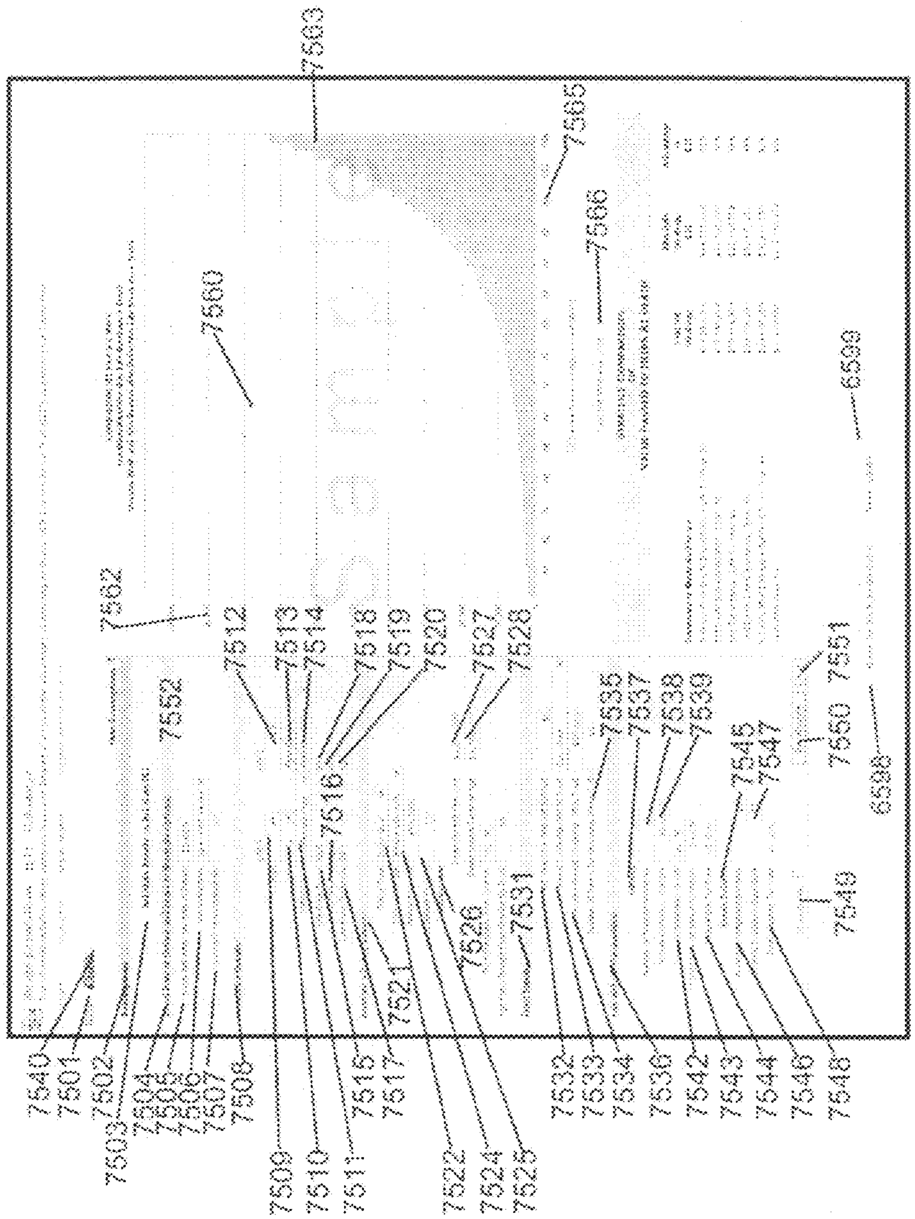

FIG. 75 demonstrates an example of an ILIT2 calculator. It can be used to illustrate the advantages of an ILIT2 over an ILIT1 in estate planning, especially for assets that have a high rate of return. An ILIT user interface can have multiple tabs for multiple ILITs. For example, the ILIT user interface has ILIT1 tab 7501 and ILIT2 tab 7540. The ILIT2 user interface can predict how a life insurance policy can grow in both a traditional ILIT1 and ILIT2. These predictions are made off of a variety of assumptions 7502 presented in the ILIT2 user interface. For example, the assumptions can include those that are directed towards In Estate Assets vs. In Estate PLI under heading 7503 with the same name. The ILIT2 user interface can have various section headings for inputting various data, including an Asset Rate of Return and Years to Illustrate Options heading 7504, Insurance Details heading 7508, Insurance Policy Values 7521, Trust Funding heading 7531, and Tax and Gift Parameters heading 7536. Under Asset Rate of Return and Years to Illustrate Options heading 7504, the user interface can have various fields, including Asset Net After Tax Rate of Return 7505 field, Year to Illustrate field 7506; and Specified Years to Illustrate field 7507. In the current example, a hypothetical user has entered 10.00% in Asset Net After Tax Rate of Return 7505, Specified Years in Years to Illustrate field 7506 and 21 in Specified Years to Illustrate field 7507. Under Insurance Details heading 7508, the user interface can have various fields, including those for a first life, such as Age 7509; Sex 7510 and Rating Class 7511. Additionally, similar fields Age 7512; Sex 7513 and Rating Class 7514 can be provided for a second life, or spouse of the client. The ILIT2 calculator can then provide a prediction regarding the total life expectancy for either the client or the spouse, as well as the life expectancy for the predicted first to die, and the predicted second to die. In the current example, a hypothetical user has entered 4451 in Age field 7509, Male in Sex field 7510 and Preferred Plus in Rating Class field 7511 for the first Life. The hypothetical user has entered 43 in Age field 7512, Female in Sex field 7513 and Preferred Plus in Rating Class field 7514 for the second Life. The ILIT2 calculator can use this information to predict that the life expectancy for Life 1 to be 86.6 in field 7515, Life Expectancy, 1st to die to be 82.6 in field 7516 and Life Expectancy—2nd to Die to be 94.7 in field 7517. The ILIT calculator can use this information to predict that the life expectancy for Life 2 to be 90.1 in field 7518, Life Expectancy, 1st to Die to be 80.6 in field 7519 and Life Expectancy—2nd to Die to be 92.7 in field 7520. Under Insurance Policy Values heading 7521, the user interface can have various fields, including those such as Policy Type 7522, Insurance Type 7523 and Annual Premium 7524, Years Premium Payable field 7525, Trust Purchased From Grantor field 7529, and Age Policy Bought From Grantor field 7530. The Insurance Policy Values heading 7521 can have a subheading such as Death Benefit 7526, which can also have various fields such as Death Benefit Year One field 7527 and Death Benefit Terminal Age in field 7528. In the current example, a hypothetical user has entered Individual in Policy Type 7522, Whole-Life U95 in Insurance Type field 7523, $50,000 in Annual Premium field 7524, 10 in Years Premium Payable field 7525, Yes in Trust Purchased From Grantor field 7529, and 65 in Age Policy Bought From Grantor field 7530. The user has also entered $2,100,000 in Death Benefit Year One field 7527 and $3,700,000 Death Benefit Terminal Age field 7528. Under Trust Funding heading 7531, the user interface can have various fields, including those such as First Year One Time Gift to Trust field 7532, Annual On-Going Gifts to Trust field 7533, Specified Annual On-Going Gifts to Trust field 7534 and Number of Years for On-Going Annual Gift field 7535. In the instant example, the user has entered $0 in First Year One Time Gift to Trust field 7532, Specified in Annual On-Going Gifts to Trust field 7533, $50,000 in Specified Annual On-Going Gifts to Trust field 7534 and 10 Number of Years for On-Going Annual Gift field 7535. Under Tax and Gift Parameters heading 7536, the user interface can have various subheadings including Gifting 7537. Under the sub-heading gifting the user interface can have various fields, including those such as Number of Trust Beneficiaries field 7538, and Annual Exclusion-Current field 7539. In the instant example, the user has entered 4 in Number of Trust Beneficiaries field 7538, and $13,000 in Annual Exclusion-Current field 7539. The ILIT2 user interface can provide similar information for predicting ILIT information under the ILIT1 tab 7501 (see FIG. 72 for details). The ILIT calculator can also have a field for Show Details 7549, and Recalculate 7550 and Clear 7551 buttons in order for the user to input, display and change any information as warranted.

The data entered into the user interface tabs ILIT1 7501 and ILIT2 tab 7540 can be graphically displayed in Comparison Of Legacy Values: traditional Irrevocable Life Insurance Trust Versus Wait-And-See Irrevocable Defective Life Insurance Trust graph 7561. In this graph, the Y-axis 7562 represents dollar amounts and X-axis 7565 represents years. A Current Scenario Legacy Value (EOY) 7563 can be graphed per drop down box 7566. The Workflow Wizard can be navigated via Back to Wealth Shifting button 6598 and Next: GRAT button 6599.

Figure 76:
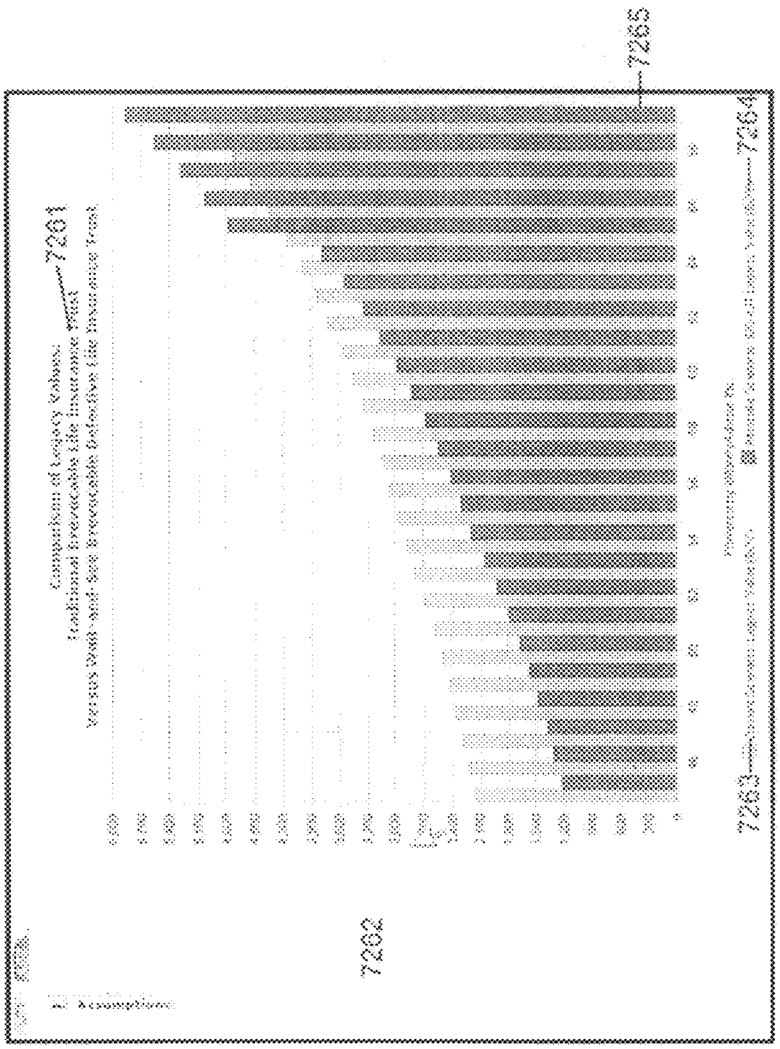

FIG. 76 illustrates how if money is shifted into an intentionally defective trust, and the life insurance is allowed to grow in the trust until age 65 and then shifted out of trust at 65, the IDT-ILIT gets a larger return. The data entered into the user interface tabs ILIT1 7501 and ILIT2 tab 7540 can be graphically represented as Comparison Of Legacy Values: traditional Irrevocable Life Insurance Trust Versus Wait-And-See Irrevocable Defective Life Insurance Trust graph 7601. In this graph, the Y-axis 7602 represents dollar amounts and X-axis 7605 represents years. Both the Current Scenario: Legacy Value (EOY) 7603 can be graphed in direct comparison to the Alternate Scenario: IDG-ILIT Legacy Value (EOY) 7604. Other non-limiting embodiments of the graphical representations of the ILIT values include line graphs, pie charts, Venn diagrams, etc., or combinations thereof.

Figure 77:
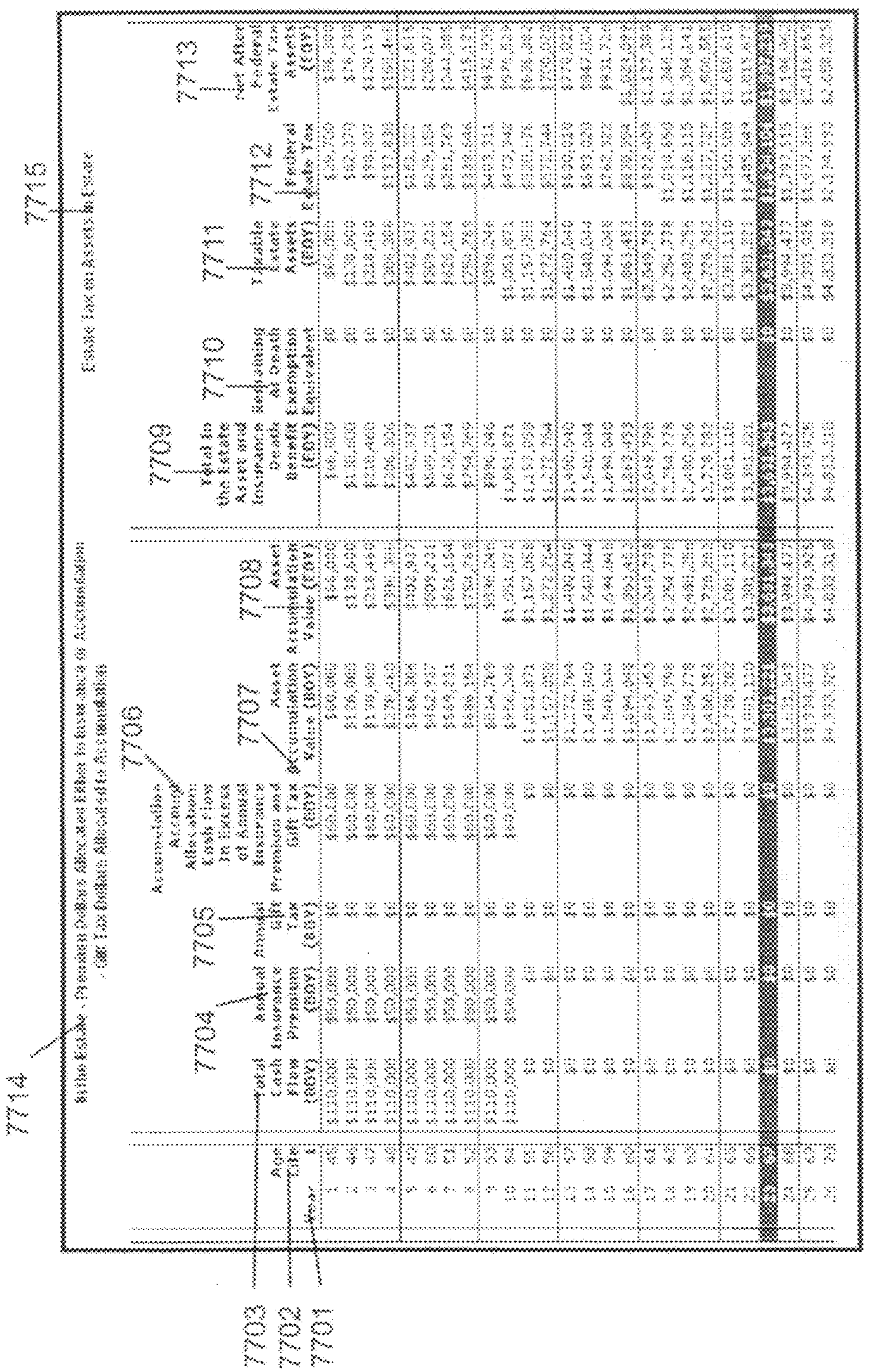

FIG. 77 illustrates some of the possible calculations used to generate the ILIT2 data when Show Detail box 7549 of calculator 7552 (FIG. 75) is selected. A table presents data directed towards In Estate—Premium Dollars Allocated Either to Insurance or Accumulation—Gift Tax Dollars Allocated to Accumulation section 7714 and Estate Tax on Assets In Estate section 7715. Specific column headers can include Year 7701, and Age Life 1 7702. Columns for Total cash Flow (BOY) 7703, Annual Insurance Premium (BOY) 7704, Annual Gift Tax (BOY) 7705, Accumulation Account Allocation: Cash Flow In Excess of Annual Insurance Premium and Gift Tax (BOY) 7706, Asset Accumulation Value (BOY) 7707, and Asset Accumulation Value (EOY) 7708 under the In Estate—Premium Dollars Allocated Either to Insurance or Accumulation—Gift Tax Dollars Allocated to Accumulation section 7714. Specific columns for Total In Estate Asset and Insurance Death Benefit (EOY) 7709, Remaining At Death Exemption Equivalent 7710, Taxable Estate Assets (EOY) 7711, Federal Estate Tax (EOY) 7712, and Net After Federal Estate Tax Assets (EOY) can be included under the Estate Tax On Assets In Estate 7713 section. Additional sections and columns are contemplated herein, and may include columns for After Federal Estate Tax Accumulations Account Value (EOY) 7416.

Figure 78:
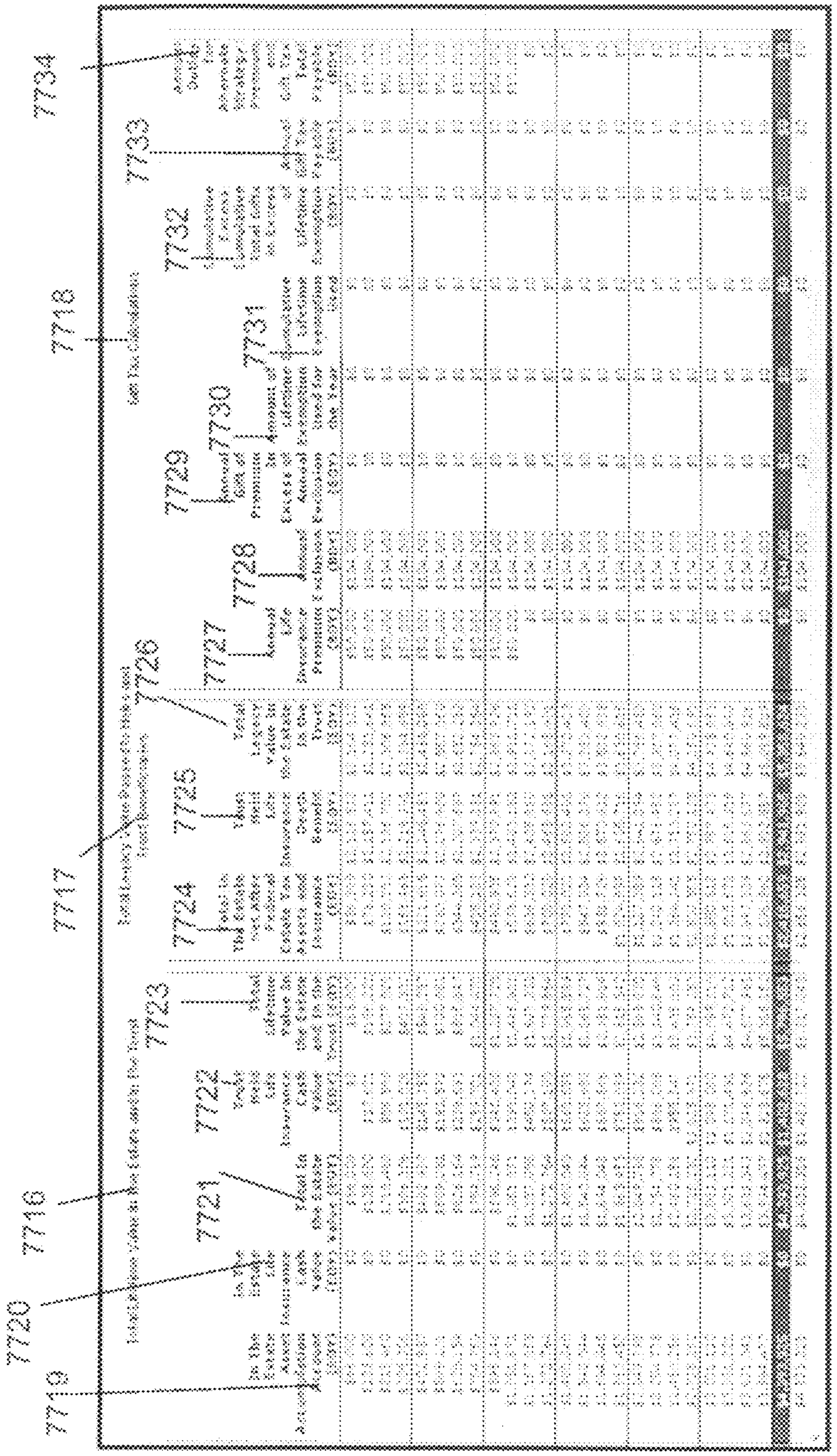

FIG. 78 is a continuation of FIG. 77 and also illustrates some of the possible calculations used to generate the ILIT2 data when Show Detail box 7549 of calculator 7552 (FIG. 75) is selected. A table can present data directed towards Total Lifetime Value In The Estate and In The Trust section 7716, Total Legacy Value Passed to Heirs and Trust Beneficiaries 7717 section, and Gift Tax Calculations section 7718. Columns for In the Estate Asset Accumulation Account (EOY) 7719, In the Estate Life Insurance Cash Value (EOY) 7720, Total In the Estate Value (EOY) 7721, Trust Held Life Insurance Cash Value (EOY) 7722, and Total Lifetime Value in the Estate and In the Trust (EOY) 7723 can be included under the Total Lifetime Value In The Estate and In The Trust section 7716. Specific columns for Total In The Estate Net Asset After Federal Estate Tax Assets and Insurance (EOY) 7724, Trust Held Life Insurance Death Benefit (EOY) 7725, and Total Legacy Value In the Estate In the trust (EOY) 7726 can be included under the Total Legacy Value Passed to Heirs and Trust Beneficiaries 7717 section. Columns for Annual Life Insurance Premiums (BOY) 7727, Annual Exclusion (BOY) 7728, Annual Gift of Premium In Excess of Annual Exclusion (BOY) 7729, Amount of Lifetime Exemption Used for the Year 7730, Cumulative Lifetime Exemption Used 7731, Cumulative Excess: Cumulative Total Gifts in Excess of Lifetime Exemption (BOY) 7732, Annual Gift Tax Payable (BOY) 7733 and Annual Outlay for Alternate Strategy Premium and Gift Tax Total Payable (EOY) 7734 can be included under the Gift Tax Calculations section 7718.

Figure 79:
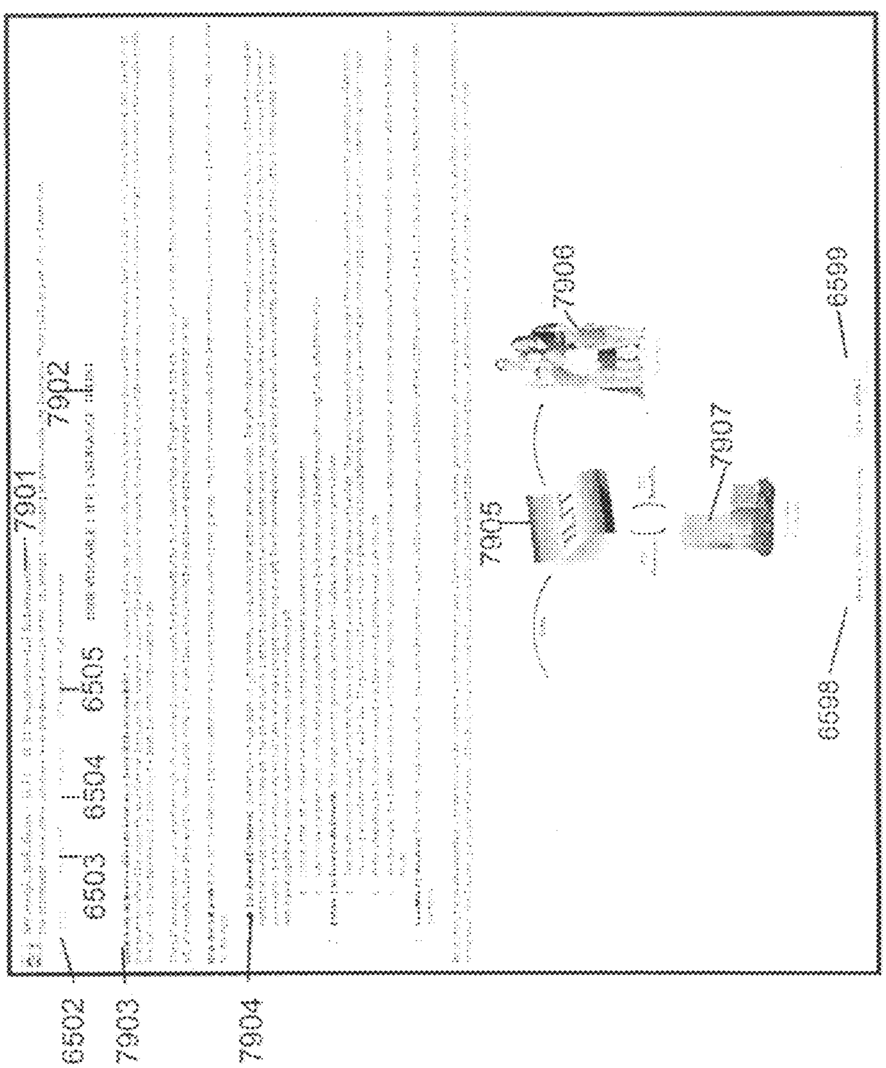

FIG. 79 is an example of a Strategic-Solutions—ILIT Supplemental Information 7901 user interface when the user selects the Supplemental Information link 6604 link (FIG. 65). The strategic-Solutions-ILIT Supplemental Information 7901 user interface offers summary level and detailed analysis of the advantages of including an Irrevocable Life Insurance Trust (ILIT) as part of an Estate Plan. For example, an Irrevocable Life Insurance Trust 7902 heading may present frequently asked questions and answers section 7903, and summary information related to an ILIT in outline form 7904. For example, frequently asked questions and answers section 7903 may include explanatory text as to that does an Irrevocable Life Insurance Trust (ILIT) accomplish. Life insurance that you own on your life will be included in your gross estate for federal estate tax purposes. If you have a taxable estate, a portion of that death benefit will be subject to an estate tax. Because life insurance is one of the best sources of liquidity, it may be best, for estate tax purposes, to place the insurance so that it is not included in the taxable estate. The ILIT is the standard means of removing the death benefit from the taxable estate.

The ILIT will hold life insurance (either single life or joint and survivor) usually for the benefit of the trust creator's family. The gifts made to the trust will, generally, be gift tax free and the death benefit will be paid income, gift, and estate tax free. By placing the life insurance in the ILIT, estate taxes will not erode the death benefit and the insurance will be creditor protected.

How does it work? The ILIT is established by the grantor (some ILITs have husband and wife as the grantor). The ILIT document sets out the terms of the trust, names the trustee(s) and establishes the state of domicile for the trust.

An Outline 7904 section relating to summary information for an ILIT may state:

1. Gift Tax Annual Exclusion: Certain rules must apply for gifts to the trust to qualify for the gift tax annual exclusion. The gift must be of a present interest—meaning that the beneficiary must have the immediate right to the use or enjoyment of the gift. The gift to an ILIT is a gift for the benefit of the named beneficiaries in the trust. However, unless special language is contained in the trust—the so called "Crummey" provisions—the trust beneficiaries will not have received a present interest in the gift. The Crummey provisions will give the beneficiaries a right to withdraw part or all of the gift for a limited period. It is the withdrawal right that has been determined to create a present interest gift.

a. Notice of the gift should be sent to the Crummey beneficiary as provided under the trust document.

b. Life insurance premiums should not be paid directly by the insured—the trustee should pay the premium using funds gifted to the trust.

2. Estate Tax Free Death Benefit: The death benefit, generally, will not be included in the insured's gross estate.

a. The death benefit may be used by the trustee to purchase assets from the deceased's estate. These purchases will create liquidity in the estate allowing the executor to pay various estate costs including any estate tax that may be due. The purchase of assets helps to preserve treasured family items as well as assets that are income producing or have a large potential upside in value.

b. In the alternative, the trustee may loan the estate funds to provide necessary liquidity.

c. In either case, the trustee will act in an arm's length manner. Purchases should be made at fair market value and loans will generally reflect federal interest rates applicable at the time the loans are made.

3. Creditor Protection: The assets held in the trust will be protected from the Grantor's creditors. Depending upon the terms of the trust, the assets held in the trust may also be protected from the Beneficiary's creditors.

ILIT supplemental user interface may also include a graphical representation of portions of the flowcharts previously seen (FIGS. 66-71) in order to visually show the benefits of, and how an ILIT 7905 functions for Heirs 7906 and Insurance Companies 7907. The user can also navigate to other areas of the navigation bar (see FIG. 11) by selecting Back to Wealth Shifting 6598 or Next: GRAT 6599 buttons.

GRAT

Figure 80:
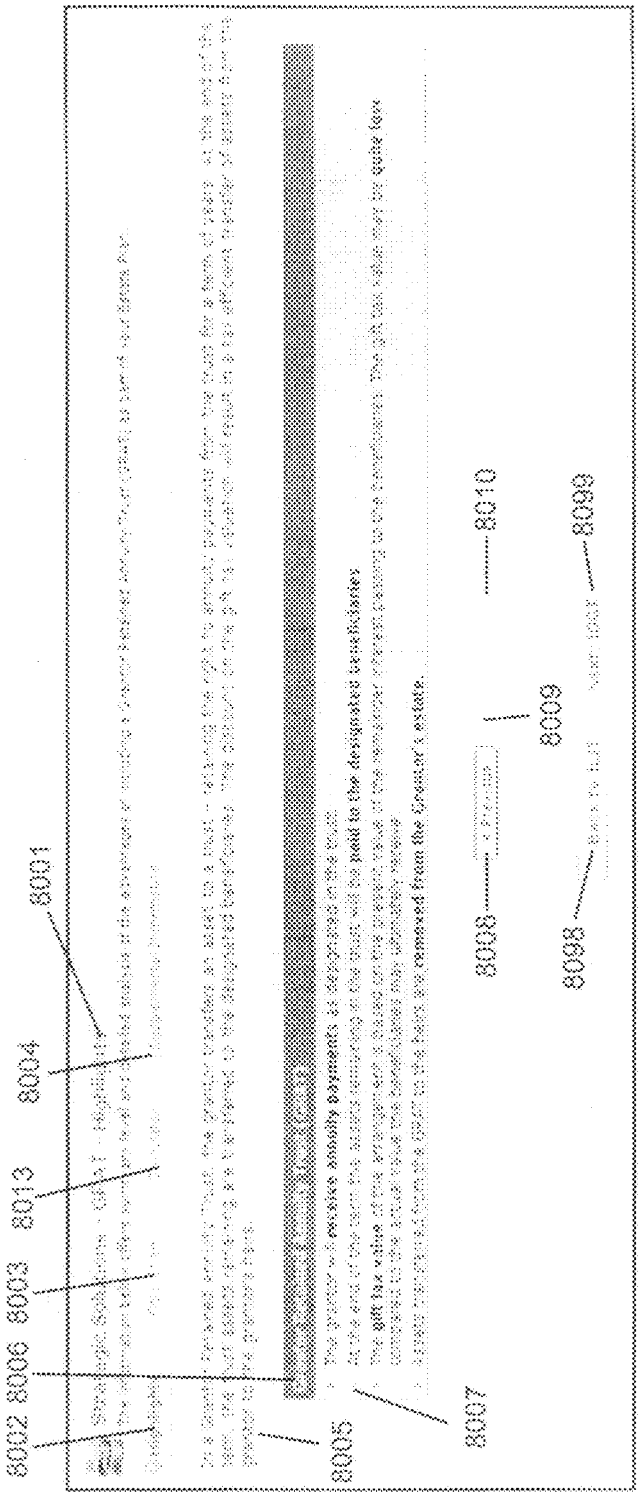

FIG. 80 illustrates an example of a user interface when the user selects the GRAT link 1131 navigation bar in the Estate module 1105 (FIG. 11). The GRAT user interface features may be presented on four pages, which are accessed by clicking the corresponding Highlights 8002, Flow Chart 8003, Calculator 8013, and Supplemental 8004 link at the top of the page. By selecting Highlights 8002 the Strategic Solutions—GRAT-Highlights user interface 8001 may be displayed. The information within the highlights section provides a summary level and detailed analysis of the advantages of including a Grantor Retained Annuity Trust (GRAT) as part of an Estate Plan. The Highlights user interface 8001 page may contain static text. When first displayed, only the introductory paragraph 8005 appears, along with a first bullet item 8007 from a Grantor Retained Annuity Trust Section 8006. The user can click Next 8009 to display the next bullet item, one at a time. Show All 8010 will display all bulleted items. The Previous 8008 button will remove the most recently added bullet item. The introductory sections 8005 may state that in a Grantor Retained Annuity Trust, the grantor transfers an asset to a trust—retaining the right to annuity payments from the trust for a term of years. At the end of the term, the trust assets remaining are transferred to the designated beneficiaries. The discount on the gift tax valuation will result in a tax efficient transfer of assets from the grantor to the grantor's heirs. The user can also navigate to other areas of the navigation bar (see FIG. 11) by selecting Back to ILIT 8098 or Next: IDGT 8099 buttons via the Workflow Wizard.

Figure 81:
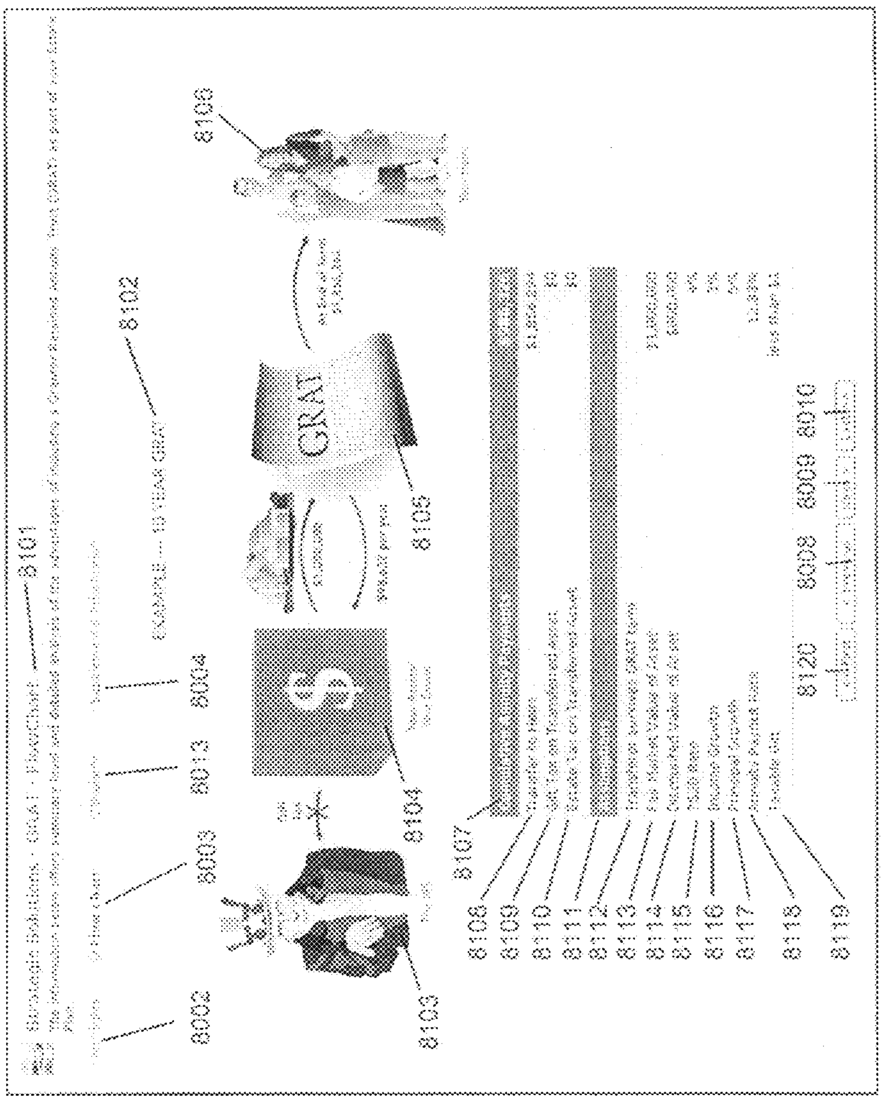

FIG. 81 provides a Strategic-Solutions—GRAT-Flowchart 8101 user interface when the user selects the Flow Chart link 8003 link (FIG. 80). The Strategic-Solutions GRAT-Flowchart 8101 user interface offers summary level and detailed analysis of the advantages of including a Grantor Retained Annuity Trust (GRAT) as part of an Estate Plan. The Strategic-Solutions—GRAT-Flowchart 8101 may contain a click-by-click sequence of graphical and text information about a GRAT. The first time a flow chart is displayed, the user will click a Next 8009 button to advance through the sequence. A Previous 8008 button will take the click sequence back one step. First button 8120 will take the user back to the first display in the sequence. Last button 8010 will display the last display with a single click. Click 1 (click to arrive on Flow Chart page)—Clicking in sequence may display Example—10 year GRAT 8102. Example—10 year GRAT 8102 may display a graphical representation wherein Your Assets/Your Estate 8104 are transferred into an irrevocable trust GRAT 8105, out of the taxable estate without incurring a gift or estate tax owed to the IRS 8103. The GRAT 8105 pays an annuity back to the estate for a period of time. At the end of the term of the GRAT 8105, the assets remaining in the GRAT 8105 are transferred to Your Heirs 8106. A Cumulative Annuity Payments summary section 8107 may display totals for Transfer to Heirs 8108, Gift Tax on Transferred Asset 8109, and Estate Tax on Transferred Asset 8110. The assumptions upon which the GRAT is based can be present in Assumptions section 8111, which presents information pertaining to Transferor survives GRAT term 8112, Fair Market Maximize Value of Asset 8113, Discounted Value of Asset 8114, 7520 Rate 8115, Income Growth 8116, Principal Growth 8117, Annuity Payout Rate 8118, and Taxable Gift 8119.

Figure 82:
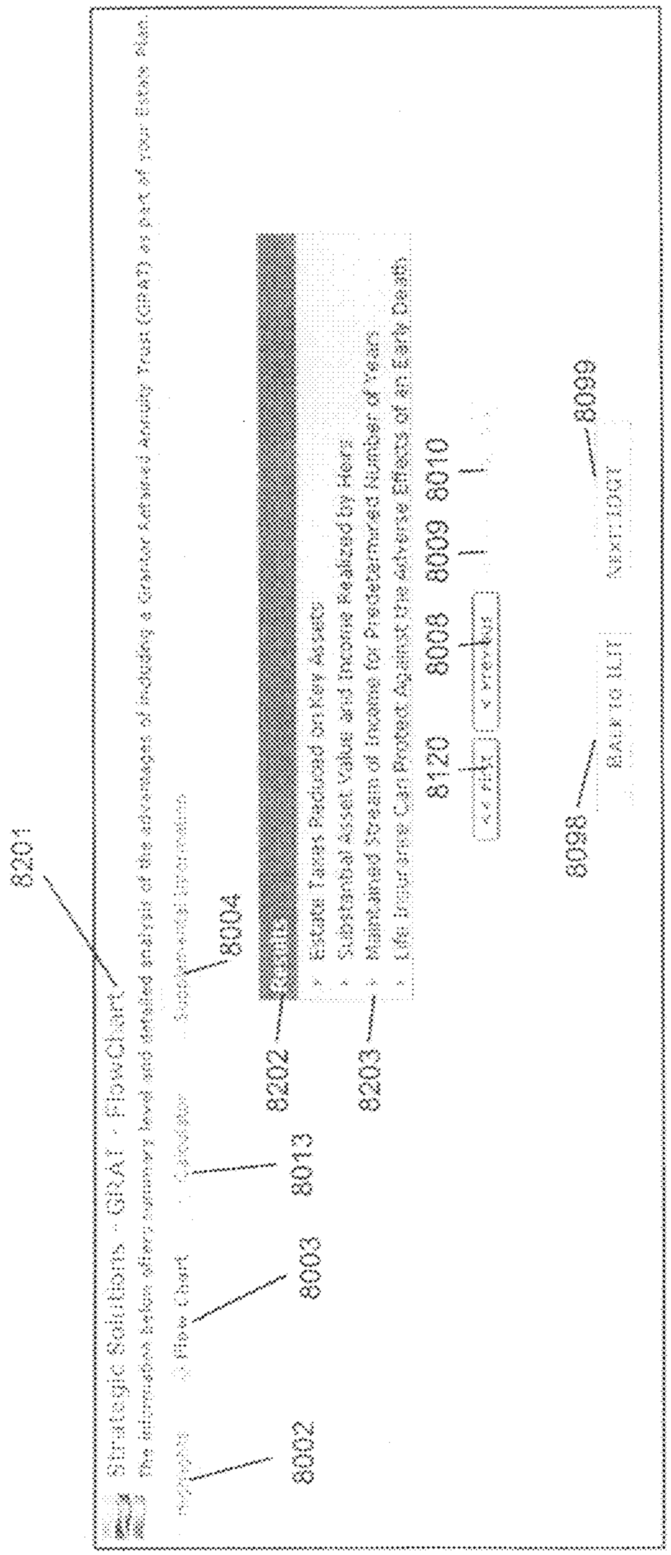

FIG. 82 illustrates an example of a Strategic-Solutions—GRAT-Flowchart 8201 user interface when the user selects the Flow Chart link 8003 link (FIG. 80) and proceeds in clicking through a sequence. The Strategic-Solutions—GRAT-Flowchart 8201 can display a Results 8202 section of a GRAT. Results 8202 displays bullets 8203 summarizing the benefits of a GRAT, such as Estate Taxes Reduced on Key Assets, Substantial Asset Value and Income Realized by Heirs, Maintained Stream of Income for Predetermined Number of Years and Life Insurance Can Protect Against the Adverse Effects of an Early Death. The user can again navigate through the flowchart via Next 8009, Previous 8008, First 8120, and Last 8010 buttons as discussed in FIG. 80. The user can also navigate to other areas of the Workflow Wizard navigation bar (see FIG. 11) by selecting Back to ILIT 8098 or Next: IDGT 8099 buttons.

Figure 83:
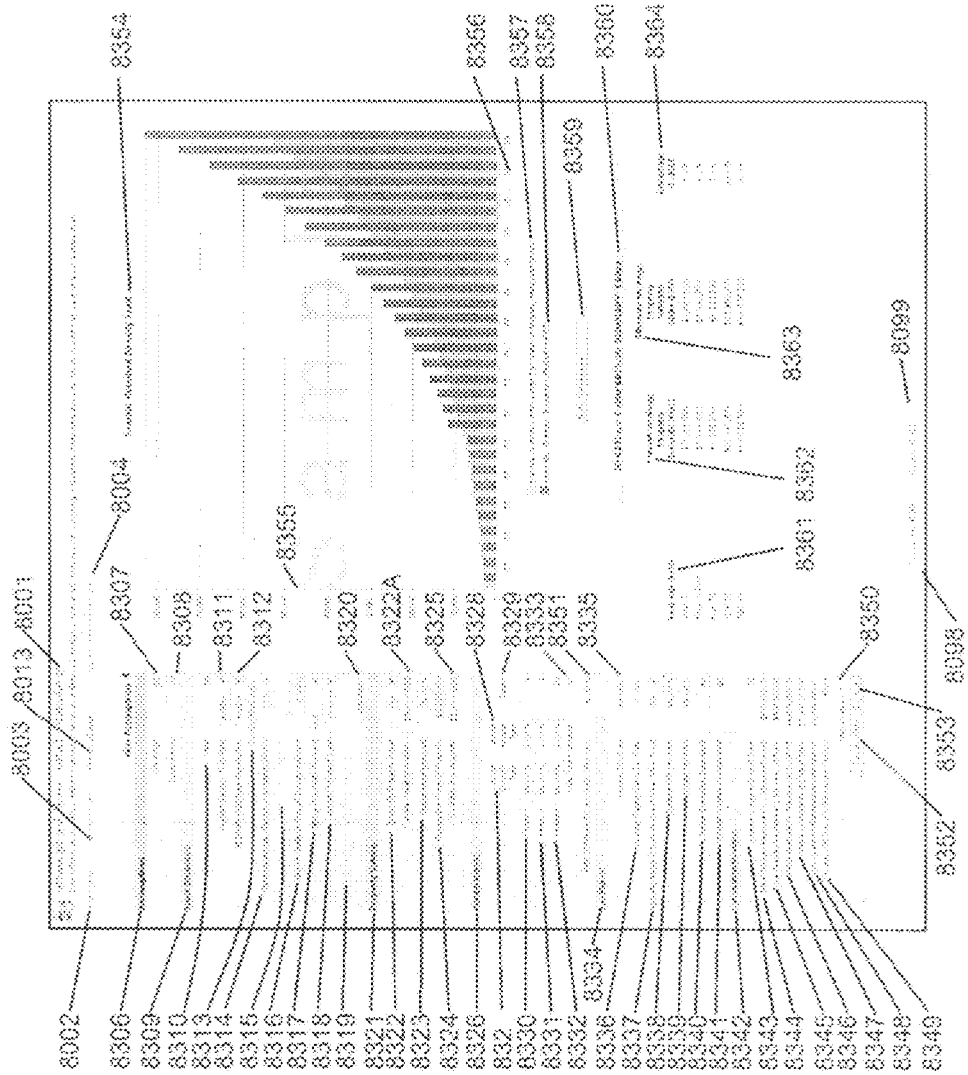

FIG. 83 illustrates an example of a Strategic-Solutions—GRAT-Calculator 8301 user interface when the user selects the Calculator link 8013 link (FIG. 80). The Strategic-Solutions—GRAT-Calculator 8301 user interface offers summary level and detailed analysis of the advantages of including a Grantor Retained Annuity Trust (GRAT) as part of an Estate Plan. The GRAT-Calculator 8301 user interface can have a menu along the top of the interface with a variety of optional data entry fields where a user can enter information relating to general information assumptions of a GRAT in this interface. The GRAT calculator 8302 can comprise several headings, such as Assumptions heading 8306, Trust Attributes heading 8309, Property Values heading 8321, Return Rates heading 8326, Tax Rates heading 8334, Calculation Results heading 8342. Under Assumption heading 8306, the user interface can have various fields, including those such as Client Age 8307 and Study Period 8308. Under Trust Attributes heading 8309, the user interface can have various fields, including those under subsection Section 7520 Rates 8313 such as Term 8310, Current Section 7520 Rate 8311, and At Death 7520 Rate Assumption 8312. Under subsection AFR Rates 8329 the fields optimize Annuity Payout (A Walton GRAT) 8314, Annuity Payout Rate 8315, Growth Rate of Annual Annuity Payment 8316, Timing of Annuity Payment 8317, Annuity Payment Type 8318 and Interest Rate on Lien Against Trust Asset 8319. Under Property Values heading 8321, the user interface can have various fields, including Gross Up Property Value 8322, Current Value of Property 8323, Hypothetical Discount 8323, Discounted Value of Property 8324 and Cost Basis of Property 8325. Under Return Rates heading 8326, the user interface can have various fields forming a table, which can include column headers Asset Growth Rate 8327, Asset Income Rate 8328, and Years 8329, and can further include rows for Period 1 8330, Period 2 8331 and Period 3 8332. Return Rates heading can further includes the Total Years Studied 8333 which adds up the Years for Periods 1, 2 and 3. Finally, Return Rates heading 8326 can include a field for Rate of Return for Accounts 8351. Under Tax Rates heading 8334, the user interface can have various fields, including Income Tax Rate 8335, Grantor Capital Gains Tax Rate 8336, Assume Asset is Sold At End of Year After Trust 8337, Federal Gift Tax Rate 8338, Estate Tax Rate 8339, Lifetime Exemption Equivalent 8340 and At Death Exemption Equivalent 8341. Under Calculation Results heading 8342, the user interface can have various fields, including Grantor's Age at End of Term 8342, Initial Annuity Payment For Optimized Payout 8344, Final Annuity Payment In Last Year of Term 8345, Value of Property Transferred to GRAT 8346, Value of Property at End of Term 8347, Value of Grantor's Retained Income Interest 8348 and Taxable Gift Value of Remainder 8349. Calculator 8302 can have a Show Detail box 8350 which when selected can display all of the data that was used to generate the values presented by the calculated. The Recalculate button 8352 can recalculate values based off of changing information by the client as time progresses. Calculator 8302 can also have a Clear button 8053 in order to clear or delete all or part of previously input data in order to change information by the client if an error has been made or the assumptions have changed with time. Calculator 8302 can have user input interfaces via typed responses, drop down menus, check boxes, etc. or other options known in the art. The user can also navigate to other areas of the Workflow Wizard navigation bar (see FIG. 11) by selecting Back to ILIT 8098 or Next: IDGT 8099 buttons.

FIG. 83 also illustrates how a GRAT can yield a larger long term return than simply holding on to a property until death based upon the calculations generated by calculator 8302. The data entered into calculator 8302 can be graphically represented as Grantor Retained Annuity Trust graph 8354. In this graph, the Y-axis 8355 represents dollar amounts and X-axis 8356 represents years. Both the Current Strategy—After Estate Tax Value of Property Held Until Death 8357 can be graphed in direct comparison to the Alternate Strategy: Property Gifted into GRAT 8359. Other non-limiting embodiments of the graphical representations of the ILIT values include line graphs, pie charts, Venn diagrams, etc. or combinations thereof. FIG. 83 also can also provides summary information for a GRAT under the Strategy Comparison Summary Table 8060. Columns Year/Age (EOY) 8361, Current Strategy Property in Estate (EOY) 8362, Alternate Strategy Property Gifted to GRAT (EOY) 8363 and Advantage of GRAT 8364 can display specific data and estimated values of a GRAT when compared to holding a property in estate.

FIG. 84 illustrates some of the possible calculations used to generate the GRAT data when Show Detail box 8350 of calculator 8302 (FIG. 83) is selected. A table can present data directed towards Asset Value with Appreciation 8401, Asset Income 8402, Asset Income Accumulated with Interest 8403, Additional Income Tax that Would Had to Have Been Paid if the Client Had a GRAT (Capital Gains On Sale of Asset Excluded) 8404, and Estate Values Estate Tax and Net After Tax Estate Values 8405. Specific column headers can include Year 8406, Age 8407, Value of Property 8408 and Value of Property (EOY) under the Asset Value with Appreciation 8401 section. Specific columns for, Annual Asset Income (EOY) 8410 and Net Annual Asset Income (EOY) 8411 can be included under the Asset Income 8402 section. Specific columns for Income Accumulated At Interest—Account Balance (EOY) 8412 can be included under the Asset Income Accumulated with Interest 8403 section. Specific columns for Total Income Tax Required for Current Fee Strategy (EOY) 8413, Total Income Tax Required for Alternate GRAT Strategy (EOY) 8414, Tax Differential Between the Two Strategies (EOY) 8415, and Accumulated Opportunity Gain (Loss) on Tax Differential (EOY) 8416 can be included under Additional Income Tax that Would Had to Have Been Paid if the Client Had a GRAT (Capital Gains On Sale of Asset Excluded) 8404 section. Specific columns for Total Value of Asset and Accumulated Income Plus/Minus Opportunity Gain (Loss) 8417, Federal Estate Tax (EOY) 8418, and Value of Property After Estate Tax (EOY) 8419 can be included under Estate Values Estate Tax and net After Tax Estate Values 8405.

Figure 85:
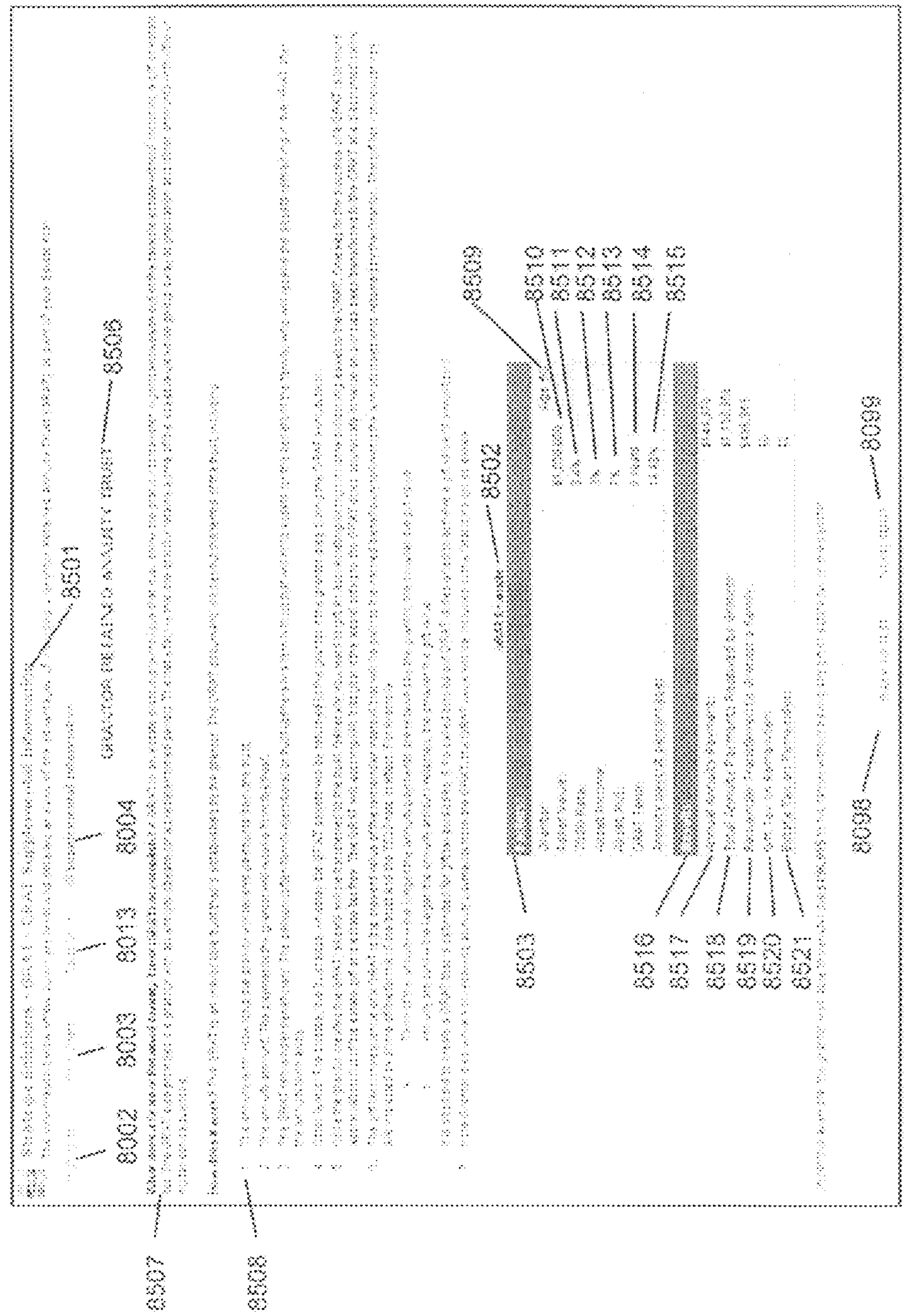

FIG. 85 illustrates a Strategic-Solutions—GRAT Supplemental Information 8501 user interface when the user selects the Supplemental Information link 8004 link (FIG. 80). The strategic-Solutions-GRAT Supplemental Information 8501 user interface offers summary level and detailed analysis of the advantages of including a Grantor Retained Annuity Trust (GRAT) as part of an Estate Plan. For Example, a Grantor Retained Annuity Trust 8506 heading may present frequently asked questions and answers section 8507, and summary information related to a GRAT in outline form 8508. For Example, frequently asked questions and answers section 8507 may include explanatory text as to what does a Grantor Retained Annuity Trust (GRAT) accomplish. A GRAT is an estate planning technique that may allow the grantor to transfer significant wealth out of the taxable estate without incurring a gift or estate tax. The GRAT also provides the grantor with an annuity stream for a predetermined period. The net effect is that the grantor retains some of the asset value while giving away appreciation and other amounts with little or no tax consequences. An outline 8508 section relating to summary information for a GRAT may include a summary table. GRAT Example 8502 presents how in one example, a grantor was able to transfer $496,955 to his family without paying any gift or estate tax on the transfer. Example Table 8502 has fields presenting data for Age of Grantor 8509, the Asset Value 8510, the 7520 Rate 8510, Asset Income 8512, Asset ROI 8513, GRAT Term 8514, and Annuity Payout Percentage 8515. The estimated totals for the GRAT of the Example are illustrated in Results table 8516, which has a field presenting totals for the Annual Annuity Payment 8517, Total Annuity Payments Received by Grantor 8518, Remainder Transferred to Grantor's Family 8519, Gift Tax on Remainder 8520, and Estate Tax on Remainder 8521. The user can also navigate to other areas of the navigation bar (see FIG. 11) by selecting Back to ILIT 8098 or Next: IDGT 8099 buttons.

IDGT

Figure 86:
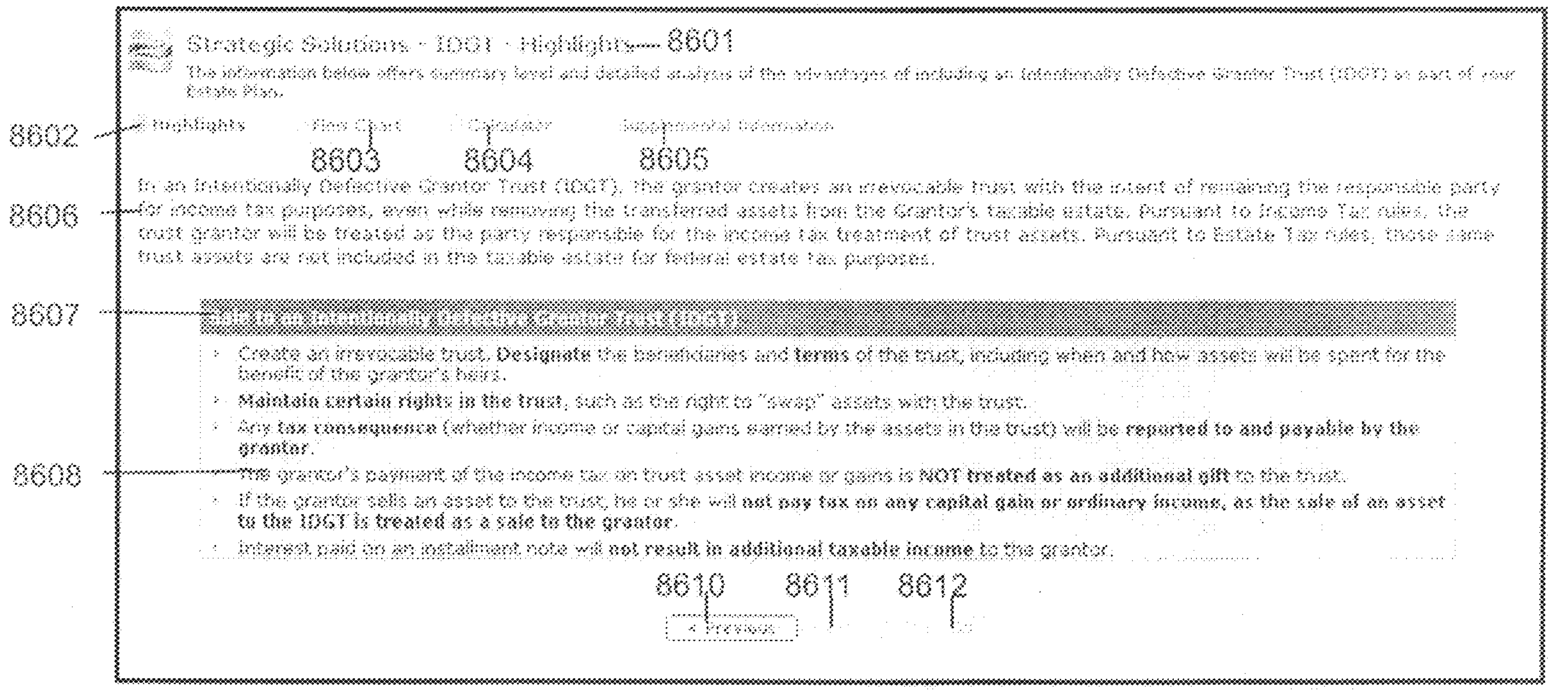

FIG. 86 illustrates the user interface when the user selects the IDGT link 1132 navigation bar in the Estate module 1105 (FIG. 11). The IDGT user interface features are presented on four pages, which are accessed by clicking the corresponding Highlights 8602, Flow Chart 8603, Calculator 8604, and Supplemental 8605 link at the top of the page. By selecting Highlights 8602 the Strategic Solutions—IDGT-Highlights user interface 8601 is displayed. The information within the highlights section provides a summary level and detailed analysis of the advantages of including an IDGT as part of an Estate Plan. The Highlights user interface 8601 page contains static text. When first displayed, only the introductory paragraph 8606 appears, along with a first bullet item in section 8608. The user can click Next 8611 to display the next bullet item, one at a time. Show All 8612 will display all bulleted items. The Previous 8610 button will remove the most recently added bullet item. The user can also navigate to other areas of the navigation bar (see FIG. 11) by selecting Back to GRAT 8698 (see FIG. 87) or Next: CRT 8699 (see FIG. 87) buttons.

Figure 87:
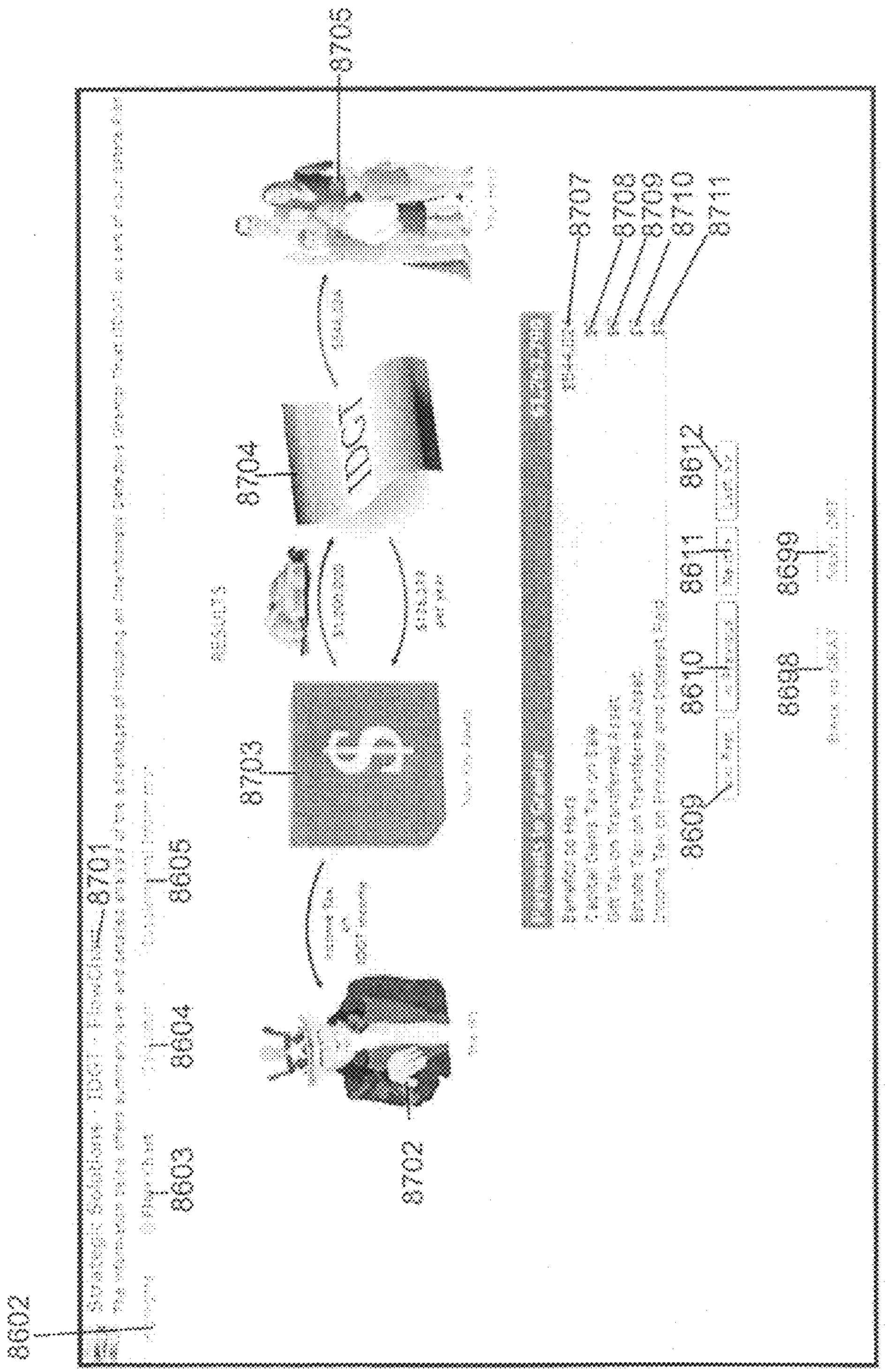

FIG. 87 provides a Strategic-Solutions—IDGT-Flowchart 8701 user interface when the user selects the Flow Chart link 8603 link (FIG. 86). The Strategic-Solutions—IDGT-Flowchart 8701 user interface offers summary level and detailed analysis of the advantages of including an IDGT as part of an Estate Plan. The Strategic-Solutions—IDGT-Flowchart 8701 contains a click-by-click sequence of graphical and text information about an IDGT. The first time a flow chart is displayed, the user will click a Next 8611 button to advance through the sequence. A Previous 8610 button will take the click sequence back one step. First 8609 will take the user back to the first display in the sequence. Last 8612 will display the last display with a single click. The illustration can provide an example of granting a $1,000,000 to a trust can result in annual payments of $126,379 to the grantor totaling $1,263,790 over the term of the trust. In this manner, the IDGT can a benefit of $544, 024 per item 8707, with a capital gains tax on sale of $0 per item 8709, an estate tax on transferred asset of $0 per item 8710 and an income tax on principal and interest paid of $0 per item 8711.

Figure 88:
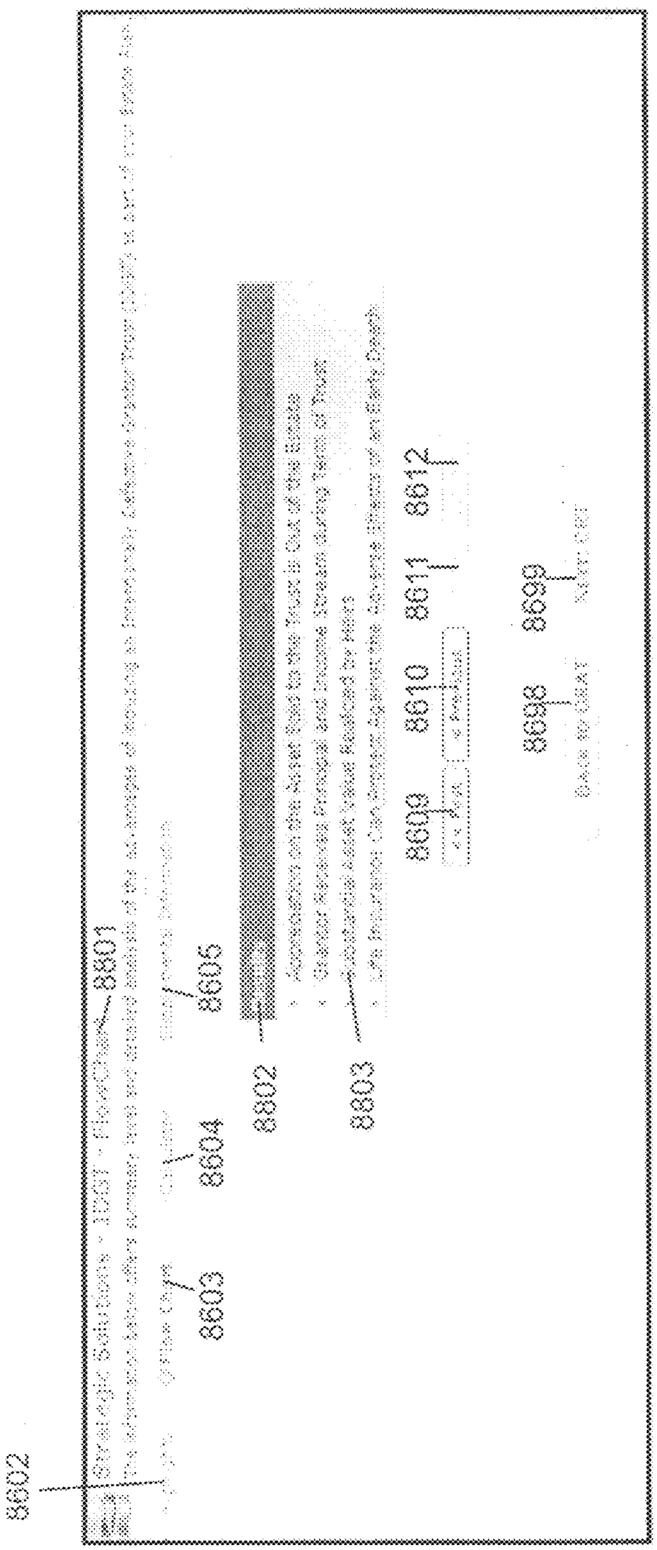

FIG. 88 illustrates a Strategic-Solutions—IDGT-Flowchart 8201 user interface when the user selects the Flow Chart link 8603 link (FIG. 86) and proceeds in clicking through a sequence. The Strategic-Solutions—IDGT-Flowchart 8801 displays Results 8802 section of a IDGT. Results 8802 displays bullets 8803 summarizing the benefits of an IDGT, such as Appreciation on the asset sold to the trust is out of estate, Grantor receives principal and income stream during term of trust, Substantial asset value realized by heirs, and Life insurance can protect against the adverse effects of an early death. The user can again navigate through the flowchart via Next 8611, Previous 8608, First 8609, and Last 8612 as discussed in FIG. 86. The user can also navigate to other areas of the navigation bar (see FIG. 11) by selecting Back to GRAT 8698 or Next: CRT 8699 buttons.

Figure 89:
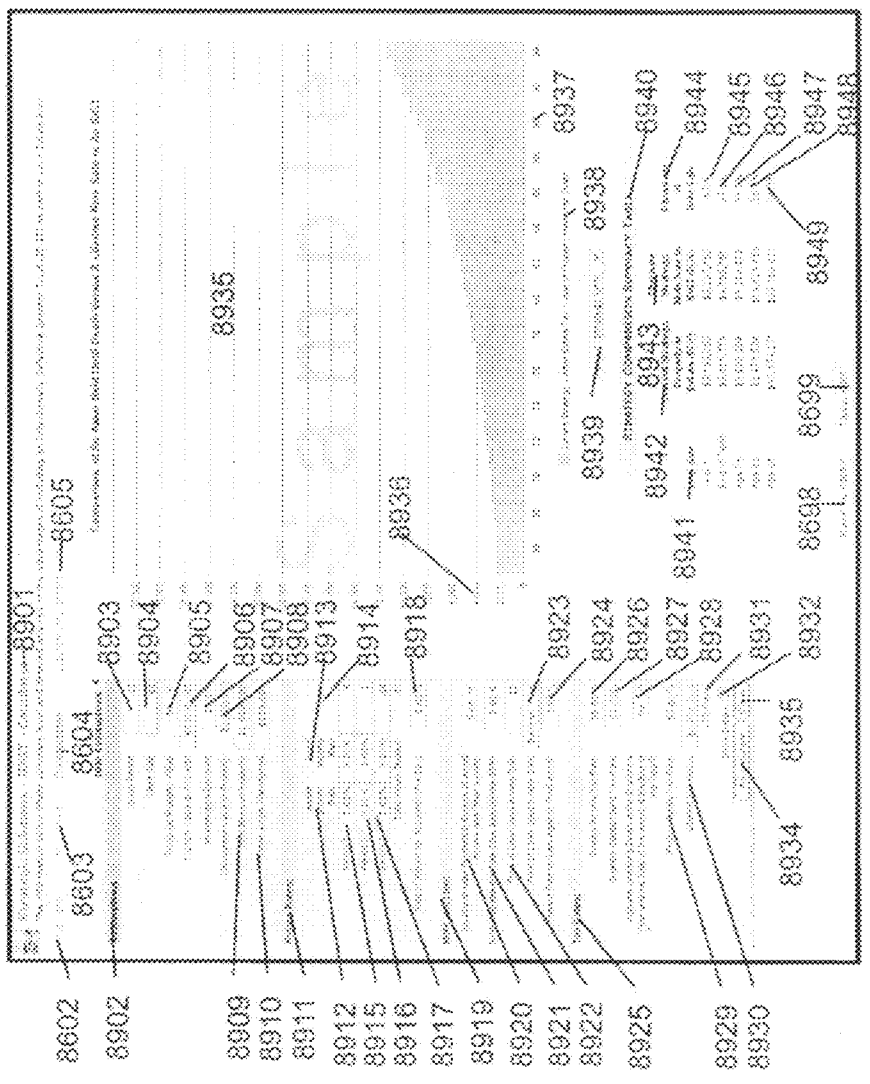

FIG. 89 provides a calculator for providing information, summary and analysis for including an intentionally Defective Grantor Trust (IDGT) as part of an estate. The Strategic Solutions—IDGT-Calculator User interface 8601 can have a menu along the top of the interface with a variety of optional fields, such as Highlights 8602, Flow Chart 8603, Calculator 8604, and Supplementation Information 8605. In this example, the calculator 8604 link is selected, which produces a user interface where a user can enter information relating to general information assumptions of a IDGT in this interface. The left hand menu can comprise several headings, such as Assumptions heading 8902, Return Rate heading 8911, Note and Lien heading 8919, and Tax Rates heading 8925. Under Assumption heading 8902, the user interface can have various fields, including those such as Study Period 8903, Client Age 8904, Gross Up Property Value 8905, Current Value of Property 8906, Hypothetical Discount 8907, Discounted Value of Property 8908, Cost Basis of Property 8909, and Other Asset Transferred 8910. In this example a user has entered 30 in Study Period field 8903, 65 in Client Age field 8904, No in Gross Up Property Value field 8905, $2,000,000 in Current Value of Property field 8906, 0.00% in Hypothetical Discount field 8907, $1,000,000 in Cost Basis of Property field 8909, and $200,000 in Other Asset Transferred field 8910. The calculator has estimated that the hypothetical Discount, based on the assumptions, is approximately $2,000,000, and displays this in field 8908. Under Return Rate heading 8911, the user interface can have various fields, including rows Period 1 8915, Period 2 8915, and Period 3 8917; and well as multiple columns, Asset Growth Rate 8912, Asset Income Rate 8913, and Years 8914. The calculator can accept input for three different growth rates, to allow for different growth rates in various periods of an assets life time. For example, if the asset is expected to have a negative growth rate at the beginning (e.g., company startup), an explosive growth rate (e.g., company going public), and a steady growth rate (e.g., after a public company has been established). These and various other scenarios can be reflected using these inputs. In the present example, user has entered 7.00% for the Asset growth rate column for Period 1, 2, and 3, respectively. A user has entered 3.00% for the Asset Income rate column for period 1, 2, and 3, respectively. Additionally, a user has entered 5 in period 1, 1 in period 2, and 24 in period 3 for Year column. The user interface can also have a field Rate of Return for Accounts (Pre-Tax) 8918, which in this example, a user has input 5.00%. Under Note and Lien heading 8919, the user interface can have various fields, including those such as Source of Note Payment in Excess of Asset Income and Other Assets field 8920, Note Sale Interest Rate (Use Appropriate AFR) field 8921, Term of Loan Used in Note Sale in field 8922, Type of Loan Used in Note Sale in field 8923 and Interest Rate on Lien Against Trust Asset in field 8924. In the present example, a user has entered Sale in Source of Note Payment in Excess of Asset Income and Other Assets field 8920, 5.00% in Note Sale Interest Rate (Use Appropriate AFR) field 8921, 10 in Term of Loan Used in Note Sale in field 8922, Balloon in Type of Loan Used in Note Sale in field 8923 and 0.00% in Interest Rate on Lien Against Trust Asset in field 8924. Under Tax Rate heading 8925, the user interface can have various fields including those such as Grantor Income Tax Rate field 8926, Grantor Capital Gains Tax Rate field 8927, Assume Grantor's Death at the End of the Year and the Sale of the Asset at the End of the Year? field 8927, Federal Tax Rate field 8929, and Lifetime Exemption field 8930. In the current example, a user has entered 35.00 in Grantor Income Tax Rate field 8926, 20.00% in Grantor Capital Gains Tax Rate field 8927, No in Assume Grantor's Death at the End of the Year and the Sale of the Asset at the End of the Year? field 8942, 50.00% in Federal Tax Rate field 8929, and Lifetime Exemption field 8930. AFR Rates 8931 can be a link to the official AFR rates as published by the IRS. The IDGT calculator can also have a field for Show Details 8932, and Recalculate 8934 and Clear 8935 buttons in order for the user to input, display and change any information as warranted. The Workflow Wizard can be navigated via Back to GRAT button 8698 and Next: CRT button 8699.

The data entered into the user interface IDGT-Calculator 8901 can be graphically represented as "Comparison of an Asset Held Until Death Versus A Lifetime Note Sale to an IDGT" graph 8935. In this graph, the Y-axis 8936 represents dollar amounts and X-axis 8937 represents years. The Current Strategy—After Estate Tax Value of Property Held Until Death 8938 can be graphed. The IDGT data is presented in Strategy Comparison Summary Table 8940. Strategy Comparison Summary Table 8940 can have multiple columns including Year/Age 8941, Current Strategy: Property In Estate 8942, Alternate Strategy Note Sale to IDGT (EOY) 8943, and Advantage of Note Sale 8944. The advantage rate of 4.2% at 8945, 27.56% at 8946, 31.3% at 8947, 55.7% at 8948, and 66.0% 8949 can be seen.

Figure 90:

In FIG. 90, the Current Strategy—After Estate Tax Value of Property Held Until Death 8948 can be graphed in direct comparison to the Alternate Strategy-Lifetime Disposition of Asset Through Note Sale 8949. Other non-limiting embodiments of the graphical representations of the IDGT values include line graphs, pie charts, Venn diagrams, etc. or combinations thereof.

FIG. 91 illustrates some of the possible calculations used to generate the IDGT data when Show Detail box 9832 of calculator 8901 (FIG. 89) is selected. A table presents data directed towards Asset Value section 9101, Asset Income 9102 section, Asset Income Accumulation 9103 section, Other Asset Account 9104 section, and Total Net Estate Value 9105 section. Specific column headers can include Year 7701, and Age Life 1 7702. Specific columns for Year 9106, and Age 9107 are provided. Columns for Value of Property (BOY) 9108, Value of Property (EOY) 9109 are provided under Asset Value section 9101. Columns for Annual Asset Income (EOY) 9110 and Net After-Tax Annual Asset Income (EOY) 9111 and Asset Income section 9102. Columns for Asset Net After Income Accumulated At Interest (EOY) under Asset Income Accumulation section 9103. Columns for Other Asset Accumulation Account (EOY) under the Other Asset Account 9104 section. Columns for Total Estate value (EOY) 9114, Federal Estate Tax (EOY) 9115, and Net After Estate Tax Value (EOY) 9116 under the Total Estate Value 9105 section. The Workflow Wizard can be navigated via Back to GRAT 8698 or Next: CRT 8699 buttons.

Figure 92:
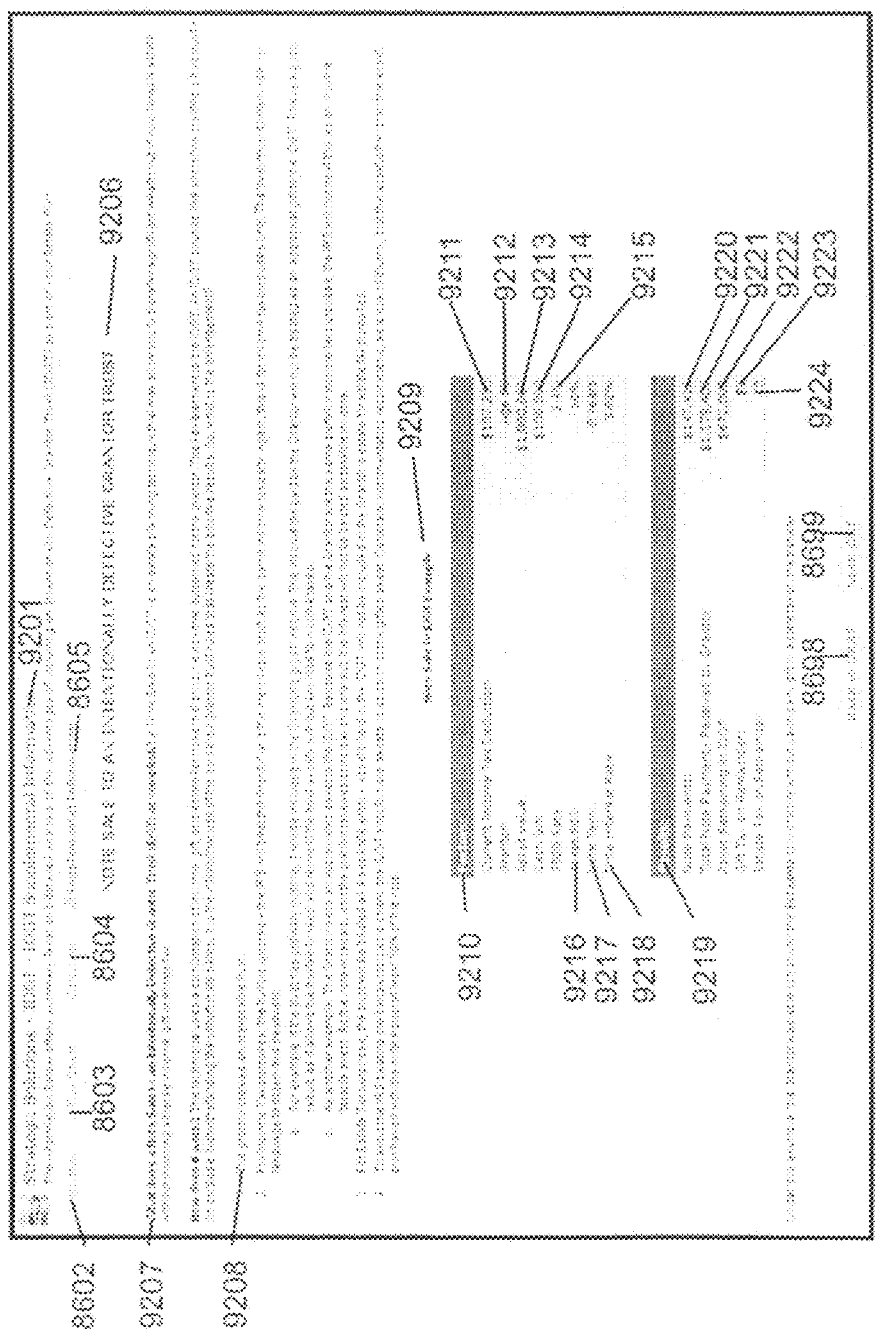
Figure 93:
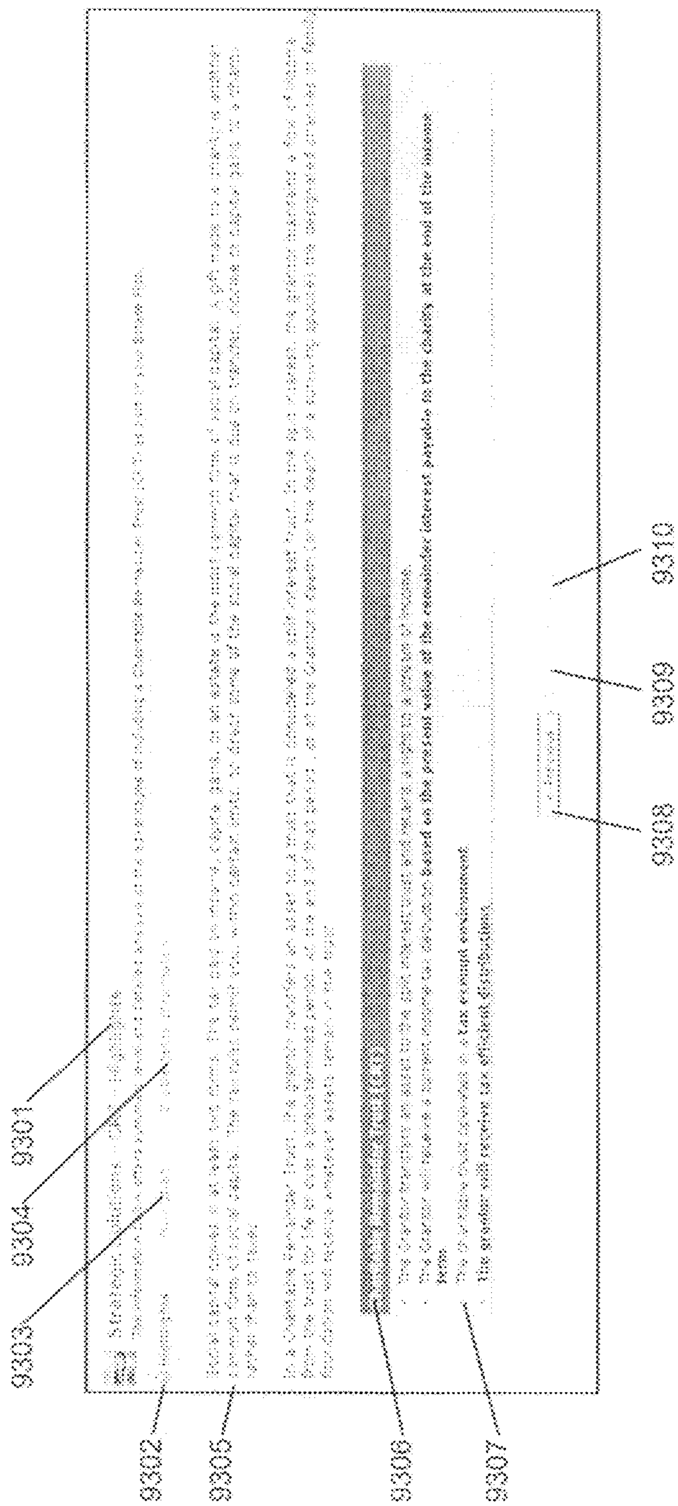

FIG. 92 demonstrates a Strategic-Solutions—IDGT-IDGT Supplemental Information 9201 user interface when the user selects the Supplemental Information link 8604 link (FIG. 93). The Strategic-Solutions—IDGT-IDGT Supplemental Information 9201 user interface offers summary level and detailed analysis of the advantages of including an IDGT as part of an Estate Plan. For example, a Note Sale To a IDGT 9206 heading may present a frequently asked questions and answers section 9207, and summary information related to a IDGT in outline form 9208. For example frequently asked questions and answers section 9207 may include reasons to use a Intentionally Defective Grantor Trust (IDGT). A Note Sale to an IDGT is an estate planning technique that may allow you to transfer significant wealth out of your taxable estate without incurring adverse income, gift or estate tax.

Frequently asked questions and answers section 9207 may also state: How does it work? The technique uses a combination of income, gift, and estate tax rules that produce positive outcomes for the grantor. The key element is the IDGT. An IDGT sounds like someone created a bad trust—on purpose. Notwithstanding the unfortunate name, it is the intentional use of the so-called grantor trust rules that create the positive results. Outline section 9208 may present information relating to:

1. The grantor creates an irrevocable trust.

2. For Income Tax purposes, the trust is ignored—the IRS will treat the Grantor and the irrevocable trust as the same income tax party. Again, this is for income tax purposes only. The trust must contain special language to obtain this treatment.

a. For example: If the trust has ordinary income, it will be included in the Grantor's gross income. The income tax paid by the Grantor will not be treated as an additional gift to the IDGT. This is a good result, as it allows the trustee to keep and reinvest the trust assets without any loss to income taxes.

b. As another example: The Grantor sells an appreciated asset to the IDGT. Because the IDGT and the Grantor are the same party for income tax purposes, the IRS will not treat this as an income taxable event. As the note is repaid, and the grantor receives principal and interest, the interest will not be treated as taxable income.

3. For Estate Tax purposes, the trust will be treated as a separate entity—assets held in the IDGT will not be included in the Grantor's estate for estate tax purposes.

4. To avoid the IRS treating the transaction as a sham, the IDGT should have assets in addition to the gifted asset. Generally, commentators recommend, as a rule of thumb, that the asset other than the asset purchased with the note equal at least 10% of the note.

Outline 9208 section relating to summary information for an IDGT may include a summary table. Note Sale to IDGT Example 9209 presents how in one example, a grantor was able to transfer the $672,002 to his family without paying any gift or estate tax on the transfer. Example Table 9209 has fields presenting Factors 9210 for Current Income Tax Deduction 9211, Grantor Age 9212, Asset Value 9213, Cash Gift 9214, 7520 Rate 9215, Asset ROI 9216, Note Term 9216, and Note Interest Rate 9218. The estimated totals for the IDGT of the Example are illustrated in a Results table 9219, which has fields presenting totals for the Note Payments 9220, Total Note Payments Received by Grantor 9221, Asset Remaining in IDGT 9222, Gift Tax on Remainder 9223, and Estate Tax on Remainder 9224. The user can also navigate to other areas of the navigation bar (see FIG. 11) by selecting Back to ILIT 8098 or Next: IDGT 8099 buttons.

CRT

FIG. 93 demonstrates the user interface when the user selects the CRT link 1133 navigation bar in the Estate module 1105 (FIG. 11). The CRT user interface features are presented on three pages, accessed by clicking the corresponding Highlights 9302, Flow Chart 9303, and Supplemental 9304 link at the top of the page. By selecting Highlights 9302 the Strategic Solutions—CRT-Highlights user interface 9301 is displayed. The information within the highlights section provides a summary level and detailed analysis of the advantages of including a Charitable Remainder Trust (CRT) as part of an Estate Plan. The Highlights user interface 9301 page contains static text. When first displayed, only the introductory paragraph 9305 appears, along with a first bullet item 9307 from a Charitable Remainder Trust Section 9306. The user can click Next 9309 to display the next bullet item, one at a time. Show All 9310 will display all bullet items. The Previous 9308 button will remove the most recently added bullet item. The introductory sections 9305 may state that social capital comes in at least two forms. The tax paid on income, capital gains, or an estate is the most common form of social capital. A gift made to a charity is another common form of social capital. The tax rules permit you, within certain limits, to direct some of the social capital that is due on transfer, income or capital gains to a charity rather than to taxes. In a Charitable Remainder Trust, the grantor transfers an asset to a trust that is considered a split interest trust. In the split interest, the grantor maintains a flow of income from the trust for life or over a predetermined period. At the end of that period, or at the Grantor's death (or the death of a surviving spouse), the designated charities or family foundation will receive whatever assets remain in the trust. Bullets 9307 may recite: the Grantor transfers an asset to the split interest trust and retains a right to a stream of income; the Grantor will receive a current income tax deduction based on the present value of the remainder interest payable to the charity at the end of the income term; the charitable trust operates in a tax exempt environment; and the grantor will receive tax efficient distributions. The bullets may appear after a series of single clicks.

Figure 94:
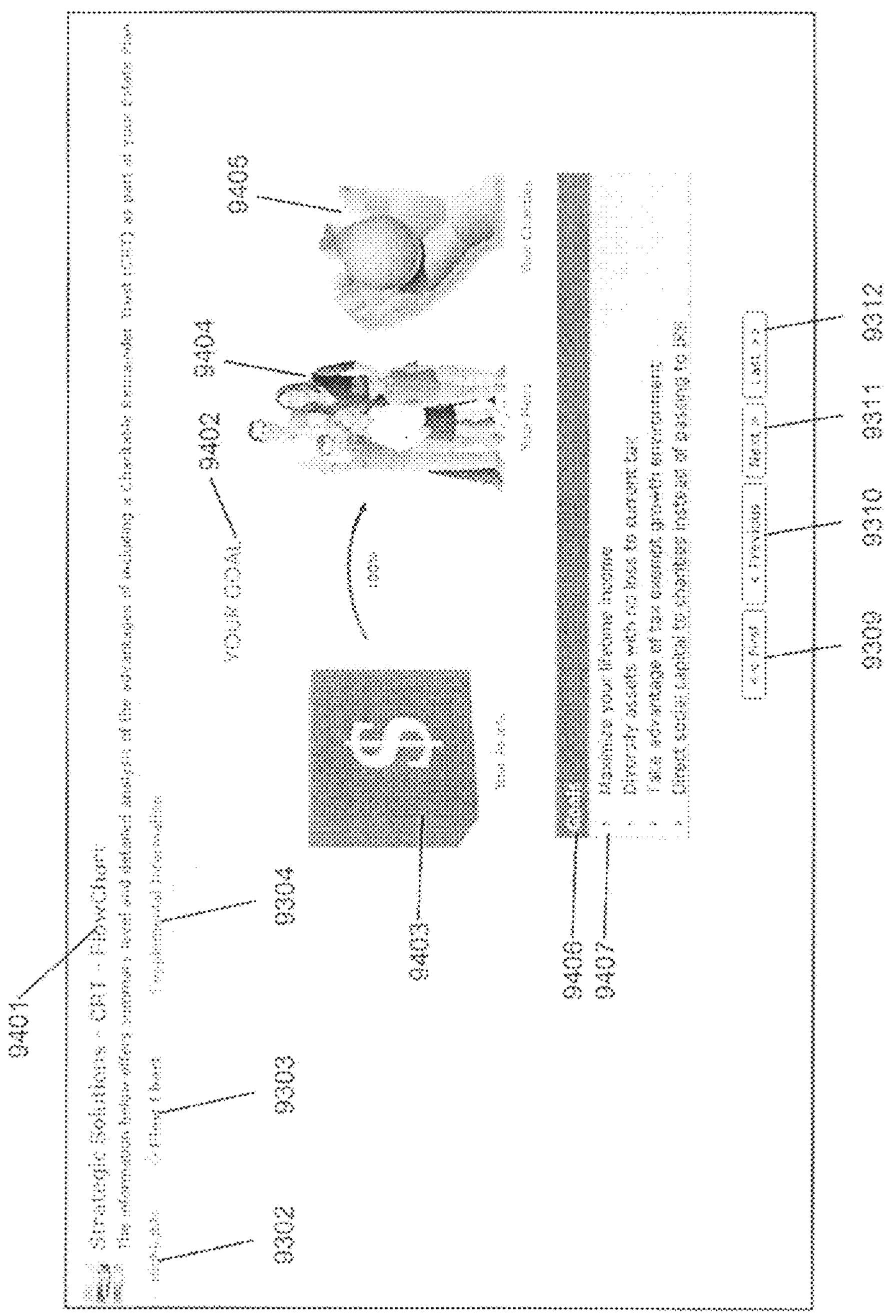

FIG. 94 shows a Strategic-Solutions—CRT-Flowchart 9401 user interface when the user selects the Flow Chart link 9303 link (FIG. 93). The Strategic-Solutions—CRT-Flowchart 9401 user interface offers summary level and detailed analysis of the advantages of including a Charitable Remainder Trust (CRT) as part of your Estate Plan. The Strategic-Solutions—CRT-Flow Chart 9401 contains a click-by-click sequence of graphical and text information about a CRT. The first time a flow chart is displayed, the user will click a Next 9411 button to advance through the sequence. A Previous 9410 button will take the click sequence back one step. First 9409 will take the user back to the first display in the sequence. Last 9412 will display the last display with a single click. Click 1 (click to arrive on Flow Chart page)—Today flow chart (NOT SHOWN). Today flow chart displays a graphical representation of Your Assets 9403. Click 2 displays Click 2—Your Goal 9402. Your Goal 9402 displays a graphical representation wherein Your Assets 9403 are 100 transferred to your Heirs 9404 and Your Charities 9405. A Goals summary section 9406 displays bulleted information pertaining to the goals of a CRT, such as: Maximize your lifetime income, Diversify assets with no loss to current tax, Take advantage of tax exempt growth environment, and Direct social capital to charities instead of passing to IRS. Click 1 (click to arrive on Flow Chart page)—Today flow chart (NOT SHOWN). Today flow chart displays a graphical representation of Your Assets 9403.

Figure 95:
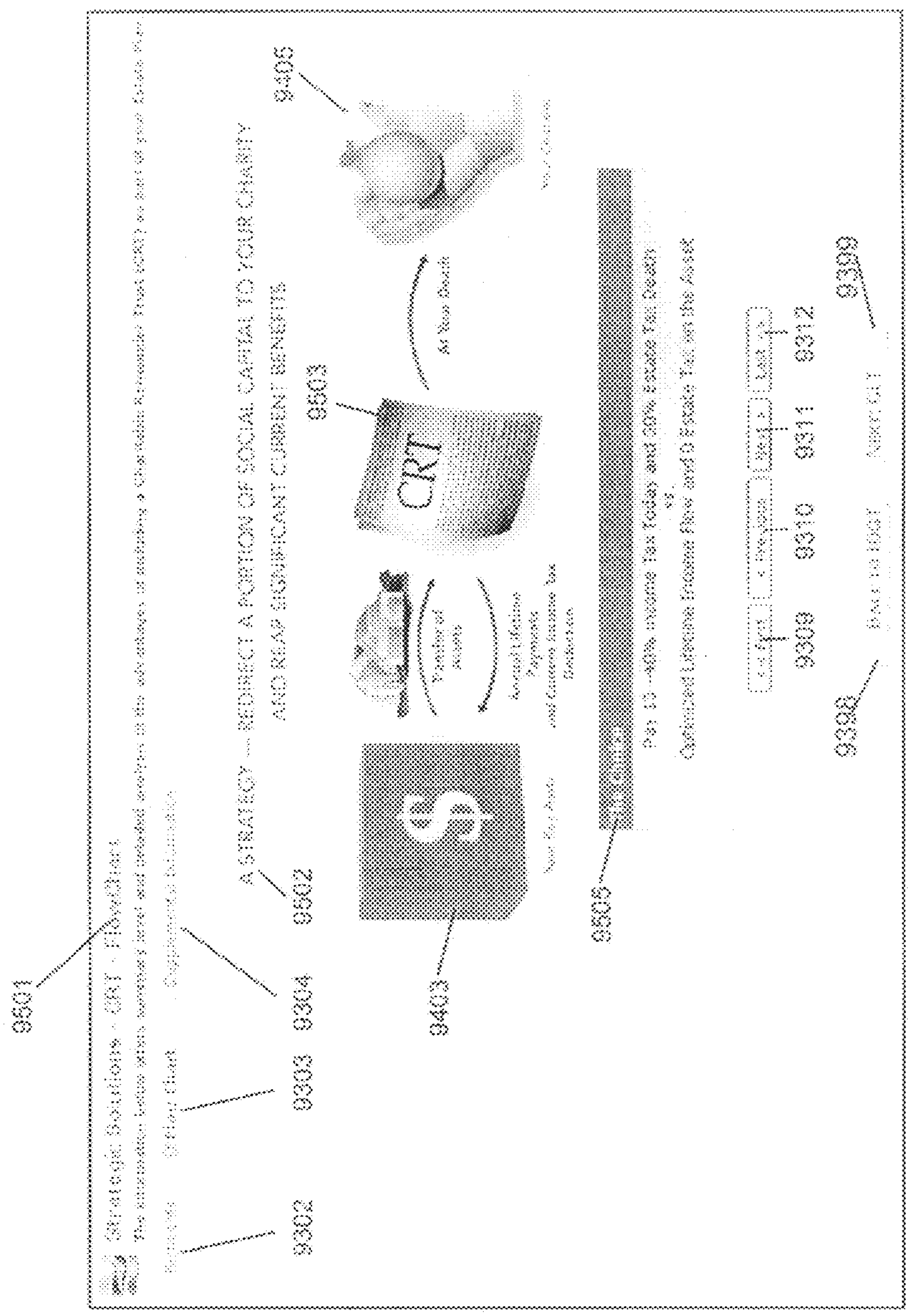

FIG. 95 shows a Strategic-Solutions—CRT-Flow Chart 9501 user interface when the user selects the Flow Chart link 9303 link (FIG. 94) and proceeds in clicking through a sequence. The Strategic-Solutions—CRT-Flow Chart 9501 displays a graphical representation of A Strategy—Redirect a Portion of Social Capital to Your Charity and Reap Significant Current Benefits 9502. Your Strategy 9502 displays a graphical representation wherein Your Key Assets 9403 are transferred to a CRT 9503, and the CRT pays Annual Lifetime Payments and provides Current Income Tax deductions for the Grantor. The CRT 9503 is then transferred to specific Charities 9405 at the Death of the Grantor. The Choice summary section 9505 displays bulleted information pertaining to options of a CRT, such as: "Pay 15-40% Income Tax Today and 50% Estate Tax Death," versus "Optimized Lifetime Income Flow and 0 Estate Tax on the Asset." The user can again navigate through the flowchart via Next 9411, Prev 9410, First 9409, and Last 9412 as discussed in FIG. 94. The user can also navigate to other areas of the navigation bar (see FIG. 11) by selecting Back to IDGT 9398 or Next: CLT 9399 buttons.

Figure 96:
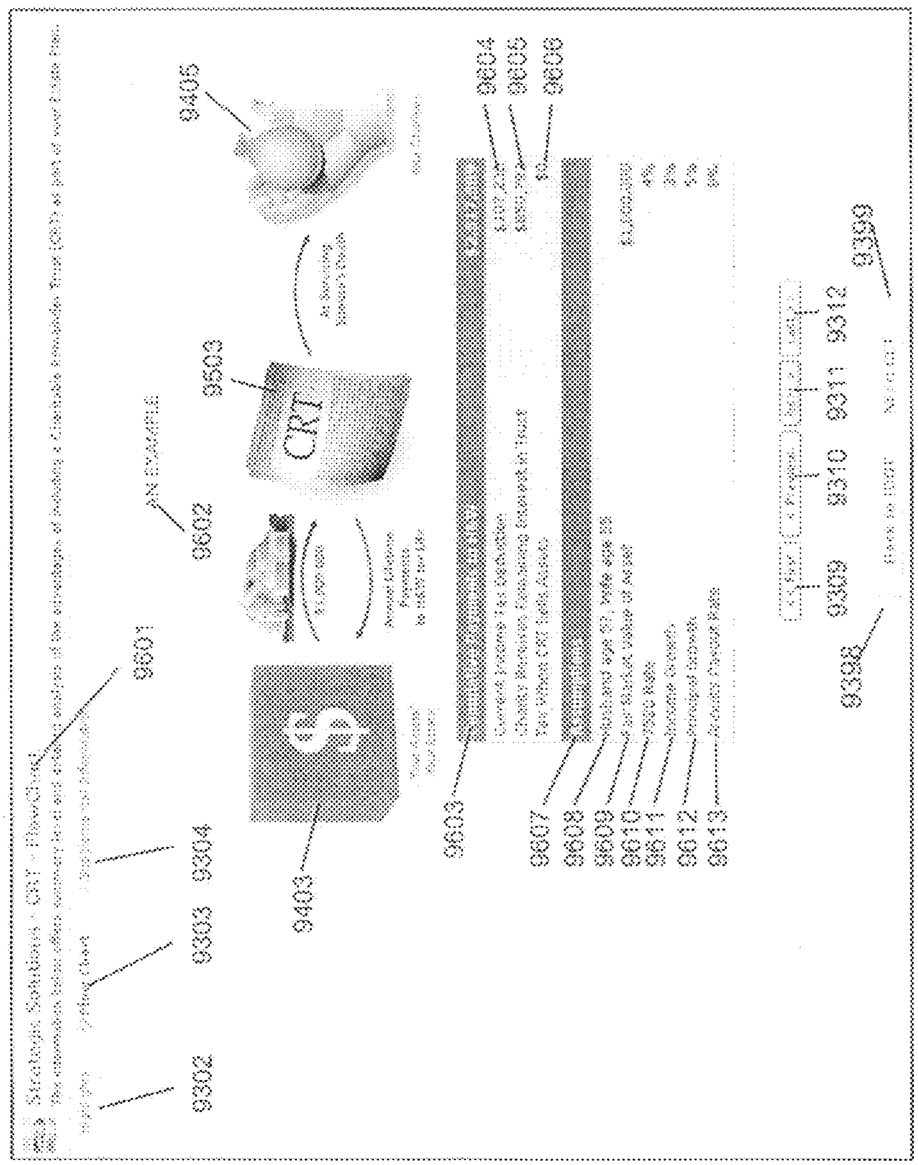

FIG. 96 demonstrates a Strategic-Solutions—CRT-Flow Chart 9601 user interface when the user selects the Flow Chart link 9303 link (FIG. 95) and proceeds in clicking through a sequence. The Strategic-Solutions—CRT-Flow Chart 9601 displays a graphical representation of An Example 9602 of a CRT. An Example 9602 displays a graphical representation wherein Your Key Assets 9403 are transferred to a CRT 9503, and the CRT pays an Annual Lifetime Payments and provides Current Income Tax deductions for the Grantor. The CRT 9503 is then transferred to specific Charities 9405 at the Death of the Grantor. The Cumulative Payments to Husband and Wife (H & W) summary section 9603 displays information pertaining to Current Income Tax Deduction 9604, Charity Receives Remaining Interest in Trust 9605, and Tax When CRT Sells Assets 9606. The estimates for Cumulative Payment to H & W section 9603 are based upon data displayed in Assumptions section 9607. For example, Assumptions may display the ages of the husband and wife 9608, the Fair Market Value of the Asset 9609, the 6120 Rate 9610, Income Growth 9611, Principal Growth 9612 and Annuity Payout Rate 9613. The user can again navigate through the flowchart via Next 9411, Previous 9410, First 9409, and Last 9412 as discussed in FIG. 94. The user can also navigate to other areas of the navigation bar (see FIG. 11) by selecting Back to IDGT 9398 or Next: CLT 9399 buttons.

Figure 97:
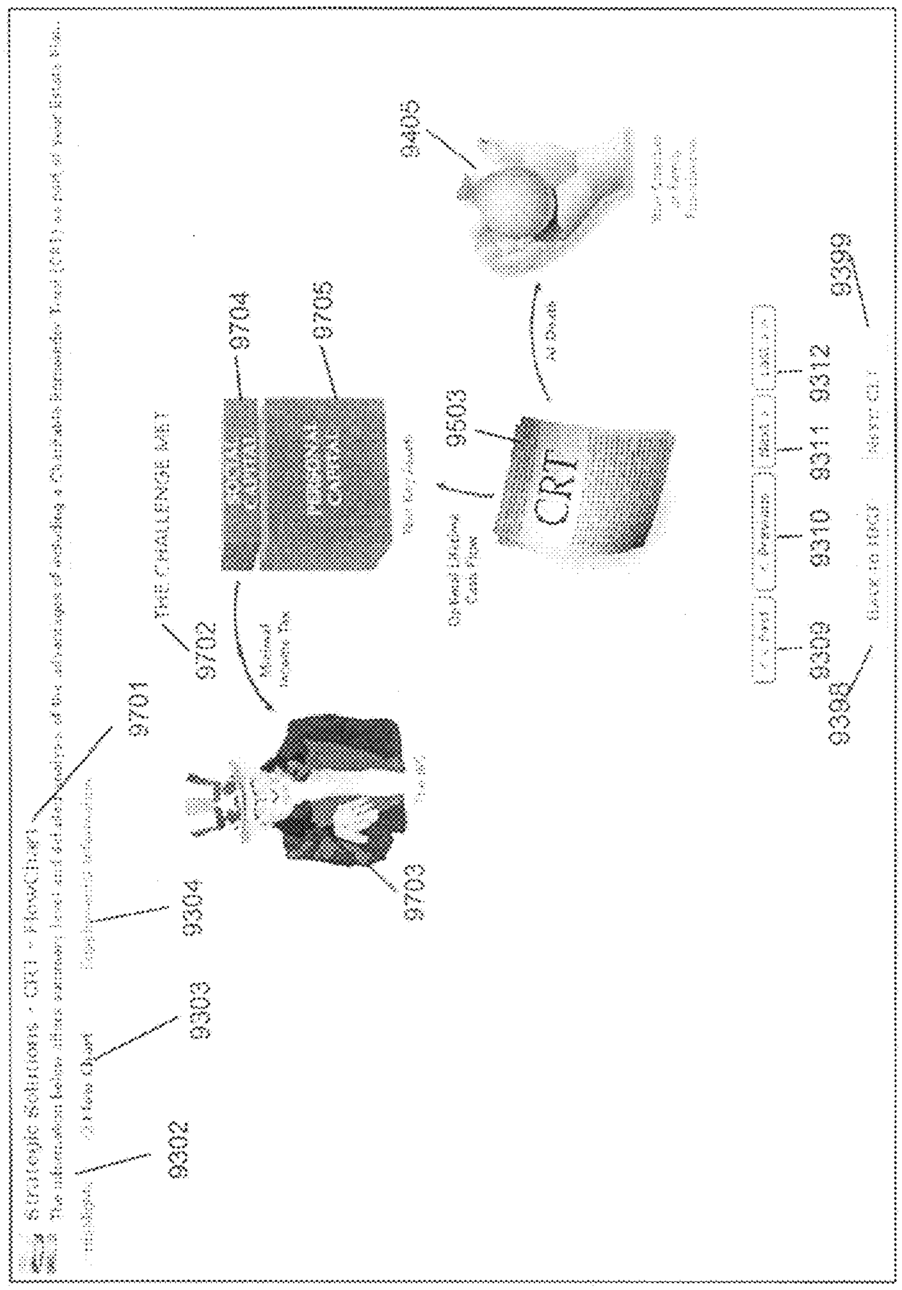

FIG. 97 demonstrates a Strategic-Solutions—CRT-Flow Chart 9701 user interface when the user selects the Flow Chart link 9303 link (FIG. 96) and proceeds in clicking through a sequence. The Strategic-Solutions—CRT-Flow Chart 9701 displays a graphical representation of The Challenge Met 9702 of a CRT. The Challenge Met 9702 displays a graphical representation wherein a CRT 9503 provides optimal Lifetime Cash flow to the grantor, providing personal and social capitol 9705 and 9704, respectively. The social capital is those monies donated to charities over your lifetime, funded by CRT 9503 reduce a client's tax burden, thus minimizing Income Taxes paid to the IRS 9703. Subsequently, at a client's death, the CRT may transfer assets or capitol to a charity or family foundation of choice 9405. The user can again navigate through the flowchart via Next 9411, Previous 9410, First 9409, and Last 9412 as discussed in FIG. 94. The user can also navigate to other areas of the navigation bar (see FIG. 11) by selecting Back to IDGT 9398 or Next: CLT 9399 buttons.

Figure 98:
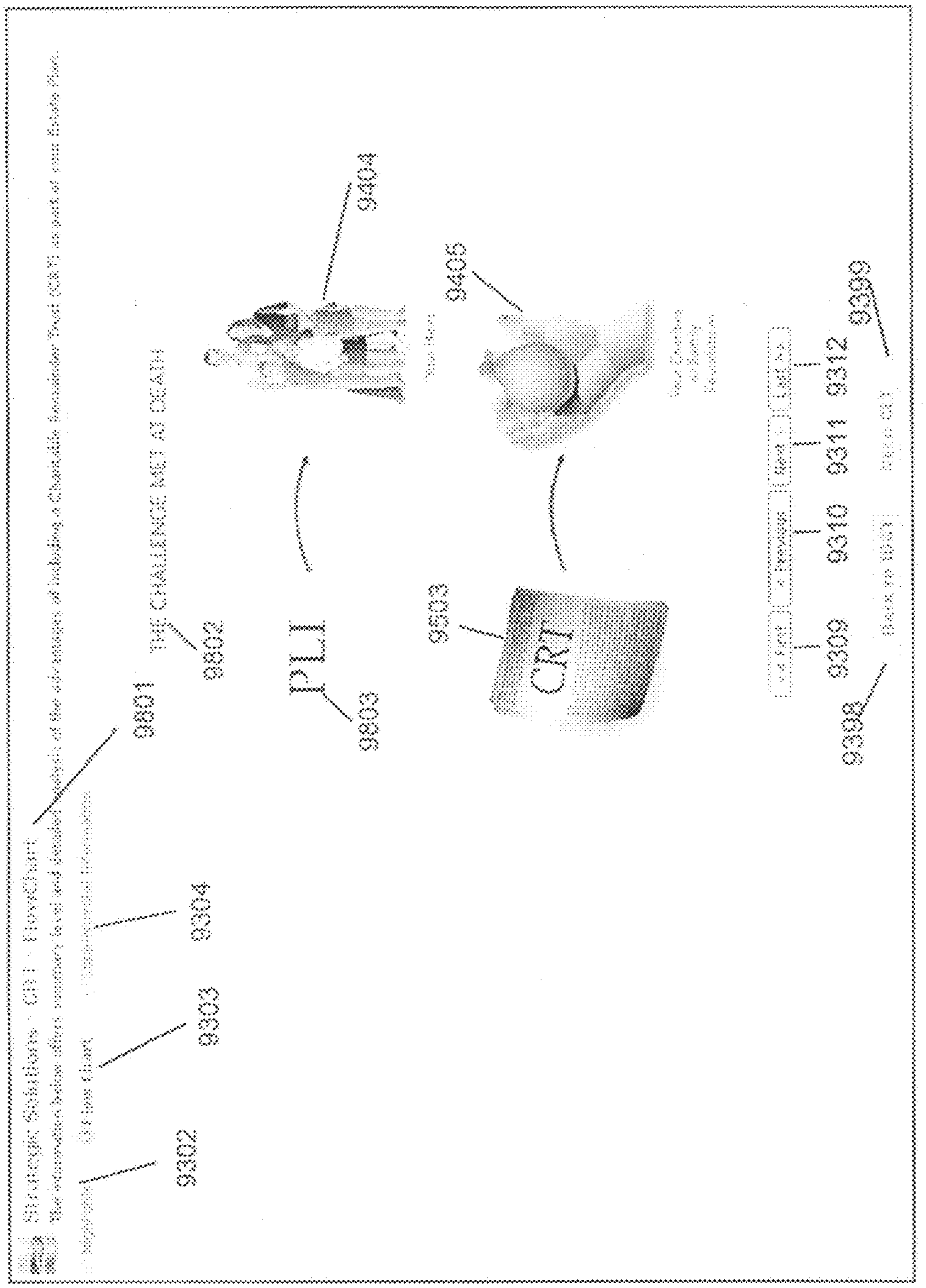

FIG. 98 shows a Strategic-Solutions—CRT-Flow Chart 9801 user interface when the user selects the Flow Chart link 9303 link (FIG. 97) and proceeds in clicking through a sequence. The Strategic-Solutions—CRT-Flowchart 9801 displays a graphical representation of The Challenge Met at Death 9802 of a CRT. The Challenge Met at death 9802 displays a graphical representation wherein a CRT 9503 may transfer assets or capitol to a charity or family foundation of choice 9405, while a personal life insurance policy (PLI) 9803 provides liquidity to designated heirs 9404. The user can again navigate through the flowchart via Next 9411, Previous 9410, First 9409, and Last 9412 as discussed in FIG. 94.

The user can also navigate to other areas of the navigation bar (see FIG. 11) by selecting Back to IDGT 9398 or Next: CLT 9399 buttons.

Figure 99:
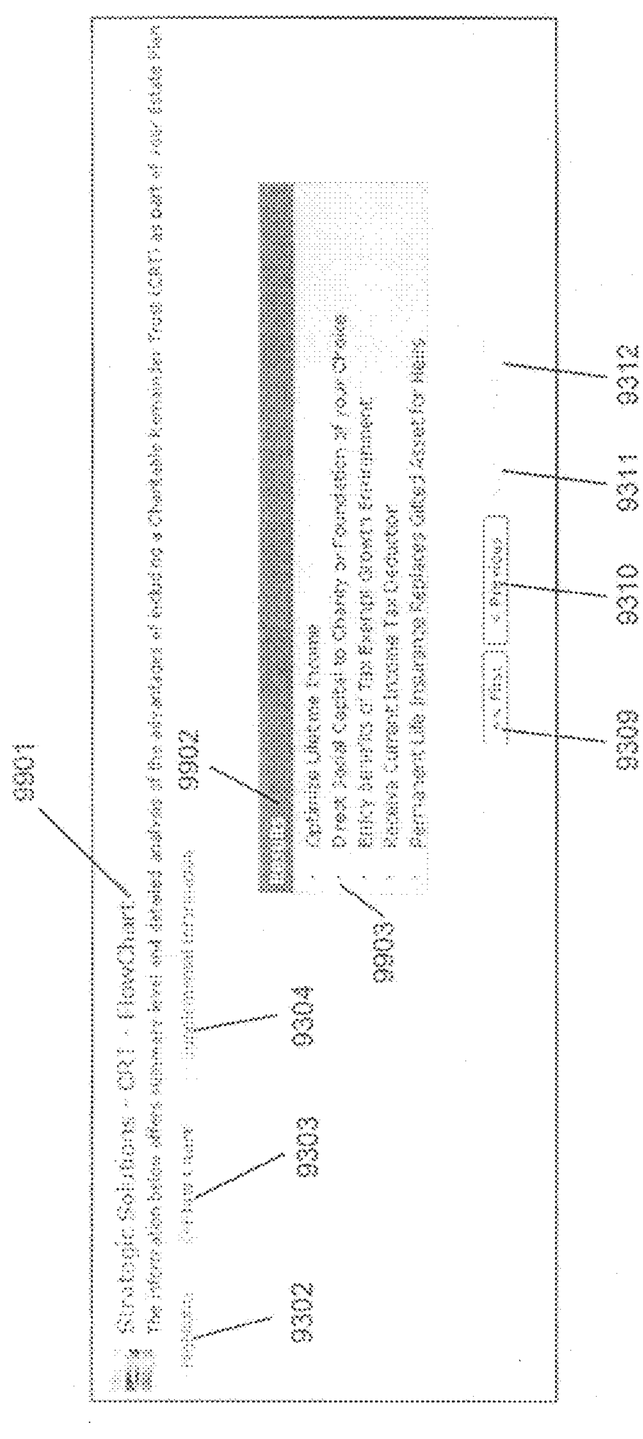

FIG. 99 shows a Strategic-Solutions—CRT-Flow Chart 9901 user interface when the user selects the Flow Chart link 9303 link (FIG. 98) and proceeds in clicking through a sequence. The Strategic-Solutions—CRT-Flow Chart 9901 displays the Results 9902 of a CRT. Results 9902 displays bullets 9903 summarizing the benefits of a CRT, such as Optimize Lifetime Income, Direct Social Capital to Charity or Foundation of your Choice, Enjoy Benefits of Tax Exempt Growth Environment, Receive Current Income Tax Deduction, and Permanent Life Insurance Replaces Gifted Assets for Heirs. The user can again navigate through the flowchart via Next 9411, Previous 9410, First 9409, and Last 9412 as discussed in FIG. 94.

Figure 100:
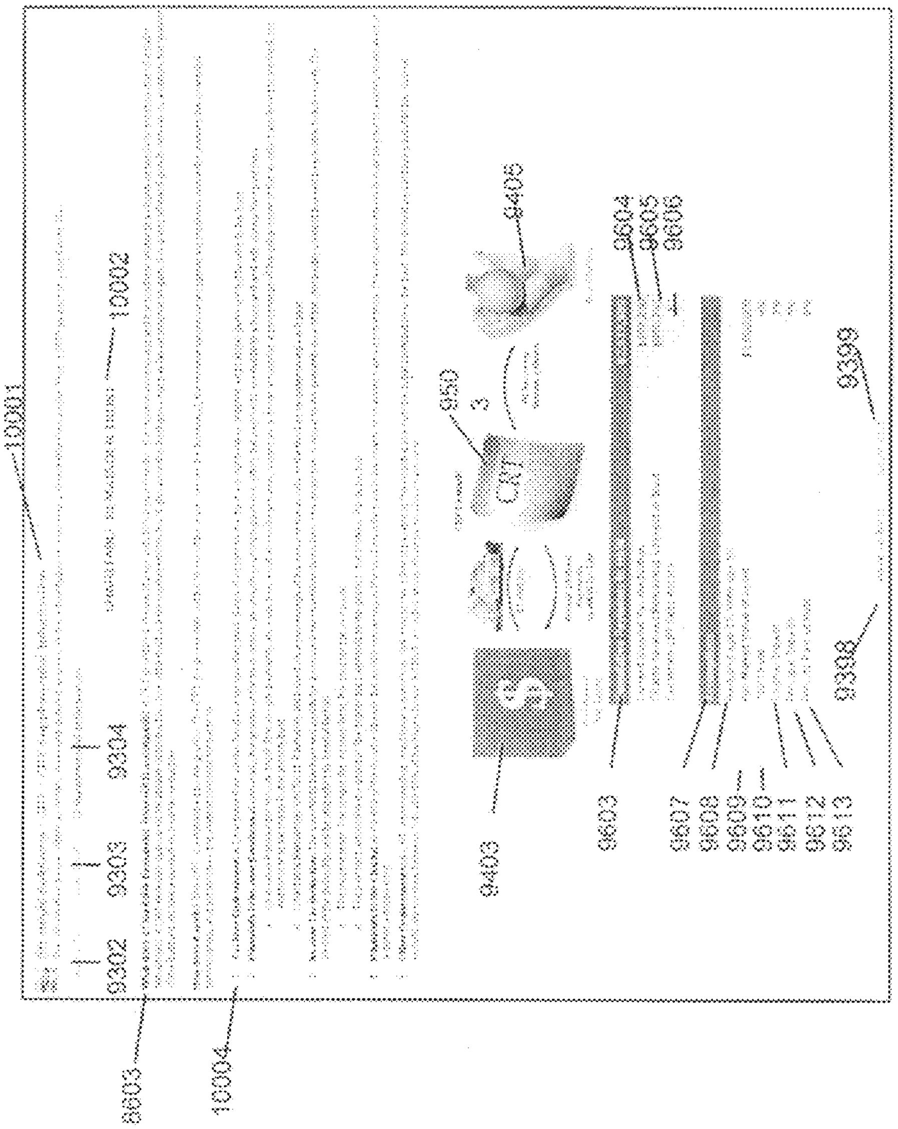

FIG. 100 demonstrates a Strategic-Solution—CRT-CRT Supplemental Information 10001 user interface when the user selects the Supplemental Information link 9304 link (FIG. 93). The Strategic-Solutions—CRT-CRT Supplemental Information 10001 user interface offers summary level and detailed analysis of the advantages of including a Charitable Remainder Trust (CRT) as part of an Estate Plan. For Example Charitable Remainder Trust 10002 heading may present a frequently asked questions and answers section 10003, and summary information related to a CRT in outline form 10004. For Example frequently asked questions and answers section 10003 may include reasons to use a Charitable Remainder Trust (CRT). A CRT provides a stream of payments to the trust Grantor (the income beneficiary) and the trust remainder to a charity or family foundation (the charitable remainder). A CRT receives special tax treatment under the tax code—the trust is a tax exempt environment. Because the trust does not pay tax on income or gain, it is a very efficient growth vehicle. In addition, the grantor of the trust will receive a current income tax deduction. The CRT is established by the grantor. The CRT document sets out the terms of the trust, names the trustee(s), the income beneficiaries (generally husband and wife), names the charitable beneficiaries, and establishes the state of domicile for the trust. An outline 10004 section relating to summary information for a CRT may include:

- Tax Free Environment: A Charitable Remainder Trust is a tax qualified trust. Sales of assets by the trust are not taxable. Income and capital gains are not taxable to the trust.
- Payments to Income Beneficiary: Generally, the grantor of the trust retains an annuity or unitrust payment. Often, the payments are made to a husband and wife during their joint lives.
  - Charitable Remainder Annuity Trust: The annuity payments are based on a set amount each year, stated as a dollar amount or a percentage of the initial value of the assets transferred to the trust. No additions may be made to the annuity trust.
  - Charitable Remainder Unitrust: Payments are based on a percentage of the value of the assets in the trust as re-determined each year.
- Income Tax Deduction: The transfer to the trust will qualify for an income tax charitable deduction. The deduction is equal to the present value of the remainder interest that will be payable to the charity. The amount of the deduction will be impacted by several factors:
  - The income term: The longer the income term, the smaller the deduction.
  - The payment amount to the grantor: The higher the payments to the grantor, the smaller the deduction.
- Payments to the Charity: At the end of the income stream, the assets remaining in the trust must be paid to the charity or charities named in the trust. The remainder interests may be paid to a family foundation or a donor advised fund.
- Other Requirements: A CRT, when created, must have a minimum 10% remainder interest payable to the charity based on the initial contribution to the trust. The annual percentage payout to the income beneficiary must be between 5% and 50% of the trust interest. A CRT, as noted above, must be revalued each year.

Finally, supplemental information user interface 10001 may repeat sections previously seen in other areas of the CRT user interface. For example, the CRT supplemental section 10001 may present graphical representations of one's assets, 9403, a CRT 9503, and designated Charities 9405 shown in the flow chart 9303 user interface. Alternately, supplemental section 10001 may repeat The Cumulative Payments to H&W section 9603 and underlying Assumptions 9607 as seen previously (FIG. 96). Thus, a client is able to see and review nearly all basic aspects of a CRT in one single place.

CLT

Figure 101:
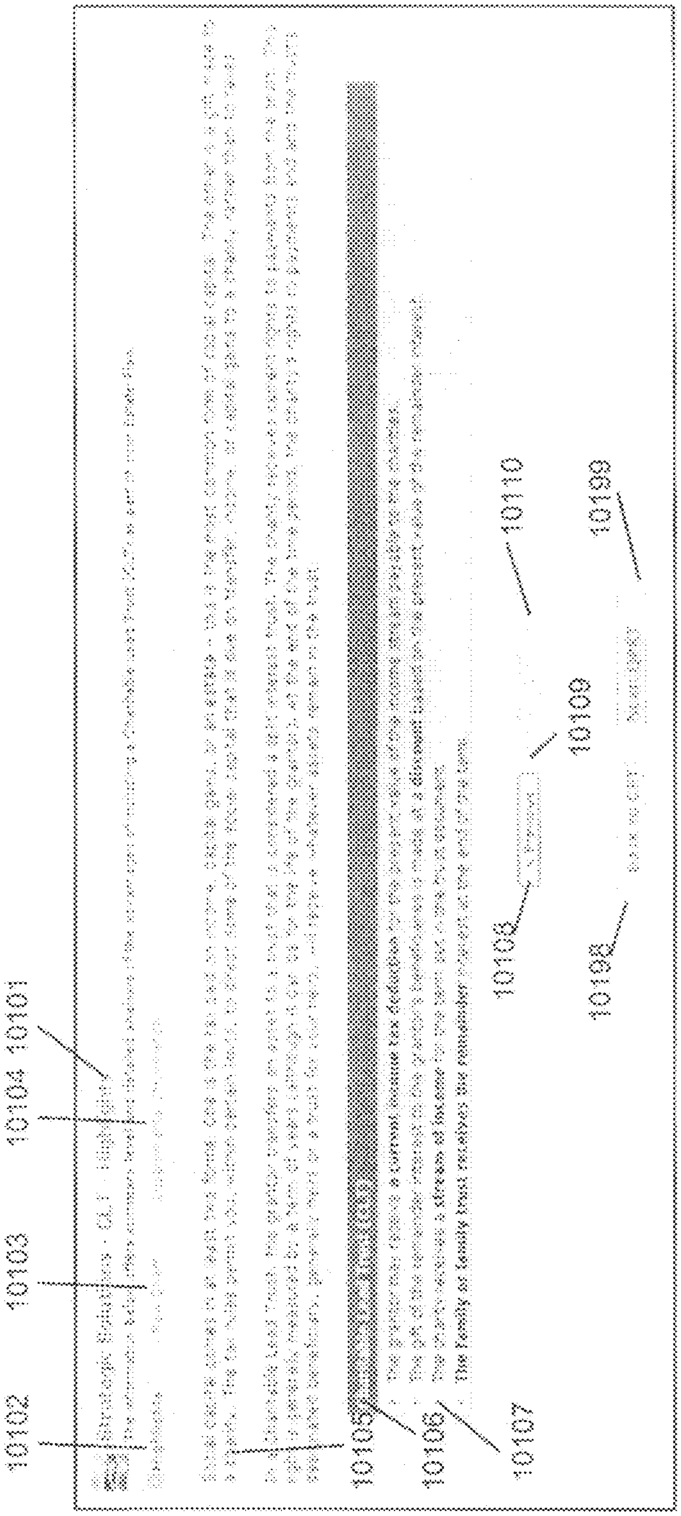

FIG. 101 illustrates the user interface when the user selects the CLT link 1134 navigation bar in the Estate module 1105 (FIG. 11). The CLT user interface features are presented on three pages, accessed by clicking the corresponding Highlights 10102, Flow Chart 10103, and Supplemental 10104 link at the top of the page. By selecting Highlights 10102 the Strategic Solutions—CLT-Highlights user interface 10101 is displayed. The information within the highlights section provides a summary level and detailed analysis of the advantages of including a Charitable Lead Trust (CLT) as part of an Estate Plan. The Highlights user interface 10101 page contains static text. When first displayed, only the introductory paragraph 10105 appears, along with a first bullet item 10107 from a Charitable Lead Trust Section 10106. The user can click Next 10109 to display the next bullet item, one at a time. Show All 10110 will display all bulleted items. The Previous 10108 button will remove the most recently added bullet item. The introductory sections 10105 may state social capital comes in at least two forms. One is the tax paid on income, capital gains, or an estate—this is the most common form of social capital. The other is a gift made to a charity. The tax rules permit you, within certain limits, to direct some of the social capital that is due on transfer, income, or capital gains to a charity rather than to taxes. In a Charitable Lead Trust, the grantor transfers an asset to a trust that is considered a split interest trust. The charity receives current rights to payments from the trust. This right is generally measured by a term of years (although it can be for the life of the grantor). At the end of the time period, the charity's rights to payments end and the trust's designated beneficiary, generally heirs or a trust for your heirs, will receive whatever assets remain in the trust. The user can also navigate to other areas of the navigation bar (see FIG. 11) by selecting Back to CRT 10198 or Next: QPRT 10199 buttons.

Figure 102:
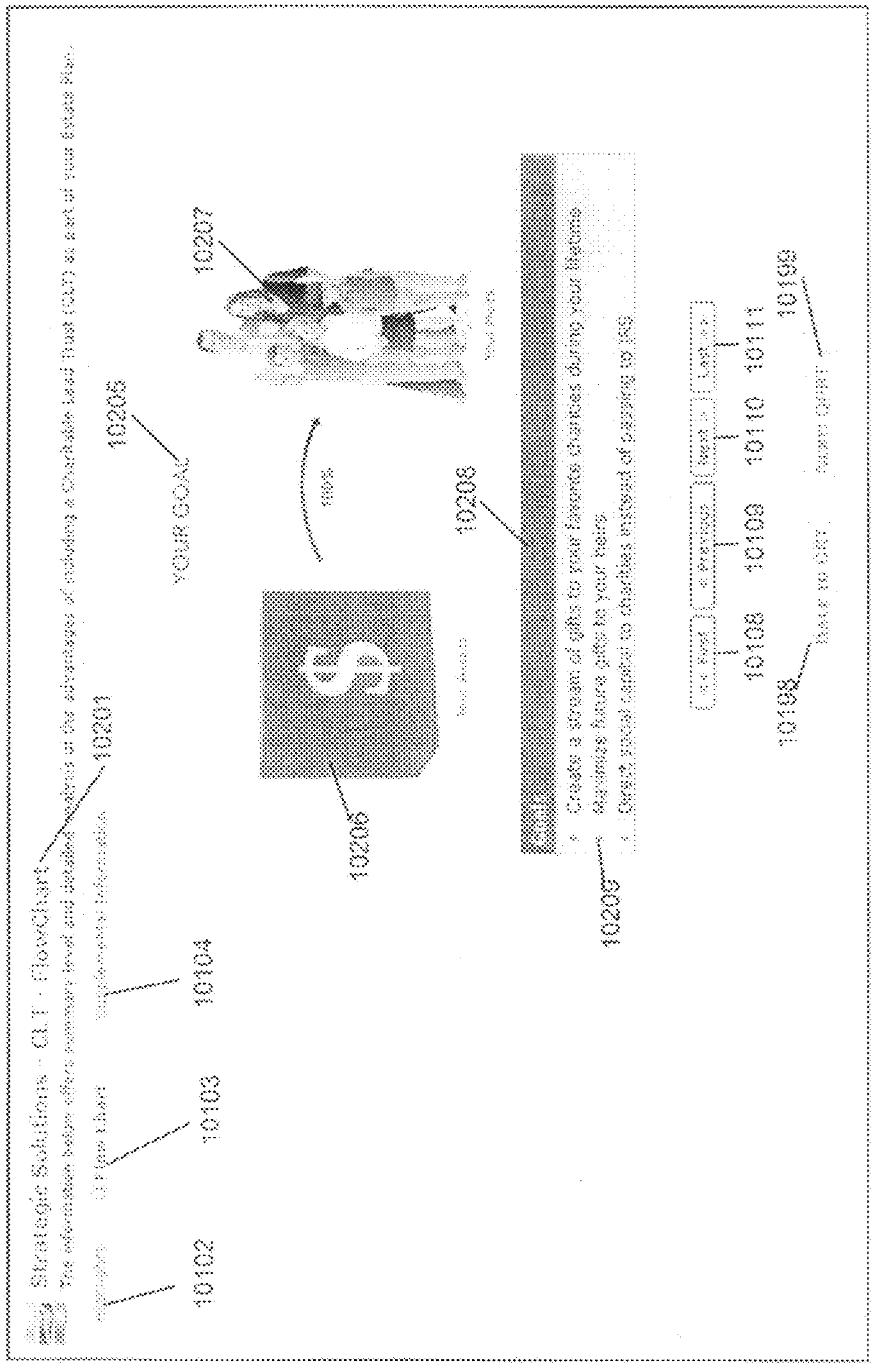

FIG. 102 provides a Strategic-Solutions—CLT-Flowchart 10201 user interface when the user selects the Flow Chart link 10203 link (FIG. 101). The Strategic-Solutions—CLT-Flowchart 10201 user interface offers summary level and detailed analysis of the advantages of including a Charitable Lead Trust (CLT) as part of an Estate Plan. The Strategic-Solutions—CLT-Flowchart 10201 contains a click-by-click sequence of graphical and text information about a CLT. The first time a flow chart is displayed, the user will click a Next 10110 button to advance through the sequence. A Previous 10109 button will take the click sequence back one step. First 10108 will take the user back to the first display in the sequence. Last 10111 will display the last display with a single click. Click 1 (click to arrive on Flow Chart page)—Clicking in sequence displays Your Goal 10205. Your Goal 10205 displays a graphical representation wherein Your Assets 10206 are 100% transferred to your Heirs 10207. A Goals summary section 10208 displays bulleted information pertaining to the goals of a CLT, such as: "Create a stream of gifts to your favorite charities during your lifetime," "Maximize future gifts to your heirs," and "Direct social capital to charities instead of passing to IRS." The user can also navigate to other areas of the navigation bar (see FIG. 11) by selecting Back to CRT 10198 or Next: QPRT 10199 buttons.

Figure 103:
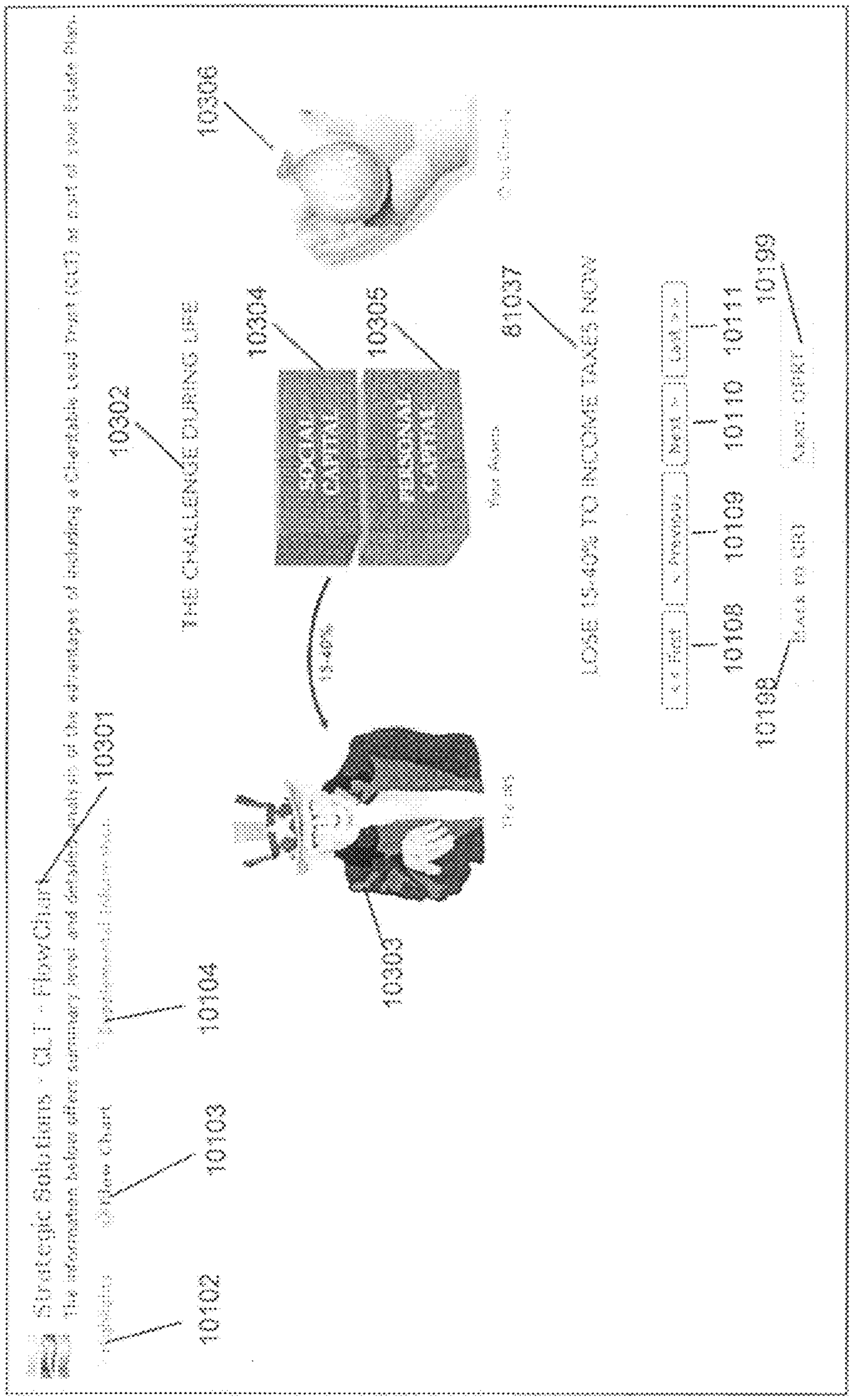

FIG. 103 shows a Strategic-Solutions—CLT-Flowchart 10301 user interface when the user selects the Flow Chart link 10103 link (FIG. 101) and proceeds in clicking through a sequence. The Strategic-Solutions—CLT-Flowchart 10301 displays a graphical representation of The Challenge During Life 10302. The Challenge During Life 10302 displays a graphical representation wherein 15-40% of Your Social and Personal Assets 10304 and 10305, respectively, are transferred to the IRS 8903, and none of your assets go to Charity 10306. The client is losing essentially up to approximately half of their assets to income taxes as reflected in the Lose 15-40% to Income Taxes Now 10307 section. The user can again navigate through the flowchart via Next 10110, Previous 10109, First 10108, and Last 10111 as discussed in FIG. 102. The user can also navigate to other areas of the navigation bar (see FIG. 11) by selecting Back to CRT 10198 or Next: QPRT 10199 buttons.

Figure 104:
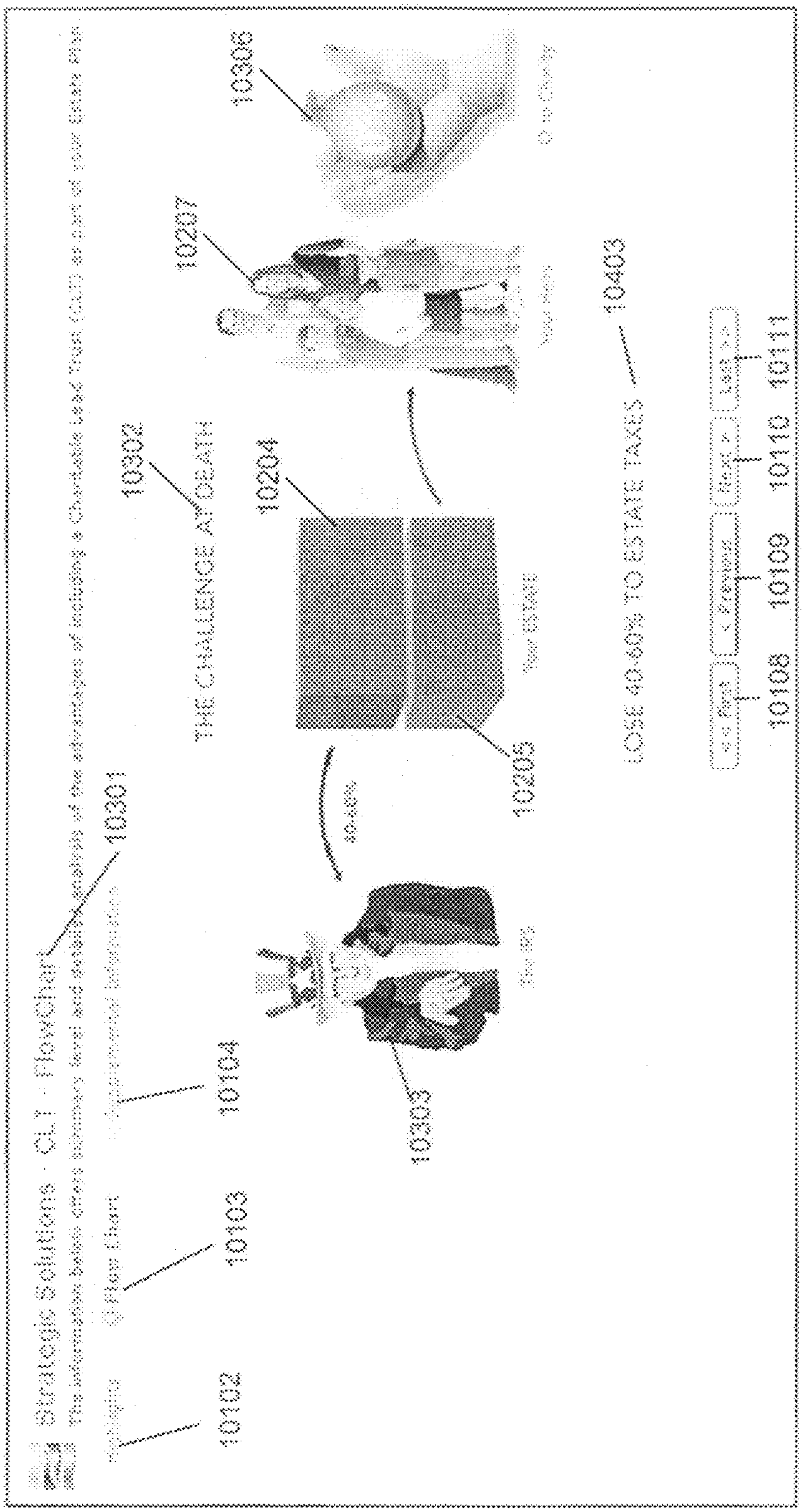

FIG. 104 shows a Strategic-Solutions—CLT-Flowchart 10401 user interface when the user selects the Flow Chart link 10103 link (FIG. 101) and proceeds in clicking through a sequence. The Strategic-Solutions—CLT-Flowchart 10401 displays a graphical representation of The Challenge at Death 10402. The Challenge at Death 10402 displays a graphical representation wherein 40-60% of Your Estate (made up of your social and personal capital 10304 and 10305, respectively) is transferred to the IRS 8903, a portion of your estate is transferred to your heirs 10207, and none of your estate goes to Charity 10306. The client is essentially approximately half of their assets to estate taxes as reflected in the Lose 40-60% to Estate Taxes Now 9803 section. The user can again navigate through the flowchart via Next 10110, Previous 10109, First 10108, and Last 10111 as discussed in FIG. 102. The user can also navigate to other areas of the navigation bar (see FIG. 11) by selecting Back to CRT 10198 or Next: QPRT 10199 buttons.

Figure 105:
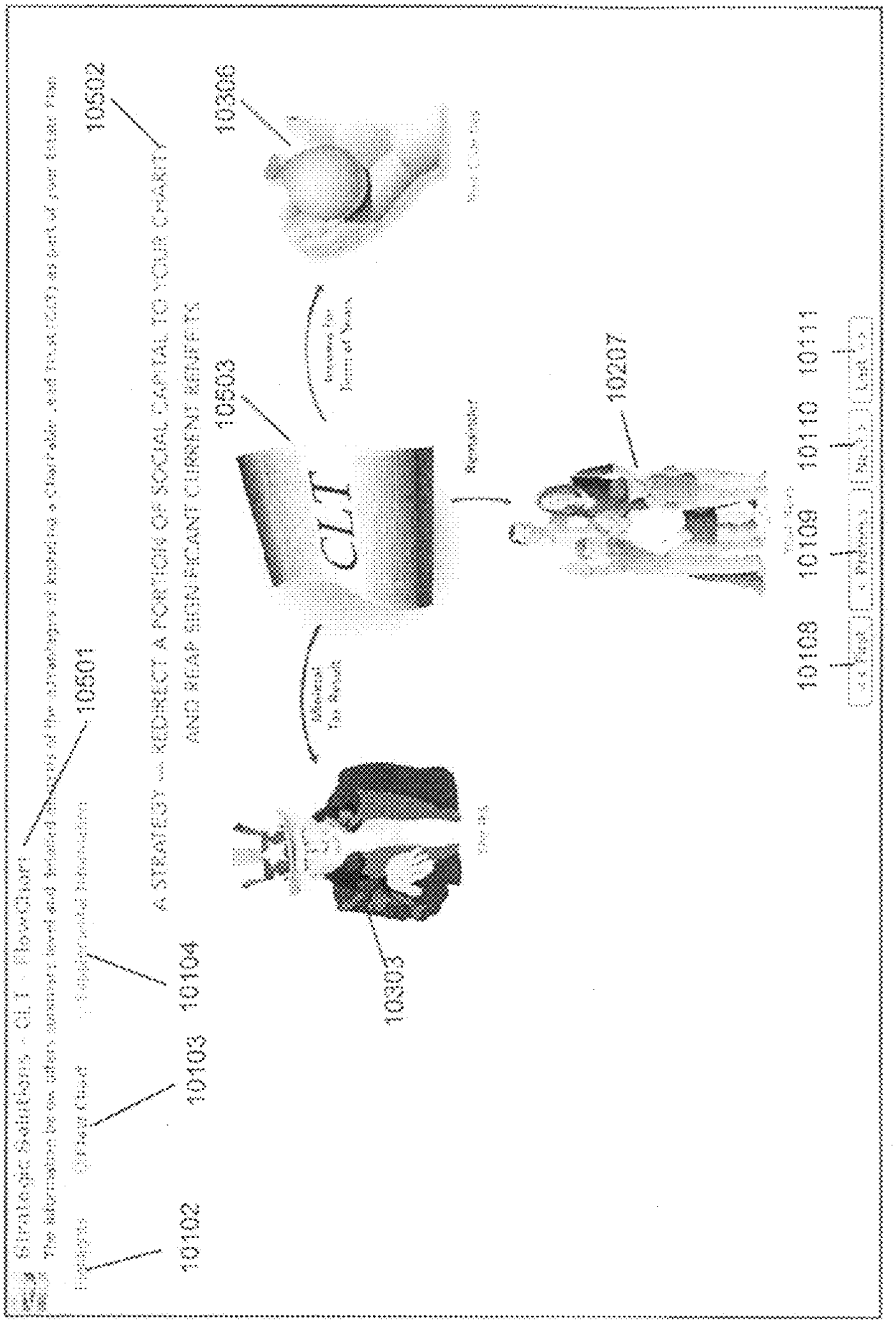

FIG. 105 shows a Strategic-Solutions—CLT-Flowchart 10501 user interface when the user selects the Flow Chart link 10103 link (FIG. 101) and proceeds in clicking through a sequence. The Strategic-Solutions—CLT-Flowchart 10501 displays a graphical representation of A Strategy—Redirect a Portion of Social Capital to Your Charity and Reap Significant Current Benefits 10502. The Strategy 10502 displays a graphical representation wherein a CLT 10503 is established, which donates annuities for a specific term to Charities 10306. As a direct result, there is a significant reduction in tax requirements to the IRS 8903, and at the end of the term of the trust, the remainder of the assets are transferred to designated Heirs 10207. The user can again navigate through the flowchart via Next 10110, Previous 10109, First 10108, and Last 10111 as discussed in FIG. 102.

Figure 106:
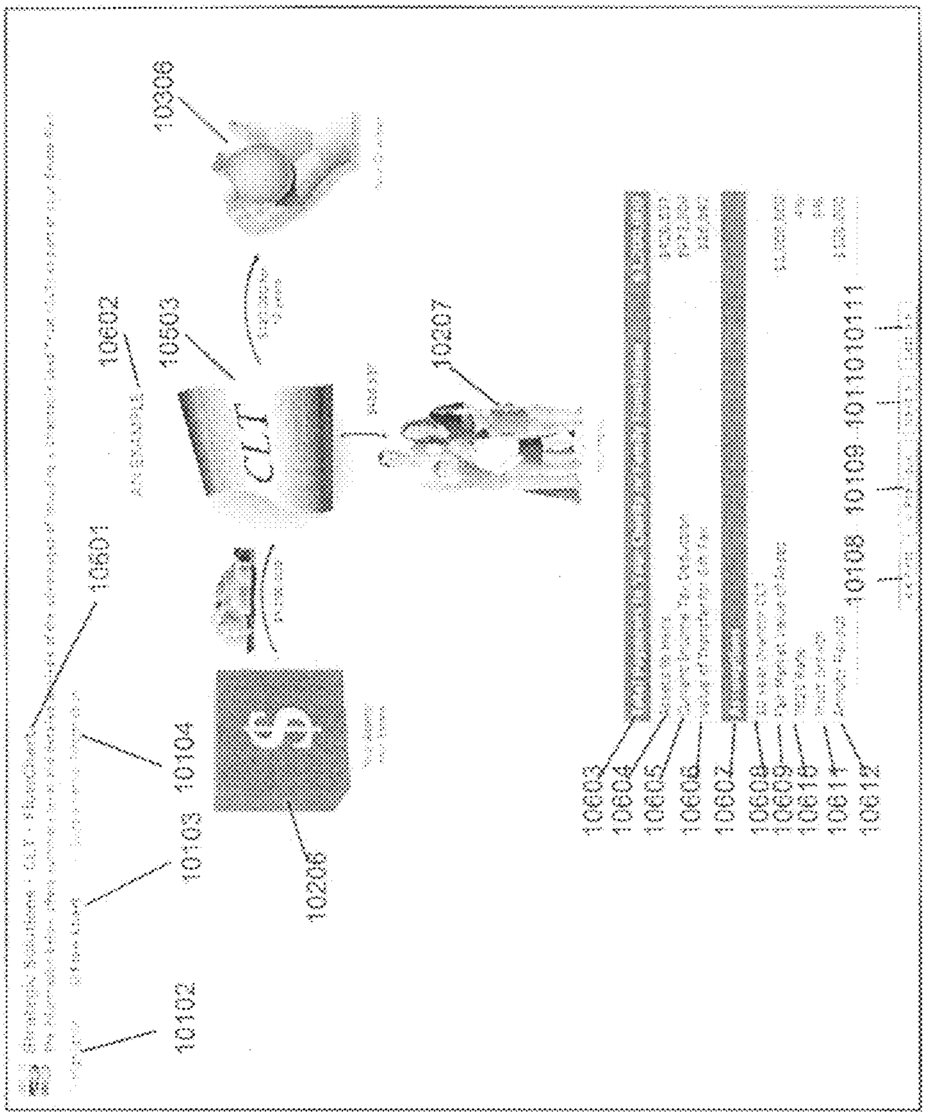

FIG. 106 shows a Strategic-Solutions—CLT-Flowchart 10601 user interface when the user selects the Flow Chart link 10203 link (FIG. 101) and proceeds in clicking through a sequence. The Strategic-Solutions—CLT-Flowchart 10601 displays a graphical representation of An Example 10602 of a CLT. An Example 10602 displays a graphical representation wherein Your Key Assets 10206 are transferred to a CLT 10503, and the CLT pays $120,000 for ten years to specific Charities 10306. At the end of the term of CLT 10503 any remaining assets are transferred to Heirs 10207. The Total Payments to Your Charity or Family Foundation summary section 10603 displays information pertaining to Assets to Heirs 10604, Current Income Tax Deduction 10605, and Value of Transfer for Gift Tax 10606. The estimates for Total Payments section 10603 are based upon data displayed in Assumptions section 10607. For example, Assumptions may display the term of the trust 10608, the Fair Market Value of the Asset 10609, the 6120 Rate 10610, Trust Growth 10611, and Annuity Payout 10612. The user can again navigate through the flowchart via Next 10110, Prev 10109, First 10108, and Last 10111 as discussed in FIG. 102.

Figure 107:
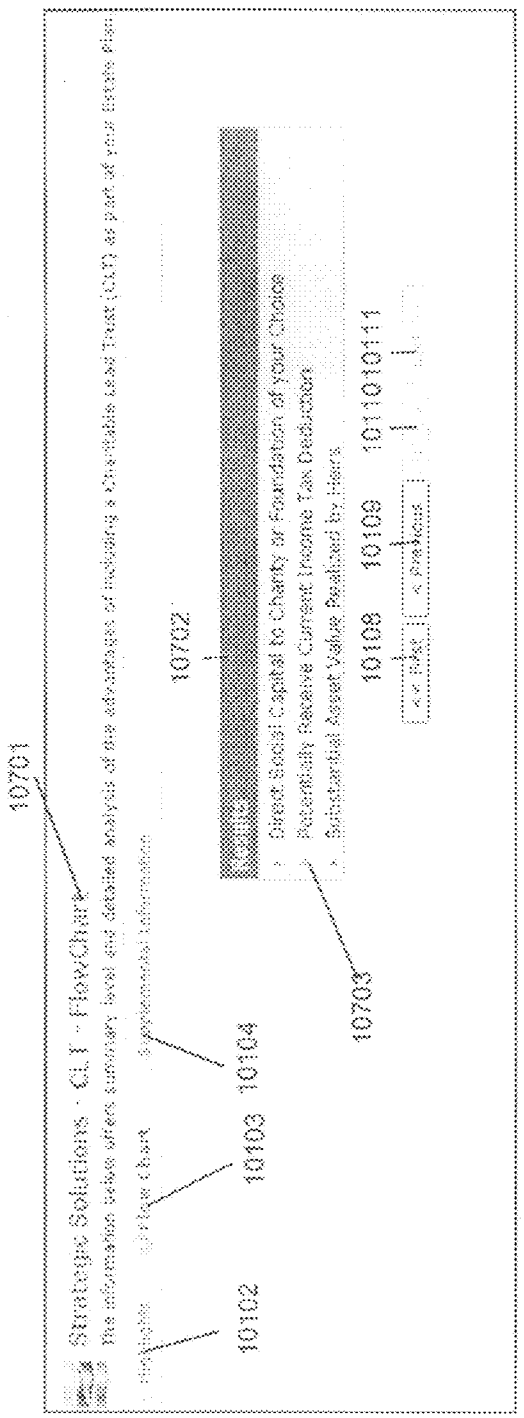

FIG. 107 shows a Strategic-Solutions—CLT-Flowchart 10701 user interface when the user selects the Flow Chart link 10203 link (FIG. 101) and proceeds in clicking through a sequence. The Strategic-Solutions—CLT-Flowchart 10701 displays a Results 10702 section of a CLT. Results 10702 displays bullets 10703 summarizing the benefits of a CLT, such as "Direct Social Capital to Charity or Foundation of your Choice," "Potentially Receive Current Income Tax Deduction" and "Substantial Asset Value Retained by Heirs." The user can again navigate through the flowchart via Next 10110, Prev 10109, First 10108, and Last 10111 as discussed in FIG. 102.

Figure 108:
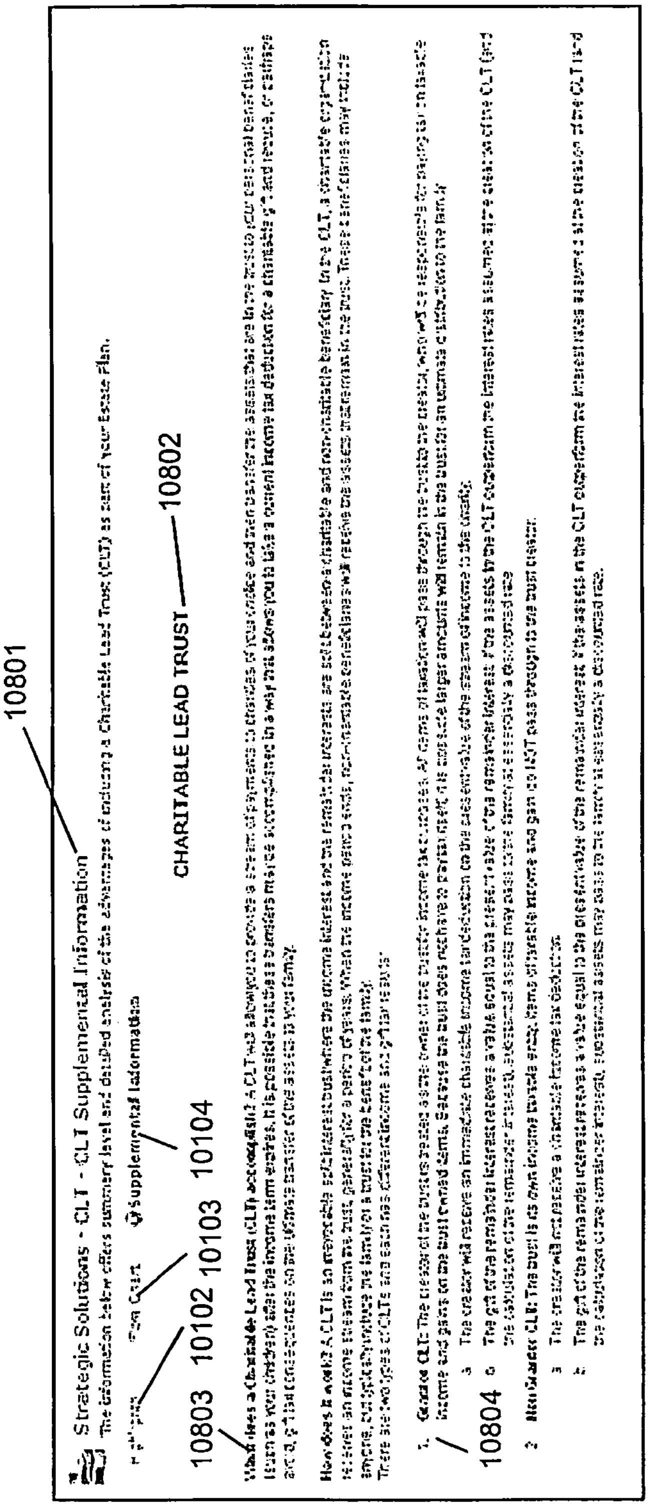

FIG. 108 shows a Strategic-Solutions—CLT-CLT Supplemental Information 10801 user interface when the user selects the Supplemental Information link 10204 link (FIG. 101). The strategic-Solutions—CLT-CLT Supplemental Information 10801 user interface offers summary level and detailed analysis of the advantages of including a Charitable Lead Trust (CLT) as part of an Estate Plan. For example Charitable Lead Trust 10802 heading may present a frequently asked questions and answers section 10803, and summary information related to a CRT in outline form 10804. For example frequently asked questions and answers section 10803 may allow you to provide a stream of payments to charities of your choice and then transfer the assets that are in the trust to your personal beneficiaries (such as your children) after the income term expires. It is possible that these transfers may be accomplished in a way that allows you to take a current income tax deduction for a charitable gift and reduce, or perhaps avoid, gift tax consequences on the ultimate transfer of the assets to your family. A CLT is an irrevocable split interest trust where the income interest and the remainder interests are split between a charitable and non-charitable beneficiary. In the CLT, a charitable organization receives an income stream from the trust, generally for a period of years. When the income period ends, non-charitable beneficiaries will receive the assets that remain in the trust. These beneficiaries may include anyone, but typically include the family or a trust for the benefit of the family. There are two types of CLTs and each has different income and gift tax results: An outline 10004 section relating to summary information for a CRT may include:

Grantor CLT: The creator of the trust is treated as the owner of the trust for income tax purposes. All items of taxation will pass through the trust to the creator, who will be responsible for paying tax on taxable income and gains on the trust owned items. Because the trust does not have to pay tax itself, it is possible larger amounts will remain in the trust for an ultimate distribution to the family.

The creator will receive an immediate charitable income tax deduction on the present value of the stream of income to the charity.

The gift of the remainder interest receives a value equal to the present value of the remainder interest. If the assets in the CLT outperform the interest rates assumed at the creation of the CLT (and the calculation of the remainder interest), substantial assets may pass to the family at essentially a discounted rate.

Non Grantor CLT: The trust is its own income taxable entity. Items of taxable income and gain do NOT pass through to the trust creator.

The creator will not receive a charitable income tax deduction

The gift of the remainder interest receives a value equal to the present value of the remainder interest. If the assets in the CLT outperform the interest rates assumed at the creation of the CLT (and the calculation of the remainder interest), substantial assets may pass to the family at essentially a discounted rate.

Figure 109:
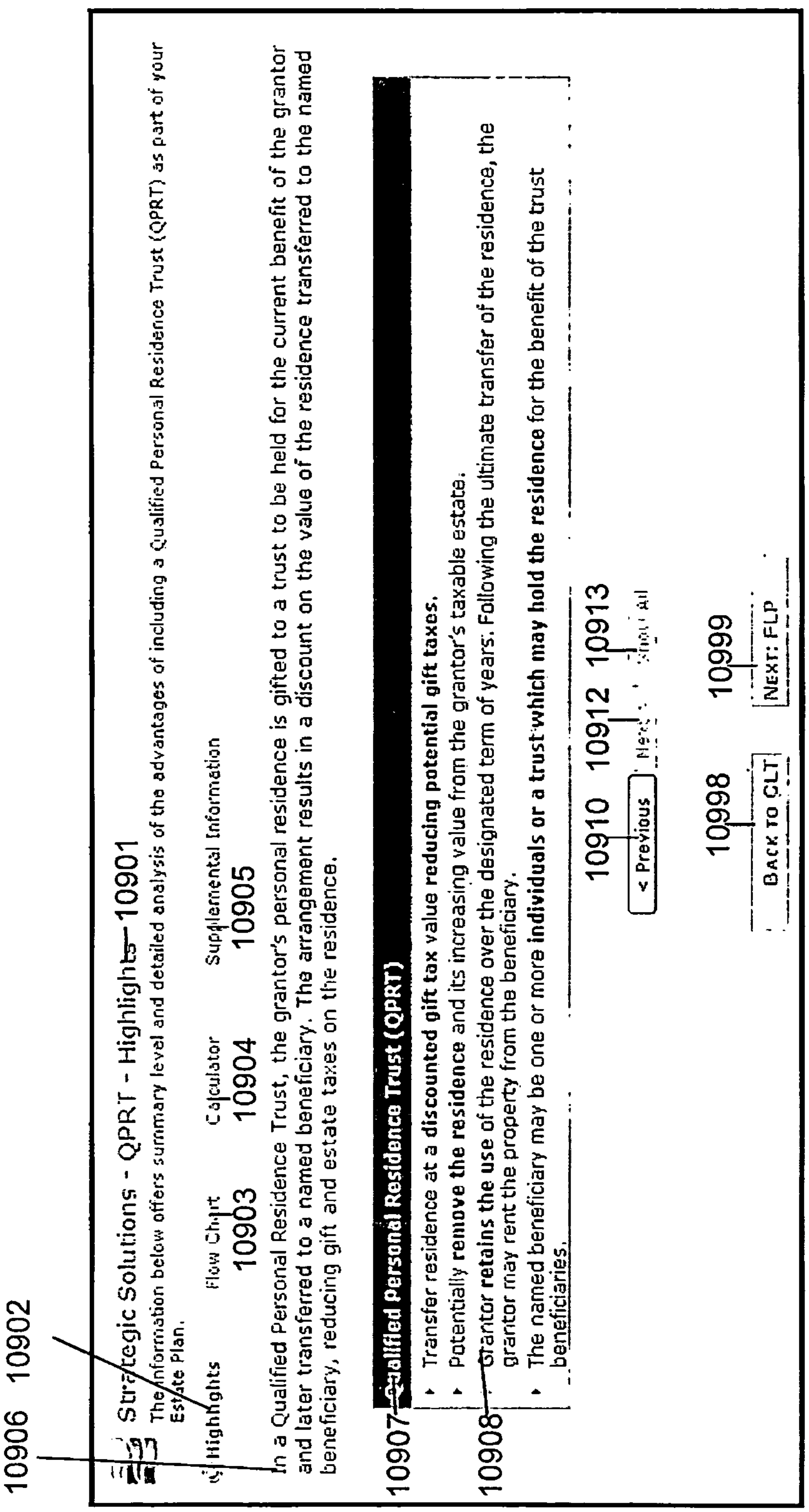

FIG. 109 demonstrates the user interface when the user selects the QPRT link 1135 navigation bar in the Estate module 1105 (FIG. 11). The QPRT user interface features are presented on four pages, accessed by clicking the corresponding Highlights 10902, Flow Chart 10903, Calculator 10904, and Supplemental Information 10905 link at the top of the page. By selecting Highlights 10902 the Strategic Solutions—QPRT-Highlights user interface 10901 is displayed. The information within the highlights section provides a summary level and detailed analysis of the advantages of including a QPRT as part of an Estate Plan. The Highlights user interface 10901 page contains static text. When first displayed, only the introductory paragraph 10906 appears, along with a first bullet item 10908 from a QPRT Section 10907. The user can click Next 10911 to display the next bullet item, one at a time. Show All 10912 will display all bullet items. The Previous 10910 button will remove the most recently added bullet item. The introductory sections 10906 states that in a QPRT, the grantor's personal residence is gifted to a trust to be held for the current benefit of the grantor and later transferred to a named beneficiary. The arrangement results in a discount on the value of the residence transferred to the named beneficiary, reducing gift and estate taxes on the residence.

Bullets 10908 may recite:

Transfer residence at a discounted gift tax value reducing potential gift taxes;

Potentially remove the residence and its increasing value from the grantor's taxable estate;

Grantor retains the use of the residence over the designated term of years. Following the ultimate transfer of the residence, the grantor may rent the property from the beneficiary; and The named beneficiary may be one or more individuals or a trust which may hold the residence for the benefit of the trust beneficiaries.

The user can also navigate to other areas of the navigation bar (see FIG. 11) by selecting Back to CLT 10998 or Next: FLP 10999 buttons.

QPRT

Figure 110:
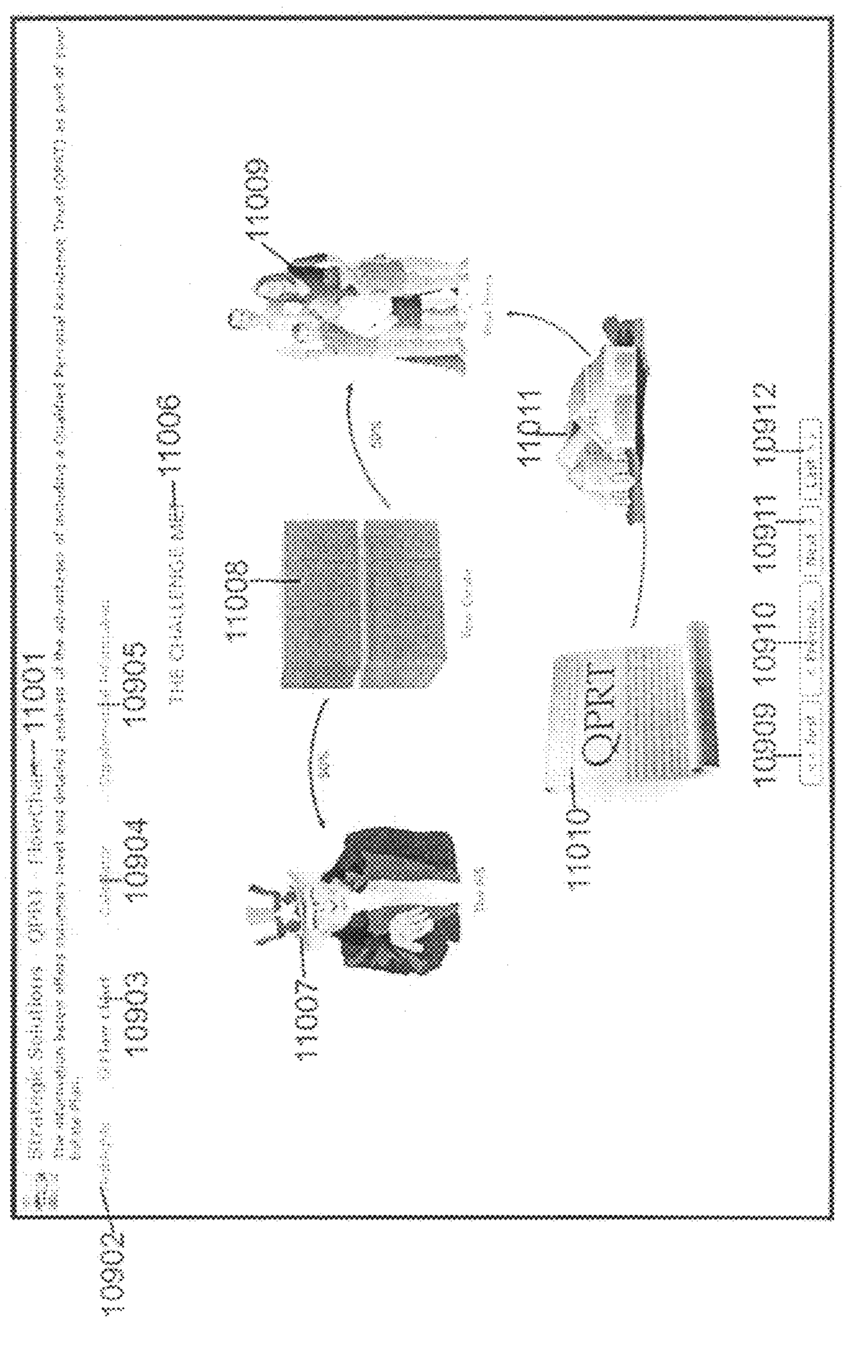

FIG. 110 shows a Strategic-Solutions—QPRT-Flowchart 11001 user interface when the user selects the Flow Chart link 10903 link (FIG. 109). The Strategic-Solutions—QPRT-Flowchart 11001 user interface offers summary level and detailed analysis of the advantages of including a QPRT as part of your Estate Plan. The Strategic-Solutions—QPRT-Flow Chart 11001 contains a click-by-click sequence of graphical and text information about a QPRT. The first time a flow chart is displayed, the user will click a Next 11011 button to advance through the sequence. A Previous 11010 button will take the click sequence back one step. First 11009 will take the user back to the first display in the sequence. Last 11012 will display the last display with a single click. Clicking in sequence displays a graphical representation of The Challenge Met 11006. The Challenge Met 11006 displays a graphical representation wherein even though 50% of Your Estate 11008 is transferred to the IRS 11007, and only 50% is transferred to your Heirs 11009, the establishment of an QPRT 11010 will allow you to transfer qualified residence assets 11011 to Your Heirs 11009.

Figure 111:
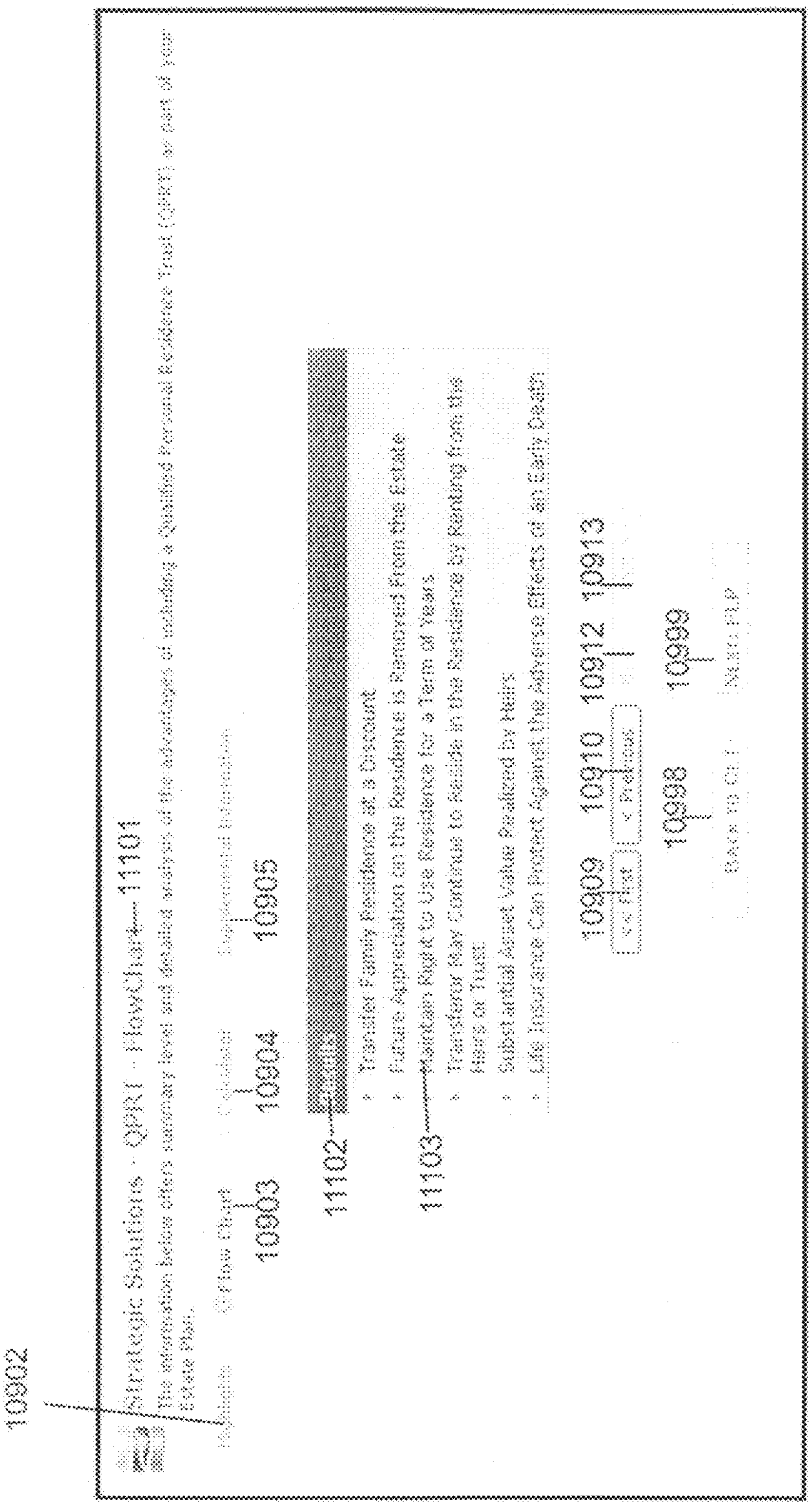

FIG. 111 demonstrates a Strategic-Solutions—QPRT-Flow Chart 11101 user interface when the user selects the Flow Chart link 10903 link (FIG. 109) and proceeds in clicking through a sequence. The Strategic-Solutions—QPRT-Flow Chart 11101 displays the Results 11102 of a QPRT. Results 11102 displays bullets 11103 summarizing the benefits of a QPRT, such as, but not limited to, Transfer Family Residence at a Discount, Future Appreciation on the Residence is Removed From the Estate, Maintain Right to Use Residence for a Term of Year, Transferor May Continue to Reside in the Residence by Renting from the Heirs or Trust, Substantial Asset Value Realized By Heirs, and Life Insurance Can Protect Against the Adverse Effects of an Early Death. The user can again navigate through the flowchart via Next 10911, Previous 10910, First 10909, and Last 10912 as discussed in FIG. 109.

Figure 112:
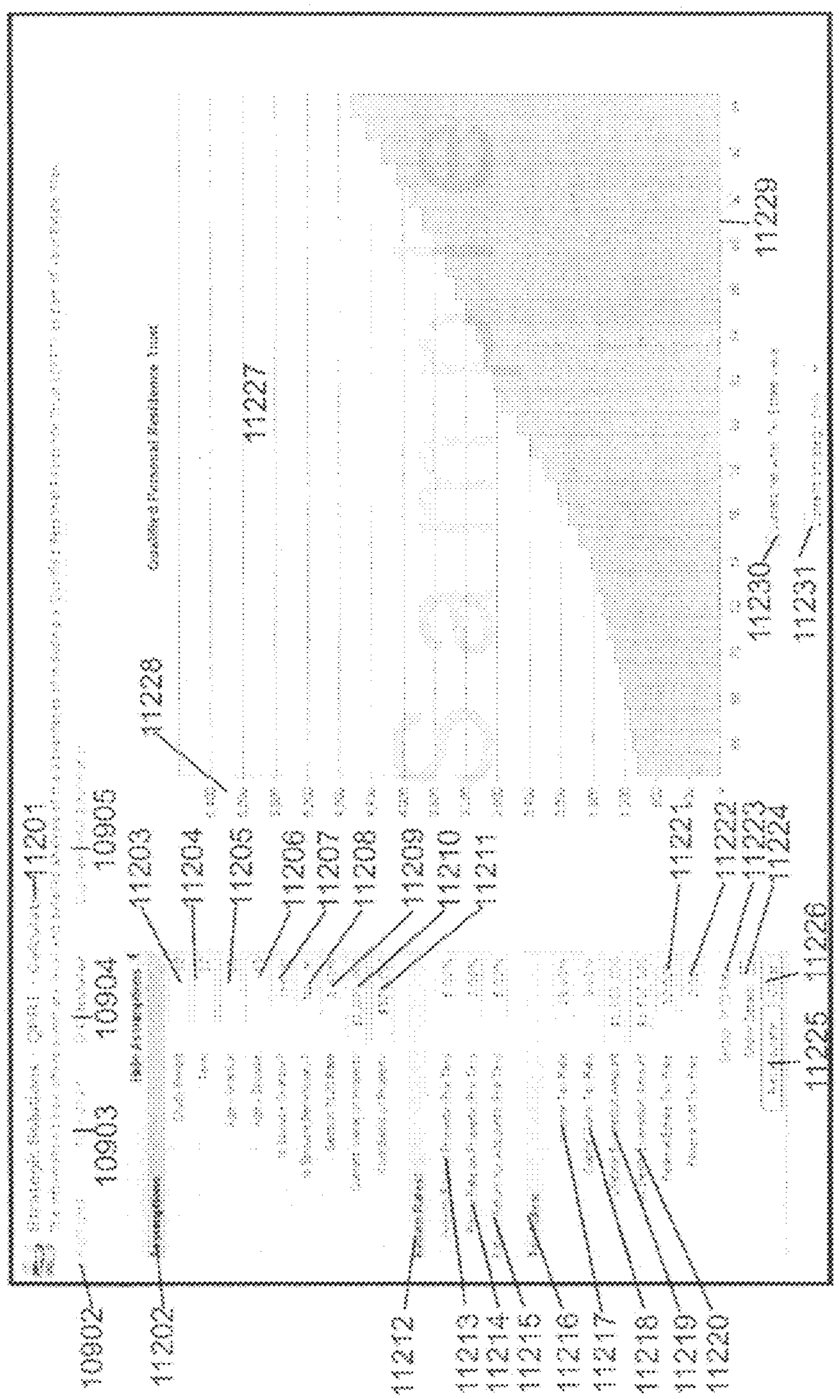

FIG. 112 demonstrates a Strategic-Solutions—QPRT-Calculator 11201 user interface when the user selects the Calculator link 10904 link (FIG. 109), which provides a calculator for providing information, summary and analysis for including a QPRT as part of an estate. The Strategic Solutions—QPRT-Calculator User interface 11201 produces a user interface where a user can enter information relating to general information assumptions of a QPRT in this interface. The menu can comprise several headings, such as Assumptions 11202 section, a Return Rates section 11212 and a Tax Rates section 11216. Assumptions heading 11202 can include fields for Study Period 11203, Term 11204, Age-Grantor 11205, Age-Spouse 11206, Is Spouse Grantor? 11207, Is Spouse Beneficiary 11208, Section 7520 Rate 11209, Current Value of Property 11210, and Cost Basis of Property 11211.

Return Rates heading 11212 in include fields for Growth Rate of Property (Pre Tax) 11213, Rental Rate on Property (Pre Tax) 11214, Rate of Return for Account (Pre Tax) 11215. Tax Rates heading 11216 can include fields for Income Tax Rate 11217, Capitol Gains Tax Rate 11218, Lifetime Exemption Amount 11219, At Death Exemption Amount 11220, Federal Estate Tax Rate 11221, Federal Gift Tax 11222. The QPRT calculator can also have a Section 7520 Rate display 11223, a Show Details 11224 field, and Recalculate 11225 and Clear 11226 buttons in order for the user to input, display and change any information as warranted.

A graphical representation of the QPRT data entered into the user interface fields is graphically represented as graph 11227 Qualified Personal Residence Trust Graph. In this graph, the Y-axis 11228 represents dollar amounts and X-axis 11229 represents years. The user can choose to display data for Current Strategy (i.e., no QPRT), QPRT alone, or Comparison between the current strategy and the QPRT together using drop down menu 11231.

Figure 113:
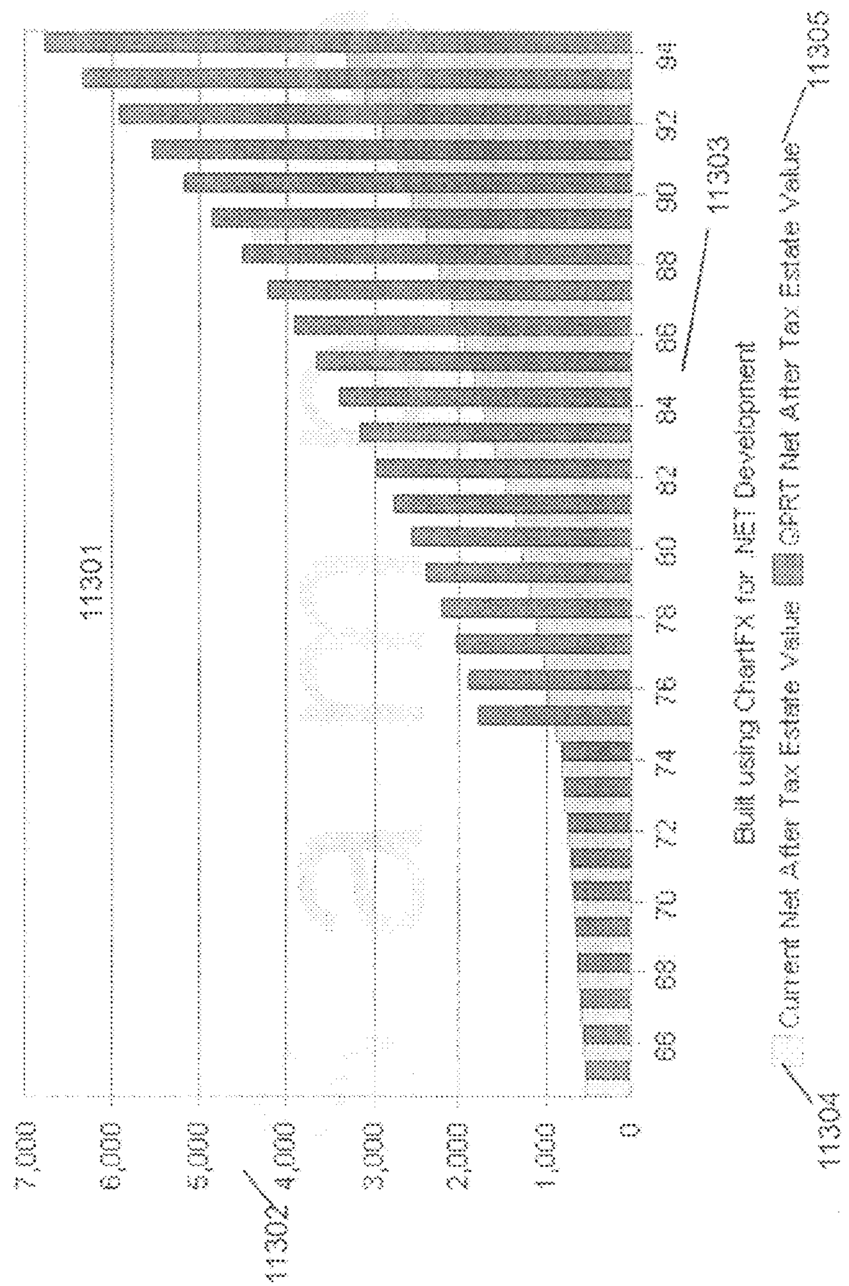

FIG. 113 demonstrates a composite showing the difference between a QPRT and in-estate life insurance policy. In this example, graph 11301 presents the difference between the data presented from a QPRT 11305 compared to the total of the estate to be transferred to the heirs after estate taxes 11304, but without a QPRT.

Figure 114:
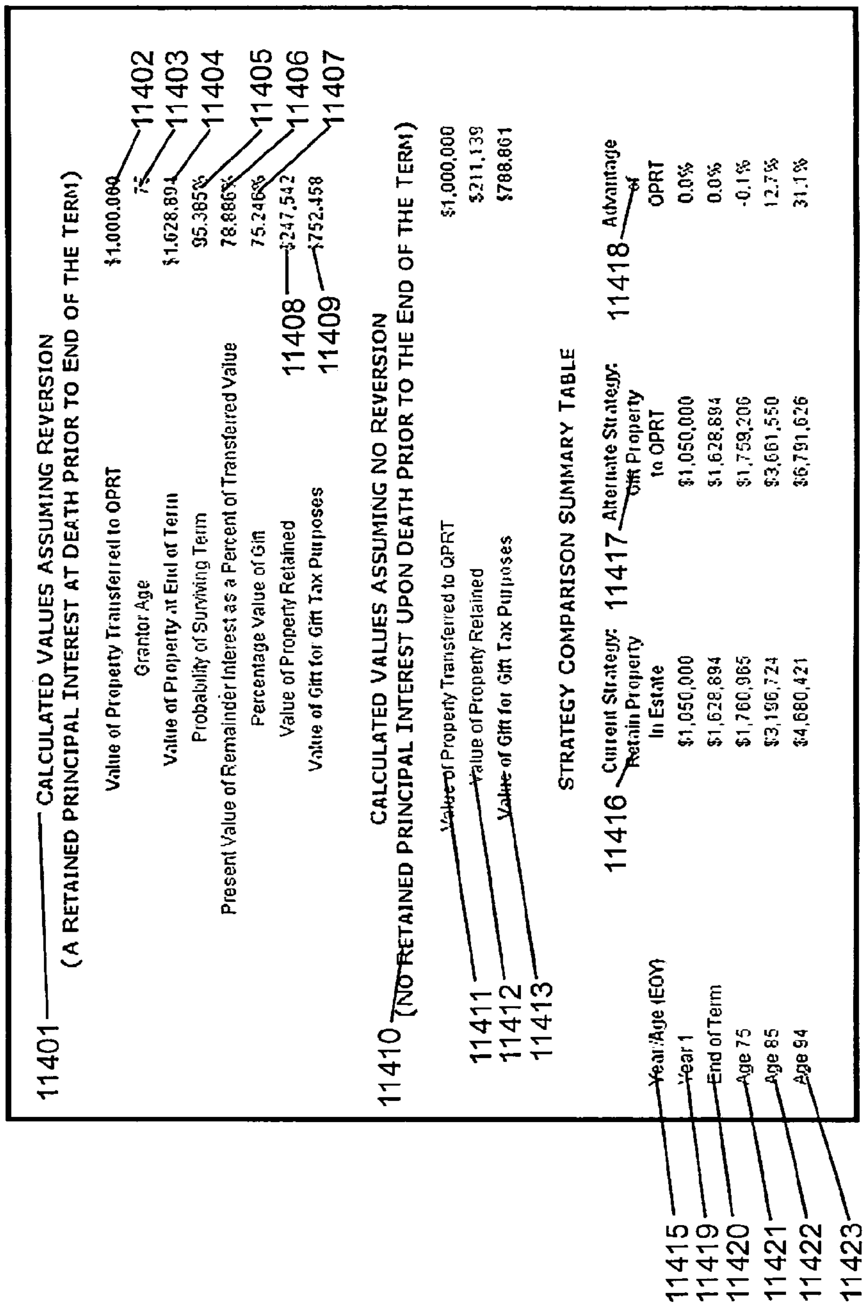

FIG. 114 displays a continuation of the Strategic-Solutions—QPRT-Calculator 11201 user interface from FIG. 112. A Summary Table Calculated Values Assuming Reversion (A Retained Principal Interest At Death Prior to End of The Term) 11401 can illustrate the Value of Property Transferred to QPRT 11402, the Grantor Age 11403, Value of Property At End of Term 11404, Probability of Surviving Term 11405, Present Value of Reminder Interest as a Percent of Transferred Value 11406, Percentage Value of Property Retained 11408, Value of Gift for Gift Tax Purposes 11409. A Calculated Values Assuming No Reversion (No Retained Principal Interest Upon Death Prior to The End of the Term) Summary Table 11410 can illustrate Value of Property Transferred to QPRT 11411, Value of Property Retained 11412, Value of Gift for Gift Tax Purposes 11413. A Strategy Comparison Summary Table 11414 can have multiple columns including Year/Age (EOY) 11415, Current Strategy: Retain Property In Estate 11416, Alternate Strategy: Gift Property to QPRT 11417, and Advantage of QPRT 11418. Rows for each column include Year 1 11419, End of Term 11420, Age 75 11421, Age 85 11422, and Age 94 11423.

Figure 115:
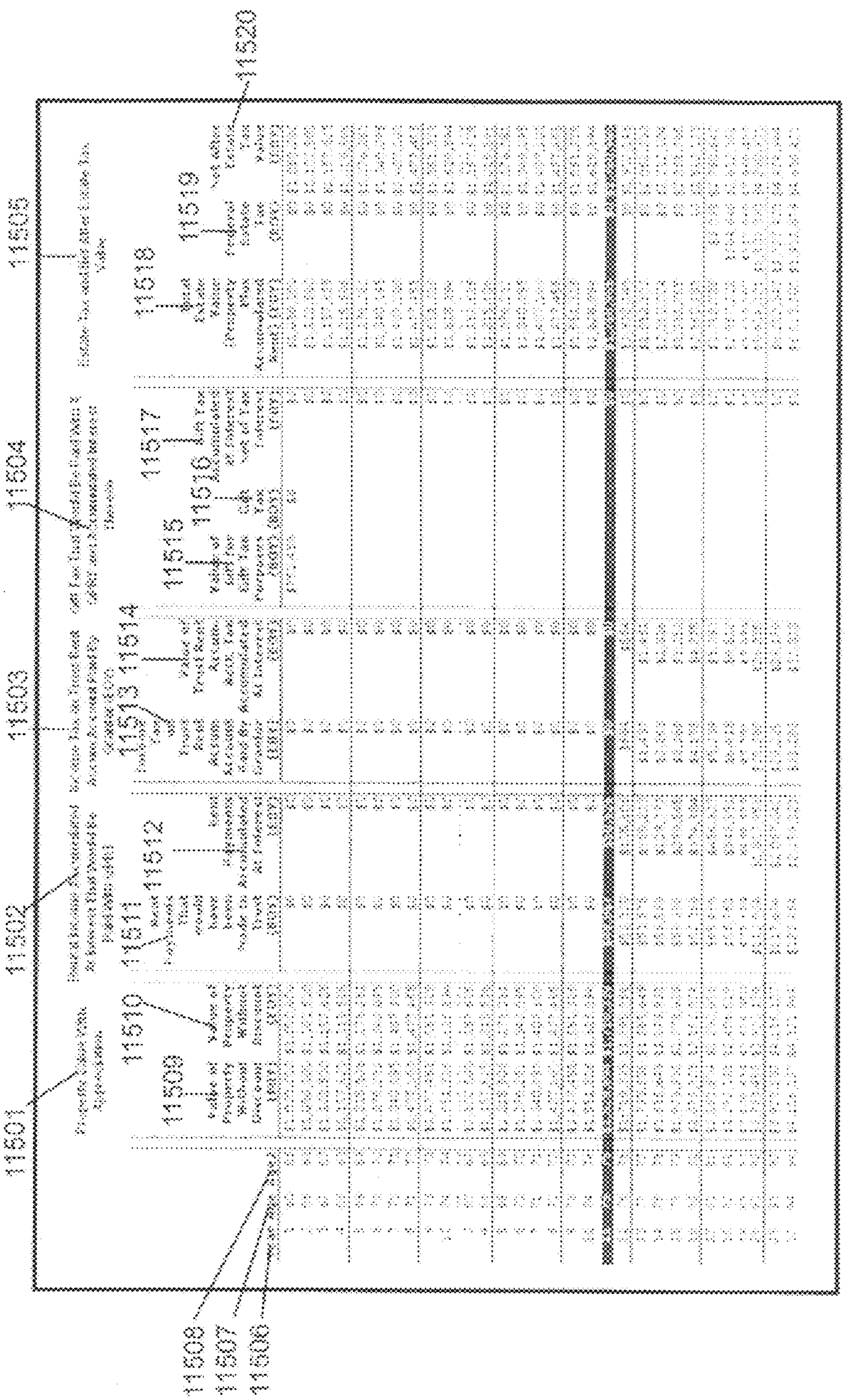

FIG. 115 illustrates some of the possible calculations used to generate the QPRT data when Show Detail box 11224 of calculator 11201 (FIG. 112) is selected. A table presents data directed towards Property Value with Appreciation 11501, Rental Income Accumulated At Interest That Would Be Paid With QPRT 11502, Income Tax on Trust Rent Accumulated Account Paid By Grantor (EOY) 11503, Gift Tax That Would be Paid With A QPRT and Accumulated Interest Thereon 11504 and Estate Tax and Net Estate Tax Value 11505. Specific column headers can include Year 11506, Age 11507, and Age 2 11508. Columns for Value of Property Without Discount (BOY) 11509, Value of Property Without Discount (EOY) 11510 may be found under Property Value with Appreciation 11501 section. Columns for Rent Payments That would have been Made to Trust (BOY) 11511, and Rent Payments Accumulated At Interest (EOY) 11512 may be found under Rental Income Accumulated At Interest That Would Be Paid With QPRT 11502 section. Columns for Income Tax on Trust Rent Accumulated Accounted Paid by Grantor (EOY) 11513, and Value of Trust Rent Accumulated Account Tax Accumulated At Interest (EOY) 11514 may be found under Income Tax on Trust Rent Accumulated Account Paid By Grantor (EOY) 11503 section. Columns for Value of Gift for Gift Tax Purposes (BOY) 11515, Gift Tax (BOY) 11516, and Gift Tax Accumulated at Interest Net of Tax Interest 11517 may be under the Gift Tax That Would be Paid With A QPRT and Accumulated Interest Thereon 11504 section. Specific columns for Total Estate Value (Property Plus Accumulated rent) (EOY) 11518, Federal Estate Tax (EOY) 11519, and Net After Estate Tax (EOY) 11520 may be under the Estate Tax and Net Estate Tax Value 11505.

Figure 116:
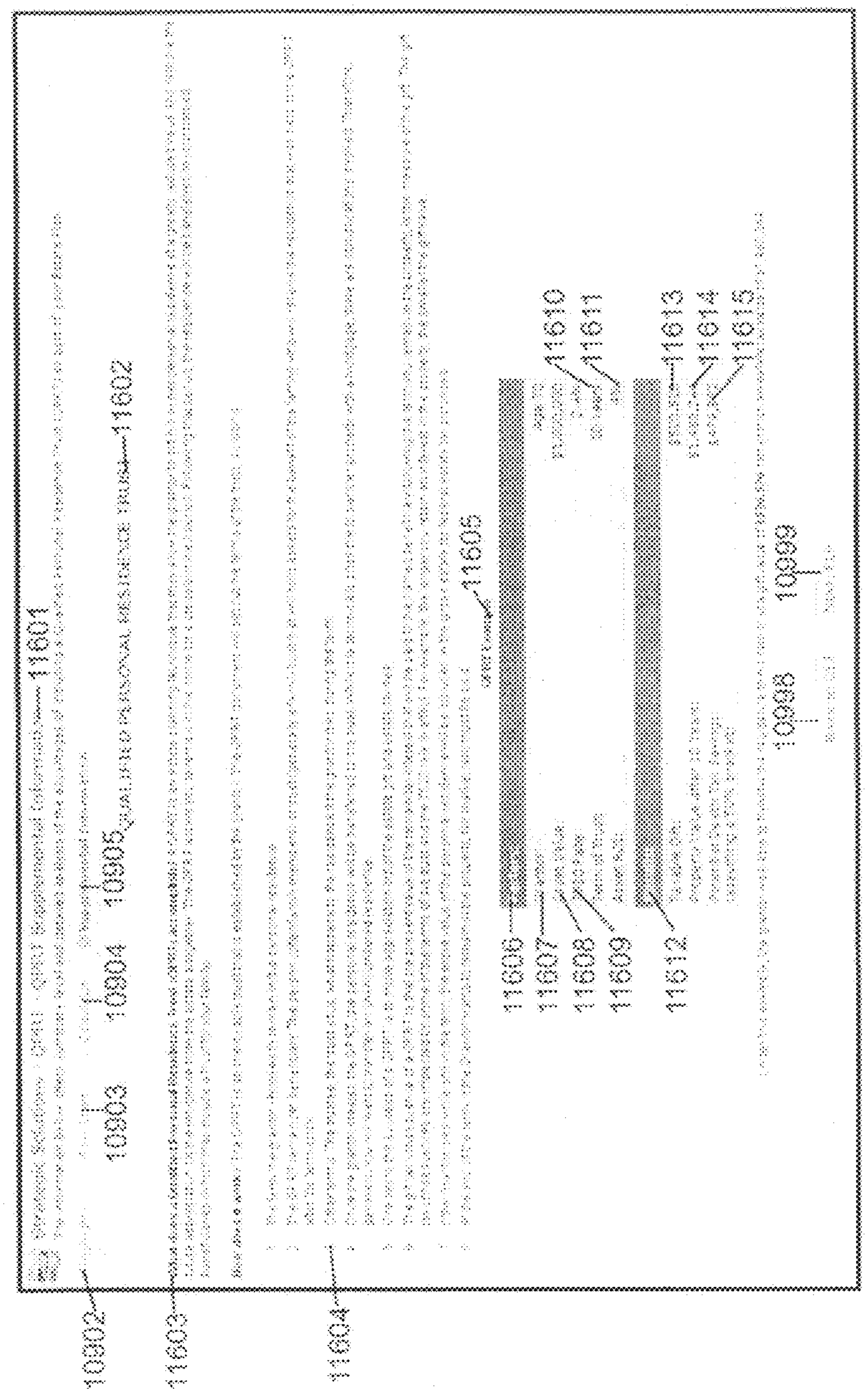

FIG. 116 demonstrates a Strategic-Solution—QPRT-QPRT Supplemental Information 11601 user interface when the user selects the Supplemental Information link 11005 link (FIG. 110). The Strategic-Solutions—QPRT-QPRT Supplemental Information 11601 user interface offers summary level and detailed analysis of the advantages of including a QPRTas part of an Estate Plan. For example Qualified Personal Residence Trust 11602 heading may present a frequently asked questions and answers section 11603, and summary information related to a QPRT in outline form 11604. For example frequently asked questions and answers section 11603 may include reasons to use a QPRT. What does a QPRT accomplish? A QPRT is an estate planning technique that may allow the grantor to gift his or her personal residence at a greatly reduced value and remove the future appreciation on the residence from the estate altogether. The QPRT allows you to remain in the home for a predetermined period. Following that period, the residence will be transferred to your named beneficiaries (which may include a trust for your family).

How does it work? The QPRT is an irrevocable trust that is established by the grantor. The QPRT document will set out the terms of the trust. An outline 11604 section relating to summary information for a QPRT may include:

1. The term the grantor chooses to remain in the personal residence.
2. The QPRT remainder beneficiary: The person (often family members) or trust (generally a family trust that will hold assets for the benefit of the family) who will receive the residence that was held in the QPRT after the term ends.
3. Other terms: The trustee, the trust situs, what happens to the residence if the grantor dies during the term.
4. Once the grantor creates the QPRT, the personal residence will be transferred to the trust. While it is technically possible to transfer property with a mortgage, there are complications involved. Therefore, generally, you will want to transfer an unencumbered residence.
5. One key to the success of a QPRT is to move appreciation out of the estate gift and estate tax free.
6. The gift tax consequence of a QPRT is that the present value of the remainder interest that will be paid to the named beneficiary following the term you remain in the property is the measure of the gift. The gift tax consequences are impacted by some of the terms of the trust and the 7520 rate in effect. For example, the longer you retain an interest in the property, the smaller the gift value.
7. If the Grantor dies while still in the term, the entire value of the personal residence will be included in the gross estate for federal estate tax purposes.
8. At the end of the term, if the Grantor wants to remain in the property, fair market rent must be paid.

Supplemental information user interface 11601 may present data relating to a an Example of an QPRT. QPRT Example section 11605 may present data relating to specific Factors 11606 including Grantor 11607, Asset Value 11608, 7520 Rate 11609, Term or Trust 11610 and Asset ROI 11611. The Results of the QPRT Example 11605 may be displayed in Results section 11612. Results 11612 may display values relating to the size of the Taxable Gift 11613, the Property Value after 10 Years 11614, Potential Death Tax Savings: (Assuming a 50% bracket) 11615.

FLP

Figure 117:
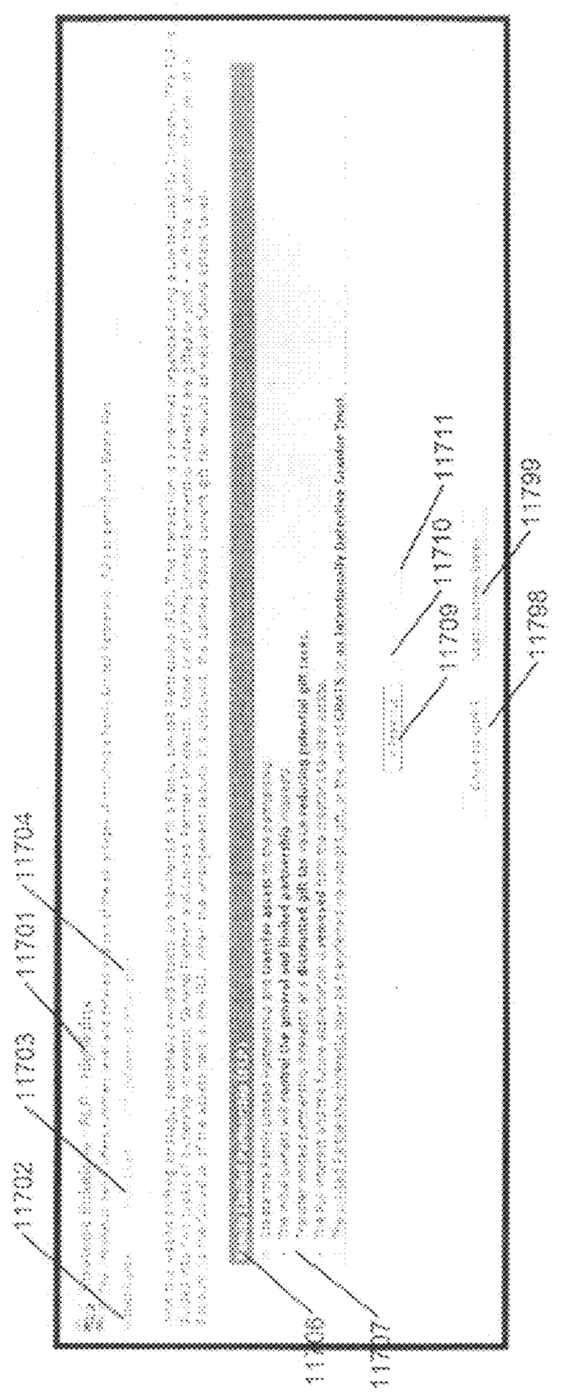

FIG. 117 demonstrates the user interface when the user selects the FLP link 1136 navigation bar in the Estate module 1105 (FIG. 11). The FLP user interface features are presented on three pages, accessed by clicking the corresponding Highlights 11702, Flow Chart 11703, and Supplemental Information 11704 link at the top of the page. By selecting Highlights 11702 the Strategic Solutions—FLP-Highlights user interface 11701 is displayed. The information within the highlights section provides a summary level and detailed analysis of the advantages of including a Family Limited Partnership (FLP) as part of an Estate Plan. The Highlights user interface 11701 page contains static text. When first displayed, only the introductory paragraph 11705 appears, along with a first bullet item 11706 from a Family Limited Partnership Section 11706. The user can click Next 11710 to display the next bullet item, one at a time. Show All 11711 will display all bullet items. The Previous 11709 button will remove the most recently added bullet item. The introductory sections 11705 may state that in a Family Limited Partnership, with this wealth shifting strategy, personally owned assets are transferred to a Family Limited Partnership (FLP). This transaction is sometimes organized using a Limited Liability Company. The FLP is divided into two types of ownership interests: General Partner and Limited Partners Interests. Some or all of the Limited Partnership interests are gifted or sold—with the valuation often set at a discount to the full value of the assets held in the FLP. When the arrangement results in a discount, the parties reduce current gift tax results as well as future estate taxes.

Bullets 11707 may recite:

- Create the Family Limited Partnership and transfer assets to the partnership.
- The initial owners will control the general and limited partnership interests.
- Transfer limited partnership interests at a discounted gift tax value reducing potential gift taxes.
- The FLP interest and the future appreciation is removed from the creator's taxable estate.
- The Limited Partnership interests may be transferred via outright gift, or the use of GRATS or an Intentionally Defective Grantor Trust.

The user can also navigate to other areas of the navigation bar (see FIG. 11) by selecting Back to QPRT 11798 or Next: Action Steps 11799 buttons.

Figure 118:
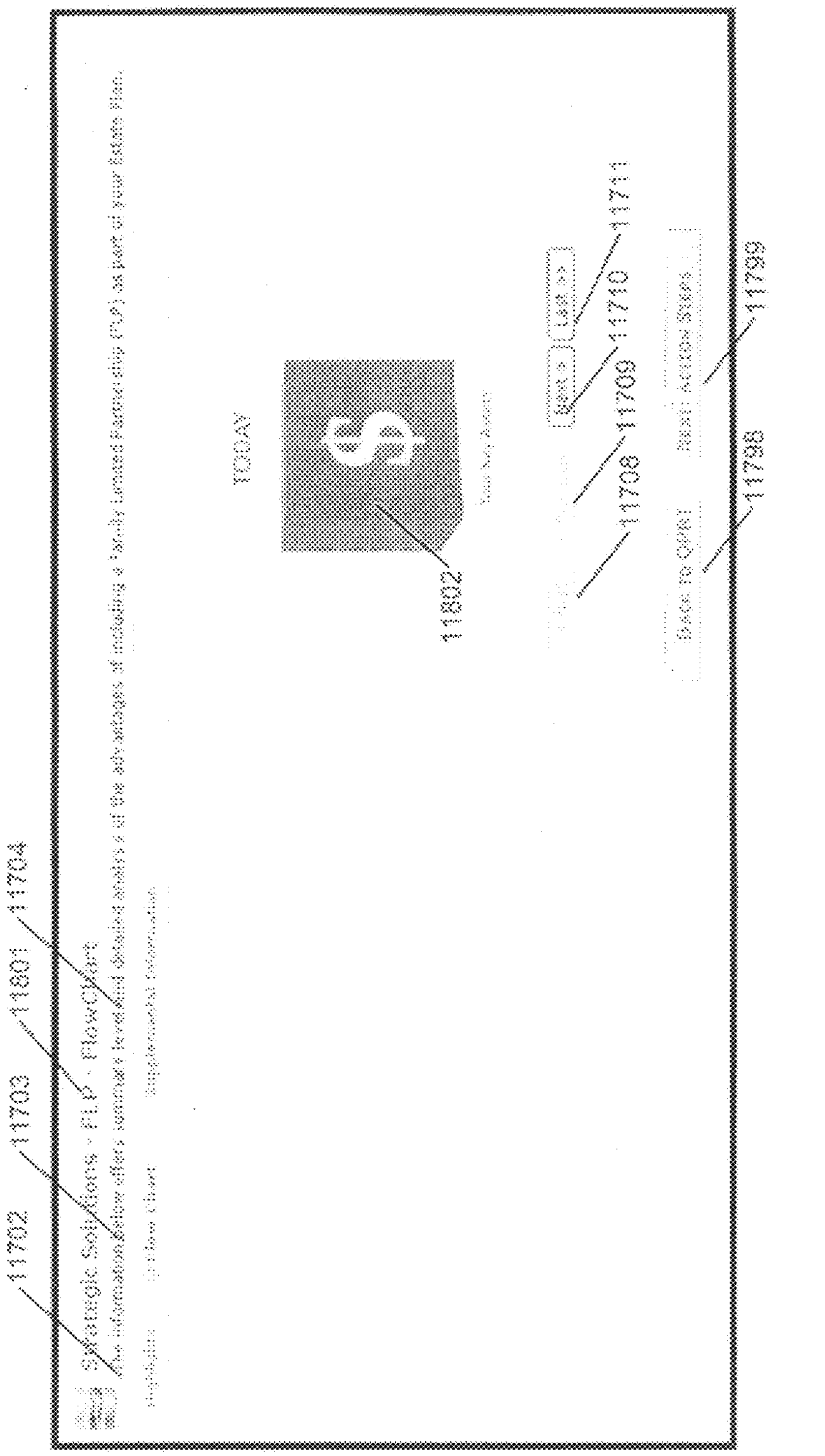

FIG. 118 a Strategic-Solution—QPRT-QPRT Supplemental Information 11801 user interface when the user selects the Flow Chart link 11603 link (FIG. 117). User interface 11601 can provide graphics, symbols and animated symbols representation demonstrating the benefits and scenarios of an FLP. Graphic representation 11802 represents a user's key assets. User interface 11801 can also include a menu across the bottom of the page that allows the user to navigate through out the flow chart fields. For example, the menu may include a First button 11708, a Previous button 11709, a Next button 11710, and a Last Button 11711 as discussed in FIG. 117. Further, the FLP flow chart interface 11801 also may include Back to QPRT 11798 and Next: Action Steps 11799 buttons.

Figure 119:
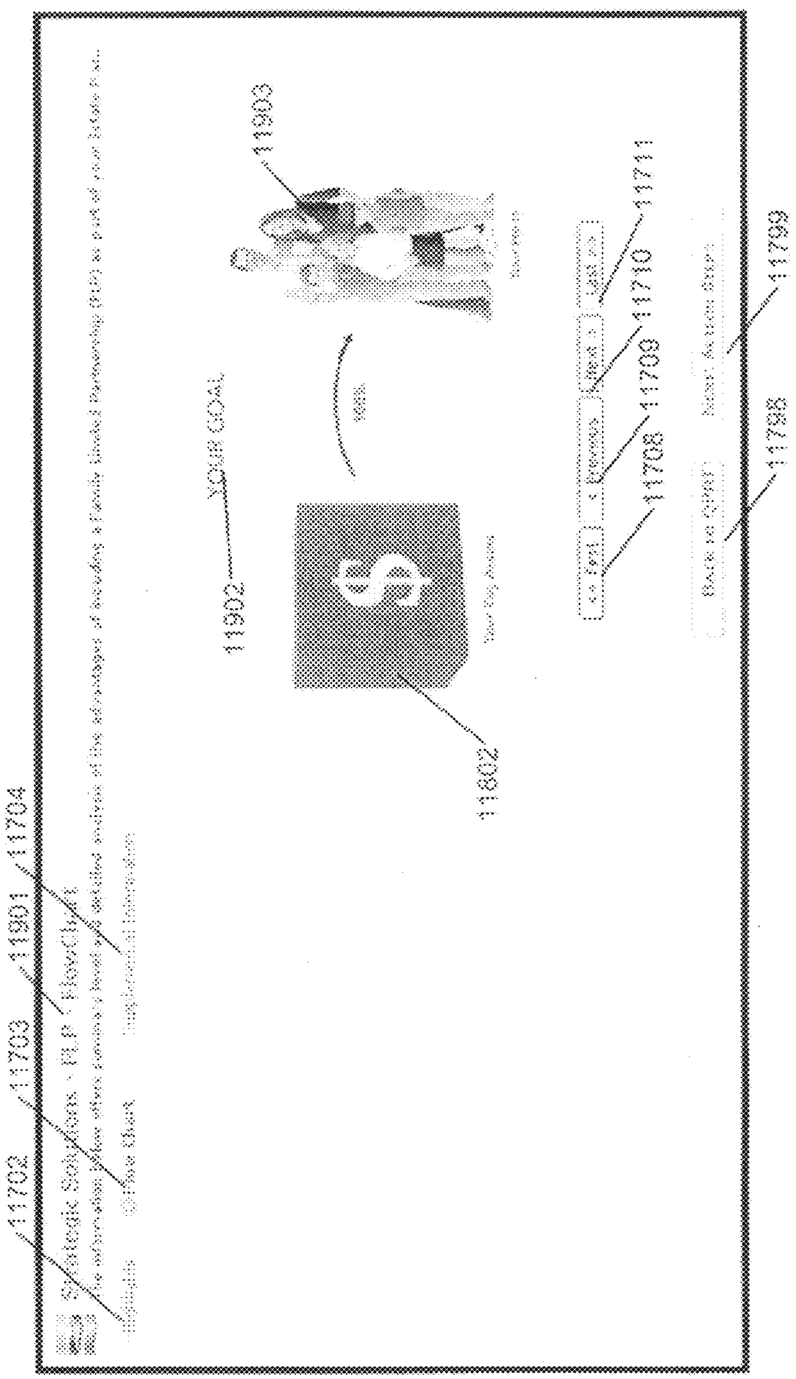

FIG. 119 illustrates user interface 11801 as a client progresses through the flowchart. In this example, the graphics demonstrate the ultimate goal of any estate: a user wants to ensure that their key assets 11802 are 100% transferred to their heirs 11803. The user can again navigate through the flowchart via Next 11710, Previous 11709, First 11708, and Last 11711 as discussed in FIG. 117. The user can also navigate to other areas of the navigation bar (see FIG. 11) by selecting Back to QPRT 11798 or Next: Action Steps 11799 buttons.

Figure 120:
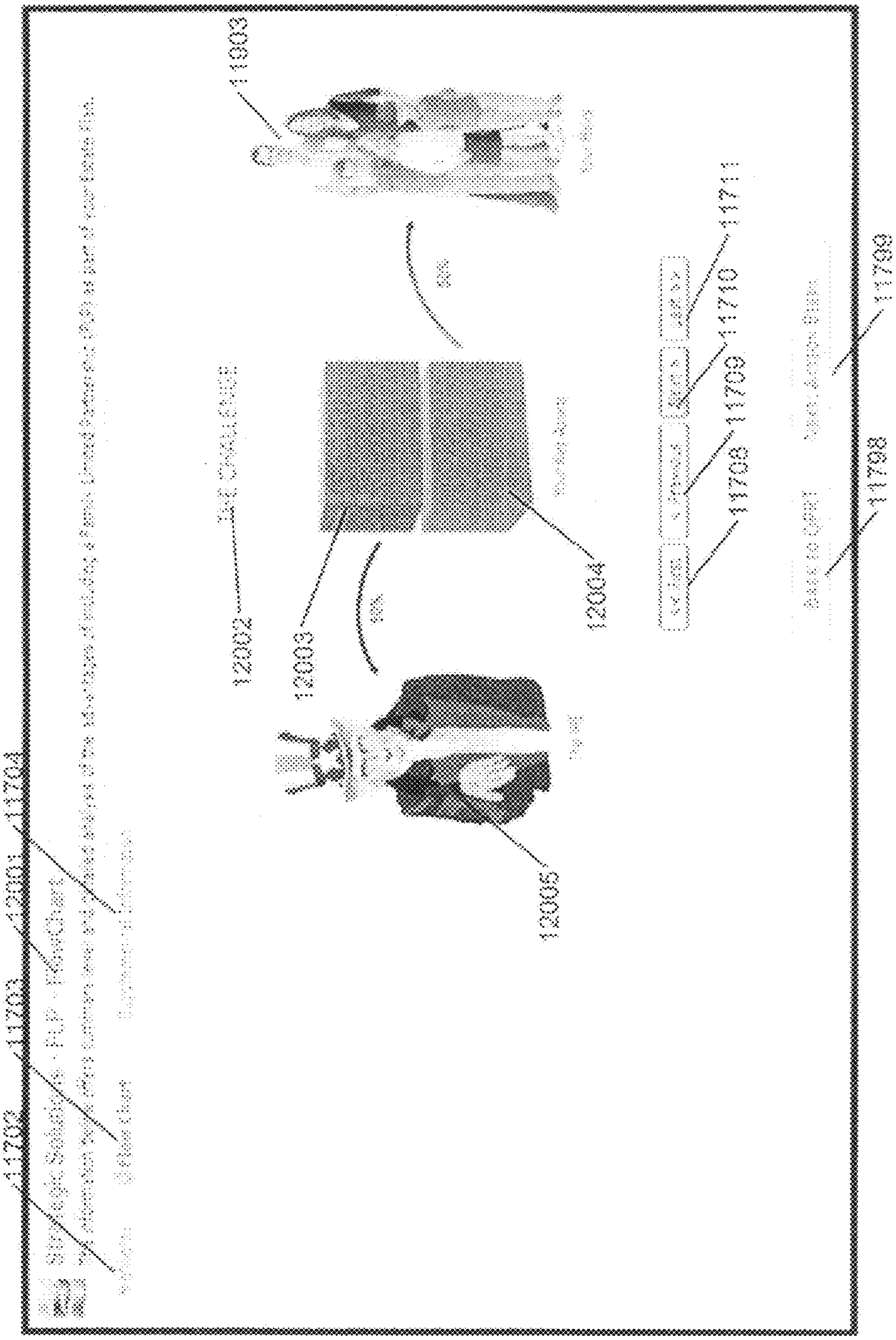

FIG. 120 illustrates user interface 11901 as a client progresses through the flowchart. In this example, the graphics demonstrate the hurdles of challenge of meeting the goals of FIG. 119. Because an estate is subject to taxation, the IRS, represented by graphic 12005 can receive about 50% of the estate 12003 and only 50% of the estate 12004 is transferred to heirs 11803. The user can again navigate through the flowchart via Next 11710, Previous 11709, First 11708, and Last 11711 as discussed in FIG. 117. The user can also navigate to other areas of the navigation bar (see FIG. 11) by selecting Back to QPRT 11798 or Next: Action Steps 11799 buttons.

Figure 121:
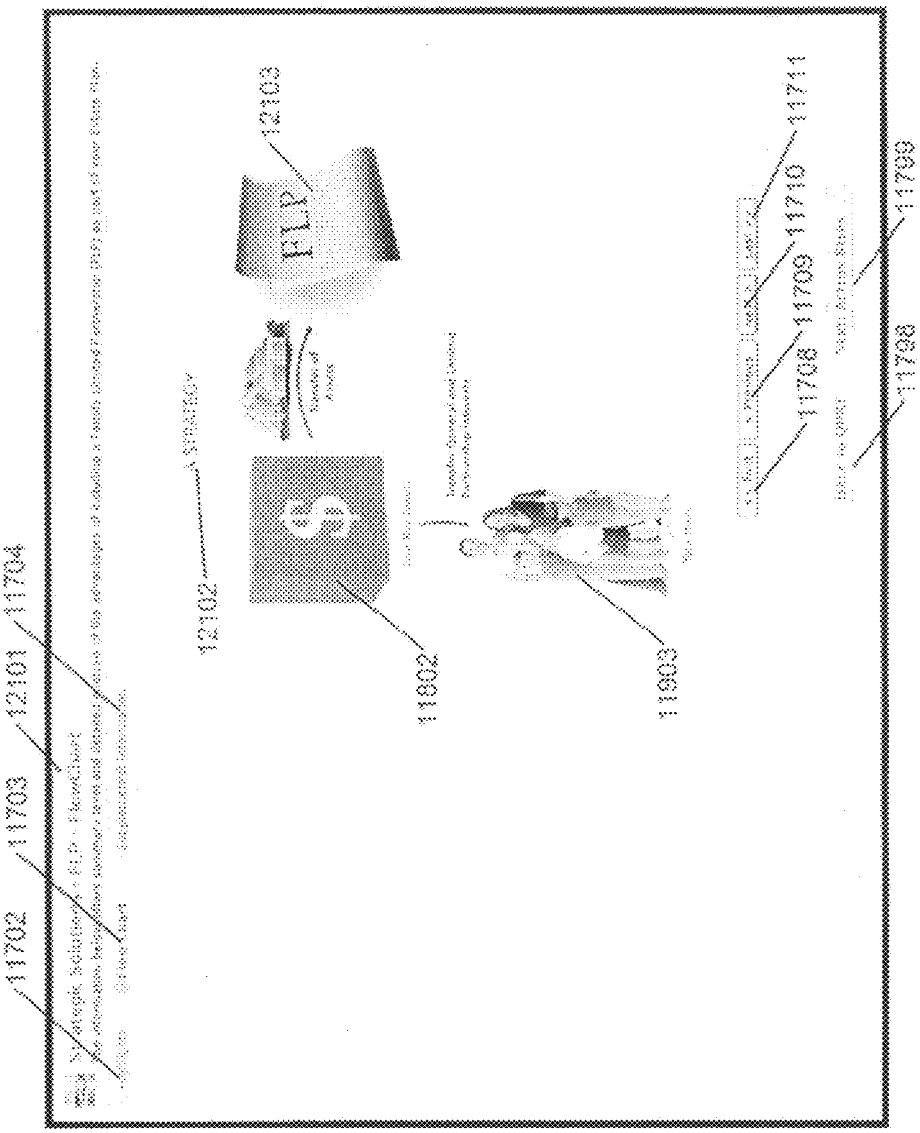

FIG. 121 illustrates user interface 12101 as a client progresses through the flowchart. In this example, the graphics demonstrate the Strategy 12102 of utilizing a FLP in order to meet the goals of FIG. 119. One strategy is for an estate 11802 to transfer assets to fund a FLP 12103. The estate 11802 can also then transfer General and Limited Partnership Interests to heirs 11803. The user can again navigate through the flowchart via Next 11710, Previous 11709, First 11708, and Last 11711 as discussed in FIG. 117. The user can also navigate to other areas of the navigation bar (see FIG. 11) by selecting Back to QPRT 11798 or Next: Action Steps 11799 buttons.

Figure 122:
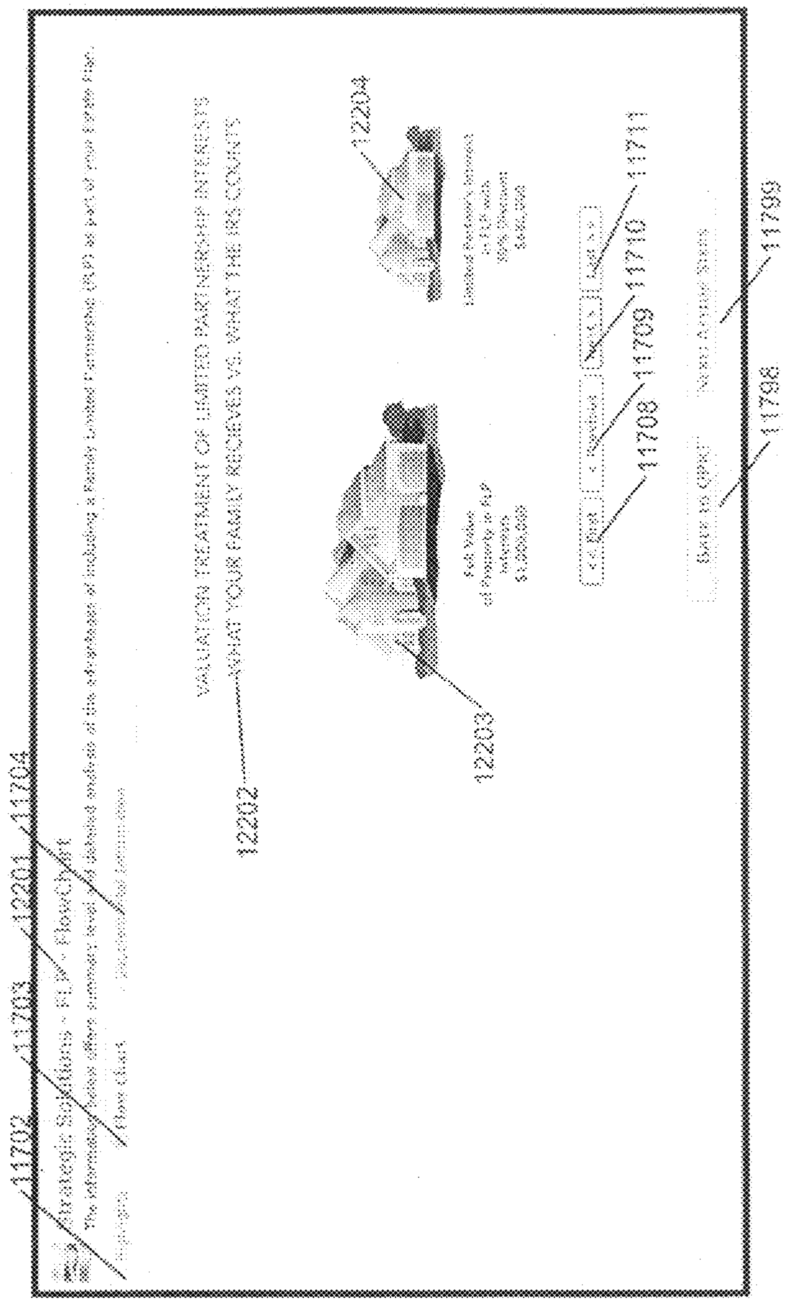

FIG. 122 illustrates user interface 12201 as a client progresses through the flowchart. In this example, the graphics demonstrate the Valuation Treatment of Limited Partnership Interests What Your Family Receives vs. What the IRS Counts 12202. Thus, even though the Full Value of the Property in the FLP Interests is $1,000,000 12203, the Limited Partner's Interest in the FLP with a 30% Discount is only $686,000 12204. The user can again navigate through the flowchart via Next 11710, Previous 11709, First 11708, and Last 11711 as discussed in FIG. 117. The user can also navigate to other areas of the Workflow Wizard navigation bar (see FIG. 11) by selecting Back to QPRT 11798 or Next: Action Steps 11799 buttons.

Figure 123:
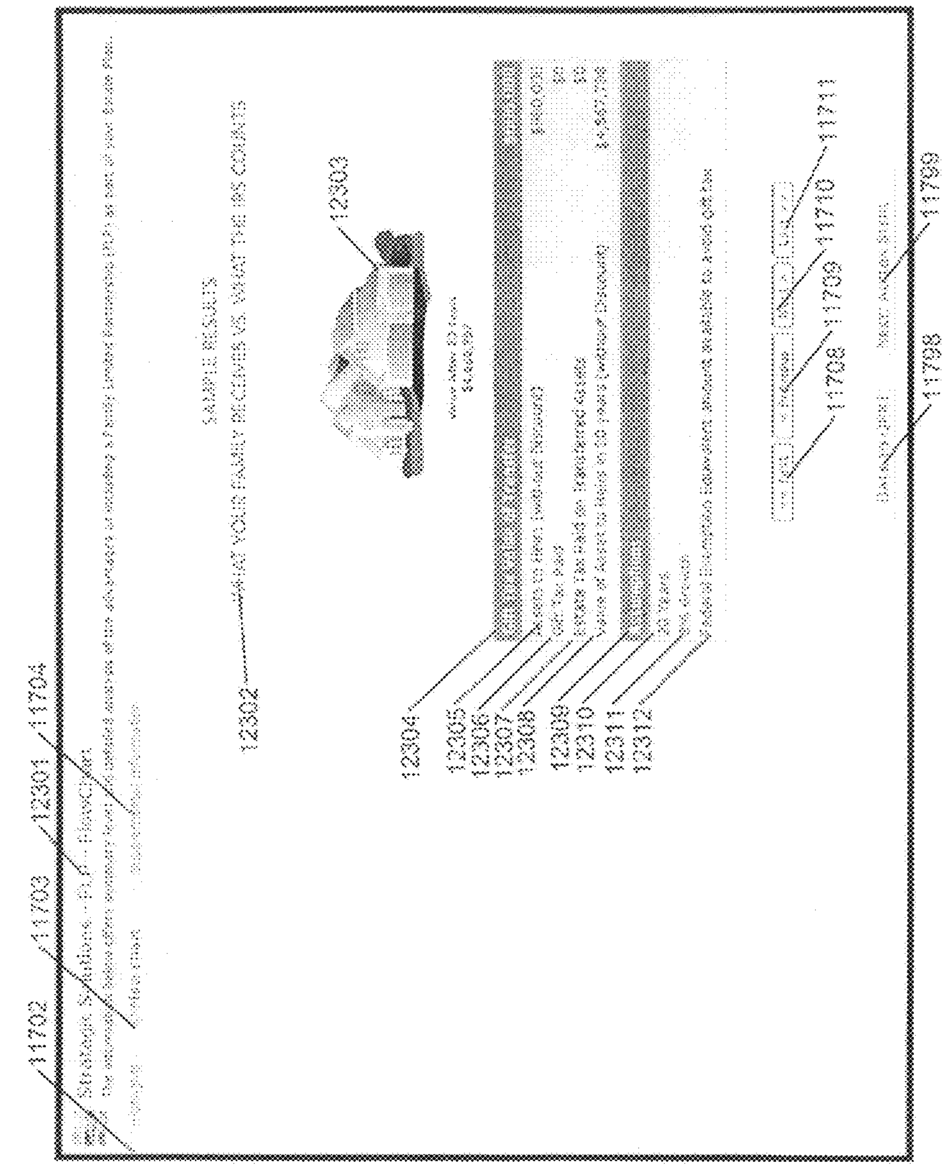

FIG. 123 illustrates user interface 12301 as a client progresses through the flowchart and reaches Sample Results for What Your Family Receives vs. What the IRS Counts 12302. In a Hypothetical situation, the Value of an Asset transferred to an FLP is worth $4,660,957. Gift Tax Value Transfer Section shows that the assets as originally transferred was worth $686,000. Assets to Heirs (without discount) 12305 was $980,000. Gift Tax Paid 12306 was $0. The Estate Tax Paid on Transferred Assets 12307 was $0. And the Value to Asset to Heir in 20 years (without Discount) is $4,567,738. The Assumptions upon which this example was made is displayed under Assumptions section 12309, which may display the Term of the trust 12310 (20 Years), the estimated Growth (8%) 12311, and The Federal Exemption Equivalent amount available to avoid gift tax 12312. The user can again navigate through the flowchart via Next 11710, Previous 11709, First 11708, and Last 11711 as discussed in FIG. 117. The user can also navigate to other areas of the Workflow Wizard navigation bar (see FIG. 11) by selecting Back to QPRT 11798 or Next: Action Steps 11799 buttons.

Figure 124:
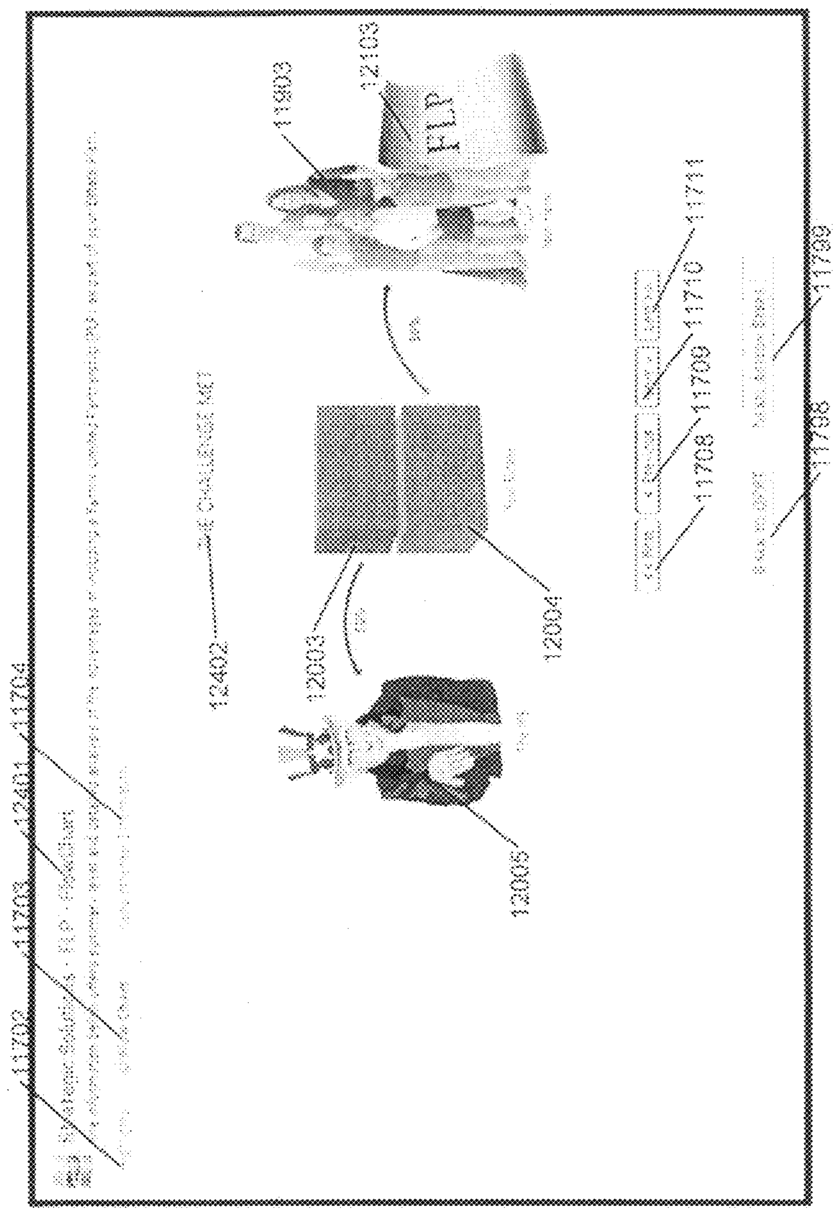

FIG. 124 demonstrates a Strategic-Solutions—FLP-Flow Chart 12401 user interface when the user selects the Flow Chart link 11603 link (FIG. 117) and proceeds in clicking through a sequence. The Strategic-Solutions—FLP-Flow Chart 12401 displays a graphical representation of The Challenge Met 12402 of a FLP. The Challenge Met 12402 displays a graphical representation wherein even though the IRS 12005 receives 50% of the estate 12003, your heirs receive 50% of an estate 12004 plus the assets from an FLP 12103. The user can again navigate through the flowchart via Next 11710, Previous 11709, First 11708, and Last 11711 as discussed in FIG. 117. The user can also navigate to other areas of the navigation bar (see FIG. 11) by selecting Back to QPRT 11798 or Next: Action Steps 11799 buttons.

Figure 125:
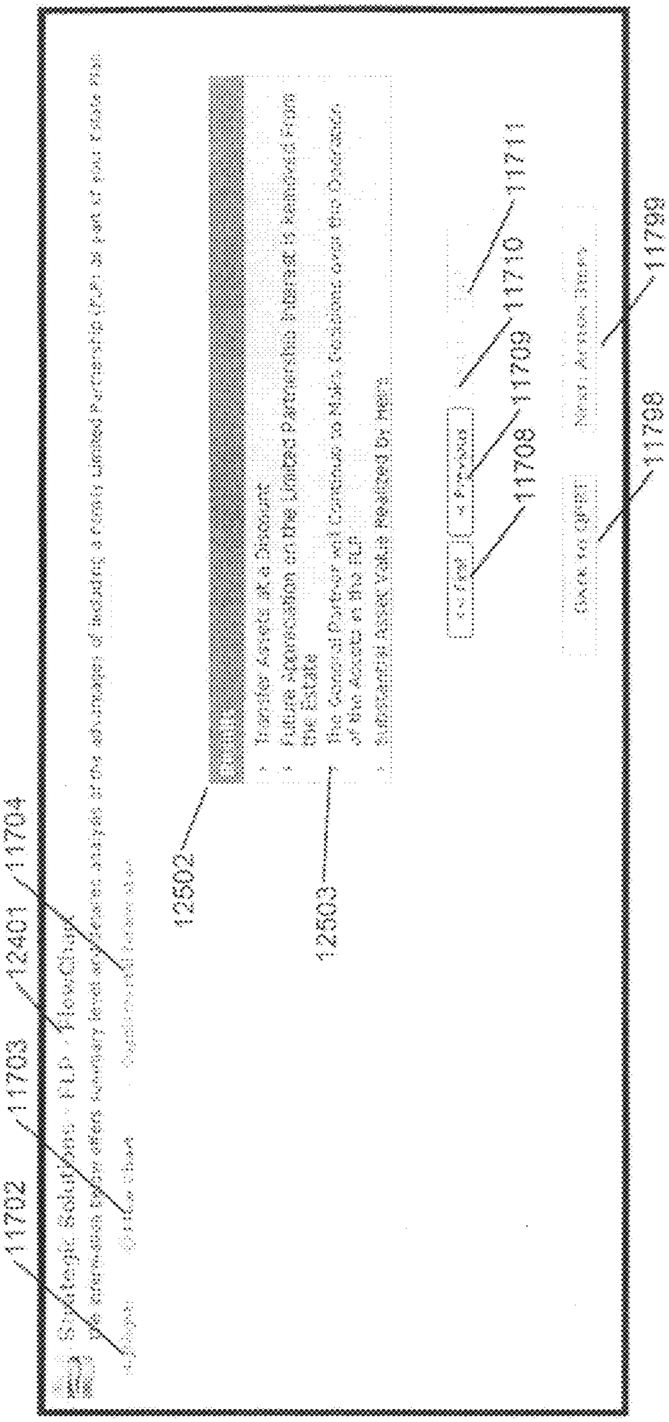

FIG. 125 illustrates a Strategic-Solutions—FLP-Flowchart 12501 user interface when the user selects the Flow Chart link 11603 link (FIG. 116) and proceeds in clicking through a sequence. The Strategic-Solutions—FLP-Flowchart 12501 displays a Results 12502 section of a FLP. Results 12502 displays bullets 12503 summarizing the benefits of a FLP, such as "Transfer Assets at a Discount," "Future Appreciation on the Limited Partnership Interest is Removed From the Estate," "The General Partner will Continue to Make Decisions over the Operation of the Assets in the FLP" and "Substantial Asset Value Realized by Heirs." The user can again navigate through the flowchart via Next 11710, Previous 11709, First 11708, and Last 11711 as discussed in FIG. 117. The user can also navigate to other areas of the navigation bar (see FIG. 11) by selecting Back to QPRT 11798 or Next: Action Steps 11799 buttons.

Figure 126:
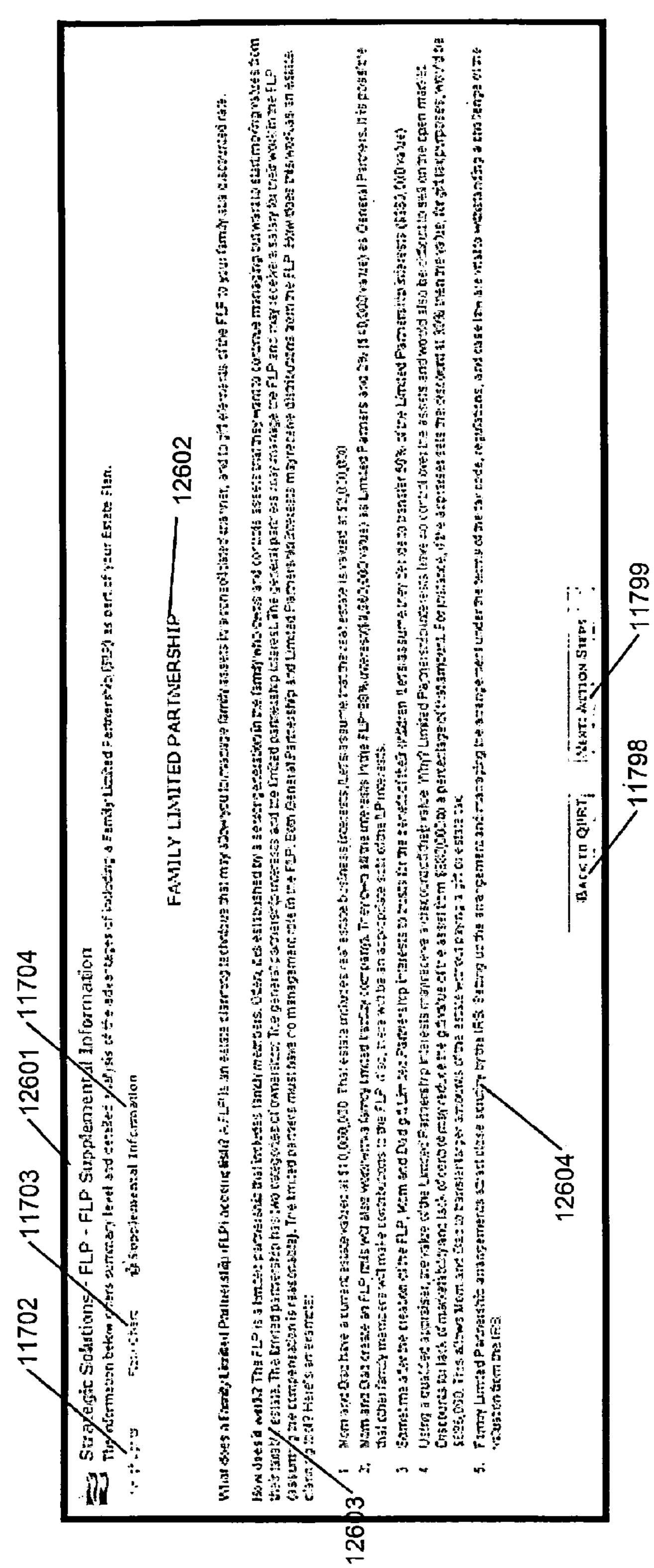

FIG. 126 demonstrates a Strategic-Solution—FLP-FLP Supplemental Information 12601 user interface when the user selects the Supplemental Information link 11703 link (FIG. 117). The Strategic-Solutions—FLP-FLP Supplemental Information 12601 user interface offers summary level and detailed analysis of the advantages of including a Family Limited Partnership (FLP) as part of an Estate Plan. For example Family Limited Partnership 12602 heading may present a frequently asked questions and answers section 12603, and summary information related to a FLP in outline form 12604. For example frequently asked questions and answers section 12603 may include reasons to use a Family Limited Partnership (FLP). What does a Family Limited Partnership (FLP) accomplish? A FLP is an estate planning technique that may allow you to manage family assets in a consolidated manner, and to gift elements of the FLP to your family at a discounted rate.

How does it work? The FLP is a limited partnership that includes family members. Often, it is established by a senior generation in the family who owns and controls assets that they want to continue managing but want to start moving values from their taxable estate. The limited partnership has two categories of ownership: the general partnership interest and the limited partnership interest. The general partners may manage the FLP and may receive a salary for their work in the FLP (assuming the compensation is reasonable). The limited partners must have no management role in the FLP. Both General Partnership and Limited Partnership interests may receive distributions from the FLP. How does this work as an estate planning tool? An outline 12604 section relating to summary information for a QPRT may include:

1. Mom and Dad have a current estate valued at $10,000,000. That estate includes real estate business interests. Let's assume that the real estate is valued at $2,000,000.

2. Mom and Dad create an FLP (this will also work with a family limited liability company). They own all the interests in the FLP: 98% interest as Limited Partners and 2% as General Partners. It is possible that other family members will make contributions to the FLP. If so, there will be an appropriate split of the LP interests.

3. Sometime after the creation of the FLP, Mom and Dad gift Limited Partnership interests to trusts for the benefit of their children. Let's assume they decide to transfer 50% of the Limited Partnership interests.

4. Using a qualified appraiser, the value of the Limited Partnership interests may receive a discount off their value. Why? Limited Partnership interests have no control over the assets and would also be difficult to sell on the open market. Discounts for lack of marketability and lack of control may reduce the gift value of the asset from $1,000,000 to a percentage of that amount. For instance, if the appraiser sets the discount at 30% then the value, for gift tax purposes would be $700,000. This allows Mom and Dad to transfer larger amounts of the estate without paying a gift or estate tax.

5. Family Limited Partnership arrangements attract close scrutiny by the IRS. Setting up the arrangement and managing the arrangement under the terms of the tax code, regulations, and case law are vital to withstanding a challenge of the valuation from the IRS.

Data Gathering

Figure 127:
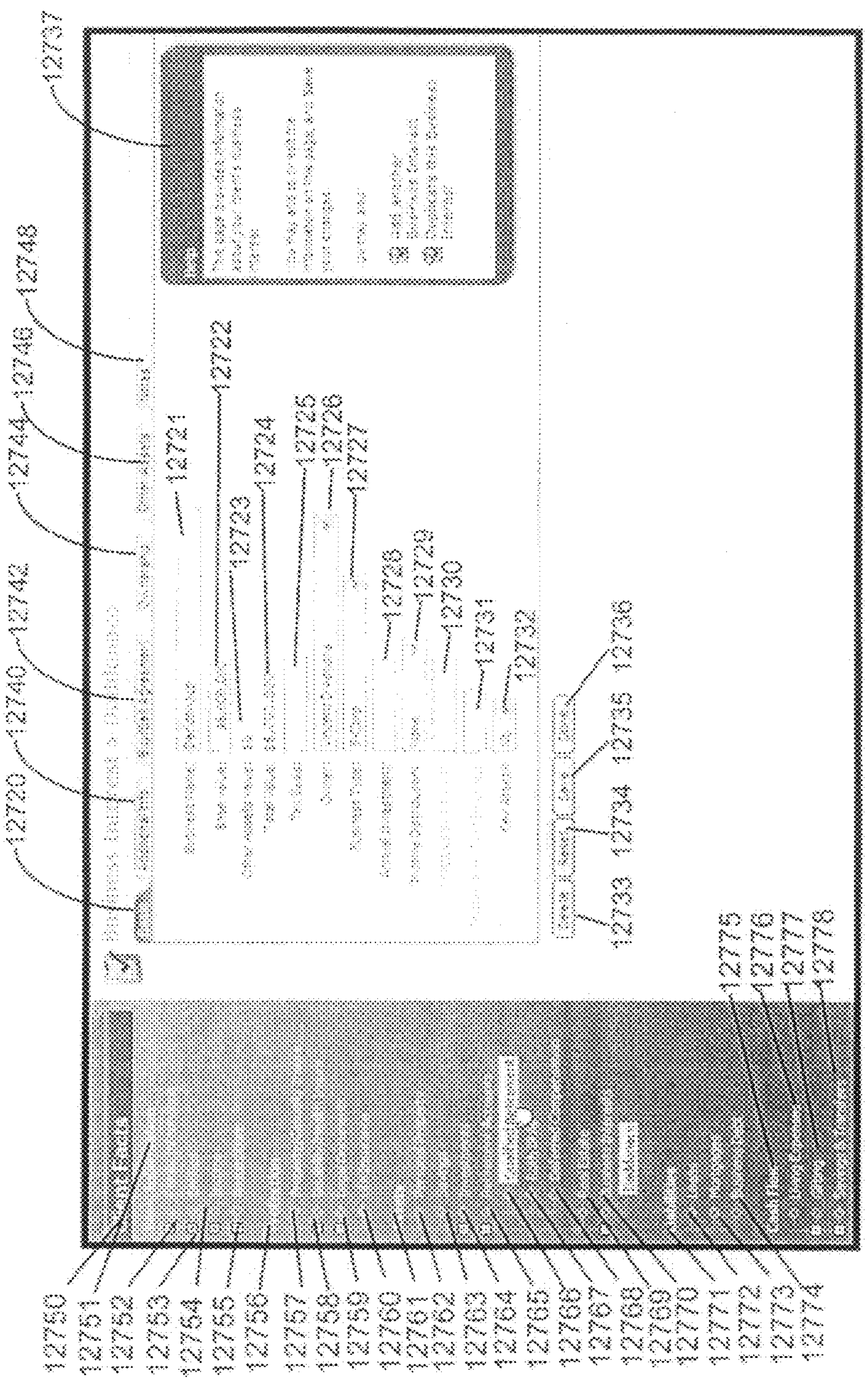

FIG. 127 presents a user interface for collecting client information and is part of the data gathering phase. The Client Facts 12750 user interface is designed to provide an easy, convenient way for a user to navigate and enter all personal finance information in order to manage their estate. A user can select any of the links on the left menu to navigate to any section of the data gathering phase to manage a client's personal information. The client information user interface includes a Client Facts link header 12750. Under Client Facts link header 12750, a user can find a variety of expandable links for collecting client information. For example, the Client Fact link header interface has a Basic Information link 12751, which includes sub-links Family Information 12752, Entities 12753, Income 12754, and Assumptions 12755. Another Client Fact link header 12750 interface is Protection link 12756, which includes sub-links Property/Casualty Insurance 12757, Disability/Health Insurance 12758, Legal Documents 12759 and Life Insurance 12760. Another Client Fact link header 12750 interface is Assets link 12761, which includes sub-links Personal Property 12762, Savings 12763, Investments 12764, Retirement Accounts 12765, Real Estate 12769, and Business Interests 12770. Sub-link Retirement Accounts 12765 can further include Qualified Retirement 12766 subsection (which can include Qualified Retirement 1 12767 information), Roth IRAs 12767 subsection, and Deferred Compensation 12768 subsection. Another Client Facts link header 12750 interface is Liabilities link 12771, which includes sub-links Loans 12772, Mortgages 12773, and Business Debt 12774. Additionally, another Client Fact link header 12750 interface is Cash Flow link 12775, which includes sub-links Living Expenses 12776, Gifting 12777, and Savings & Transfers 12778. Client Facts 12750 menu can be a dynamic menu. The plus signs under the Client Facts 12750 menu can be selected to expand a sub-menu. The sub-menu can expand as data is entered, for example, by adding an entry for each family member, entity, protection, asset, liability or asset in the Client Facts 12750 menu.

In this example, a client has entered information for a hypothetical business interest "Daddonaco." When entering data for a business interests, a user can be given a variety of tool bars and layers of links in which to enter data. In this example, the Business Interest user interface displays a menu comprising multiple tabs along the top of the page. For example, the menu comprises a Basic menu tab 12720, an Additional Info menu tab 12740, a Buy/Sell Agreement menu tab 12742, an Ownership menu tab 12744, an Other History menu tab 12746, and a Notes menu tab 12748. In this example, the Basic menu tab 12720 is displayed. A user can enter information relating to general information of their Business Interest in this layer. For example, the layer can have an Business Name field 12721, an Base Value field 12722, a Other Assets Value field 12723, a Total Value field 12724, a Tax Basis field 12725, a Owner field 12726, a Business Type field 12727, an Annual Investment field 12728, an Income Distribution field 12729, a Distribution Amount field 12730, a Distribution (% of Income) field 12731, and a Key Asset field 12732. Key assets are assets which a client does not wish to sell, i.e., keep it in family, in order to satisfy the estate tax burden during estate settlement. Examples of key assets are family owned businesses, vacation home shared by the inheritors, or other legacy assets. In order to make the layers user friendly and convenient to the user, the layer can have several housekeeping buttons, such as Delete 12733, Reset 12734, Save 12735, and Done 12736. These housekeeping buttons allow a user to perform these tasks so as to enable the user the upload information and change it at their convenience. Further, the interface can comprise a Help window 12737 which provides basic information regarding the current page that the client is in, and provides useful links that the user may choose in order to navigate through the particular Client Facts subsections easily.

Figure 128:
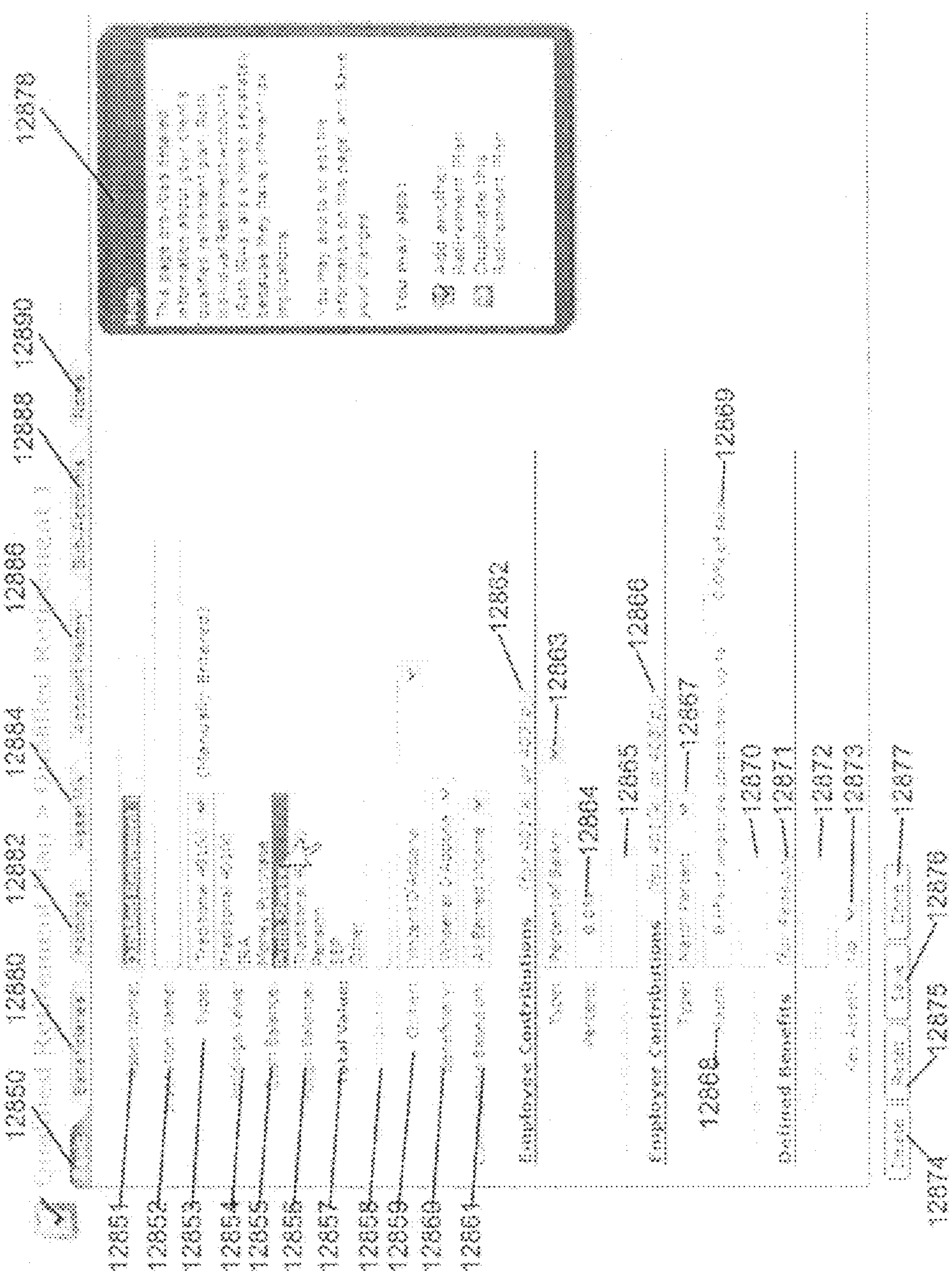

As shown in FIG. 128, a client can enter personal information relating to various qualified retirement plans. In this example, a client has entered information for a hypothetical Qualified Retirement 1. When entering data for a Qualified Retirement plan, a user can be given a variety of tool bars and layers of links in which to enter data. In this example, the Qualified Retirement plan 12838 displays a menu comprising multiple tabs along the top of the page. For example, the menu comprises a Basic menu tab 12850, a Beneficiaries menu tab 12880, a Holdings menu tab 12882, an Asset Mix menu tab 12884, an Account History menu tab 12886, a sub-Accounts menu tab 12888, and a Notes menu tab 12890. In this example, the Basic menu tab 12850 is displayed. A user can enter information relating to general information of their Qualified Retirement Plans 1 in this layer. For example, the layer can have an Asset Name field 12851, an Institution Name field 12852, a Type field 12853, a Holdings Value field 12854, a Cash Balance field 12855, a Margin Balance field 12856, a Total Value field 12857, an Annual Contributions field 12858, an Owner field 12859, a Beneficiary field 12860, and a Contributions Based On field 12861. The layer can also have several fields generally directed towards contributions made by the employee for 401(k) or 403(b) by retirement plans. For example, Employee Contributions header 12862 can have a Type field 12863, a Percent field 12864 and/or an Annual Dollar Amount field 12865. The layer can also have several fields generally directed towards contributions made by the employer for 401(k) or 403(b) retirement plans. For example, Employer Contributions header 12862 can have a Type field 12867, a Match field 12868 which lists the percent an employer matches the employee contribution, and a field reflecting the percent of Salary maximum field 12869 that is matched, and/or an Annual Dollar Amount field 12870. A Defined Benefits header 12871 can be directed to individual pension plans for the client, and can have an Annual Pension Benefits field 12872 and/or a Key Asset 12873 field which identifies the specific pensions, and provides a general assessment of the pension to the overall retirement plan. Key assets are assets which a client does not wish to sell, i.e., keep it in family, in order to satisfy the estate tax burden during estate settlement. In order to make the layers user friendly and convenient to the user, the layer can have several housekeeping buttons, such as Delete 12874, Reset 12875, Save 12876, and Done 12877. These housekeeping buttons allow a user to upload information and change it at their convenience. Further, the interface can comprise a Help window 12878 which provide basic information regarding the current page that the client is in, and provides useful links that the user may choose in order to navigate through the particular Client Facts subsections easily.

In FIG. 129, a client can enter personal information relating to real estate properties owned by the client. In this example, a client has entered information for a hypothetical "Real Estate 1" 12901. When entering data for real estate, a user can be given a variety of tool bars and layers of links in which to enter data. In this example, the Real Estate Property user interface displays a menu comprising multiple tabs along the top of the page. For example, the menu comprises a Basic menu tab 12902, an Ownership menu tab 12914, a Mortgages menu tab 12914, and a Notes menu tab 12916. In this example, the Basic menu tab 12902 is displayed. A user can enter information relating to general information of their Real Estate properties in this layer. For example, the layer can have a Property Name field 12903, a Property Type field 12904, a Category field 12905, a Current Value field 12906, a Tax Basis field 12907, an Owner field 12908, a State field 12909, a Qualifies for Home Sale Gain Exclusion field 12910, and a Key Asset field 12916. Key assets are assets which a client does not wish to sell, i.e., keep it in family, in order to satisfy the estate tax burden during estate settlement. In order to make the layers user friendly and convenient to the user, the layer can have several housekeeping buttons, such as Delete 12918, Reset 12920, Save 12922, and Done 12924. These housekeeping buttons will allow a user to perform these tasks so as to enable the user the upload information and change it at their convenience, and make any changes necessary at their discretion. Further, the layer can comprise a Help window 12926 which provides basic information regarding the current page that the client is in, and provides useful links that the user may choose in order to navigate through the particular Client Facts subsections easily.

The actions described in the data gathering figures (FIG. 127-129) are for the purposes of example only. These steps are further described in related applications, the contents of which are expressly incorporated by reference, in their entirety.

Accordingly, insurance professionals can use such display pages and features to manage and improve many aspects of their business operations, and clients can benefit from such improved operations and information. The display pages can be used as part of a client meeting, to form reports for a client, to practice for a meeting, to identify pertinent facts to discuss with a client, etc.

Although, the insurance-professional specific pages are particularly suited for insurance professionals, if desired, one or more of such pages can be configured for access and use by clients.

Note that the above display pages and processes were presented in particular sequences. However, variations in the order of the process steps, features, and the sequence of display pages, or the separate display or implementation of display pages are also contemplated.

One or more applications can be implemented (e.g., separately, in combination, or as a single application) to provide such insurance related display pages, features, or systems. Note that applications such as applets or modules can be used in or to implement display pages or features thereof.

For convenience and clarity, the word "page" is used herein to describe a graphical user interface through which a user or client interacts with the insurance services environment. Other terms may also be used for these features.

For the sake of brevity, it should be understood that certain structure and functionality, or aspects thereof of embodiments of the invention that are evident from the illustrations of the FIGs. have not been necessarily restated herein.

A computer or processor readable medium such as a floppy disk, CD-ROM, DVD, etc. It may be used to store the processes, techniques, software, and information illustratively described herein. The media may store instructions, which when executed by a computer processor causes the processor to perform the processes described herein. The media can also be stored on devices, such as a server device, within a database, within main memory, within secondary storage, or the like.

It is to be understood that the invention is not to be limited to the exact configuration as illustrated and described herein. Accordingly, all expedient modifications readily attainable by one of ordinary skill in the art from the disclosure set forth herein, or by routine experimentation there from, are deemed to be within the spirit and scope of the invention as defined by the appended claims.

What is claimed is:

1. A computer-implemented method for interactively analyzing and illustrating a grantor's estate transfer to heirs comprising:

storing grantor information including a life expectancy state and a current financial state with a computer;

receiving a selection of one or more key assets;

calculating with the computer a projected financial state, wherein the projected financial state is calculated by a wealth shifting tool utilizing the life expectancy state and a financial change in the current financial state that occurs when an estate disbursement is triggered, wherein at least a portion of the triggered estate disbursement is based on the received selection of one or more key assets;

presenting an interactive interface that displays the current financial state and the projected financial state over a period of years; and data gathering, with the interactive interface, estate related parameters to redisplay the projected financial state based on the estate related parameters on the computer.

2. The method of claim 1, wherein the period of years is greater than ten years.

3. The method of claim 1, wherein the wealth shifting tools comprise two or more of an Irrevocable Life Insurance Trust (ILIT), a Grantor Retained Annuity Trust (GRAT), an Intentionally Defective Grantor Trust (IDGT), a Charitable Remainder Trust (CRT), a Charitable Lead Trust (Cu), a Qualified Personal Residence Trust (QPRT) and a Family Limited Partnership (FLP).

4. The method of claim 1, wherein the presenting includes a graph.

5. The method of claim 4, wherein the graph includes graphs for the current estate state over the years and the projected estate state over the years pursuant to using the wealth shifting tool.

6. The method of claim 1, wherein the presenting includes data tables for the current estate state over the years and the projected estate state over the years pursuant to using the wealth shifting tool.

7. The method of claim 1, wherein the step of presenting includes comparing the projected financial state generated by the wealth shifting tool against another projected financial state generated by a different wealth shifting tool.

8. The method of claim 7, wherein the wealth shifting tool includes a trust set to transfer at the estate distribution event.

9. The method of claim 1, wherein data gathering limits the financial parameters to permissible estate parameters.

10. The method of claim wherein the modified financial state includes life insurance.

11. The method of claim 10, wherein the life insurance includes whole life insurance that pays dividends without further cash from the insured.

12. The method of claim 1, wherein the interactive interface displays the current financial state in numerical values.

13. The method of claim 1, wherein the interactive interface comprises side-by-side tabular information for the current financial state and the modified version of the current financial state.

14. The method of claim 1, wherein the interactive interface provides the user with an opportunity to select to payoff liabilities incurred by the estate due to the estate disbursement trigger and calculating the modified financial state.

15. The method of claim 1, wherein the interactive interface is presented in a browser.

16. The method of claim 1, further comprising publishing the current financial state and the modified financial state to a customized client web-site.

17. The method of claim 1, further comprising: allowing the user to input a second selection to explore alternative asset liquidation scenarios, wherein the second selection includes a de-selection of one or more key assets; calculating with the computer a second projected financial state; and, presenting an interactive interface that displays the current financial state and the second projected financial state over a period of years.

* * * * *